United States Patent [19]

Lien

[11] Patent Number: 4,817,187
[45] Date of Patent: Mar. 28, 1989

[54] APPARATUS AND METHOD FOR VECTORIZATION OF INCOMING SCANNED IMAGE DATA

[75] Inventor: Yih-Liang L. Lien, Chandler, Ariz.

[73] Assignee: GTX Corporation, Phoenix, Ariz.

[21] Appl. No.: 16,660

[22] Filed: Feb. 19, 1987

[51] Int. Cl.$^4$ .............................................. G06K 9/00
[52] U.S. Cl. ........................................ 382/56; 382/22
[58] Field of Search ...................... 382/56, 21, 22, 25, 382/26, 60; 358/260, 261, 263; 258/133

[56] References Cited

U.S. PATENT DOCUMENTS

| | | | |
|---|---|---|---|
| 3,609,685 | 9/1971 | Deutsch | 382/60 |
| 4,087,788 | 5/1978 | Johannesson | 382/21 |
| 4,097,847 | 6/1978 | Forsen et al. | 382/22 |
| 4,107,648 | 8/1978 | Frank | 340/146.3 |
| 4,183,013 | 1/1980 | Agrawala et al. | 382/22 |
| 4,204,232 | 5/1980 | Mizuno | 382/56 |
| 4,307,377 | 12/1981 | Pferd et al. | 340/146.3 |
| 4,493,105 | 1/1985 | Beall et al. | 382/21 |
| 4,516,173 | 5/1985 | Abe et al. | 358/261 |
| 4,545,067 | 10/1985 | Juvin et al. | 382/21 |
| 4,603,431 | 7/1986 | Grover et al. | 382/56 |

FOREIGN PATENT DOCUMENTS 2131660 6/1984 United Kingdom.

Primary Examiner—Leo H. Boudreau
Attorney, Agent, or Firm—Cahill, Sutton & Thomas

[57] ABSTRACT

Serial data obtained by scanning an object including a plurality of connected shapes is encoded into "slices" consisting of colinear connected black pixels and is processed and assembled into "records" that contain compact slice data or corner points of trapezoidal shapes. For each shape, a record is fetched and recognized as to whether it is to be represented by a horizontal, vertical or diagonal vector, an arc vector, or a filled shape. The vector is entered into a table or merged with a vector already in the table, or corresponding "filled shape" data is generated and entered in the table. Merging is accomplished by determining if the input vector has an intersection number equal to that of any vector stored in the table, and merging the input vector with the stored vector if their respective end points and orientations are sufficiently close.

45 Claims, 12 Drawing Sheets

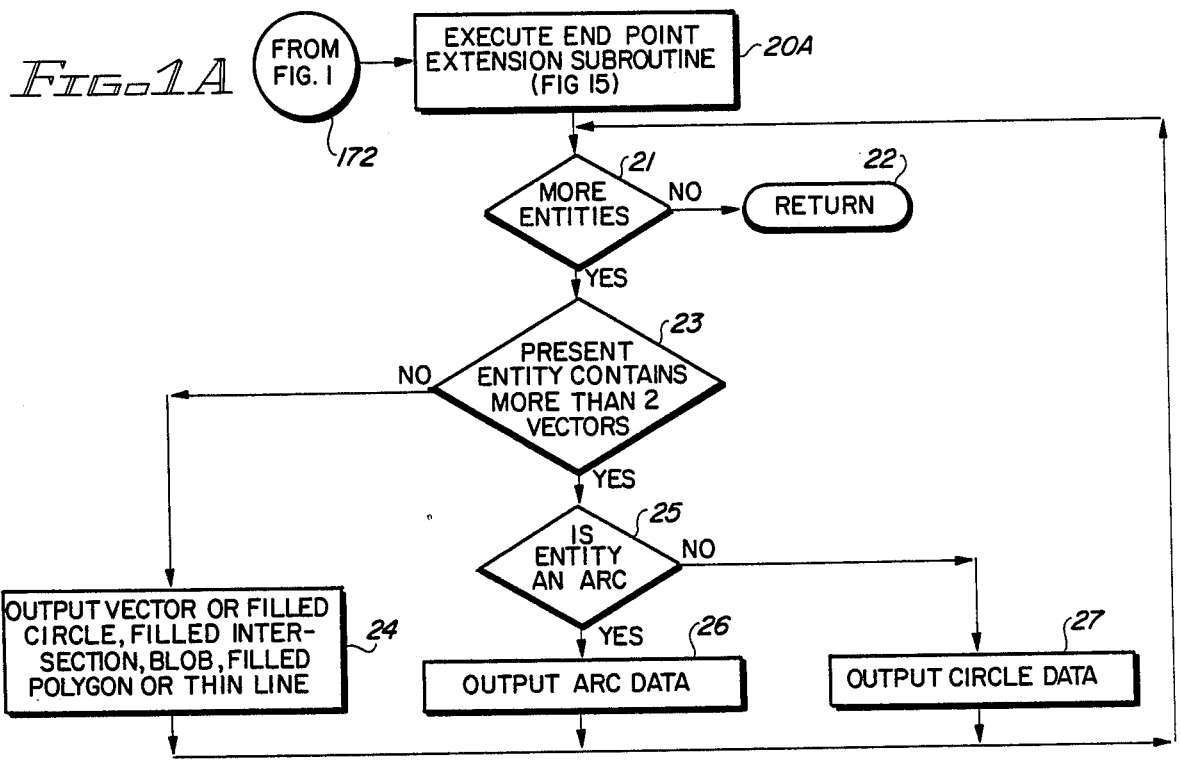
FIG. 1A
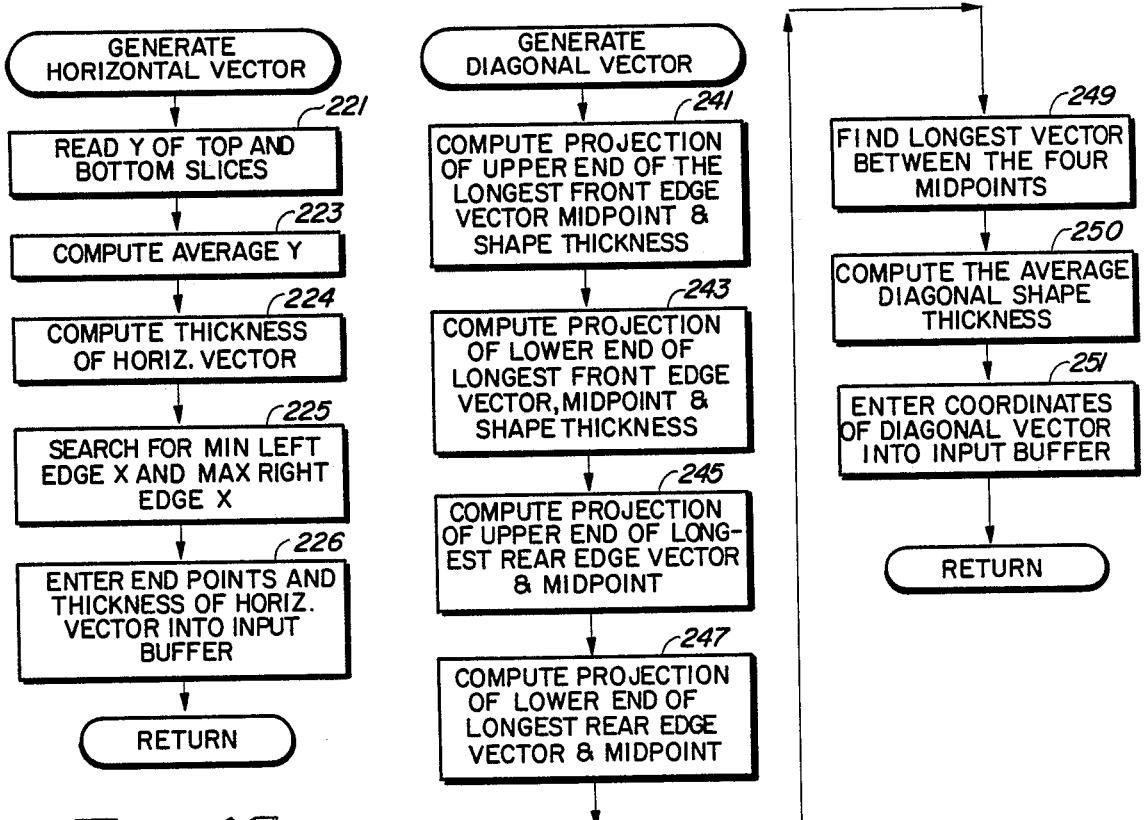
FIG. 1C
FIG. 1E

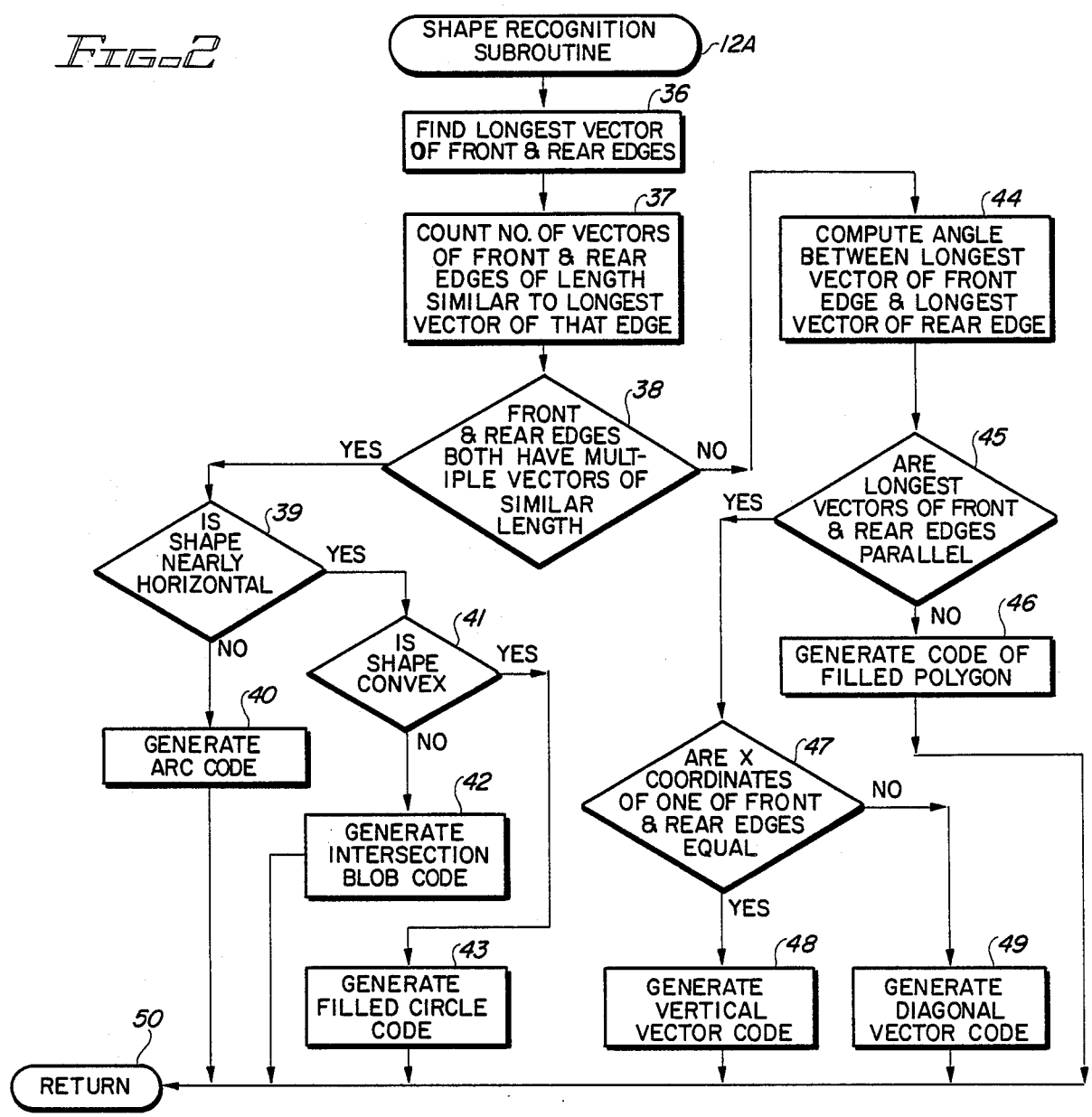
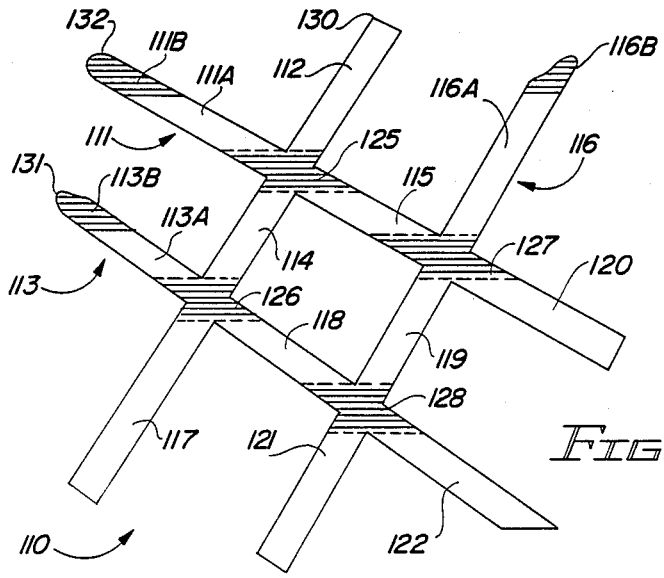
FIG. 6
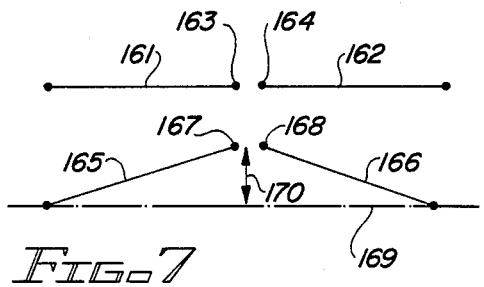
FIG. 7
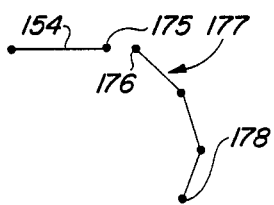
FIG. 8

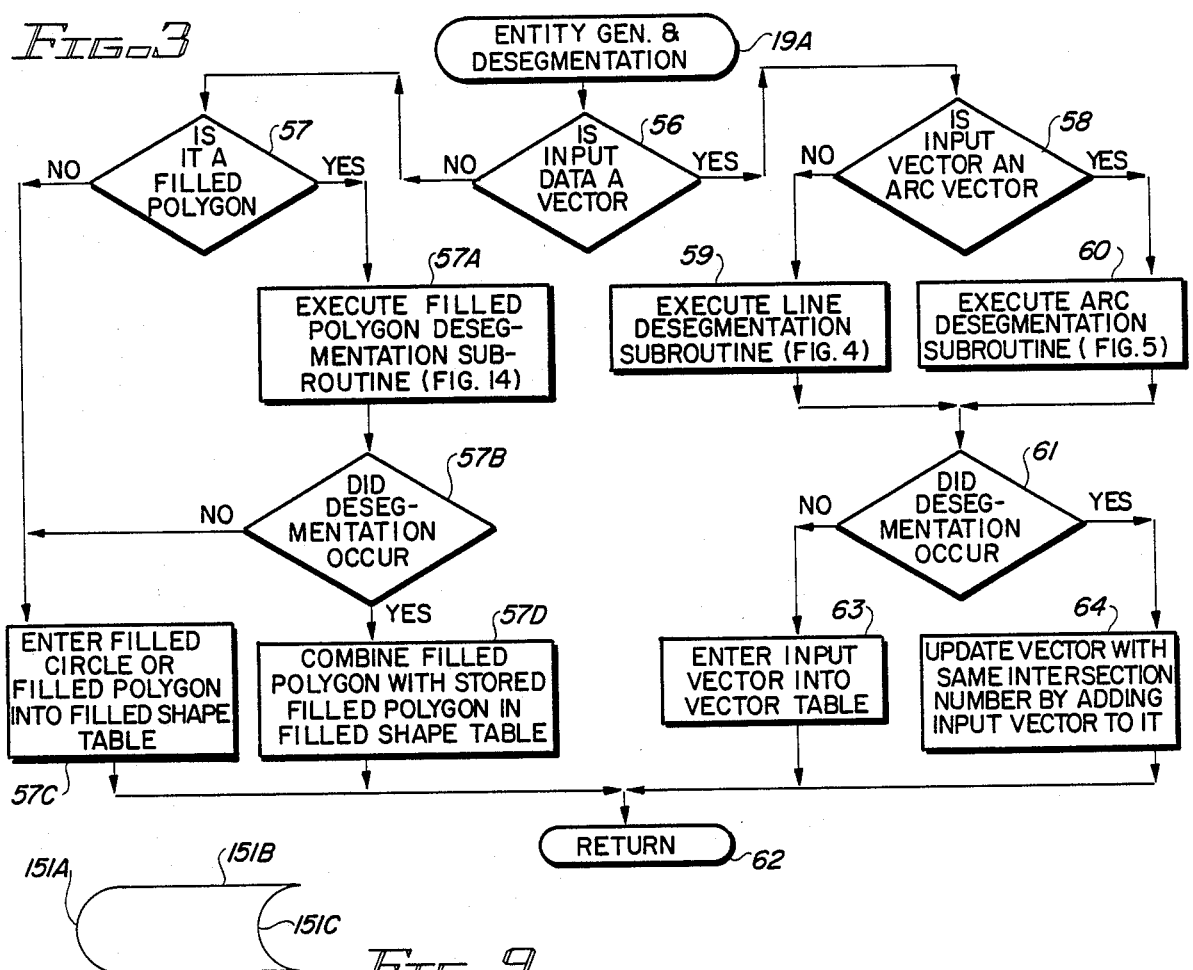
FIG-3
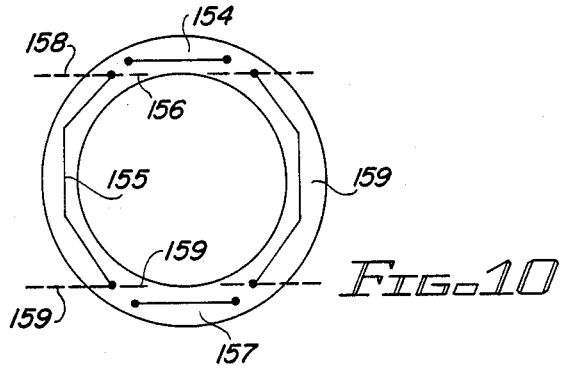
FIG-9
FIG-10
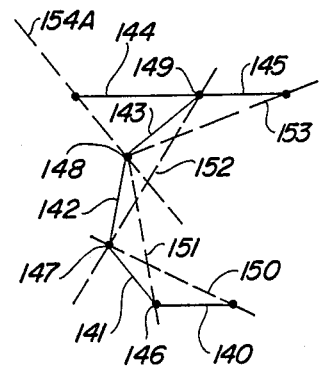
FIG-11
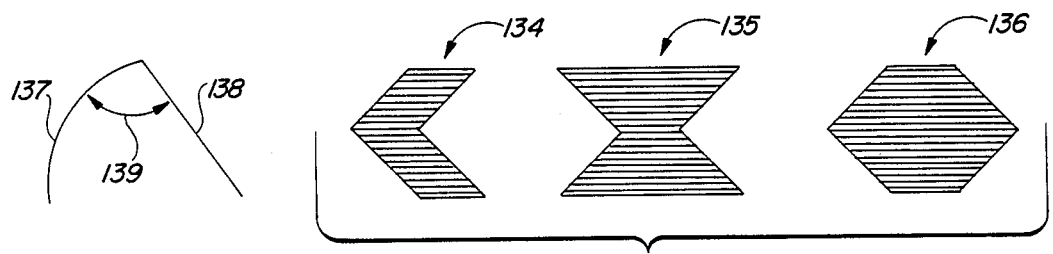
FIG-12
FIG-13

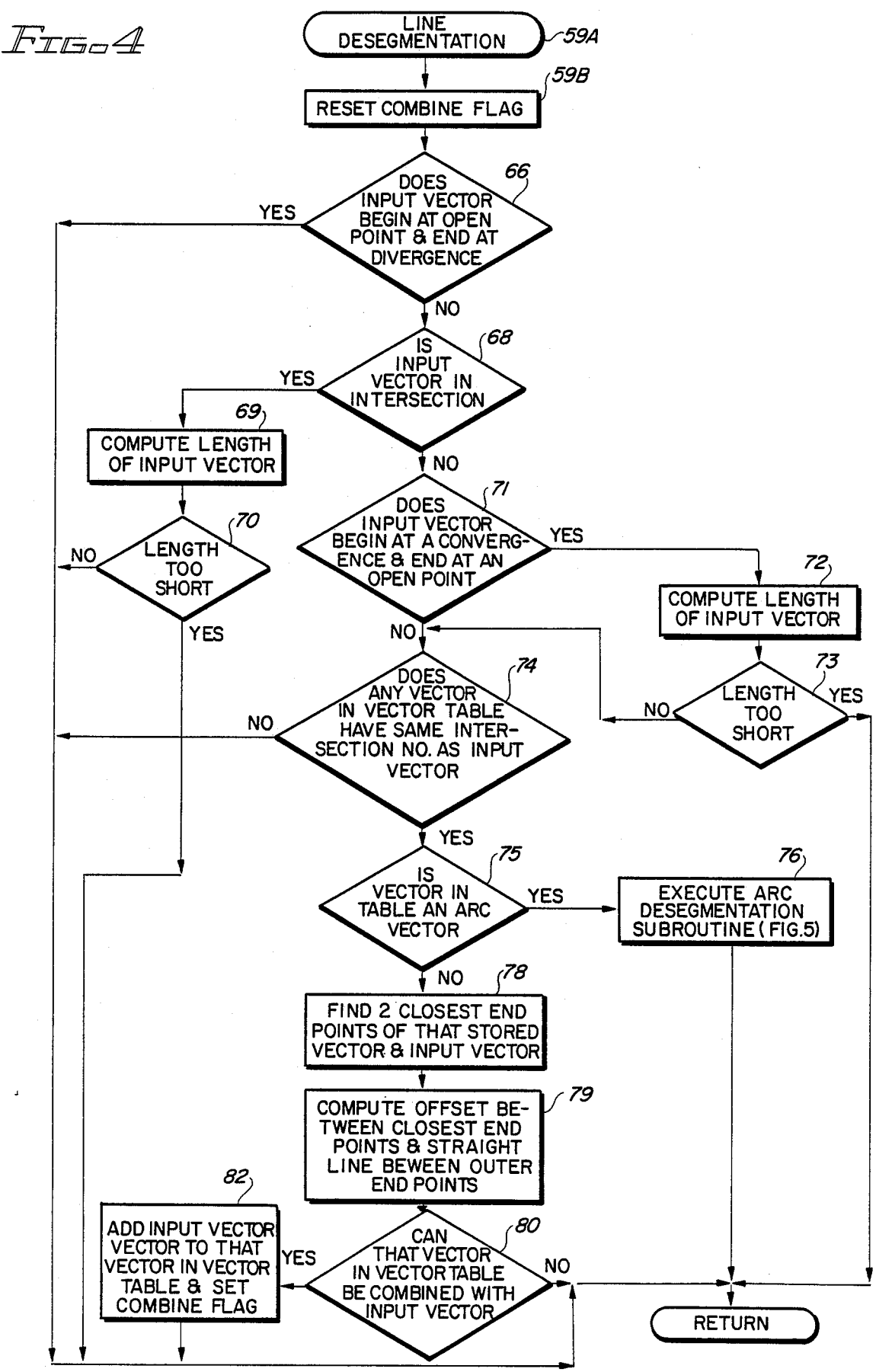

APPARATUS AND METHOD FOR VECTORIZATION OF INCOMING SCANNED IMAGE DATA

CROSS-REFERENCE TO RELATED APPLICATION

This application is related to copending patent application "METHOD AND APPARATUS FOR SIMPLIFYING RUNLENGTH DATA FROM SCANNING OF IMAGES" by John M. Roye, commonly assigned, filed on even data herewith and incorporated herein by reference, Ser. No. 016,662, now U.S. Pat. No. 4,821,336.

BACKGROUND OF THE INVENTION

The invention relates to apparatus and methods for vectorizing serial data received from scanning a document, especially a document with line drawings, hand-drawn technical drawings, or the like.

Those skilled in the art recognize that a single sheet of a document has a large number of pixel-sized areas that can be scanned line-by-line by a typical optical scanning device. As many as 60 million bits of information may be required to represent every such area or "point" on a single sheet of paper. Various techniques have been proposed to reduce the amount of data that must be processed and stored to allow computerized manipulation of scanned images and electronic transmission thereof. To this end, various character recognition, pattern recognition, and vectorization techniques have been developed. One type of character or pattern recognition technique is template matching, typically found in optical character readers. This approach requires very close matching of the scanned character to a stored "template". Another approach involves the recognition of simple shapes and generation of vectors to represent those shapes. Another approach involves complex statistical feature extraction processes that are performed on scanned data and statistical comparison of such features with stored samples. All of the known techniques require extensive pixel manipulation, and cannot be accomplished with satisfactory accuracy and speed on a low cost computer, such as an IBM AT personal computer.

The state of the art is generally indicated by the following references.

The article "Line Recognition of Hand-Written Schematics Using Run-Length Data", by Masayuki Okamoto and Hiroyuki Okamoto discloses a method of vectorizing images from line drawings using only runs of connected black pixels. (The date of this article presently is unknown, and it is not known whether this reference is prior to the present invention.) Input vectors are compared to stored criteria to determine if the input vector is vertical, horizontal, or a 45 degree vector. Runs on consecutive rows are merged into a block if they are connected and satisfy certain conditions. The blocks then are recognized. A number of runlengths are gathered to compose one block according to the length, gradient between certain lines, and line connectivities. Line recognition is performed on blocks which can be recognized as lines according to gradients and shapes.

U.S. Pat. No. 4,307,377 (Pferd et al.) discloses a system in which computer graphics material is raster scanned, digitzed, and then examined for narrow width areas of similar darkness, typically black or white. Such runs are compactly coded by using the coordinates of the first and last scan lines defining each area and thickness.

U.S. Pat. No. 4,493,105 (Beall et al.) discloses a technique of determining x and y coordinates of uniquely defined corner point vectors about the edge contours of a binary-valued image and then uniquely linking such encoded corner points into associated lists that together define the image.

U.S. Pat. No. 4,545,067 (Juvin et al.) discloses an automatic image recognition system in which electronically scanned data is processed to determine the coordinates of characteristic contour lines of the image, segmenting the respective contour lines, encoding the segments, attributing to each a pair of values relating to its length and angle, and comparing those with a stored reference contour.

U.K. patent application No. 2131660A by H. Hashiyama et al. discloses a technique of storing data corresponding to characteristic points on contours of images to be recognized, reading out such data and subjecting it to magnification-changing processing such as enlargement, reduction, rotation processing, etc., and converting the thus-arranged pattern into one-dimensional time series data.

None of the known systems meet the existing need for a low cost, accurate scanner that can rapidly and accurately digitize documents such ad hand-drawn technical drawings and the like in times as short as about five minutes.

SUMMARY OF THE INVENTION

Accordingly, it is an object of the invention to provide an improved method and apparatus for vectorizing serially scanned runlength data.

It is another object of the invention to provide an improved technique for vectorizing runlength data that reduces the amount of data required to electronically represent an image.

It is another object of the invention to provide an improved method and apparatus for vectorizing runlength data to substantially increase the accuracy of "copies" of the original object reconstructed from the vectorized data.

Another object of the invention is to substantially reduce the amount of time, processing, and hardware required to edit electronically scanned documents.

It is another object of the invention to provide a method and apparatus for reducing the costs and increasing the speed of the electronically transmitting graphic data.

It is another object of the invention to decrease the amount of memory required to accurately digitize scanned graphic objects.

Briefly described, and in accordance with one embodiment thereof, the invention includes a method and apparatus for vectorizing runlength data obtained by electronically scanning the object, wherein the runlength data has been assembled into records definitive of connected basic shapes of which the object is composed. The method includes obtaining the records of a first basic shape of the object, vectorizing front and rear edges of the first basic shape, determining if the first basic shape is accurately representable as an arc vector, a line vector, or a filled shaped by operating on the front and rear edge vectors, generating an input vector that is either a line vector or an arc vector if the first basic shape is to be represented by a line vector or an arc vector, respectively, generating data defining a filled shape if the first basic shape is to be represented as a filled shape, entering the filled shape data as a new entry into a vector table if the first basic shape is represented as a filled shape, determining whether the input vector can be combined with a vector already stored in the table is the first basic shape is represented by an input vector, and if this determintion is affirmative, storing a combined vector including the input vector and the stored vector in the table, and otherwise entering the input vector as a new entry into the table. In the described embodiment of the invention, the records include trapezoid records that include four corner points of trapezoids that are basic shapes of the object and blob records that include all of the runlength slices in non-trapezoidal basic shapes of the object. The records also include convergence records and divergence records that include pointers to basic shapes connected to the convergences and/or divergences of the object. All of the basic shapes connected to a patial intersection counter are vectorized or reduced to simplified filled shape data, circle data, or arc data before any basic shape connected to a second intersection but not connected to the first intersection is vectorized. A shape recognition subroutine determines if the first basic shape is horizontal, and then determines if the front and rear edges of the first basic shape each include a plurality of line vectors of similar length, and if that is the case, determines if the first basic shape is "nearly" horizontal, and if it is not, generating an arc code, and if the first basic shape is nearly horizontal, determining if the first basic shape is convex, and if it is, generating a filled circle code, and if the first basic shape is not convex, generating an intersection blob code. If the front and rear edges of the first shape each do not include a plurality of similar length vectors, the shape recognition subroutine determines if the longest vectors of the front and rear edges of the first basic shape are paralle, and generates a filled polygon code is they are not, and if they are, generates either a vertical vector code or a diagonal vector code. The foregoing codes then are used to call subroutines that generate the actual vectors or filled shape codes. The vectors or filled shape codes then are fed into an entity generation and desegmentation subroutine that either causes the information to be entered as a new entity into the vector table, or if the information is an input vector, determines whether or not it is an arc vector or a line vector, and executes a corresponding arc desegmentation or line desegmentation subroutine. The arc desegmentation subroutine determines if there are any stored vectors having the same intersection number as the input arc vector. If there are not, the input vector is added as a new entry to the vector table, and if there are, the arc desgmentation subroutine determines if the two closest end points thereof are close enough to permit combination of the input arc vector with the stored vector. If this is the case, the arc desegmentation subroutine determines if the intersection angle of the resulting vector would be too sharp, and if it would not, determines if the resulting shape would be convex, and if it would, sets a "combine" flat that indicates that the input vector is to be merged or combined with the stored vector. The line desegmentation subroutine determines if any vector in the table has the same intersection number as the input line vector, and if that is not the case, causes the input vector to be entered as a new entry to the vector table. If a stored vector has the same intersection number as the input line vector, the "offset" between their two closest end points and a straight line between their outer end points is computed and a determination is made whether the input vector can be combined with the stored vector. If this determination is affirmative, the "combine" flag is set. If the combination flag is set, the stored vector is updated so as to include the input vector. The entire procedure is repeated until all basic shapes of the object have been vectorized and stored in the vector table, which then can be utilized by a utilization program.

BRIEF DESCRIPTION OF THE DRAWINGS

FIGS. 1 and 1A constitute a flow chart of the main vectorization program of the present invention.

FIG. 1C is a flow chart of the subroutine executed in block 7 of FIG. 1.

FIG. 1E is a flow chart of the program executed in block 17 of FIG. 1.

FIG. 2 is a flow chart of the shape recognition subroutine in the flow chart of FIGS. 1 and 1A.

FIG. 3 is a flow chart of the entity generation and desegmentation subroutines called by the vectorization program of FIGS. 1 and 1A.

FIG. 4 is a flow chart of the line desegmentation subroutine in the entity generation and desegmentation subroutine of FIG. 3.

FIG. 6 is a diagram of an object useful in explaining the operation of the vectorization technique of the present invention.

FIG. 7 is a diagram useful in explaining the operation of the line desegmentation subroutine of FIG. 4.

FIG. 8 is a diagram useful in explaining the operation of the arc desegmentation subroutine of FIG. 5.

FIG. 9 is a diagram useful in explaining the ARC desegmentation subroutine of FIG. 5.

FIG. 10 is a diagram useful in explaining the operation of vectorizing a circle.

FIG. 11 is a diagram useful in explaining how the vectorization program determines the convexity of a shape.

FIG. 12 is a diagram useful in explaining the angle determination referred to in the description of FIG. 5.

FIG. 13 is a diagram useful in explaining the operation of the shape recognition subroutine of FIG. 2.

DESCRIPTION OF THE INVENTION

Before describing the vectorization technique of the present invention in detail, it should first be noted that the vectorization technique will find primary use in a computer graphics system that effectuates line-by-line scanning of a document such as a hand-drawn engineering drawing and receives the resulting data in a serial format in the form of a sequence of raw runlengths that each indicate (1) the x coordinate of the last scanned black pixel in a string of connected black pixels, and (2) the length of that string or "slice" of connected black pixels.

Figure 17:
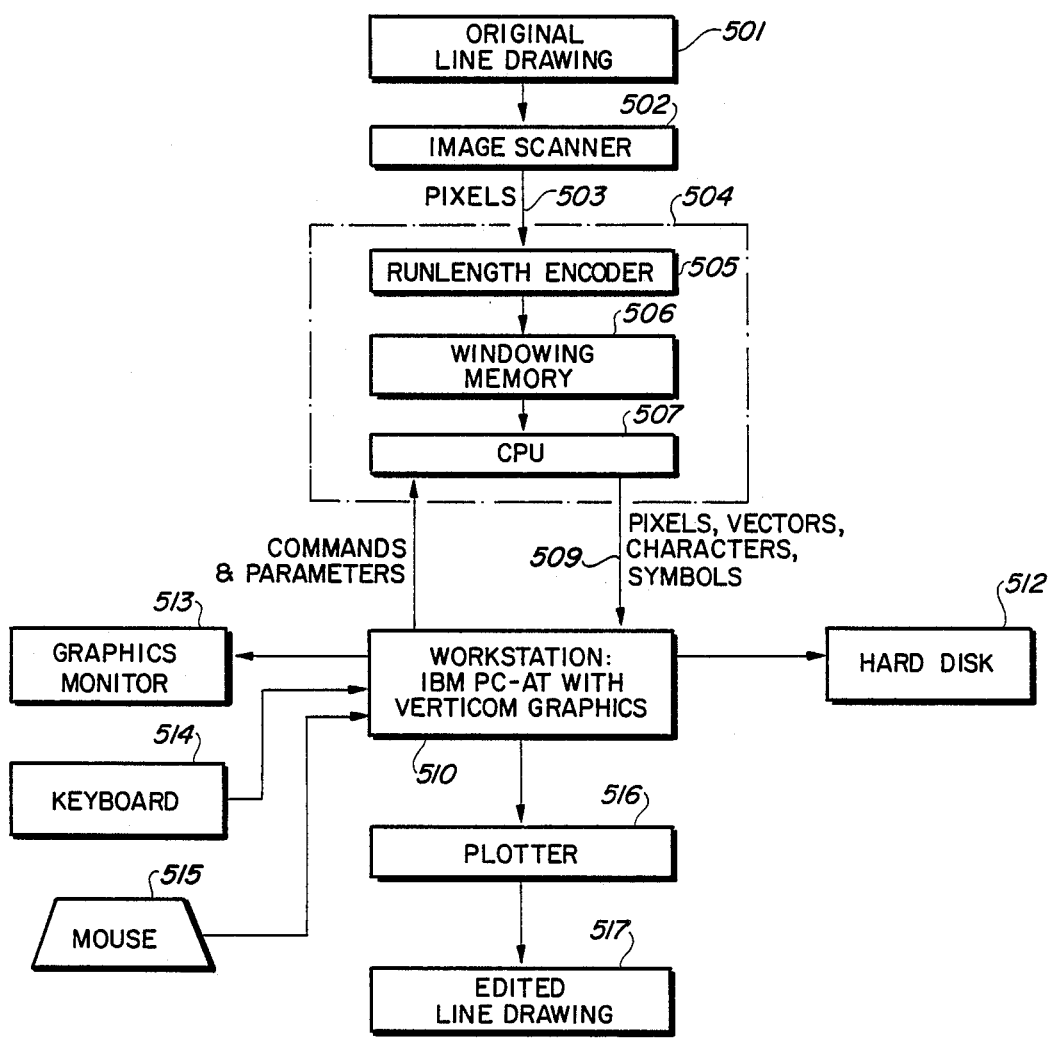
FIG. 17 is a block diagram of the hardware system in which the vectorization system of the present invention is incorporated.

The computer graphics system as shown in the diagram of FIG. 17, in which an original line drawing 501, typically an engineering drawing or the like, is scanned by a suitable image scanner 502, which outputs serial pixel data 503 into an "automatic drawing recognition system" 504 that includes a runlength encoder 505, a windowing memory 506 that is described in the above-referenced copending Krich application, and a CPU 507, which can include one or more microprocessor chips, such as Motorola MC68020 micrprocessors. The automatic drawing recognition system 504 simplifies the pixel data as subsequently described and produces pixels, vectors, recognized characters, and symbols as indicated by 509 to a work station 510 including an IBM PC-AT desk top computer containing VERTICOM graphics boards, a high resolution graphics monitor 513, a keyboard 514, a mouse 515, and a hard disk 512. Runlength encoder 505 is a relatively simple circuit that receives serial pixels from the scanner along with end of row signals and end of page signals, which are fed into a control circuit that generates an increment signal and a clear signal that are applied to a pixel counter that is incremented each time a new non-zero pixel code is received. The control circuit also generates an increment signal and a clear signal that are applied to a column counter circuit which is incremented every time a new pixel input signal is received.

The clear signal to the pixel counter resets it every time there is a transition from a string of connected black pixels to a white pixel, at which time the contents of the pixel counter are written in a FIFO buffer. The pixel counter also stores the length of the present string or "slice" of dark pixels resulting from scanning of an object on the document. The column counter clear signal is generated at the end of every row in response to the end of row signal. A write signal causes the contents of both the pixel counter and the column counter to be written into the FIFO buffer every time the end of a slice occurs or the end of a row occurs.

The above-mentioned raw runlength data also indicates the end of each scanned line and the end of each scanned page. The raw runlength data is reorganized into linked lists that represent either (1) individual simple sections or (2) "blobs" of an "object". An "object" is an image surrounded entirely by white pixels.

The linked lists are filtered to eliminate insignificant white pixel gaps between the various slices in order to greatly reduce the number of slices. This is necessary because small, insignificant gaps that could result in accidental dividing of an intended slice into a number of shorter slices connected by one or two unintended white pixels frequently occur during scanning of a document.

The filtered linked lists are assembled into "geometrically" organized (1) "blob records" that contain all of the compact slice data and associated pointers needed for relating each "blob" to other blobs or trapezoids connected thereto, (2) "trapezoidal records" that contain four corner points and associated points of shapes of the object that can be accurately represented by trapezoids and pointers to other blobs or trapezoids connected thereto, (3) convergence records, subsequently described, and (4) divergence records, subsequently described. The above referenced copending Roye application describes in detail how to produce these records. The vectorization technique of the present invention utilizes the foregoing records to "vectorize" the object.

The output vectors and data produced by the vectorization technique of the present invention then can be loaded into a suitable data file that can be accessed by a computer aided design (CAD) system or the like to multiply dimensions by a scale factor, delete certain features, modify certain features, add features to create an updated file defining a modified or edited version of the original drawings or objects, etc. The edited file then can be utilized to redisplay or otherwise utilize the information representing the edited document.

Figure 1:
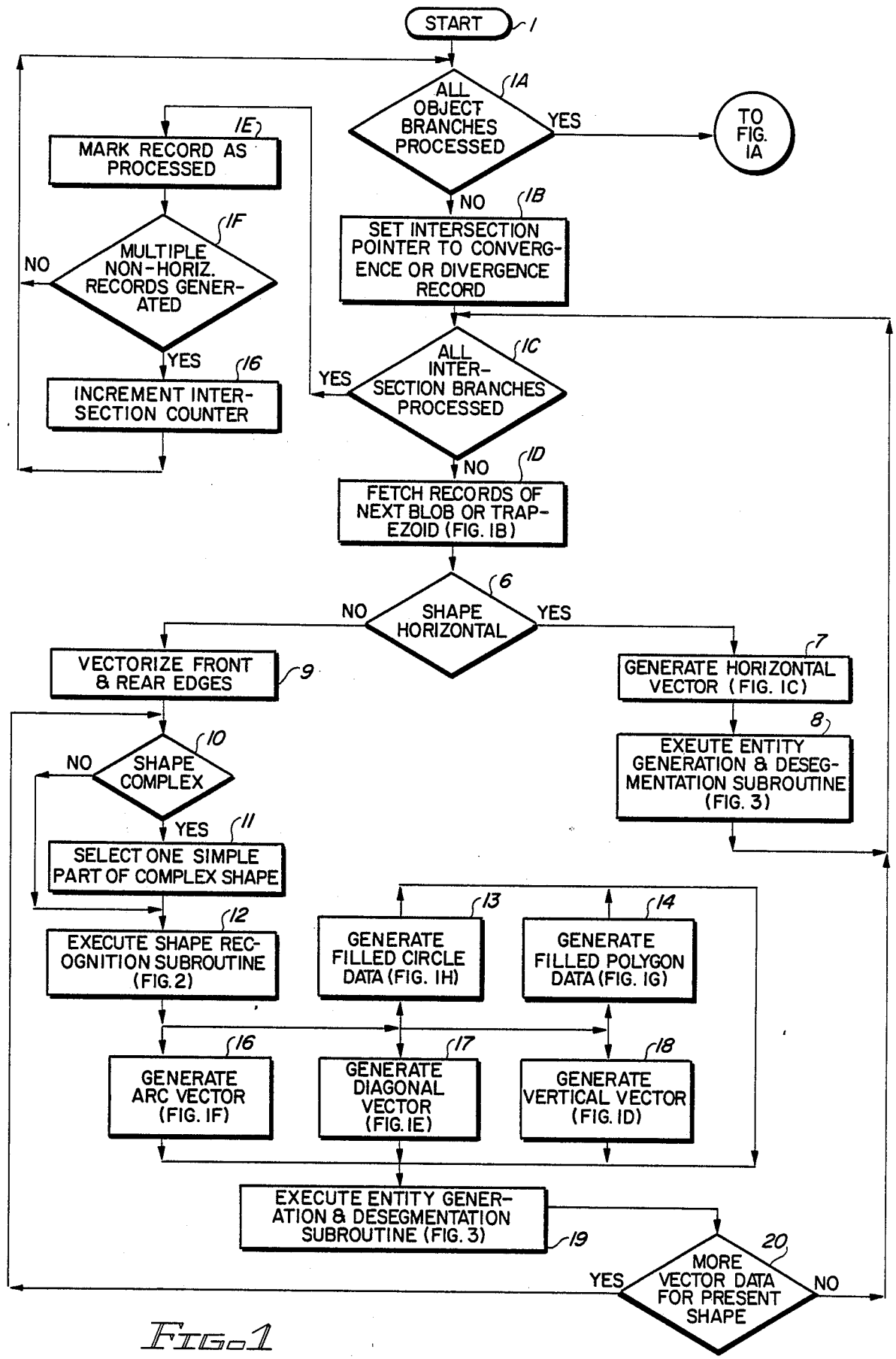

FIG. 1 shows the basic flow chart of the vectorization technique of the present invention. The program is entered at label 1 and goes to decision block 1A.

If the determination of decision block 1A is affirmative, this means that all of the connected shapes of which the present object is composed have passed through the first stage of the vectorization procedure. If that is the case, the program goes to the flow chart of FIG. 1A to determine if any of the vectorized data of the present basic shape can be further simplified by recognizing circles and arcs and substituting values of the mathematical parameters, i.e., centers, radii, etc., of circles and arcs.

Until the present object has passed entirely through the first stage of vectorization, the determination of decision block 1A will be negative, and the program goes to block 1B.

Before proceeding with the description of FIG. 1, it will be convenient to provide some examples of what is meant by the terms "object", "blob", "slice", "trapezoid", "intersection", "convergence", and "open point".

Referring to FIG. 6, the entire shape designated by reference numeral 110 is an "object" that is entirely black, although only the boundaries are shown as black in FIG. 6. Each object consists of a number of relatively simple connected basic shapes, which are referred to as either "blobs" or trapezoids. A trapezoid is a four sided polygon. In FIG. 6, shapes 111A, 112, 117, 119, and others are trapezoids. A blob is an irregular shape that cannot be accurately classified as a trapezoid. In FIG. 6, shapes 111B, 116B, 113B, and 125 are blobs. A trapezoid can be represented accurately by the coordinates of its four corners. A blob is represented by all of the "slices" defining its boundary. (Recall that each slice constitutes a runlength of colinear successively adjacent black or non-white pixels.) Each basic shape of an object is connected to at least one other basic shape of the object. Thus, the object is surrounded entirely by white pixels, none of which are included in any of the raw runlength or slice data. In FIG. 6, object 110 includes blobs 111B, 113B, 116B, 125, 126, 127, and 128.

Object 110 includes simple shapes 111, 113, and 116, which have rounded outer ends, and cannot be accurately represented by trapezoids. For example, simple shape 111 includes a lower section 111A that is a trapezoid and an upper section 111B that is a blob. Similarly, simple shape 113 includes a trapezoid 113A and a blob 113B, and simple shape 116 includes a trapezoide 116A and a blob 116B.

Each trapezoid in object 110 has an associated "trapezoid record" and each blob has an associated "blob record". Each blob record contains all of the slices of the corresponding blob. Each trapezoid record includes the four corner points of the trapezoid.

Object 110 includes a plurality of "intersection blobs" 125–128. Each of the intersection blobs contains all of the slices of that blob. Object 110 also includes a number of "open points" such as 130, 131, and 132. An open point is an upper or lower end point that does not directly join another blob or trapezoid.

The records assembled from the raw runlength data mentioned above also include "divergence records" and "convergence records." A convergence is defined as two colinear slices of a particular horizontal scan line above a single slice of the next lower horizontal scan line, where each of the two upper slices at least partly overlaps the lower single slice. For example, in FIG. 6 the two lowest slices of trapezoids 111A and 112, respectively, and the top single slice of intersection blob 125 form a convergence. Similarly, a divergence consists of a single slice of a scan line above and at least partly overlapping two colinear slices of the next lower scan line. In object 110, the bottom slice of intersection blob 125 and the top slices of trapezoids 114 and 115, respectively, form a divergence.

The divergence records and convergence records of an object store data for all of the convergences and divergences of that object.

At this point, it will be convenient to describe the various records which are accessed by the vectorization program of FIG. 1. Briefly, the records are necessary to describe the interrelationships between sequence of trapezoids, blobs, divergences, and convergences. There is an object header record, in addition to the above-mentioned trapezoid records, blob records, divergence records, and convergence records. Each record includes as many 64 byte sections of memory as is needed to complete that record. At the end of each 64 byte section of memory there is a "linking pointer" that points to the address of an additional 64 byte section of memory if the present record cannot be entirely contained in the present 64 byte section of memory.

An object header record is shown below.

| object header ptr# | beg ptr 0 | end ptr 0 | beg ptr 1 | end ptr 1 | beg ptr 2 | end ptr 2 | beg ptr 3 | end ptr 3 | beg ptr 4 | end ptr 4 | beg ptr 5 | end ptr 5 | link |
|---|---|---|---|---|---|---|---|---|---|---|---|---|---|
| p t r # 00 | v | v | v | v | v | v | v | v | v | v | v | v | |
| object header | beg ptr 6 | end ptr 6 | beg ptr 7 | end ptr 7 | beg ptr 8 | end ptr 8 | beg ptr 9 | end ptr 9 | beg ptr 10 | end ptr 10 | beg ptr 11 | end ptr 11 | link |
| 00 00 | v | v | v | v | v | v | v | v | v | v | v | v | fill |

The object header record includes in its first byte a number "ptr#" that indicates the number of open points of the present object. Each open point of the object has beginning pointer "beg ptr" and an ending pointer "end ptr" associated therewith. A beginning pointer of each trapezoid or blob corresponds to the point at which "scanning" of the record of that trapezoid or blob begins, and includes the address of the record of that blob or trapezoid. For each open point there is also an ending pointer, which, if necessary, points to a second 64 byte section of memory in which that trapezoid record or blob record is continued. If the trapezoid record or blob record pointed to by the beginning pointer of the object header record is contained entirely in the blob or trapezoid record pointed to, the corresponding ending pointer is equal to the beginning pointer.

A blob record, shown below, stores all of the slices contained in a corresponding blob. The first byte of the blob record includes a slice count number "slic cnt" that indicates how many slices are contained in the blob. The second byte of the blob record is a "record type" record code, which is 04 for a blob record.

An example of a blob record is shown below.

| sc ln it c | ptr down 04 | up ptr | Ys Ye | V E C G | w o r k | 0 | 1 | 2 | 3 | 4 | slice 5 | 6 | 7 | 8 | 9 | link |
|---|---|---|---|---|---|---|---|---|---|---|---|---|---|---|---|---|
| | | | | | | | | | | | | | | | | |
| | v | | | | | | | | | | | | | | | |

The next byte contains a down pointer "ptr down" that indicates whether the blob is being scanned downward to another record. The down pointer points to the address of such other record.

The next byte of the blob record contains an up pointer "ptr up" which has a value of 0 if the present blob is being scanned from an open point. If the blob is being scanned downward from a divergence, the up pointer points to the address of a corresponding divergence record.

The next byte of the blob record contains the y coordinate $Y_s$, which indicates the top y coordinate of the blob. The next byte contains the y coordinate $Y_e$ of the bottom of the blob.

The next byte is a pointer "VECG work" to an address in a table called a "vector table" that stores a vector or a table called a "filled shape table" that shows the vertices of a filled shape into which the present blob is ultimately converted by the vectorization technique of the present invention. "VECG work" is set to a $-1$ if the present blob is recognized as an intersection blob.

The next bytes of the blob record contain the x coordinate (X) and the horizontal extent, i.e., the width (W)

for each slice of the present blob. If necessary, a link pointer is provided at the end of each 64 byte section of the blob record pointing to the address of the beginning of a next 64 byte section that may be required for that blob record.

A trapezoid record is shown below.

| tc  |      |      | f | V | w | x0 |    | x2 |    | x4 |    | x6 |    | x8 |    |
|-----|------|------|---|---|---|----|----|----|----|----|----|----|----|----|----|
| rn  | ptr  | up   | i | E | o | y0 |    | y1 |    | y2 |    | y3 |    | y4 |    |
| at  | down | ptr  | l | C | r | x1 |    | x3 |    | x5 |    | x7 |    | x9 |    |
| p   | 03   |      | l | G | k |    | y0 |    | y1 |    | y2 |    | y3 |    | y4 |
| f   | x0   |      | x2 |  |   | x4 |    | x6 |    | x8 |    | x0 |    | x2 |    |
| i   |      | y5   |   | y6 |  | y7 |    | y8 |    | y9 |    | y0 |    | y1 |    |
| l   |      | x1   |   | x3 |  | x5 |    | x7 |    | x9 |    | x1 |    | x3 |    |
| l   | 03   | y5   |   | y6 |  | y7 |    | y8 |    | y9 |    | y0 |    | y1 |    |

The above trapezoid record contains in its first byte a count pointer "trap cnt" indicating how many trapezoids are stored in this particular trapezoid record. The record type than is indicated by the code 03. The down pointer "ptr down" and the up pointer "up ptr" have precisely the same meaning in a trapezoid record as in the above-described blob record. A number of trapezoids may be stored in a single trapezoid record, as long as each shares an edge with another. The "fill" pointer in the second shown 64 byte section of the trapezoid record is presently unused. The vector table pointer "VECG work" has the same meaning as in the above blob record. The remaining entries in the trapezoid record constitute the x and y coordinates of the four corner points of each trapezoid.

An example of a divergence record for a particular object is shown below.

| P |    |     |     |    |    | beg | end | beg | end | beg | end | beg | end |      |
|---|----|-----|-----|----|----|-----|-----|-----|-----|-----|-----|-----|-----|------|
| t |    | beg | end | x0 | x1 | ptr | ptr | ptr | ptr | ptr | ptr | ptr | ptr | link |
| r |    | ptr | ptr | y  | y  | 0   | 0   | 1   | 1   | 2   | 2   | 3   | 3   |      |
| # | 01 |     |     |    |    | v   | v   | v   | v   | v   | v   | v   | v   |      |
| f |    | beg | end | beg | end | beg | end | beg | end | beg | end | beg | end |      |
| i |    | ptr | ptr | ptr | ptr | ptr | ptr | ptr | ptr | ptr | ptr | ptr | ptr | link |
| l |    | 4   | 4   | 5   | 5   | 6   | 6   | 7   | 7   | 8   | 8   | 9   | 9   |      |
| l | 01 | v   | v   | v   | v   | v   | v   | v   | v   | v   | v   | v   | v   |      |

The initial byte of the divergence record includes a pointer number "ptr #" that indicates the number of blobs or trapezoids that diverge from the divergence represented by this particular divergence record. The code 01 indicates that the present record is a divergence record. Next, the beginning pointer "beg ptr" points to the address of the blob or trapezoid record that represents the blob from which other blobs and/or trapezoids diverge. The end pointer "end ptr" is identical to the beginning pointer unless the subject blob (from which other trapezoid and/or blobs diverge) requires more than one 64 byte section of memory. In that case, the end pointer points to the beginning of that 64 byte section.

The next two bytes of the divergence record contain the x and y coordinates of the slice at which the present divergence occurs, namely x0, y x1, y. Note that the two y coordinates are the same, since the scan line is horizontal. The coordinates x0 and x1 define the end points of that slice. The next entries in the divergence table contain a plurality of pairs of beginning pointers and ending pointers. The beginning pointer of each pair points to the address of a blob or trapezoide diverging from the present divergence. In each case, the end pointer is identical to the beginning pointer unless more than 64 bytes of memory is required for the blob pointed to, in which case the ending pointer points to the beginning of the 64 byte section of memory in which the blob record or trapezoide record is continued.

Convergence records are similar to divergence records, except that the code is 02. An example of a convergence record is shown below.

| P |    |     |     |    |    | beg | end | beg | end | beg | end | beg | end |      |
|---|----|-----|-----|----|----|-----|-----|-----|-----|-----|-----|-----|-----|------|
| t |    | beg | end | x0 | x1 | ptr | ptr | ptr | ptr | ptr | ptr | ptr | ptr |      |
| r |    | ptr | ptr | y  | y  | 0   | 0   | 1   | 1   | 2   | 2   | 3   | 3   | link |
| # | 02 | v   | v   |    |    |     |     |     |     |     |     |     |     |      |
| f |    |     |     |    |    |     |     |     |     |     |     |     |     |      |
| i |    | beg | end | beg | end | beg | end | beg | end | beg | end | beg | end |      |
| l |    | ptr | ptr | ptr | ptr | ptr | ptr | ptr | ptr | ptr | ptr | ptr | ptr | link |
| l | 02 | 4   | 4   | 5   | 5   | 6   | 6   | 7   | 7   | 8   | 8   | 9   | 9   |      |

Returning now to the description of FIG. 1, if the determination of block 1A is negative, more branches of the present object need to be processed. The program goes to block 1B and sets an intersection pointer to the address of an appropriate convergence record or divergence record, and then goes to decision block 1C. In decision block 1C, the program determines if all of the branches of the present intersection being pointed to by the intersection pointer have been processed. This determination is made by referring to an above-mentioned divergence or convergence record.

Figure 1B:
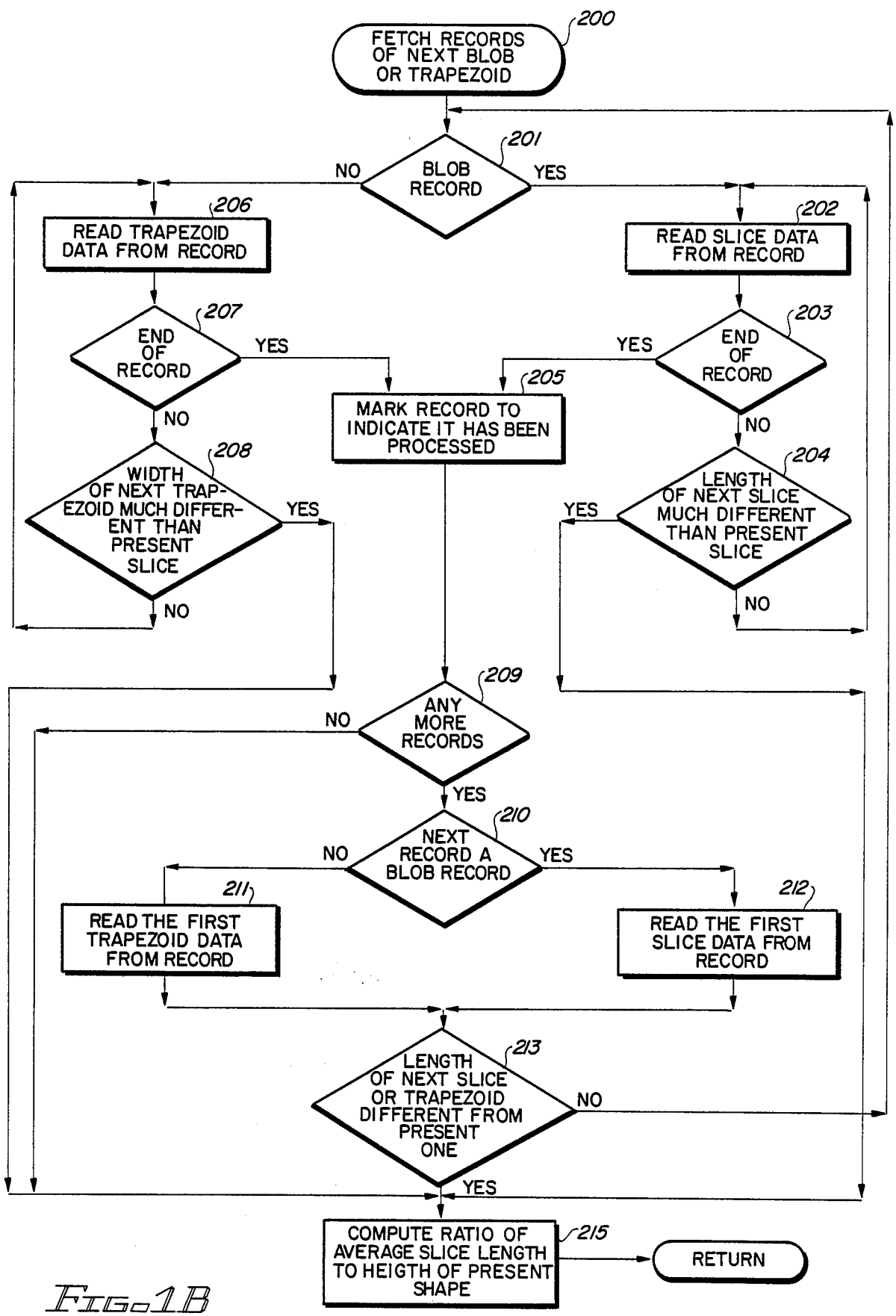
FIG. 1B is a flow chart of the subroutine of FIG. 1 that fetches blob and trapezoid records.

If the determination of decision block 1C is negative, the vectorization program goes to block 1D and fetches the record of the next blob or trapezoid by executing the subroutine of FIG. 1B. However, if the determination of block 1C is affirmative, then ordinarily it will be necessary to increment the intersection pointer. The program goes to block 1E and marks the present divergence or convergence record as "processed" and then goes to decision block 1F.

Before describing the decision of block 1F, it should be understood that the situation may exist in which what is intended to be a thin line drawn on a document being scanned may have minute white gaps in what should be a single dark line. It is undesirable for the vectorization program to recognize intersections that could theoretically be formed as a result of such white gaps. To avoid this, decision block 1F determines if the processing of the branches of the present divergence or convergence resulted in the generation of multiple non-horizontal vectors. If this is the case, then the intersection counter should be incremented. This is done in block 16, and the program returns to decision block 1A.

However, if the determination of block 1F is negative, it means that multiple horizontal vectors were generated. This corresponds to the situation in which there are multiple horizontal lines with white gaps between them. If this is the case, it is not desirable to increment the intersection counter, and the program goes directly back to decision block 1A.

Before describing FIG. 1B in detail, it should be appreciated that there are a number of possibilities for the kind of record or group of records being fetched in accordance with block 1D. For example, the next record could be a blob record that includes a stack of slices of considerably different lengths, followed by a trapezoid, followed by another stack of slices (i.e., a blob) or another trapezoid.

Referring now to FIG. 1B, the subroutine for fetching records of the next blob or trapezoid is entered at label 200, and goes first to decision block 201 and determines if the next record is a blob record. If it is, the subroutine goes to block 202 and reads the next slice of data from the present record (and stores it in a buffer) and goes to decision block 203 to determine if that slice is at the end of the record. If the present slice is not at the end of the present record, the subroutine goes to decision block 204 and determines if the length of the next slice is much different than the present slice. If the determination of block 204 is negative, the subroutine returns to block 202 and reads the next slice. However, if the length of the next slice is much different than the length of the present slice, the subroutine goes to block 215 and computes the ratio of the average slice length of the shape represented by the present blob record to its heighth and returns to the vectorization program of FIG. 1. The ratio in block 215 indicates whether or not the present blob is essentially horizontal.

If the determination of decision block 203 is affirmative, the subroutine marks the present blob record to indicate that it has been processed, as indicated in block 205 and goes to decision block 209. In block 209, the subroutine determines if the present blob record points to another record representative of the same simple shape. If not, the subroutine goes to block 215 and computes the above-identified average slice length to height ratio of the present shape and returns to the main vectorization program. If the determination of block 209 is affirmative, the subroutine goes to block 210 and determines if the next record is a blob record. If so, the subroutine reads the first slice of data therefrom and goes to decision block 213. If the next record pointed to is a trapezoid, the first portion of the trapezoid data is read therefrom, as indicated in block 211 and the subroutine then goes to block 213. In block 213 the record fetching subroutine determines if the length of that slice (the one in the buffer) is much different than the length of the next slice. If this determination is affirmative, the subroutine goes to block 215 and computes the width to heighth ratio of the present shape and returns to the main vectorization program. Otherwise, the subroutine returns to block 201.

If the determination of block 201 is negative, the fetched record is a trapezoid record. The subroutine goes to block 206, reads the first portion of the data from the trapezoid record, goes to block 207, and determines if the end of the trapezoid record has been reached. If so, the trapezoid record is marked to indicate that it has been processed, as indicated in block 205, and the subroutine goes to block 209, previously described.

If the present data read from the trapezoid record is not at the end of the record, the subroutine goes to decision block 208 and determines if the length of the next slice is much different than the present slice. If not, the subroutine goes back to block 206 and reads the next group of data from the trapezoid record. Otherwise, the subroutine goes to block 215 and computes the ratio of the width to the heighth of the present trapezoid and returns to the main vectorization program. (It should be noted that a "length" of each slice is the length in the horizontal direction. The term "next slice" also corresponds to the width or horizontal dimension of the top of the next trapezoid if the present shape is attached to the top of a trapezoid, rather than a blob.)

It should be noted that the term "vectorize" as used herein refers not only to determining the coordinates of a vector and computation of a width that can accurately represent a particular trapezoid, but also refers to determining simplified data that is generated to define blobs, filled polygons, filled circles, and intersection blobs.

Returning now to FIG. 1, the program goes to decision block 6 and performs a test on the width to heighth ratio computed in block 215 of FIG. 1B to determine if the present blob or trapezoid is horizontal.

If the determination of decision block 6 is affirmative, the program goes to block 7 and generates a horizontal vector which contains the coordinates of two end points and the width of the vector, in accordance with the subroutine of FIG. 1C, subsequently described. The program then goes to block 8 and executes an "entity generation and desegmentation" subroutine described in detail with reference to FIG. 3.

Referring to label 200 of FIG. 1B, it should be noted that the subroutine can fetch a sequence of connected records that all form a single "branch" of the object.

If the determination of decision block 6 of FIG. 1 is negative, the vectorization program goes to block 9 and vectorizes the "front and rear edges" of the data in the present blob record or trapezoid record. The program then goes to decision block 10 and determines if the present shape is "complex". The technique by which the decision block 10 determines if the present shape is "complex" is to measure the angles between different portions of either the front edge vectors or the rear edge vectors (determined in block 9) and determine if the different portions of the front edge or rear edge depart too much from a straight line. For example, if the angle between two front edge vectors is less than 90 degrees, then the shape may be considered to be complex, and the decision of block 10 will be affirmative. If the present blob or trapezoid is complicated, the program goes to block 11 and selects the next simple portion of the complicated shape and goes to block 12.

For example, the schematic symbol for a resistor is a complex shape. If the shape is determined to be not complex, the program goes from decision block 10 directly to block 12. In block 12, the vectorization program calls the shape recognition subroutine of FIG. 2.

At this point, it will be convenient to describe the shape recognition subroutine of FIG. 2, which is entered at label 12A. Briefly, this subroutine performs the function of recognizing whether the present simple shape obtained from the present blob record or trapezoid record is an arc, an "intersection blob," a filled circle, a vertical vector, a diagonal vector, or a filled polygon. First, the shape recognition subroutine enters block 36 and determines which of the vectors of each of the front and rear edges of the present blob or trapezoid (determined in block 9 of FIG. 1) are the longest. The shape recognition subroutine then goes to block 37 and determines the number of front and rear edge vectors that have approximately the same length as the longest front and rear edge vectors, respectively. The program then goes to decision block 38 and determines if both the front edge or rear edge of the present blob or trapezoid includes multiple vectors of similar length. If the determination of decision block 38 is affirmative, there are three different possible general configurations for the present shape, and the shape recognition subroutine accordingly goes to decision block 39. Examples of the three possibilities referred to are shown in FIG. 13, and are designated by reference numerals 134, 135, and 136. Shapes 135 and 136 are considered to be "nearly horizontal", and each has front end/rear edges containing multiple vectors of the same length approximately equal to the maximum length. Shape 134 is not considered to be nearly horizontal.

If the present shape is similar to shape 134 of FIG. 13, the determination of block 39 in FIG. 2 is negative. The shape recognition subroutine then recognizes that the present shape is an "arc vector" and generates an arc code, as indicated in block 40, and then returns to FIG. 1 via label 50. An arc vector constitutes a connected string of line vectors generally describing an arc; such vectors are of similar length and subtend similar angles. If the determination of decision block 39 is affirmative, that is, the shape is nearly horizontal, then the present shape must be similar to either shape 135 or shape 136 in FIG. 13.

The program then goes to decision block 41, determines if both the front edge and rear edge of the present shape are convex. If they are, the shape is similar to that of shape 136 in FIG. 13, and the present simple shape is considered to be a "filled circle." The shape recognition subroutine then goes to block 43, generates a "filled circle code", and returns to FIG. 1 via return label 50. If the present shape is not convex, it must be concave, and the present simple shape must be similar to shape 135 in FIG. 13, which is an intersection blob. The subroutine then generates a "intersection blob code" in block 42, and returns via label 50 to FIG. 1.

If the determination of decision block 38 is negative, i.e., if there are no multiple vectors of similar length in the front and rear edges of the present simple shape, the program goes to block 44 and computes the angle between the longest vector of the front edge and the longest vector of the rear edge. The subroutine then goes to decision block 45 and determines if the longest vector of the front edge is parallel to the longest vector of the rear edge. If this determination is affirmative, the present simple shape can be approximated by either a vertical vector or a diagonal vector. The recognition subroutine goes to decision block 47 and determines if the x coordinates of one of the front and rear edges of the present simple shape are equal. If they are, the present shape is a vertical vector, and the subroutine goes to block 48, generates a "vertical vector code," and returns to FIG. 1 via label 50. If the determination of decision block 47 is negative, the present shape is a diagonal vector, and the subroutine goes to block 49 and generates a "diagonal vector code", and returns to FIG. 1 via label 50.

If the determination of decision block 45 is negative, the present simple shape is a "filled polygon", and the subroutine goes to block 46, generates a "filled polygon" code, and return to FIG. 1 via label 50.

When the vectorization program of FIG. 1 is returned to shape recognition subroutine of FIG. 2, it utilizes the "filled shape" code or vector code generated therein to enter an appropriate vector or code generating subroutine 13, 14, 16, 17, or 18 (subsequently described). For example, if the present simple shape is an arc, the arc code generated in block 40 of FIG. 2 causes the vectorization program to enter subroutine 16 and generate an arc vector, which constitutes consecutive vectors to represent the arc. The filled circle code generated in block 43 of FIG. 2 causes the vectorization program of FIG. 1 to call the subroutine 13 and generate data that represents a filled circle. The filled circle data consists of the coordinates of the center point radius and width which is equal to radius. The vertical vector code in block 48 causes the vectorization program to enter subroutine 18 of FIG. 1, which generates a vertical vector consisting of coordinates of two end points and its line width. If the present simple shape is a diagonal vector, the diagonal vector code generated in block 49 of FIG. 2 causes the vectorization program to enter subroutine 17 of FIG. 1, and generate a diagonal vector that consists of coordinates of two end points and its line width. Finally, if a filled polygon code is generated by the shape recognition subroutine, the vectorization subroutine calls subroutine 14 and generates filled polygon data consisting of coorinates of the vertices of the filled polygon. (The vector generating subroutines and filled shape code generating subroutines of blocks 13, 14, 16, 17, and 18 will be described subsequently.)

Once the filled shape data or arc vector, vertical vector, diagonal vector, or horizontal vector (block 7 of FIG. 1) are generated, the entity generation and desegmentation subroutine of FIG. 3 is called. Briefly, the purpose of the entity generation and desegmentation subroutine is to (1) make entries of the "input vectors" generated by subroutines 16, 17, and 18 of FIG. 1 into a "vector table", and make entires of "filled shape data" generated by subroutines 13 and 14 into a "filled shape table", and (2) as each new "input vector" or "filled shape data" is generated by these subroutines, compare it to the contents of the vector table or filled shape table, determine whether the present input vector or filled shape data can be conveniently combined with any vector or filled shape already stored in such table, and, if that is the case, combine or merge that "stored vector" or "filled shape" with the present input vector or shape by updating it to include the present input vector or filled shape. The first procedure is referred to as "entity generation", and the procedure of combining the input vector or filled shape with a stored one is referred to as "desegmentation."

Referring now to FIG. 3, the entity generation and desegmentation subroutine is entered via label 19A, and goes first to decision block 56. The subroutine then determines if the present "input" from one of subroutines 13, 14, or 16–18 of FIG. 1 is "shape data" defining a filled circle, filled polygon, or is a "vector" such as an arc vector, diagonal vector, vertical vector, or horizontal vector. If the present input is "shape data", the decision of block 56 in FIG. 3 is negative, and the entity generation and desegmentation subroutine goes to decision block 57 and determines if the shape is a filled polygon.

If the determination of block 57 is affirmative, the subroutine goes to block 57A and executes the filled polygon desegmentation subroutine of FIG. 14, subsequently described. The subroutine then goes to decision block 57B and determines if desegmentation, i.e., merging of the filled polygon with one already in the filled shape table occurred. If this determination is negative, then the present filled polygon must be entered as a new entry into the filled shape table, as indicated in block 57C. The subroutine then returns to FIG. 1 via return label 52. If the determination of block 57B is affirmative, the filled polygon is combined wit or added to the stored filled polygon already present in the filled shape table. The subroutine then returns to FIG. 1 via label 62. The test of block 57B is whether or not a combine flag is set.

Block 57C indicates that if the determination of block 57 is negative, the input data is entered into the filled shape table.

The subroutine then returns to the main program of FIG. 1.

If the present input to decision block 56 is a vector, it is referred to as an "input vector". The input vector is stored in an input buffer. The subroutine then goes to block 58 and determines if the input vector is an arc vector. If the determination of decision block 58 is affirmative, the subroutine goes to block 60 and executes the "arc desegmentation" subroutine of FIG. 5. Conversely, if the determination is that the input vector is not an arc vector, the subroutine goes to block 59 and executes the "line desegmentation" subroutine of FIG. 4.

As explained in more detail later, both the arc desegmentation subroutine of FIG. 5 and the line desegmentation subroutine of FIG. 4 initially reset a "combine" flag and then, if the input line vector or arc vector can be merged or combined with a vector already stored in the vector table, sets the combine flag to a "1". If the combine flag is "set" at the end of either the line desegmentation subroutine of FIG. 4 or the arc desegmentation subroutine of FIG. 5, this means that the present input vector entered in the input buffer is combinable with a vector already stored in the vector table, and no entry of the present input vector as a new "entity" is required. However, if the combine flag is still reset at the end of the line desegmentation or arc desegmentation subroutine, this means that the present input vector is not combinable with a vector already stored in the vector table, soa new "entity" needs to be generated by entering the present input vector into the vector table.

Figure 5:
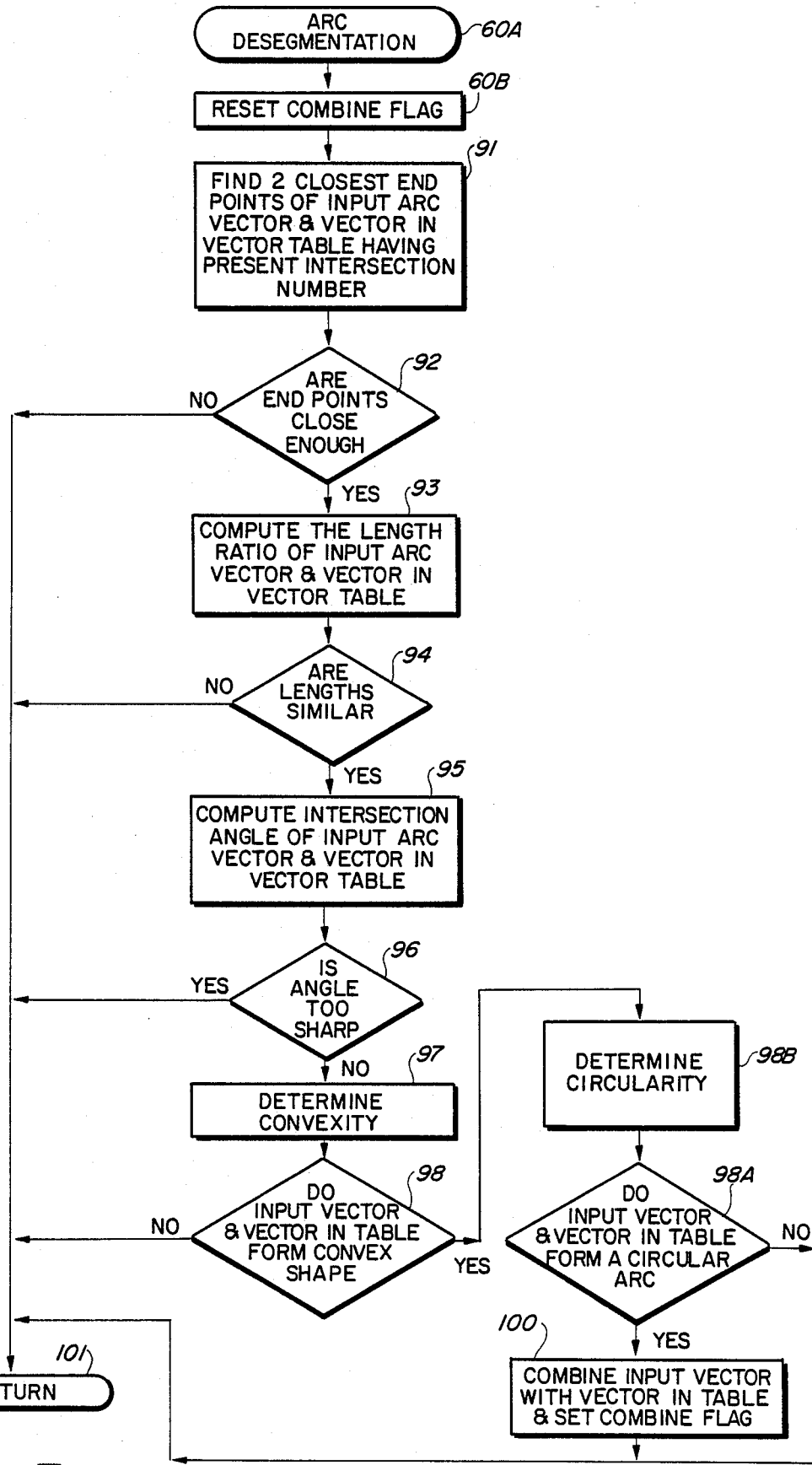
FIG. 5 is a flow chart of the arc desgmentation subroutine called up by the entity generation and desegmentation subroutine of FIG. 3 and the line desegmentation subroutine of FIG. 4.

After either the line desegmentation subroutine of FIG. 4 or the arc desegmentation subroutine of FIG. 5 has been executed, the combine flag has been set to a "1" if desegmentation is possible or left at its reset value of "0" if no desegmentation is possible. The entity generation and desegmentation subroutine then goes to decision block 61 of FIG. 3 and tests the combine flag to determine if desegmentation occurred.

If no desegmentation occurred, the subroutine goes to block 63 and simply enters the present input vector into the vector table as a new entity. If the determination of block 61 is affirmative, the subroutine goes to block 64 and "adds" the input vector to a stored vector with the same intersection number by extending the stored vector to include the input vector. In either case, the entity generation and desegmentation subroutine then returns via label 62 to the main vectorization program of FIG. 1.

Referring now to FIG. 5, the first step in executing the arc desegmentation subroutine is to reset the combine flag to a "zero", as indicated in block 60B. Then, the arc desegmentation subroutine goes to block 91 if there is a stored vector having the same intersection number as the present input arc vector, and finds the two end points of that input arc vector and the stored vector which are closest together. The arc desegmentation program then goes to decision block 92 and determines if those two closest end points are close enough that it is possible to combine the input vector with that vector. For example, if arc vector 177 of FIG. 8 is the input vector, and the stored vector is 154, decision block 92 determines if end points 175 and 176 are close enough, i.e., closer than about 50 pixels or 100 mils. If so, it is possible to combine input arc vector 177 with stored vector 154. If this determination is negative, the subroutine returns via label 101 to FIG. 3.

If the determination of decision block 92 is affirmative, the arc desegmentation subroutine goes to block 93 and computes the ratio of the length of the input arc vector and the length of the stored vector in the table. If the input vector is too much longer or too much shorter than the stored vector, then the two cannot be combined to form a single arc vector. Furthermore, if the angle between the input vector and the stored vector is too sharp, the two cannot be cominbed to form a single arc vector. For example, in FIG. 9, input vector 151A is sufficiently shorter than stored vector 151B that the two should not be combined to form part of a single arc vector. The angle between arc vector 151C and line vector 151B is too sharp to allow the two to be combined into a single arc vector.

The subroutine then goes to decision block 94 and determines if the computed lengths are sufficiently similar to allow combining of the input vector with the stored vector. The arc desegmentation subroutine is exited if this determination is negative, and goes to block 95 if the determination is affirmative.

An example of the computation of the intersection angle of the input arc vector and the stored vector in block 95 of FIG. 5 is indicated in FIG. 12, wherein reference numeral 137 designates the present input arc vector, 138 designates the stored vector, and reference numeral 139 designates the computed angle.

Next, the arc desegmentation subroutine then goes to decision block 96 and determines if that angle is "too sharp" of an angle, i.e., if it departs too much from a straight line. Presently, if the angle is less than about 90 degrees, the input vector is not combinable with the stored vector, and the arc desegmentation subroutine is exited via label 101.

If the angle is not too sharp, the program goes to block 97 and determines if the combined vector will be convex. This is accomplished by performing the test indicated in FIG. 11, wherein the input arc vector consist of vectors 140, 141, 142, and 143. Vectors 144 or 145 can be the stored vector. The determination of convexivity is made, in effect, by drawing lines between alternate intersections of the proposed arc vector, and if the intersection between each pair of adjacent vectors remains on the same side of the line, the proposed combined vector is convex, but otherwise it is not convex. For example, if the stored vector represents line 145 in FIG. 11, the shape is convex because intersections 146, 147, 148, and 149 are all to the left of the dotted lines 150, 151, 152, and 153 respectively. However, if the stored vector is represented by line 144 in FIG. 11, the shape is not convex, because intersection 149 is not to the left of dotted line 154A.

After the convexity has been determined in block 97 of FIG. 5, the arc desegmentation subroutine goes to decision block 98 and determines if the present input vector and the stored vector form a convex shape. If this determination is negative, the subroutine is exited via lable 101. If the determination of block 98 is affirmative, the arc desegmentation subroutine goes to block 98B, computes the "circularity" of the convex shape, and goes to decision block 98A and determines if the input vector and the stored vector form a circular arc. If this determination is negative, the subroutine returns via label 101. If the determination if affirmative, the subroutine goes to block 100 and indicates that the present input vector is combinable with the stored vector by setting the combine flag to a "1". The arc desegmentation program then returns via label 100 to the entity generation and desegmentation subroutine of FIG. 3.

The line desegmentation subroutine of FIG. 4 is entered via label 59A. The first step is to reset the combine flag, as indicated in block 59B. The line desegmentation subroutine then goes to decision block 66 and determines whether the present input line vector begins at an open point and ends at a convergence or divergence. For example, if the present input vector represents trapezoid 112 in FIG. 6, it begins at an open point 130, and ends at a convergence, so that the determination would be affirmative. If this is the case, the line desegmentation subroutine returns to block 63 of FIG. 3 and enters the vector representing trapezoid 112 as a new entity in the vector table.

If the determination of decision block 66 is negative, then the line desegmentation subroutine goes to decision block 68 and determines if the present input vector is in an intersection. An "intersection" is defined to be a shape that goes downward from a convergence to a divergence. It was found convenient to provide this definition to accomplish rapid, efficient desegmentation of a circle, such as the one shown in FIG. 10. By way of example, in desegmentating the circle shown in FIG. 10, the first input vector would be the one representing the shape 154, which is separated from shapes 155 and 159 by dotted line 156. A "yes" determination from decision block 66 would be obtainable in this instance. The line desegmentation subroutine then generates a new entity in the vector table corresponding to the vector representing shape 154. The next shape scanned in FIG. 10 would be shape 155. The definition that an intersection goes downward from a convergence to a divergence makes it clear that shape 155 is not in an intersection, because shape 155 goes downward from a divergence to a convergence.

If the determination of decision block 68 of FIG. 4 is affirmative, the line desegmentation subroutine goes to block 69 and computes the length of the input vector, and then goes to decision block 70 and determines whether that length is too short (for example, less than 50 pixels, 100 mils) to be considered a vector. If this determination is negative, the subroutine enters the present input vector as a new entity in the vector table (see block 63 of FIG. 3). Otherwise, the program simply returns from decision block 70 back to FIG. 3.

If the determination of block 68 in FIG. 4 is negative, the subroutine goes to decision block 71 and determines if the present input vector begins at a convergence and ends at an open point. For example, the shape 157 shown in FIG. 10 begins at a convergence and ends at an open point, and hence would result in an affirmative decision.

If the determination of decision block 71 is affirmative, the line desegmentation subroutine goes to block 72 and computes the length of the input vector. If the length is too short (i.e., less than 100 mils) to be considered a vector, the subroutine is exited via the return label. If the determination of decision block 71 or 73 is negative, the subroutine goes to decision block 74.

In decision block 74, the line desegmentation subroutine determines if anay vector in the vector table has the same intersection number as the present input vector. If this determination is negative, it is impossible to combine the input vector with any stored vector, so the subroutine goes to block 63 of FIG. 3, enters the present input vector as a new entity in the vector table, and returns via the return label to FIG. 3. Otherwise, the subroutine goes from decision block 74 to decision block 75 and determines if the stored vector with the present intersection number is an arc vector. If this determination is affirmative, the subroutine goes to block 76, and calls and executes the arc desegmentation subroutine of FIG. 5.

If the stored vector is not an arc vector, it is a line vector, and the line desegmentation subroutine goes to block 78, and finds the two closest end points of the stored vector and the input vector. For example, in FIG. 7, if line 161 designates the input vector and line 162 designates the stored vector, then points 163 and 164 will be the two closest end points of the input vector and the stored vector. Similarly, 167 and 168 are the two closest end points of an input vector 165 and a stored vector 166.

Next, the subroutine goes to block 79 and computes the offset between the above mentioned closest end points and a straight line such as dotted line 169 (FIG. 7) drawn between the outer end points of the input vector and the stored vector. For input vector 161 and stored vector 162, it is clear that they lie along a straight line, so there is no offset of the two closest end points 163 and 164. However, input vector 165 and stored vector 166 are not perfectly aligned, and the distance 170 between the closest end points 167, 168 and the straight line 169 is the computed offset.

The line desegmentation subroutine then goes to decision block 80 and compares the computed offset in FIG. 7 to a threshold value to determine if the input vector can be combined with the stored vector. If this determination is negative, the input vector is entered as a new entity in block 67. If the determination of decision block 80 is affirmative, the subroutine goes to block 82 and indicates that the present input vector can be combined with the stored vector by setting the combine flag to a "1", and then returns via the return label to FIG. 3.

Figure 15:
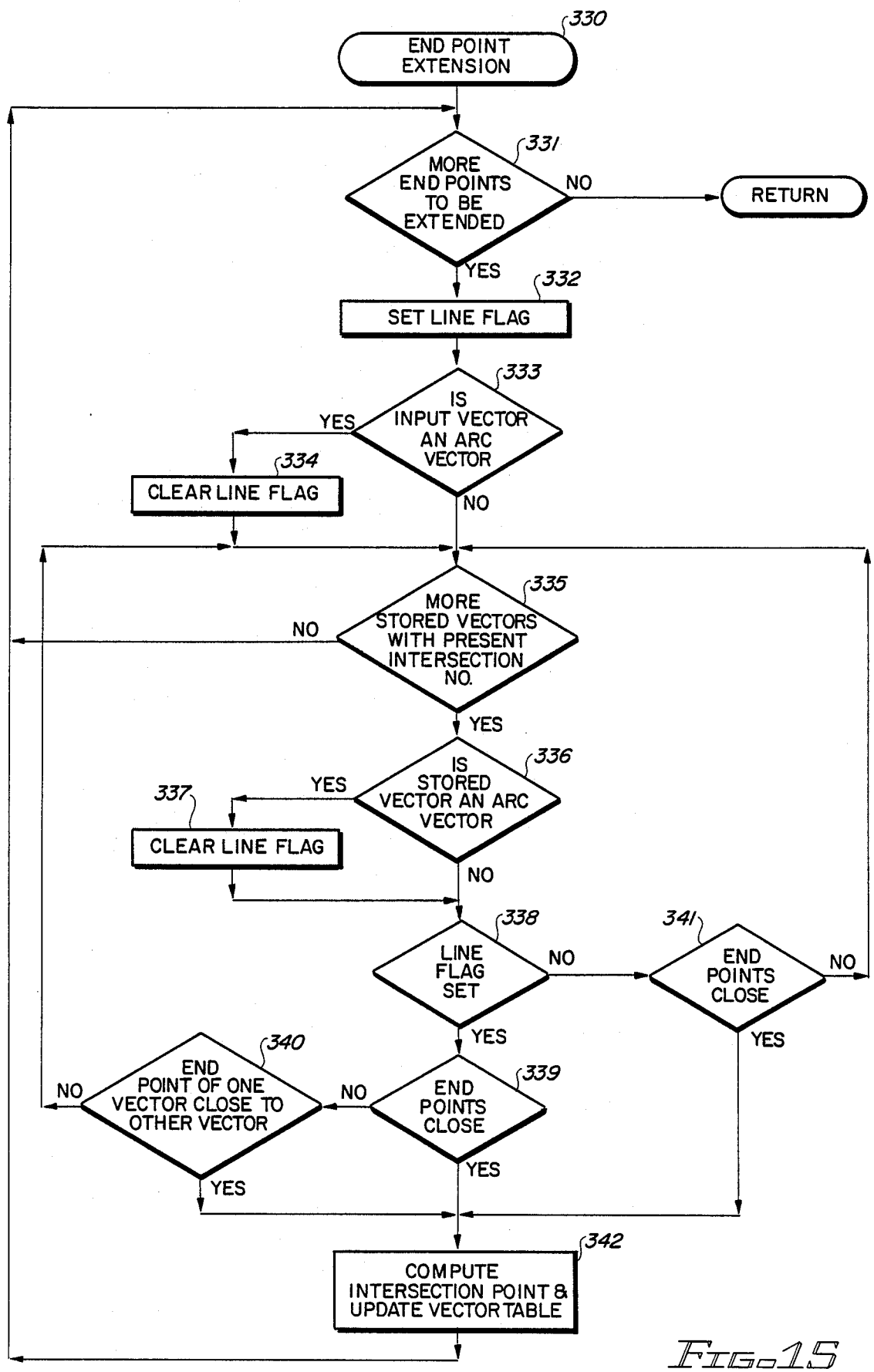
FIG. 15 is a flow chart of a subroutine called by the flow chart of FIG. 1A.

After the main vectorization program of FIG. 1 has filled the vector table and/or filled shape from the data in the various records, an affirmative determination is produced by decision block 1A, and the program executes the end point extension subroutine of FIG. 15, as indicated in block 20A of FIG. 1A. The purpose of the end point extension subroutine is to extend the end points of vectors in the vector table which should be connected to end points or other portions of other vectors in the vector table. It should be appreciated that the above-described vectorization process results in such gaps, which are due to the thicknesses of various connected shapes which are represented by line vectors or arc vectors. That is, frequently a line vector representing one shape will have to be extended by approximately half of the thickness of another shape represented by a second line vector so that the first line vector end point touches the end point of the second line vector.

Referring now to FIG. 15, the en point extension subroutine is entered via label 330 and goes to decision block 331. In block 331, the subroutine determines if there are any more vectors in the vector table having end points that need to be extended to fill gaps of the above-mentioned type. If not, the subroutine returns to FIG. 1A. If the determination of block 331 is affirmative, the subroutine goes to block 332 and sets an initial value to a "line" flag, and then goes to decision block 333. In block 333, the subroutine determines if the next vector, which has been fetched into a buffer and is referred to as the "present entity", contains more than two vectors. That is, block 333 determines if the present vector is an arc vector. If it is, the subroutine clears the line flag in block 334 and goes to decision block 335. If the present entity is a line vector, the subroutine goes directly to block 335.

In block 335, the subroutine determines if there are any more stored vectors in the vector table having the same intersection number as the present entity, i.e., the line vector or arc vector presently in the input buffer. If not, the subroutine returns to block 331. If the determination of block 335 is affirmative, the subroutine goes to decision block 336 and determines if the stored vector with the present intersection number is an arc vector. If not, the subroutine goes to decision block 338. If the stored vector is an arc vector, the subroutine clears the line flag in block 337 and goes to block 338.

In block 338, the subroutine tests the line flag. If the line flag is not set, it means one of the input vector and the stored vector having the same intersection number is an arc vector. The program goes to block 341 and determines if their end points are closer than approximately 50 pixels. If this determination is negative, the subroutine returns to block 335. If the end points of the input vector and the stored vector are closer than about 50 pixels, the subroutine goes to block 342, computes the projected intersection point of the two vectors, and updates the vector table to extend the vectors so their closest end points intersect. The subroutine then returns to block 331.

If the determination of block 338 is affirmative, it means both the two vectors under consideration are line vectors, and the subroutine goes to block 339 and determines if two of the end points of the input vector and the stored vector are closer than about 50 pixels. If so, the subroutine goes to block 342 and extends the end points so the two vectors intersect. If the two end points are not close enough, then the subroutine goes to block 340 and determines if an end point of one of the two line vectors is closer than approximately 50 pixels to any other portion of the other line vector. If not, the subroutine returns to block 335. If the determination of block 340 is affirmative, the subroutine goes to block 342, computes the intersection point, and extends the first vector so that it touches the midportion of the second vector.

When a negative determination is obtained from decision block 331 the subroutine returns to block 21 of FIG. 1A and determines if more vectorized entities are to be output by the vectorization program. If not, the vectorization program returns to the calling program via label 22. Otherwise, the program goes to decision block 23 and determines if the present entity to be output contains more than two vectors. If this determination is negative, the present entity is not an arc or circle, and the program goes to block 24 and outputs the present entity as previously vectorized, and returns to block 21. If the determination of block 23 is affirmative, the program goes to block 25 and determines if the present entity is an arc. If it is, it is output as an arc, as indicated in block 26, and the program returns to block 21. If the determination of block 25 is negative, then the present entity is a circle, and is output as a circle, as indicated in block 27.

Next it will be convenient to briefly describe the data and vector generating subroutines of block 13, 14, and 16–18 of FIG. 1. Referring first to FIG. 1C, which is called by block 7 of FIG. 1, it generates a horizontal vector. Basically, with this subroutine does is determine the y coordinate of the top and bottom slices of the horizontal vector (block 221), compute the average y coordinate (block 223), compute the thickness of the horizontal vector by subtracting the bottom y coordinate from the top y coordinate (block 224), and obtain the minimum left edge x coordinate and the maximum right edge x coordinate for the horizontal vector (block 225). These coordinates thereby provide the left end coordinates and right end coordinates of the horizontal vector, and are loaded into the input buffer, and indicated in block 226.

Figure 1D:
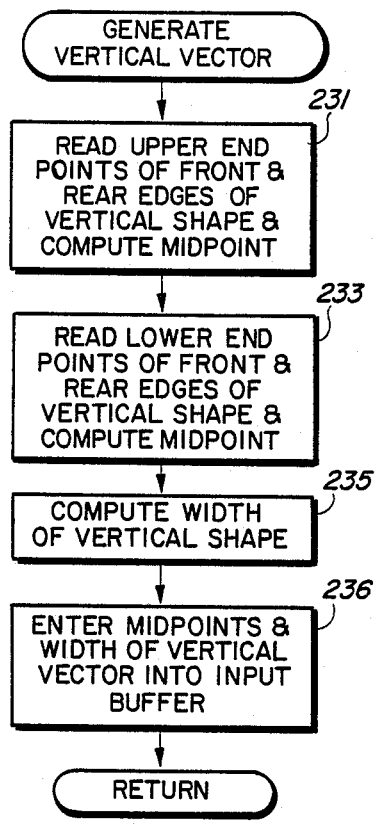
FIG. 1D is a flow chart of the subroutine executed in block 18 of FIG. 1.

Referring now to FIG. 1D, this subroutine is called by block 18 of FIG. 1. In this case, it should be noted that for any non-horizontal vector, the subroutine vectorizes the front (left) and rear (right) edges of the shape to be vectorized in block 9 of FIG. 1. Basically, this subroutine simply computes the midpoint of the upper edge of the vertical shape (block 231), the midpoint of the lower edge of the vertical shape (block 233), the width of the vertical shape (block 235), and enters the coordinates of the upper and lower midpoints and the widths of the vertical shape into the input buffer (block 236).

Figure 16:
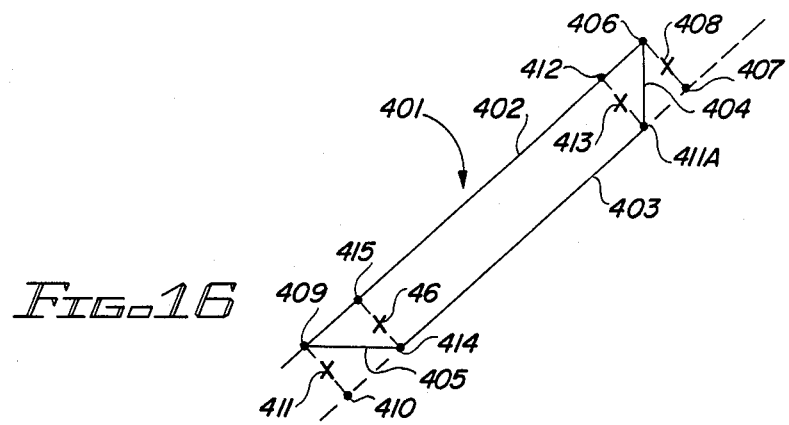
FIG. 16 is a diagram useful in explaining the subroutine of FIG. 1E.

FIG. 1E shows the steps in generating a diagonal vector, and is called by block 17 of FIG. 1. The operation of this subroutine can be best understood with reference to FIG. 16, in which a diagonal shape 401 has a longest front edge 402 and a shorter front edge 405 which have been vectorized in block 9 of FIG. 1 and a longest rear edge 403 and a shorter rear edge 404 which also have been vectorized in block 9 of FIG. 1. The diagonal vector generating subroutine of FIG. 1E computes the perpendicular projections of end points 406 and 409 on the straight line passing through points 411A and 414. That is, the subroutine computes projection points 407 and 410, and then computes the midpoint 408 between points 406 and 407 and computes the midpoint 411 between points 409 and 410. The shape thicknesses at the upper and lower ends also are computed. These steps are performed in blocks 241 and 243 of FIG. 1E. Next, a similar procedure is performed on projecting the end points of the longest rear edge vector 403 onto a straight line passing through points 406 and 409. That is, point 411A is projected to point 412 and its midpoint 413 is computed. Similarly, point 414 is projected to point 415, and the corresponding midpoint 416 is computed. The corresponding shape thicknesses also are computed. These steps are performed in blocks 245 and 247 of FIG. 1E. Then, the longest vector between the four midpoints is determined, i.e., the vector between midpoints 408 and 411. This step is performed in block 249. The average thickness of the diagonal shape is computed in block 250. The coordinates of the diagonal vector then are entered into the input buffer, as indicated in block 251 of FIG. 1E. That is, the coordinates of points 411 and 408 and the average computed thickness are entered into the input buffer.

Figure 1F:
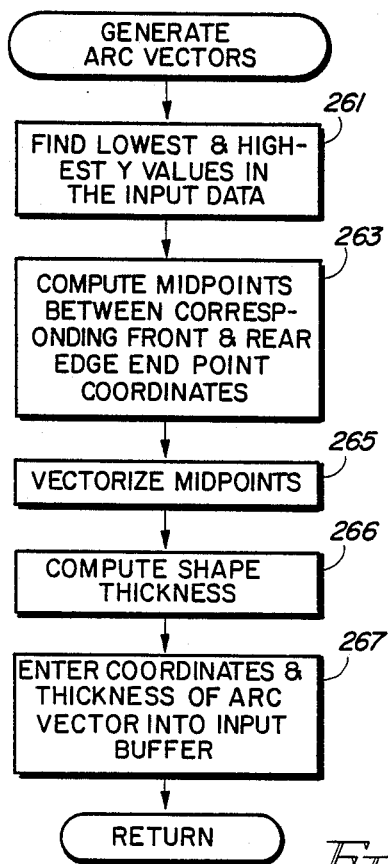
FIG. 1F is a flow chart of the subroutine executed in block 16 of FIG. 1.

Referring next to FIG. 1F, which is called by block 16 of FIG. 1, block 9 of FIG. 1 has vectorized the front and rear edges of the composite arc vector. Block 261 of FIG. 1F reads the Y values of the upper and lower ends of the arc vector, and computes the midpoint of each slice of the arc vector, as indicated in blocks 261 and 263 of FIG. 1F. The subroutine then vectorizes the center points in exactly the same fashion that block 9 of FIG. 1 vectorizes the front and rear edges, and computes the line width, as indicated in blocks 265 and 266. The coordinates of the resulting arc vector, including the computed shape width, are stored in the input buffer as indicated in block 267.

Figure 1G:
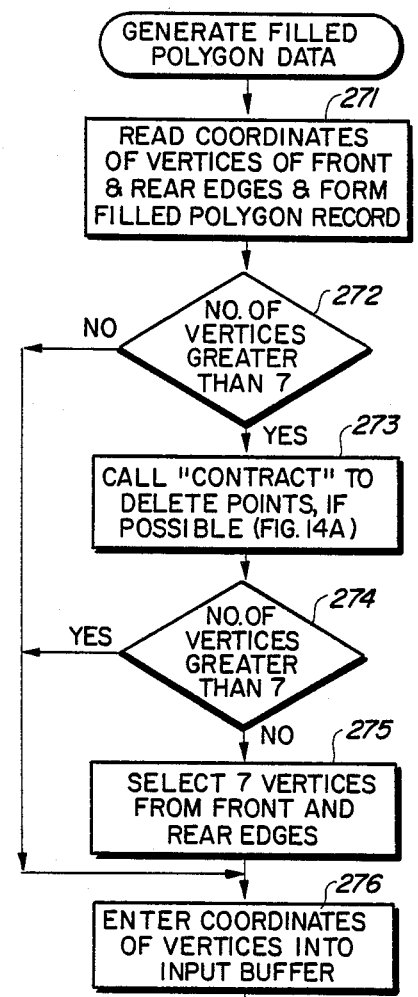
FIG. 1G is a flow chart of the subroutine executed in block 14 of FIG. 1.

Referring to FIG. 1G, which is called by block 14 of FIG. 1 to generate data representing a filled polygon, the subroutine enters block 271 reads the coordinates of all of the vertices of the front and rear edges, which have been previously vectorized in block 9 of FIG. 1, and uses those vortex coordinates to form a "filled polygon record". The subroutine then goes to decision block 272 and determines if the number of such vertices is greater than 7. If not, the subroutine goes to block 276, enters the coordinates of the vertices into the input buffer, and returns to FIG. 1. If the number of vertices of the filled polygon record is greater than 7, the subroutine calls the contract subroutine of FIG. 14A to delete some of the vertices if possible. Basically, FIG. 14A determines if any of the pairs of vertices are close enough that one vertex of that pair can be deleted.

Figure 14:
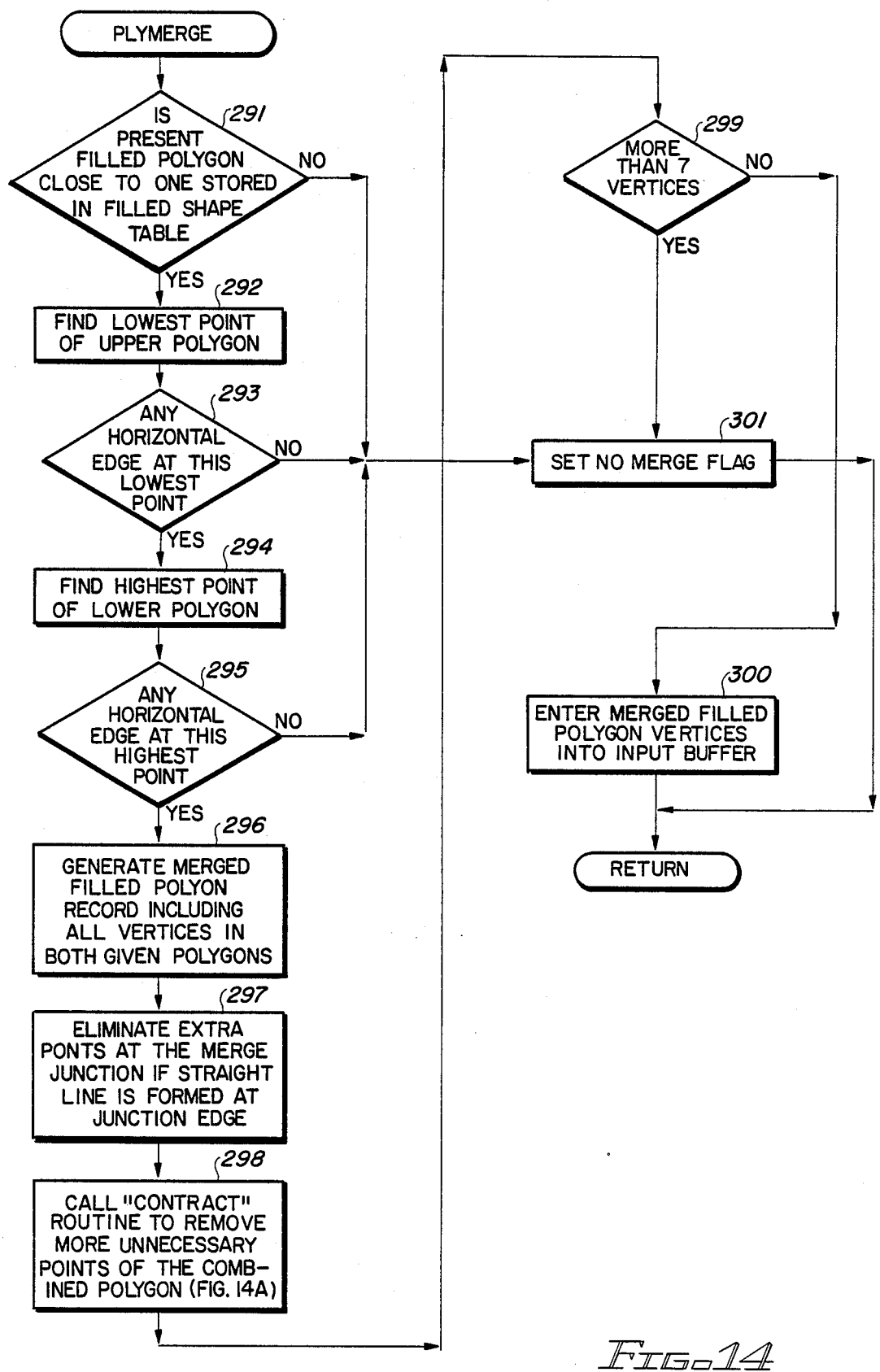
FIG. 14 is a flow chart of a subroutine for merging filled polygons.
Figures 14A, 14B:
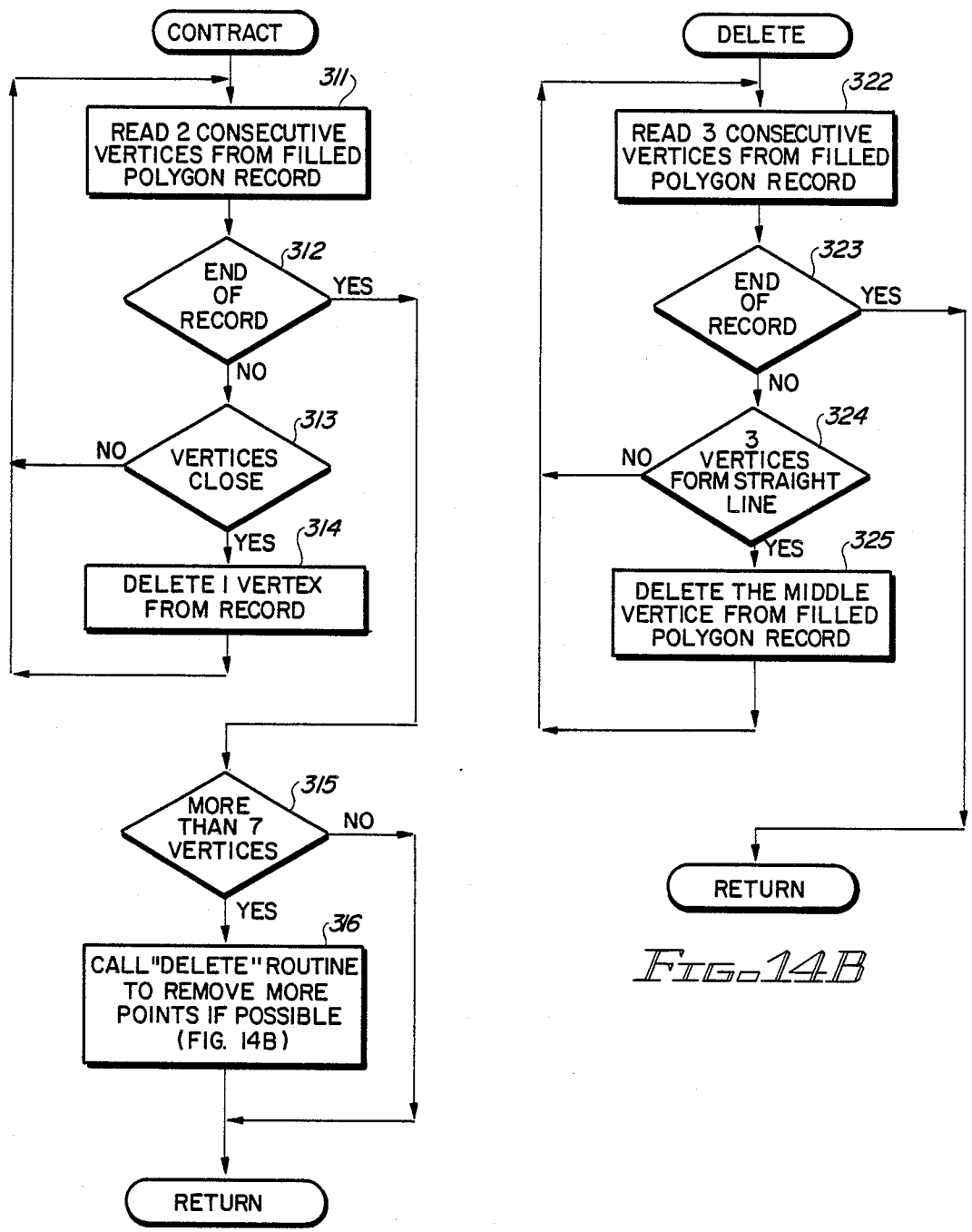
FIG. 14A is a flow chart of a subroutine that is called by the flow chart of FIG. 14.
FIG. 14B is a flow chart of a subroutine called by the flow chart of FIG. 14A.

Referring to FIG. 14A, two consecutive vertices are obtained from the filled polygon record, as indicated in block 311. The subroutine goes to block 312, determines if it is at the end of the filled polygon record, and if it is not, goes to block 313, determines if the two vertices are close enough together that one of them can be deleted. If this determination is negative, the subroutine returns to block 311. If the two vertices under consideration are sufficiently close, one of them is deleted from the filled polygon record, as indicated in block 314. The subroutine then returns to block 311. If the determination of block 312 is affirmative, the subroutine goes to block 315 and determines if more than seven vertices remain in the filled polygon record. If this determination is negative, the subroutine returns to FIG. 1G. Otherwise, the subroutine calls the "delete" subroutine of FIG. 14B, executes it, and returns to FIG. 1G.

Basically, what the subroutine of FIG. 14B does is to determine if three consecutive vertices of the filled polygon record define a sufficiently straight line to allow the middle vertex to be deleted from the filled polygon record. To accomplish this, the delete subroutine reads three consecutive vertices from the filled polygon record as indicated in block 322, and goes to block 323. If the end of the filled polygon record has been reached, the subroutine returns to FIG. 1G, and otherwise goes to block 324 and determines if the middle vertex is close enough to a straight line passing through the other two vertices. If this determination is negative, the subroutine returns to block 322 and repeats the procedure. If the determination of block 324 is affirmative, the middle vortex is deleted from the filled polygon record.

Returning to FIG. 1G, the subroutine goes from block 272 to decision block 274 and determines if the number of vertices has been reduced to seven or less. If the determination is affirmative, the subroutine goes to block 276 and enters the coordinates of those vertices into the input buffer and returns. If the determination of block 274 is negative, the subroutine goes to block 275 and selects seven vertices from the vectorized front and rear edges of the filled polygon and enters them into the input buffer. It should be realized that if sufficient space is made available in the output record, the limitation of the number of filled polygon vertices to a maximum of 7 is unnecessary.

Figure 1H:
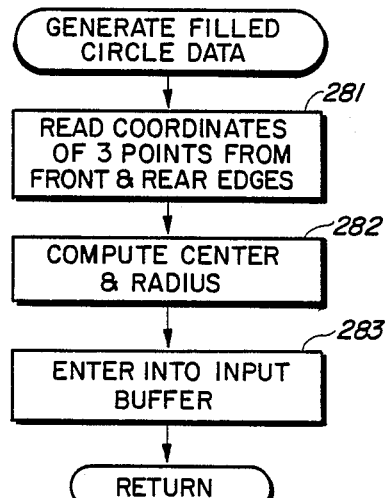
FIG. 1H is a flow chart of the subroutine executed in block 13 of FIG. 1.

FIG. 1H is called by block 13 of FIG. 1 to generate filled circle data, and simply reads the coordinates of three points from the previously vectorized front and rear edges of the filled circle shape, as indicated in block 281. The subroutine then computes the center point and the radius on the basis of the coordinates of the three points, and enters those into the input buffer, as indicated in blocks 282 and 283.

Next, the subroutine of FIG. 14, which is called from block 57A of FIG. 3 will be described. This subroutine performs the function of determining if the present filled polygons can be combined or merged into one stored in the filled shape table. The subroutine first goes to decision block 291 and determines if the present filled polygon represented by the input data is sufficiently close to a filled polygon already stored in the above-mentioned filled shape table. If this determination is negative, the subroutine goes to block 301 and sets a "no merge" flag, and returns to FIG. 3. If the determination of block 291 is affirmative, the subroutine determines the lowest point of the upper filled polygon in block 292, goes to block 293, and determines if there is a horizontal edge at the lowest point of the upper polygon. If this determination is negative, the no merge flag is set in block 301. I the determination of block 293 is affirmative, the subroutine goes to block 294 and finds the highest point of the lower filled polygon, goes to decision block 295 and determines if there is a horizontal edge at that point. If not, the subroutine goes to block 301. If the determination of block 295 is affirmative, the subroutine goes to block 296 and generates a "merged filled polygon record" including all vertices of both filled polygons under consideration. The subroutine then goes to block 297 and deletes points lying along the merge junction if a straight line is formed thereat. This subroutine then goes to block 298 and called the contract subroutine of FIG. 14A, described later, to delete as many of the vertices as possible, and goes to block 299 and determines if the number of vertices of the merged polygon exceeds a maximum number, for example seven. If there are more than seven vertices in the merged filled polygon record, the subroutine goes to block 301, sets the no merge flag and returns. However, if the number of vertices in the merged filled polygon record is seven or less, the merged filled polygon data is transferred from the merged filled polygon record into the input buffer in block 300 and the subroutine returns to FIG. 3.

Next, several examples will be given to illustrate further how the program of FIG. 1 vectorizes the shapes shown in FIGS. 6 and 10. The shape shown in FIG. 6 is vectorized as follows. First, the vecorizing program passes through decision block 1D of FIG. 1 and fetches the trapezoid record of trapezoid 112, since its upper end 130 is the highest points, by executing the subroutine of FIG. 1B, and computes it height to width ratio. The above mentioned intersection counter initially is set to 1 and remains at 1, and since trazepoid 12 has not been previously processed. The program then goes to decision block 6, determines that trazepoid 112 is not horizontal, and in block 9 vecorizes its front and rear edges. It is determined in block 10 that trapezoid 12 is not a complex shape. The program then goes to the shape recognition subroutine of FIG. 2 and determines that the longest vector of the front edge is the front edge and the longest vector of the rear edge is the rear edge.

In block 37 of FIG. 2 the shape recognition subroutine determines that there are no additional vectors of length similar to the longest vectors of either the front edge or rear edge, and therefore makes a negative determination in decision block 38, and goes to block 44, wherein the shape recognition subroutine computes the angle between the front and rear edges of trapezoid 112, and then determines in decision block 45 that the front and rear edges of trapezoid 112 are parallel. The shape recognition subroutine then goes to decision block 47 and determines that the front and rear edges are not vertical, and then generates a code in block 49 indicating that trapezoid 112 should be represented by a diagonal vector.

The program returns to FIG. 1 and uses that diagonal vector code to call subroutine of FIG. 1E and generate a diagonal vector that represents trazepoid 112. The program then goes to the entity generation and desegmentation subroutine of FIG. 3 and determines that the input data generated is a vector, rather than data representing a filled shape. Therefore, the determination of block 56 in FIG. 3 is affirmative, so the subroutine goes to block 58 and determines that trapezoid 112 is not represented by an arc vector, and therefore goes to the line desegmentation subroutine of FIG. 4.

The line desegmentation subroutine of FIG. 4 then resets the combine flag to "0" in block 59B, and in decision block 66 makes a negative determination, since trapezoid 112 of FIG. 6 ends at a convergence, not a divergence. The present input vector representing trapezoid 112 is not contained in intersection 125 (FIG. 6) and therefore the determination of block 68 in FIG. 4 is negative. The line desegmentation subroutine also makes a negative determination in decision block 71, and also makes a negative determination in decision block 74, since there are no prior entries in the vector table for the present object. The subroutine then goes to block 67 and enters the input vector for trapezoid 112 into the vector table.

The program then goes back to block 1C of FIG. 1 and fetches the blob record for blob 111B, and since not all shapes connected to intersection 125 in FIG. 6 have been vectorized, determines that the intersection counter need not be incremented. The program then determines in block 6 that blob 111B is not horizontal, vectorizes the front and rear edges of the data for blob 111B in block 9, and calls the shape recognition subroutine of FIG. 2 in block 12.

In block 36 of FIG. 2, the shape recognition subroutine determines that the front edges of blob 111B is the longest, and in blocks 37 and 38 determines that neither the front nor rear edges have multiple vectors of similar lengths and goes to block 44. In block 44, the shape recognition subroutine computes the angle between the longest vectors of the front and rear edges, determines that they are not parallel in block 45, and generates a filled polygon code in block 46 indicating that blob 111B should be represented by a filled polygon.

The subroutine then returns to FIG. 1, generates the filled polygon data representing blob 111B in block 14, goes to block 56 of FIG. 3 and determines that the input data does not represent a vector, and then a block 57 enters the filled polygon data for blob 111B into the filled shape table.

Next, after determining that blob 111B has no further data in decision block 20 of FIG. 1, the vectorizing program fetches the trapezoid record of trapezoid 111A in block 3, determines in block 6 that trapezoid 111A is not a horizontal shape, and vectorizes the front and rear edges in block 9. In the shape recognition subroutine of FIG. 2, it is determined by the decisions in blocks 38 and 45 that the front and rear edges of trapezoid 111 are parallel. As for trazepoid 112, blocks 47 and 49 cause a diagonal vector code to be generated for trapezoid 111A, and a corresponding diagonal vector is generated by subroutine 17 in FIG. 1.

Block 56 of FIG. 3 determines that the generated diagonal input vector is a vector, and block 58 determines that the vector is not an arc vector. The subroutine then goes to the line desegmentation subroutine of FIG. 4.

Negative determinations are made in decision blocks 66, 68, and 71. Decision block 74 determines that now there is a stored vector, namely the vector representing trazepoid 112, in the vector table having the same intersection as the present input vector representing trapezoid 111A. Decision block 75 determines that the stored vector, which represents trapezoid 112, is not an arc vector. In blocks 78 and 79 the offset is computed between the two closest end points of the vectors representing trapezoids 111A and 112. Block 80 determines that the offset is too large to allow vectors 111A and 112 to be combined. The line desegmentation subroutine then returns to FIG. 3 and determines in block 61 that the combine flag is still at a "0", and enters the present input vector representing trapezoid 111A into the vector table.

Next, the vectorization program fetches the blob record corresponding to intersection blob 125, determines in block 6 that it is not a horizontal shape, vectorizes the front and rear edges in block 9, determines in block 10 that the shape is not complicated. The shape recognition subroutine of FIG. 2 determines the longest vectors of the front and rear edges of intersection blob 125, and determines that there are two similar length vectors in each of the front and rear edges (blocks 37 and 38). The determination of block 38 in FIG. 2 therefore is affirmative. Decision block 39 determines that intersection blob 25 is more nearly horizontal than vertical, and therefore goes to decision block 41 and determines that intersection blob 125 is not convex, and then generates a code in block 42 indicating that intersection blob 125 is an intersection blob.

Next, the program fetches the trapezoid record for trapezoid 114, and determines in block 6 that trapezoid 114 is not horizontal. The program goes to the shape recognition subroutine and passes through decision block 38, block 44, decision blocks 45 and 47, and block 49 to generate a diagonal vector code.

The program then uses that code to cause subroutine 17 of FIG. 1 to generate a diagonal vector code that represents trapezoid 114. The program then goes to the entity generation and desegmentation subroutine of FIG. 3, passes through blocks 56 and 58 to determine that the resulting input vector that is not an arc vector and goes to the line desegmentation subroutine of FIG. 4, obtains negative determinations in decision blocks 66, 68, and 71, and determines in decision block 74 that the present input vector representing trapezoid 114 has the same intersection number as stored vectors 111A and 112 in the vector table. The line desegmentation subroutine of FIG. 4 then passes through decision block 75, blocks 78 and 79, and decision block 80 to determine that the present input vector representing trapezoid 114 can be combined with the stored vector representing trapezoid 112. The subroutine then goes to block 82 and sets the combine flag to a "1", and then returns to decision block 61 of FIG. 3, tests the combine flag, and determines that input vector 114 is to be combined with stored vector 112 by extending vector 112 to include the lower end points of input vector 114.

The program then goes to FIG. 1 and fetches the trapezoid record of trapezoid 115, which has the same intersection number as the intersection counter, which has not yet been incremented. As previously explained, the vectorization subroutine vectorizes all shapes connected to the intersection represented by the present count of the intersection counter before incrementing it and vectorizing shapes connected to the next intersection.

The vectorization program vectorizes trapezoid 115 in the same manner as trapezoid 114, determines that the resulting input vector is combinable with the stored vector 111A, and extends stored vector of trapezoid 111A, to include the lower end points of input vector 115.

The program then obtains an affirmative decision in decision block 1C of FIG. 1, increments the intersection counter from 0 to 1, and then fetches the blob record of blob 113B of FIG. 6. This blob is "vectorized" in the same manner that blob 111B previously was, and is entered in the filled shape table. Trapezoid 113A is fetched and vectorized in the same manner as previously vectorized trapezoid 111A. An intersection blob code is generated for intersection blob 126. Trapezoid 117 is vectorized and combined with stored vector 114 in the manner previously described.

Trapezoid 118 differs only from those described above in that it begins at a divergence of intersection blob 126. In FIG. 4, a negative determination is obtained in decision block 71, resulting in the input vector 118 being combined with the stored vector now representing trapezoid 113A by appropriately updating the vector table, as previously described.

The rest of object 110 is vecorized in essentially the same manner. When the last trapezoid 122 has been vectorized and combined or desegmented, the determination of decision block 1C and then block 1A of FIG. 1 will be affirmative. The first phase of the vectorization procedure for FIG. 6 has been completed. The vecorization program then goes to block 20A of FIG. 1A. The shape of FIG. 6 requires no end point extension due to the way desegmentation has occurred. An affirmative decision is obtained in block 331 of FIG. 15, and then in block 21 of FIG. 1A. The program then determines in decision block 23 that the first entity in the vector table does not contain more than two vectors, and therefore outputs the vector representing that entity or the filled polygon data representing that entity into an output file. This procedure is repeated until all of the entities in the vector table and the filled shape table have been output to the output file. The vectorization program then returns via label 22 to whatever program called the vectorization program of FIG. 1.

Next, the circle shown in FIG. 10 is used as an example to explain the operation of the vectorization program of the present invention. The top shape of the circle is blob 154. Its blob record is fetched, as indicated in block 10 of FIG. 1. Shape 154 is determined in decision block 6 of FIG. 1 to be horizontal, and a horizontal vector is generated in block 7. The entity generation and desegmentation subroutine of FIG. 3 determines in decision block 56 that this horizontal vector is indeed a vector, determines in decision block 58 that the input vector is not an arc vector, and goes to the line desegmentation subroutine of FIG. 4.

In decision block 66 of FIG. 4 the line desegmentation subroutine determines that shape 154 begins at an open point, and ends in a divergence (the divergence of shapes 155 and 159 from shape 154). Therefore, the input horizontal vector is entered as a new entity into the vector table, as indicated in block 67. The program then fetches the blob 155 of FIG. 6, as indicated in block 10 of FIG. 1, determines in decision block 6 that this shape is not horizontal, vectorizes the front and rear edges of arc 155, and determines that the shape is not complex, since none of the angles are less than 90 degrees, and goes to the shape recognition subroutine of FIG. 2.

In blocks 36, 37, and 38 of FIG. 2, the shape recognition subroutine determines that both the front and rear edges of blob 155 have multiple vectors of similar length, goes to decision block 39, determines that shape 155 is not more nearly horizontal than vertical, generates an arc code in block 40, and returns to FIG. 1. In FIG. 1, that arc vector code is used to call the subroutine of block 16 and generate an arc vector that represents blob 155.

Then, the vectorization program goes to FIG. 3, makes an affirmative decision in block 56, determines in decision block 58 that the present input vector 155 is an arc vector, and goes to the arc desegmentation subroutine of FIG. 5. In FIG. 5, the combine flag is reset to a "0" in block 60B.

As shown in FIG. 8, the two closest end points are found between input vector of blob 155 and the stored vector of blob 154, which has the present intersection number. Decision block 92 determines that the end points are close enough to permit desegmentation or combining of the input vector and the stored vector. Blocks 93 and 94 compute the lengths of input vector 155 and determines that it is sufficiently similar to combine with stored vector 154.

Next, in blocks 95 and 96 of FIG. 5, the angle between stored vector 154 and the closest segment of input vector 155 are computed and a determination is made as to whether the resulting angle is too sharp. In this case, it is not too sharp, so the previously described convexity test is made, in block 97. In block 98 it is determined that shape 155 is convex and therefore can be combined with the stored vector of blob 154. The program goes to block 100, sets the combine flag to a "1", and returns to block 61 of FIG. 3, tests the combine flag, obtains an affirmative decision, and goes to block 64, and updates the stored vector 154 by adding input vector 155 to it.

The program performs a similar sequence of operations to update the stored vector by adding the arc vector representing blob 159 to the stored vector, and then finally updating the resulting stored vector by adding the horizontal vector representing shape 157 to it.

Then the vectorization program goes to FIG. 1A and determines in decision block 23 that the single entity now in the vector table contains more than two vectors, so it goes to block 25 and determines that the entity in the vector table is not an arc, and therefore it must be a circle. It computes the center of the circle and the radius and the thickness of the circle and outputs that data to the output file.

The above-described vectorization technique substantially reduces the amount of data needed to accurately electronically represent an image, such as an engineering drawing, scanned by an electronic optical scanning device, such as a charge coupled device (CCD). The accuracy is substantially greater than other known vectorization techniques, the amount of time required to electronically transmit the vectorized data produced by the present invention, and to edit, scale, or otherwise modify the data before accurately reproducing the drawing on a CRT or a plotter is greatly less than is the case for images vectorized by prior techniques. The desegmentation techniques and the shape recognition techniques make practical the high speed and data simplification of the present invention.

While the invention has been described with reference to a particular embodiment thereof, those skilled in the art will make various modifications to the described embodiment of the invention without departing from the true spirit and scope of thereof. It is intended that all vectorization methods and apparatus which are equivalent to those described herein in that they perform substantially the same function in substantially the same way to obtain the same result are within the scope of the invention. For example, a slice can be a connected string of successively adjacent non-white pixels, or nontransparent pixels other than black pixels. As many as thousands of different pixel codes can be used to represent the thousands of different colors that are distinguishable to an average human.

Appendix A attached hereto contains code corresponding to the above-described flow charts.

APPENDIX A

```
VECGEN    IDNT    1,0                          MAIN PROGRAM Fig. 1

*******************************************************************
*       MODULE NAME:   VECGEN.SA           (C) COPYRIGHT 1986 GTX CORP   *
*       REVISION HISTORY:                                                *
*       AUTHOR      DATE        DESCRIPTION                              *
*       ------      ----        -----------                              *
*         LL        10/01/85    ORIGINAL WRITING                         *
*         LL        01/10/86    ADD NEXT_DIV BUFFER                      *
*         LL        03/05/86    PROCESS THE RUNLENGTH RECORD OF CONVERGENCE *
*                               IMMEDIATELY WHEN IT IS HIT               *
*         LL        8/21/86     APPLY INTERSECTION NUMBER CONCEPT        *
*         LL        9/22/86     APPLY GRID CONCEPT                       *
*         LL        10/17/86    JUMP TO INTERSECTION AREA TO PROCESS BRANCHES *
*       MODULE DESCRIPTION:                                              *
*           VECGEN receives the data generated by METAGRAB, vectorizes,  *
*       desegments, and endpoint extends them to generates vectors, arcs,*
*       circles, filled circle and filled polygons.                      *
*       ENTRY CONDITIONS:                                                *
*           D4 contains the minimum x coordinate of the object           *
*           D5 contains the maximum x coordinate of the object           *
*           D6 contains the minimum y coordinate of the object           *
*           D7 contains the maximum y coordinate of the object           *
*           A0 points to the beginning of metaobject header record       *
*       EXIT CONDITIONS:                                                 *
*           REGISTERS USED                                               *
*           0  1  2  3  4  5  6  7                                       *
*           -----------------------                                      *
*       A  !*  *  *  *  *  *  *  *!                                      *
*       D  !*  *  *  *  *  *  *  *!                                      *
*           -----------------------                                      *
*           * = DESTROYED                                                *
*           P = REGISTER USED BUT PRESERVED                              *
*           E = ENTRY PARAMETER (NOT DESTROYED)                          *
*           R = RETURN VALUE                                             *
*       NOTES:                                                           *
*******************************************************************
```

```
              PAGE

XDEF      VECGEN

XREF      .VECTORS,.VCTLOCK,.OBJFIN,.PARAMS,.STDWDTH
              XREF      .RCGWDTH,.SSLOPE,.ENDPTXT,.OVERTOL
              XREF      INITFILE,UPTYPE,UPOFRM,PTSCLT,DWNTYPE,HORIZ,DESEG,SHAPRCG
              XREF      OBJEPEXT,LINEWDTH,SQDIST,ARCCNT,DESEG2,INTSEC
              XREF      INITGRID

IFEQ      GRAPH
              XREF      OUTLIN,OUTCRL,CLR_QUME,OUTDOT,GRAFOUT,DRWPOLY
              ENDC

****** .VECTORS type definitions
LINERECD   EQU       $0100
DOTRECD    EQU       $0200

ARCRECD    EQU       $0600
CIRCRECD   EQU       $0700

VECTLEN    EQU       32
****** symbols used in the module
CHARSIZ    EQU       120
BRH_BEG    EQU       4
START_Y    EQU       12
ENT_PTR    EQU       16
SLICE1     EQU       20
SL1DWN     EQU       24
SL2DWN     EQU       32
DTYPE      EQU       2
ENDREC     EQU       52
LINK       EQU       60
SQMAXDST   EQU       1600
MIN_HORI   EQU       80
MIN_SLCS   EQU       3
CONVERG    EQU       1
TRPTYPE    EQU       3
DIVTYPE    EQU       1
MINCIRV    EQU       7

*************** VECGEN ************************
VECGEN    .ENTER    VECGSTA$
          MOVE.L    A2,-(A7)
          MOVE.W    D4,XMIN
          MOVE.W    D5,YMIN
          GWINDOW   #$B,D4,D5,D6,D7
          MOVE.B    D0,ARCRCG_F
          SUB.W     D4,D6
          SUB.W     D5,D7
          JSR       INITGRID
          CLR.B     CHAR_FLG

IFEQ      GRAPH
          JSR       CLR_QUME
          ENDC

CMP.W     #CHARSIZ,D6
          BGT.S     VEC_BEG
          CMP.W     #CHARSIZ,D7
          BGT.S     VEC_BEG
          MOVE.B    #1,CHAR_FLG

***** Initialize VECSEG, LINESEG, and NONLINE to memory files.
VEC_BEG   MOVE.L    #BUFFER,BUF_PTR
          LEA       NONLINE,A1
          LEA       20(A1),A0
          MOVE.L    #.ENDLOCL,D0
          SUB.L     A0,D0
          ASR.L     #3,D0
          JSR       INITFILE
          JSR       INITFILE
          JSR       INITFILE
```

```
            JSR         INITFILE
            ADD.L       D0,D0
            ADD.L       D0,D0
            JSR         INITFILE

***** Continue initialization
            MOVE.L      (A7)+,A0
            MOVE.W      #0,N_INTSEC
            MOVE.L      #DIV_BUF,DIV_PTR
            MOVE.L      #DIV_BUF,DIV_USE
            CLR.L       OB_HEAD
            CLR.W       D0
            MOVEA.L     ,PARAMS,A2
            MOVE.B      .ENDPTXT(A2),EPEXT_FL
            MOVE.B      .ROGWDTH(A2),D0
            MOVE.W      D0,MINWDTH
            MOVE.B      .ROGWDTH+1(A2),D0
            MOVE.W      D0,MAXWDTH
            MOVE.B      .SSLOPE(A2),D0
            MOVE.W      D0,EPSILON
            MOVE.B      .OVERTOL(A2),D0
            MOVE.W      D0,OVERTOL

***** Beginning of real process
NEXT_HDR    MOVE.L      A0,OBJ_HEAD
            LEA         BRH_BEG,A2
            MOVE.L      A0,BRH_IDX
LOOP_1      ADDA.L      OBJ_HEAD,A0
            TST.L       (A0)
            BEQ         VEC_END
            MOVEA.L     (A0),A1
            TST.L       ENT_PTR(A1)
            BNE         NEXT_BRH
            ADDQ.W      #1,N_INTSEC

***** locate the intersection area of the branch
            TST.L       4(A1)
            BEQ.S       LOOP_2
            MOVEA.L     4(A1),A0
SAME_BRH    CMP.W       #TRPTYPE,DTYPE(A0)
            BLT         NEXT_CDH
            TST.L       4(A0)
            BEQ.S       LOOP_2
            MOVEA.L     4(A0),A0
            BRA.S       SAME_BRH

***** Set up the pointer for data cluster
LOOP_2      MOVE.L      A1,TB_HEAD
            MOVE.L      A1,REC_HEAD
            MOVE.W      #SLICE1,INDEX
            MOVE.W      START_Y(A1),Y

***** Set up the up_type and dwn_type for grabbing the next data record and
***** desegmentation
***** move runlength data from data record to buffer for further process
LOOP_3      JSR         UPTYPE
            JSR         PTSCLT
            JSR         UPOFRM
            JSR         DWNTYPE

IFEQ        GRAPH
            JSR         GRAFOUT
            ENDC

CMPI.W      #MIN_HORZ,H_SHAPE
            BLT.S       OTHERS

***** Vectorize the runlength data
            JSR         HORIZ
            JSR         DESEG
            BRA.S       CHECK
OTHERS      CMP.W       #MIN_SLCS,N_SLCS
            BLT.S       CHECK
            JSR         SHAPROG
```

```
***** If dwntype = T/S, don't clear PRI_VEC
CHECK    TST.L     TB_HEAD
         BEQ.S     CLR_PRIV
         MOVEA.L   TB_HEAD,A0
         CMP.W     #TRPTYPE,DTYPE(A0)
         BGE.S     CHK_1
CLR_PRIV MOVE.L    #0,PRI_VEC

***** Get the pointer of next data record
CHK_1    MOVEA.L   TB_HEAD,A0
         MOVE.L    A0,D0
         BNE.S     V_FWD1
         TST.B     UP_OFRM
         BLT       NEXT_CHK
         CMP.B     #CONVERG,UP_OFRM
         BEQ       CDB_PRC
         BRA       NEXT_DIV
V_FWD1   CMP.W     #TRPTYPE,DTYPE(A0)
         BGE       LOOP_3
         CMP.B     #1,UP_OFRM
         BEQ       CDB_PRC
         TST.B     UP_OFRM
         BLT       NEXT_CHK
         CMP.B     #-1,DWN_TYPE
         BEQ       CDB_PRC
         CMPA.L    CD_HEAD,A0
         BEQ       NEXT_CHK

***** New convergence/divergence record
***** Update the intersection number
NEXT_CDH MOVE.L    A0,CD_HEAD
         MOVE.L    A0,CD_REC
         MOVE.W    (A0),CD_CNT
NEXT_CON TST.L     4(A0)
         BEQ       CD_BRH
         MOVEA.L   4(A0),A0
         CMP.W     #TRPTYPE,DTYPE(A0)
         BLT       CD_BRH
         TST.L     ENT_PTR(A0)
         BEQ       CD_BRH
         CMP.L     #-1,ENT_PTR(A0)
         BEQ.S     NEXT_CON
         MOVEA.L   ENT_PTR(A0),A1
CD_LNK1  MOVEA.L   (A1),A2
*        TST.L     4(A0)
*        BEQ.S     CDS_UPDT
*        MOVEA.L   4(A0),A6
*        CMP.W     #TRPTYPE,DTYPE(A6)
*        BGE.S     CD_LNK
CDS_UPDT MOVE.W    (A2),D0
         MOVE.W    2(A2),D1
         MOVE.W    D0,D2
         CMP.W     N_INTSEC,D0
         BEQ.S     CD_LNK
         CMP.W     N_INTSEC,D1
         BEQ.S     CD_LNK
         CMP.W     D1,D0
         BEQ.S     CD_UP4
         BPL.S     CD_UP1
         MOVE.W    N_INTSEC,(A2)
         BRA.S     CD_UP6
CD_UP4   MOVE.W    N_INTSEC,(A2)
         TST.W     D1
         BEQ.S     CD_UP6
CD_UP1   MOVE.W    N_INTSEC,2(A2)

***** update the intersection # of all vectors in the same intersection area
CD_UP6   MOVE.L    4(A2),D0
         BTST.L    #0,D0
         BEQ.S     CD_LNK
         SUBQ.L    #1,D0
         MOVEA.L   D0,A3
CD_BUP   MOVEA.L   4(A3),A3
```

```
                MOVEA.L     (A3),A4
                MOVE.W      (A4),D0
                MOVE.W      2(A4),D1
                CMP.W       N_INTSEC,D0
                BEQ.S       NXT_UPDT
                CMP.W       N_INTSEC,D1
                BEQ.S       NXT_UPDT
                CMP.W       D0,D2
                BEQ.S       CD_UP7
                CMP.W       D1,D2
                BEQ.S       CD_UP2
                CMP.W       D1,D0
                BPL.S       CD_UP2
CD_UP7          MOVE.W      N_INTSEC,(A4)
                BRA.S       NXT_UPDT
CD_UP2          MOVE.W      N_INTSEC,2(A4)
NXT_UPDT        TST.L       4(A3)
                BEQ.S       CD_LNK
                BRA.S       CD_BUP
CD_LNK          TST.L       4(A1)
                BEQ         NEXT_CON
                MOVEA.L     4(A1),A1
                BRA         CD_LNK1

***** update the intersection number of all branches
CD_BRH          LEA         SLICE1,A0
CD_NREC         MOVE.L      A0,CD_IDX
                ADDA.L      CD_REC,A0
CD_DEC1         SUBQ.W      #1,CD_CNT
                BLT         CD_FWD2
                MOVEA.L     (A0),A1
CD_BCK1         CMP.W       #TRPTYPE,DTYPE(A1)
                BLT         CD_NEXT
                TST.L       ENT_PTR(A1)
                BEQ         CD_NEXT
                CMP.L       #-1,ENT_PTR(A1)
                BNE.S       CD_FWD3
CD_DWN          TST.L       4(A1)
                BEQ         CD_NEXT
                MOVEA.L     4(A1),A1
                BRA.S       CD_BCK1
CD_FWD3         MOVEA.L     ENT_PTR(A1),A0
CD_LNK2         MOVEA.L     (A0),A2
                MOVE.L      4(A2),D0
                BTST.L      #0,D0
                BNE.S       CD_LNK3
                MOVEA.L     D0,A5
                TST.W       12(A5)
                BGE.S       CD_UPDT
                MOVE.W      4(A5),D0
                CMP.W       8(A5),D0
                BNE.S       CD_UPDT
                MOVEA.L     CD_HEAD,A3
                CMP.W       #DIVTYPE,DTYPE(A3)
                BNE.S       CON_UPDT
                MOVEA.L     8(A1),A4
                CMPA.L      CD_HEAD,A4
                BNE.S       CD_LNK3
                BRA.S       CD_UPDT
CON_UPDT        TST.L       4(A0)
                BNE.S       CD_LNK3
                TST.L       4(A1)
                BEQ.S       CD_UPDT
                MOVEA.L     4(A1),A6
                CMP.W       #TRPTYPE,DTYPE(A6)
                BGE.S       CD_LNK3
CD_UPDT         MOVE.W      (A2),D0
                MOVE.W      2(A2),D1
                CMP.W       N_INTSEC,D0
                BEQ.S       CD_LNK3
                CMP.W       N_INTSEC,D1
                BEQ.S       CD_LNK3
                CMP.W       D1,D0
```

```
                BEQ.S       CD_UP6
                BPL.S       CD_UP3
                MOVE.W      N_INTSEC,(A2)
                BRA.S       CD_LNK3
CD_UP6          MOVE.W      N_INTSEC,(A2)
                TST.W       D1
                BEQ.S       CD_LNK3
CD_UP3          MOVE.W      N_INTSEC,2(A2)
CD_LNK3         TST.L       4(A0)
                BEQ         CD_DWN
                MOVEA.L     4(A0),A0
                BRA         CD_LNK2
CD_NEXT         MOVE.L      CD_IDX,A0
                ADDQ.L      #8,A0
                CMP.L       #ENDREC,A0
                BLT         CD_NREC
                MOVE.L      CD_REC,A0
                MOVEA.L     LINK(A0),A0
                MOVE.L      A0,D0
                BEQ         CD_DEC1
                MOVE.L      A0,CD_REC
                LEA         4,A0
                BRA         CD_NREC

***** process the intersection area for convergence/divergence record
CD_FWD2         MOVE.B      #1,INC_FLG
                MOVEA.L     CD_HEAD,A0
                MOVEA.L     4(A0),A1
                CMP.W       #TRPTYPE,DTYPE(A1)
                BLT.S       CDB_PRC
                TST.L       ENT_PTR(A1)
                BEQ         LOOP_2

***** Process the branches for convergence/divergence record
CDB_PRC         MOVE.B      #0,GOOD_BRH
                MOVEA.L     CD_HEAD,A0
                MOVE.L      A0,CD_REC
                MOVE.W      (A0),CD_CNT
                LEA         SLICE1,A0
NEXT_CD         MOVE.L      A0,CD_IDX
                ADDA.L      CD_REC,A0
                SUBQ.W      #1,CD_CNT
                BLT         NEXT_TB
                MOVEA.L     (A0),A1
                MOVE.L      A1,BRH_HEAD
                CMP.W       #TRPTYPE,DTYPE(A1)
                BLT.S       NEXT_CDP
TB_REC          TST.L       ENT_PTR(A1)
                BEQ         LOOP_2
NEXT_CHK        MOVEA.L     BRH_HEAD,A0
NXT_CHK2        CMP.L       #-1,ENT_PTR(A0)
                BEQ.S       NXT_CHK3
                MOVEA.L     ENT_PTR(A0),A1
NXT_CHK4        MOVEA.L     (A1),A2
                MOVEA.L     4(A2),A2
                MOVE.L      A2,D0
                BTST.L      #0,D0
                BEQ.S       NXT_CHK5
                SUBQ.L      #1,D0
                MOVEA.L     D0,A2
                MOVEA.L     (A2),A2
NXT_CHK5        TST.W       12(A2)
                BGE.S       CDB_1
                MOVEM.W     2(A2),D0-D3
                CMP.W       D1,D3
                BEQ.S       NXT_CHK1
CDB_1           ADDQ.B      #1,GOOD_BRH
NXT_CHK1        TST.L       4(A1)
                BEQ.S       NXT_CHK3
                MOVEA.L     4(A1),A1
                BRA.S       NXT_CHK4
NXT_CHK3        TST.L       4(A0)
                BEQ.S       NEXT_CDP
```

```
              MOVEA.L   4(A0),A0
              CMP.W     #TRPTYPE,DTYPE(A0)
              BGE.S     NXT_CHK2
NEXT_CDP      MOVE.L    CD_IDX,A0
              ADDQ.L    #8,A0
              CMPA.L    #ENDREC,A0
              BMI       NEXT_CD
              MOVE.L    CD_REC,A0
              MOVEA.L   LINK(A0),A0
              MOVE.L    A0,D0
              BEQ.S     NEXT_TB
              MOVE.L    A0,CD_REC
              LEA       4,A0
              BRA       NEXT_CD

***** POST PROCESS
NEXT_TB       CMP.B     #1,GOOD_BRH
              BGT.S     NEXT_TB2
              MOVE.B    #0,INC_FLG
NEXT_TB2      MOVEA.L   CD_HEAD,A1
              MOVE.L    #-1,52(A1)
              CMP.W     #DIVTYPE,DTYPE(A1)
              BEQ       DIVERG

***** POST PROCESS OF CONVERGENCE
***** Check whether we generated a non-horizontal vector at the intersection
***** area in order to decide we need to increment the intersection number
***** or not
              MOVEA.L   4(A1),A1
CON_CHK       CMP.W     #TRPTYPE,DTYPE(A1)
              BLT.S     CON_CLR
              TST.L     ENT_PTR(A1)
              BNE.S     CON_FWD5
              TST.L     4(A1)
              BEQ.S     CON_STR
              BRA.S     CON_CLR
CON_FWD5      CMP.L     #-1,ENT_PTR(A1)
              BNE.S     CON_FWD2
              TST.L     4(A1)
              BEQ.S     CON_STR
              MOVEA.L   4(A1),A1
              BRA.S     CON_CHK
CON_FWD2      MOVEA.L   ENT_PTR(A1),A1
CON_FWD3      MOVEA.L   (A1),A2
              MOVEA.L   4(A2),A2
              TST.W     12(A2)
              BGE.S     CON_STR
              MOVE.W    2(A2),D0-D3
              CMP.W     D1,D3
              BNE.S     CON_STR
              TST.L     4(A1)
              BEQ.S     CON_CLR
              MOVEA.L   4(A1),A1
              BRA.S     CON_FWD3
CON_CLR       MOVE.B    #0,INC_FLG

***** store the pointer of all branches in this convergence area
CON_STR       MOVEA.L   CD_HEAD,A1
              BSR       STBRHPTR
              TST.B     INC_FLG
              BEQ.S     CON_FWD4
              ADDQ.W    #1,N_INTSEC
CON_FWD4      MOVEA.L   8(A1),A0
              CMP.W     #TRPTYPE,DTYPE(A0)
              BGE.S     CON_FWD6
CON_BCK1      MOVEA.L   4(A1),A0
              BRA.S     CHK_USED
CON_FWD6      TST.L     4(A0)
              BEQ       NEXT_DIV
              MOVEA.L   4(A0),A0
CHK_USED      TST.L     52(A0)
              BNE       NEXT_DIV
              BRA       NEXT_CD4
```

```
***** POST PROCESS OF DIVERGENCE
DIVERG  TST.B       INC_FLG
        BEQ.S       DIV_FWD3
        ADDQ.W      #1,N_INTSEC

***** store down pointer of rest of branches except 1st branch in DIV_BUF
DIV_FWD3 MOVE.L     A1,CD_HEAD
         MOVE.L     A1,CD_REC
         MOVE.W     (A1),CD_CNT
         SUBQ.W     #1,CD_CNT
         MOVEA.L    #SLIDWN,A0
DIV_NEXT MOVE.L     A0,CD_IDX
         ADDA.L     CD_REC,A0
         SUBQ.W     #1,CD_CNT
         BLT.S      DIV_1
         MOVEA.L    DIV_PTR,A2
         MOVEA.L    (A0),A1
         CMP.W      #TRPTYPE,DTYPE(A1)
         BGE.S      V_BCK1
         MOVEA.L    -4(A0),A1
         MOVE.L     A1,(A2)+
         BRA.S      DIV_2
V_BCK1   TST.L      4(A1)
         BEQ.S      DIV_FWD1
         MOVEA.L    DIV_PTR,A2
         MOVE.L     4(A1),(A2)+
DIV_2    CMPA.L     #ENDIVBUF,A2
         BNE.S      DIV_FWD2
         LEA        DIV_BUF,A2
DIV_FWD2 MOVE.L     A2,DIV_PTR
DIV_FWD1 MOVE.L     CD_IDX,A0
         ADDQ.L     #8,A0
         CMPA.L     #ENDREC,A0
         BMI        DIV_NEXT
         MOVE.L     CD_REC,A0
         MOVEA.L    LINK(A0),A0
         MOVE.L     A0,D0
         BEQ.S      DIV_1
         MOVE.L     A0,CD_REC
         LEA        2,A0
         BRA.S      DIV_NEXT
DIV_1    MOVEA.L    CD_HEAD,A1
         MOVEA.L    SLIDWN(A1),A1
         TST.L      4(A1)
         BEQ.S      NEXT_DIV
         MOVEA.L    4(A1),A0
         BRA        CHK_USED

***** GRAB NEXT DOWN POINTER FROM DIV_BUF
NEXT_DIV MOVE.L     DIV_USE,A1
         CMPA.L     DIV_PTR,A1
         BEQ.S      NEXT_BRH
         MOVEA.L    (A1)+,A0
         CMPA.L     #ENDIVBUF,A1
         BNE.S      USE_1
         LEA        DIV_BUF,A1
USE_1    MOVE.L     A1,DIV_USE
*        CMP.W      #TRPTYPE,DTYPE(A0)
*        BLT.S      USE_2                divergence or convergence
*        MOVEA.L    A0,A1                blob or trapezoid
*        TST.L      ENT_PTR(A1)          if the data record has been processed,
*        BNE        NEXT_DIV             get another divergence branch
*        BRA        LOOP_2               Otherwise, process it
*USE_2   CMP.W      #DIVTYPE,DTYPE(A0)
*        BEQ        NEXT_CDH             if it is divergence, go ahead
*        MOVEA.L    4(A0),A1             Otherwise, it must be convergence
*        TST.L      ENT_PTR(A1)          have we process this intersection area?
*        BNE        NEXT_DIV             if yes, get next intersection
*        BRA        NEXT_CDH             Otherwise, process it
         TST.L      52(A0)
         BNE.S      NEXT_DIV
         ADDQ.W     #1,N_INTSEC
         BRA        NEXT_CDH
```

```
***** GRAB THE POINTER OF NEXT BRANCH OF THE OBJECT
NEXT_BRH MOVE.L    BRH_IDX,A0
         ADDQ.L    #8,A0
         MOVE.L    A0,BRH_IDX
         CMPA.L    #ENDREC,A0
         BMI       LOOP_1
         MOVE.L    OBJ_HEAD,A0
         MOVEA.L   LINX(A0),A0
         MOVE.L    A0,D0
         BNE       NEXT_HDR

VEC_END  JSR       DESEG2
         TST.B     EPEXT_FL
         BEQ.S     VEC_MV
         TST.B     CHAR_FLG
         BNE.S     VEC_MV
         JSR       OBJEPEXT

************************************************************
* End of object. Move data to global .VECTORS.
************************************************************
VEC_MV   MOVEQ.L   #0,D0
         MOVEQ.L   #0,D1
         MOVEQ.L   #0,D2
         MOVEQ.L   #0,D3

IFEQ      GRAPH
         JSR       CLR_QUME
         ENDC

************************************************************
* Scan LINESEG. Follow pointers to get records from VECSEG.
************************************************************
         MOVEA.L   LINESEG,A1
MV_LOOP  MOVE.W    (A1)+,D0
         BPL.S     MV_LOOP1
         CMP.W     #EOBLK,D0
         BNE       NON_LN
         MOVE.L    (A1),A1
         BRA.S     MV_LOOP

***** Process a LINESEG record.
MV_LOOP1 MOVE.W    (A1)+,D1
         MOVEA.L   (A1)+,A2
         LEA       8(A1),A1
         TST.W     D1
         BLT.S     MV_LOOP
         CLR.B     COUNTER
         MOVE.L    A2,D0
         BTST.L    #0,D0
         BEQ.S     V_FWD3
         SUBQ.L    #1,D0
         MOVEA.L   D0,A2
         MOVEA.L   (A2),A2
V_FWD3   MOVE.L    A2,A3

***** count number of vectors in the entity
VL_LOOP  CMP.W     #1,(A2)
         BNE.S     V_FWD2
         ADDQ.B    #1,COUNTER
         LEA.L     12(A2),A2
         BRA.S     VL_LOOP
V_FWD2   CMP.B     #7,COUNTER
         BGT       V_CURV
         CMP.B     #2,COUNTER
         BLE.S     LINE
         BSR       ARCCHK
         TST.B     D0
         BNE       V_CURV

***** Output a line segment, VECSEG to .VECTORS
LINE     MOVE.W    10(A3),D7
         MOVE.W    4(A3),D0
```

```
            CMP.W       8(A3),D0
            BNE.S       LINE_1
            CMP.W       #1,D7
            BEQ         LINE_3
            CMP.W       MAXWDTH,D7
            BLE.S       LINE_1
***** Filled Polygon
            LOCK        .VCTLOCK
            GETADRS     .VECTORS,#VECTLEN
            UNLOCK      .VCTLOCK
            MOVE.W      #$0204,(A0)+
            MOVE.W      #0,(A0)+
            ASR.W       #1,D7
            MOVE.W      2(A3),(A0)+
            MOVE.W      4(A3),D6
            SUB.W       D7,D6
            MOVE.W      D6,(A0)+
            MOVE.W      2(A3),(A0)+
            ADD.W       4(A3),D7
            MOVE.W      D7,(A0)+
            MOVE.W      6(A3),(A0)+
            MOVE.W      D7,(A0)+
            MOVE.W      6(A3),(A0)+
            MOVE.W      D6,(A0)+
            MOVE.W      #8,D0
            BRA.S       LINE_LP

***** LINE
LINE_1      LOCK        .VCTLOCK
            GETADRS     .VECTORS,#VECTLEN
            UNLOCK      .VCTLOCK
            JSR         LINEWDTH
LINE_2      MOVE.W      #LINERECD,(A0)+
            MOVE.W      D7,(A0)+
            MOVE.W      2(A3),(A0)+
            MOVE.W      4(A3),(A0)+
            MOVE.W      6(A3),(A0)+
            MOVE.W      8(A3),(A0)+
            MOVE.W      #4,D0
LINE_LP     CLR.L       (A0)+
            DBRA        D0,LINE_LP
            IFEQ        GRAPH
            MOVE.W      2(A3),D0
            SUB.W       XMIN,D0
            BGE.S       OUT_1
            CLR.W       D0
OUT_1       MOVE.W      4(A3),D1
            SUB.W       YMIN,D1
            BGE.S       OUT_2
            CLR.W       D1
OUT_2       MOVE.W      6(A3),D2
            SUB.W       XMIN,D2
            BGE.S       OUT_3
            CLR.W       D2
OUT_3       MOVE.W      8(A3),D3
            SUB.W       YMIN,D3
            BGE.S       OUT_4
            CLR.W       D3
OUT_4       JSR         OUTLIN
            ENDC

LINE_3      LEA         10(A3),A3
            CMPA.L      A2,A3
            BNE         LINE
            BRA         MV_LOOP

***** Vectorize a series of lines into an ARC or CIRCLE.
V_CURV      MOVE.W      2(A3),D4
            MOVE.W      4(A3),D5
            MOVE.W      -6(A2),D6
            MOVE.W      -4(A2),D7
            JSR         SQDIST
            CMP.L       #SQMAXDST,D1
```

```
                BGT         ARC
                CMP.B       #MINCIRV,COUNTER
                BLT         ARC

***** Output a CIRCLE.
CIRCLE          MOVEM.W     2(A3),D0-D3
                MOVEM.W     -12(A2),D4-D7
                JSR         INTSEC
                TST.W       D0
                BGT.S       CIR_7
                MOVEM.W     2(A3),D0-D1
                BRA.S       CIR_8
CIR_7           MOVEM.W     D0-D1,2(A3)
                MOVEM.W     D0-D1,-6(A2)
CIR_8           TST.B       ARCRCG_F
                BEQ         LINE
                MOVE.B      COUNTER,D7
                ASR.B       #1,D7
                MOVE.B      D7,COUNTER
C_LOOP1         LEA         12(A3),A2
                SUBQ.B      #1,D7
                BNE.S       C_LOOP1
                MOVE.W      -6(A3),D4
                MOVE.W      -4(A3),D5
                MOVE.B      COUNTER,D7
                ASR.B       #1,D7
C_LOOP2         SUB.L       #12,A3
                SUBQ.B      #1,D7
                BNE.S       C_LOOP2
                MOVE.W      2(A3),D2
                MOVE.W      4(A3),D3
                MOVE.W      10(A3),D7
                SUB.W       XMIN,D0
                BGE.S       CIR_1
                CLR.W       D0
CIR_1           SUB.W       YMIN,D1
                BGE.S       CIR_2
                CLR.W       D1
CIR_2           SUB.W       XMIN,D2
                BGE.S       CIR_3
                CLR.W       D2
CIR_3           SUB.W       YMIN,D3
                BGE.S       CIR_4
                CLR.W       D3
CIR_4           SUB.W       XMIN,D4
                BGE.S       CIR_5
                CLR.W       D4
CIR_5           SUB.W       YMIN,D5
                BGE.S       CIR_6
                CLR.W       D5
CIR_6           JSR         ARCCNT
                TST.W       D0
                BLT         LINE
                MOVE.W      D0,-(A7)
                LOCK        .VCTLOCK
                GETADRS     .VECTORS,#VECTLEN
                UNLOCK      .VCTLOCK
                MOVE.W      (A7)+,D0
                MOVE.W      #CIRCRECD,(A0)+
                JSR         LINEWDTH
                MOVE.W      D7,(A0)+
                ADD.W       XMIN,D0
                MOVE.W      D0,(A0)+
                ADD.W       YMIN,D1
                MOVE.W      D1,(A0)+
                CLR.W       (A0)+
                MOVE.W      D2,(A0)+
                MOVE.W      #4,D3
CIR_LP          CLR.L       (A0)+
                DBRA        D3,CIR_LP
                IFEQ        GRAPH
                SUB.W       XMIN,D0
                BGE.S       OUT_5
                CLR.W       D0
```

```
OUT_5     SUB.W     YMIN,D1
          BGE.S     OUT_6
          CLR.W     D1
OUT_6     JSR       OUTCRL
          ENDC

BRA       MV_LOOP

***** Output an ARC.
ARC       TST.B     ARCRCG_F
          BEQ       LINE
          MOVE.L    A3,-(A7)
          MOVE.B    COUNTER,D0
          ASR.B     #1,D0
A_LOOP    LEA       12(A3),A3
          SUBQ.B    #1,D0
          BNE.S     A_LOOP
          MOVE.W    -2(A3),D0
          MOVE.W    D7,-(A7)
          MOVE.W    D0,D7
          JSR       LINEWDTH
          LOCK      .VCTLOCK
          GETADRS   .VECTORS,#VECTLEN
          UNLOCK    .VCTLOCK
          MOVE.W    #ARCRECD,(A0)+
          MOVE.W    D7,(A0)+
          MOVE.W    D4,(A0)+
          MOVE.W    D5,(A0)+
          MOVE.W    -6(A3),(A0)+
          MOVE.W    -4(A3),(A0)+
          MOVE.W    D6,(A0)+
          MOVE.W    (A7)+,(A0)+
          MOVE.W    #3,D0
ARC_LP    CLR.L     (A0)+
          DBRA      D0,ARC_LP
          MOVEA.L   (A7)+,A3
          IFEQ      GRAPH
ARC_0     MOVE.W    2(A3),D0
          SUB.W     XMIN,D0
          BGE.S     ARC_1
          CLR.W     D0
ARC_1     MOVE.W    4(A3),D1
          SUB.W     YMIN,D1
          BGE.S     ARC_2
          CLR.W     D1
ARC_2     MOVE.W    6(A3),D2
          SUB.W     XMIN,D2
          BGE.S     ARC_3
          CLR.W     D2
ARC_3     MOVE.W    8(A3),D3
          SUB.W     YMIN,D3
          BGE.S     ARC_4
          CLR.W     D3
ARC_4     JSR       OUTDOT
          LEA       12(A3),A3
          CMPA.L    A2,A3
          BNE       ARC_0
          ENDC
          BRA       MV_LOOP

****************************************************************
* Scan the NONLINE file for pointers to VECSEG.
****************************************************************
NON_LN    MOVEA.L   NONLINE,A1
NL_LOOP   MOVE.W    (A1)+,D0
          BPL.S     NL_LOOP1
          CMP.W     #EOBLK,D0
          BNE       INC_JBN
          MOVE.L    (A1),A1
          BRA.S     NL_LOOP

***** Got a record from NONLINE.
NL_LOOP1  MOVE.W    (A1)+,D1
          LOCK      .VCTLOCK
```

```
                GETADRS     VECTORS,#VECTLEN
                UNLOCK      .SYSLOCK
                MOVE.L      ...,...
                MOVE.W      ...,...

***** Got a DOT
                CMP.W       #$022,D2
                BNE.S       POLYGON
DOT             MOVE.W      #DOTRCD,(A0)+
                MOVE.W      6(A2),(A0)+
                MOVE.W      (A2),(A0)+
                MOVE.W      2(A2),(A0)+
                CLR.W       (A0)+
                MOVE.W      4(A2),(A0)+
                MOVE.W      #4,D0
DOT_LP          CLR.L       (A0)+
                DBRA        D0,DOT_LP
                BRA.S       NL_LOOP

***** Output a filled polygon
POLYGON         MOVE.W      D0,(A0)+
                CLR.W       (A0)+
                MOVEA.L     A2,A3
                MOVE.B      #0,COUNTER
PLYG_LP1        TST.W       (A2)
                BLT.S       PLYG_LP2
                MOVE.W      (A2)+,(A0)+
                MOVE.W      (A2)+,(A0)+
                ADDQ.B      #1,COUNTER
                BRA.S       PLYG_LP1
PLYG_LP2        CMP.B       #7,COUNTER
                BEQ.S       PLYG_LP3
                CLR.L       (A0)+
                ADDQ.B      #1,COUNTER
                BRA.S       PLYG_LP2
PLYG_LP3        NOP
                IFEQ        GRAPH
                JSR         DRWPOLY
                ENDC
                BRA         NL_LOOP

***** Object finished.
INC_JBN         RLSLOCL     NONLINE
                RLSLOCL     LINKPTR
                RLSLOCL     BRHPTR
                RLSLOCL     LINESEG
                RLSLOCL     VECSEG
                LOCK        .SYSLOCK
                ADDQ.W      #1,.OBJFIN
                UNLOCK      .SYSLOCK
                .EXIT
END             RTS

***************************************************************************
*   STBRHPTR - STORE ADDRESSES OF BRANCHES IN CONVERGENCE VECTOR
*       INPUT:   A1 -) beginning of convergence record
*       OUTPUT:  If it is a horizontal vector in convergence area, the
*                branch pointers are stored properly
***************************************************************************

STBRHPTR        MOVEM.L     D0/A1-A6,-(A7)
                MOVEA.L     4(A1),A2
                CMP.W       #TRPTYPE,DTYPE(A2)
                BLT         BPTR_RTN
                TST.L       ENT_PTR(A2)
                BEQ         BPTR_RTN
                CMP.L       #-1,ENT_PTR(A2)
                BEQ         BPTR_RTN
                MOVEA.L     ENT_PTR(A2),A2
                MOVEA.L     (A2),A4
                MOVEA.L     4(A4),A5
                MOVE.L      A5,D0
                BTST.L      #0,D0
```

```
            BNE.S      OLD_CONV
            TST.L      12(A5)
            BGE        BPTR_RTN
            MOVE.W     4(A5),D0
            CMP.W      8(A5),D0
            BNE        BPTR_RTN

GETADRS    BRHPTR,#8
            MOVE.L     A5,(A0)
            MOVE.L     #0,4(A0)
            MOVEA.L    A0,A6
            ADDQ.L     #1,A0
            MOVE.L     A0,4(A4)
            MOVE.L     A4,-(A7)
            BRA.S      CONP_BRH

OLD_CONV    MOVE.L     A4,-(A7)
            SUBQ.L     #1,D0
            MOVEA.L    D0,A5
OLD_1       TST.L      4(A5)
            BEQ.S      OLD_2
            MOVEA.L    4(A5),A5
            BRA.S      OLD_1
OLD_2       MOVEA.L    A5,A6

CONP_BRH    MOVE.L     A1,CD_REC
            MOVE.W     (A1),CD_CNT
            LEA        SLICE1,A1
CONP_NXT    MOVE.L     A1,CD_IDX
            ADDA.L     CD_REC,A1
            SUBQ.W     #1,CD_CNT
            BLT        BPTR_CHK
            MOVEA.L    (A1),A2
            CMP.W      #TRPTYPE,DTYPE(A2)
            BLT.S      CONP_1
CONP_5      CMP.L      #-1,ENT_PTR(A2)
            BEQ.S      CONP_2
            MOVEA.L    ENT_PTR(A2),A3
CONP_4      MOVEA.L    (A3),A4
            MOVEA.L    4(A4),A5
            MOVE.L     A5,D0
            BTST.L     #0,D0
            BNE.S      CONP_3
            TST.W      12(A5)
            BGE.S      PUT_PTR
            MOVE.W     4(A5),D0
            CMP.W      8(A5),D0
            BEQ.S      CONP_3
PUT_PTR     GETADRS    BRHPTR,#8
            MOVE.L     A0,4(A6)
            MOVE.L     A4,(A0)
            MOVE.L     #0,4(A0)
            MOVEA.L    A0,A6
CONP_3      TST.L      4(A3)
            BEQ.S      CONP_2
            MOVEA.L    4(A3),A3
            BRA.S      CONP_4
CONP_2      TST.L      4(A2)
            BEQ.S      CONP_1
            MOVEA.L    4(A2),A2
            CMP.W      #TRPTYPE,DTYPE(A2)
            BGE.S      CONP_5
CONP_1      MOVE.L     CD_IDX,A1
            ADDQ.L     #8,A1
            CMPA.L     #ENDREC,A1
            BMI        CONP_NXT
            MOVE.L     CD_REC,A1
            MOVEA.L    LINK(A1),A1
            MOVE.L     A1,D0
            BEQ.S      BPTR_CHK
            MOVE.L     A1,CD_REC
            LEA        4,A1
            BRA        CONP_NXT
```

```
BPTR_CHK  MOVE.L    (A7)+,A4
          MOVE.L    4(A4),A5
          SUBQ.L    #1,A5
          TST.L     4(A5)
          BNE.S     BPTR_RTN
          MOVE.L    (A5),4(A4)
BPTR_RTN  MOVEM.L   (A7)+,D0/A1-A6
          RTS

**********************************************************************
*     ARCCHK - ARC CHECKING                                           *
*         INPUT:   A3 points to the beginning of entity vector database *
*                  A2 points to the end of entity vector database     *
*         OUTPUT:  D0.W = 1 if these vectors are an arc.  Otherwise, D0.W = 0 *
**********************************************************************

XREF      COSINX,CARCCHK,SQDIST

COS105    EQU       -2
COS135    EQU       -7
COS180    EQU       -10

ARCCHK    MOVEM.L   D1-D7/A0-A6,-(A7)
          MOVEA.L   A3,A0
          JSR       CARCCHK
          TST.B     CARC_FLG
          BEQ.S     NON_ARC

**** check the angle of three points which are going to represent
**** the arc
          MOVEM.W   2(A3),D3-D4
          MOVEM.W   -6(A2),D5-D6
          MOVE.L    A3,-(A7)
          MOVE.B    COUNTER,D0
          ASR.B     #1,D0
ARCK_LP   LEA       12(A3),A3
          SUBQ.B    #1,D0
          BNE.S     ARCK_LP
          MOVEM.W   -6(A3),D1-D2
          MOVEA.L   (A7)+,A3
          JSR       COSINX
          CMP.W     #COS135,D0
          BGT.S     NON_ARC

**** compare the length of the two vectors which are formed by the
**** three points
          MOVE.W    D6,D0
          MOVEM.W   D1-D2,-(A7)
          MOVEM.W   (A7)+,D6-D7
          MOVE.W    D4,D2
          MOVE.W    D5,D4
          MOVE.W    D0,D5
          JSR       SQDIST
          MOVE.L    D1,D0
          MOVE.W    D3,D4
          MOVE.W    D2,D5
          JSR       SQDIST
          CMP.L     D1,D0
          BLT.S     ARC_FWD2
          TDIVU.L   D1,D0
          BRA.S     ARC_FWD3
ARC_FWD2  TDIVU.L   D0,D1
          MOVE.L    D1,D0
ARC_FWD3  CMP.L     #1,D0
          BEQ.S     ARC_FWD1
NON_ARC   MOVE.W    #0,D0
          BRA.S     ARC_RTN
ARC_FWD1  MOVE.W    #1,D0
ARC_RTN   MOVEM.L   (A7)+,D1-D7/A0-A6
          RTS
```

DATA CLUSTER Fig. 1B

```
************************************************************************
*    PTSCLT - FRONT AND REAR EDGES POINTS COLLECTOR                     *
*         INPUT:   REC_HEAD contains the address of the present trapezoid or *
*                  blob record                                          *
*                  TB_HEAD contains the starting address of a branch    *
*                  INDEX contains the address of the slice or trapezoid needs *
*                  to be processed                                      *
*         OUTPUT:  A2 contains the number of points collected which are stored *
*                  in FRNT_X, FRNT_Y, REAR_X, REAR_Y                    *
*                  The content of REC_HEAD, INDEX, TB_HEAD have been updated *
*                  H_SHAPE will be greater than zero if the output section is *
*                  horizontal shape. Otherwise, it will be zero         *
************************************************************************

XDEF      PTSCLT

DTYPE        SET       2
MINJPB       SET       18
TRPTYPE      SET       3
MAXPNTS      SET       500

PTSCLT       CLR.W     N_PNTS
             CLR.L     WDTHSUM
             MOVE.L    TB_HEAD,TB_PHEAD
             MOVEA.L   REC_HEAD,A4
             CMP.W     #TRPTYPE,DTYPE(A4)
             BGT.S     PT_BLOB
PT_TRAP      BSR       PTSTR
             BRA.S     CON_CHK
PT_BLOB      BSR       PTSBL
CON_CHK      MOVEA.L   TB_HEAD,A0
             CMPA.L    #0,A0
             BEQ.S     PTS_RTN
             CMP.W     #TRPTYPE,DTYPE(A0)
             BLT.S     PTS_RTN
             MOVEA.L   TB_PHEAD,A1
             MOVE.W    DTYPE(A1),D0
             CMP.W     DTYPE(A0),D0
             BEQ.S     PTS_RTN
***** IS BUFFER FULL?
             MOVE.W    N_PNTS,D0
             CMP.W     #MAXPNTS-1,D0
             BGE.S     PTS_RTN
             TST.B     BRK_FL
             BNE.S     PTS_RTN
             CMP.W     #TRPTYPE,DTYPE(A0)
             BGT.S     BLOB_REC
             MOVE.W    20(A0),D0
             MOVE.W    24(A0),D1
             SUB.W     D0,D1
             ADDQ.W    #1,D1
             BRA.S     PTS_CMP
BLOB_REC     MOVE.W    22(A0),D1
PTS_CMP      MOVE.W    LASTLEN,D2
             CMP.W     D1,D2
             BGE.S     D2D1
D1D2         MULU.W    #10,D1
             DIVU.W    D2,D1
             MOVE.W    D1,D3
             BRA.S     PTS_CON
D2D1         MULU.W    #10,D2
             DIVU.W    D1,D2
             MOVE.W    D2,D3
PTS_CON      CMP.W     #MINJPB,D3
             BGE.S     PTS_RTN
             MOVE.L    A0,TB_PHEAD
             CMP.W     #TRPTYPE,DTYPE(A0)
             BEQ       PT_TRAP
             BRA       PT_BLOB
PTS_RTN      RTS
```

```
****************************************************************************
*    PTSTR - FRONT AND REAR EDGES POINTS COLLECTOR                          *
*        INPUT: REC_HEAD contains the address of the present trapezoid or   *
*               blob record                                                 *
*               TB_HEAD contains the starting address of a branch           *
*               INDEX contains the address of the slice or trapezoid needs  *
*               to be processed                                             *
*        OUTPUT: A2 contains the number of points collected which are stored*
*                in FRNT_X, FRNT_Y, REAR_X, REAR_Y                          *
*                The content of REC_HEAD, INDEX, TB_HEAD have been updated  *
*                H_SHAPE will be greater than zero if the output section is *
*                horizontal shape. Otherwise, it will be zero               *
****************************************************************************

ENDREC   SET      32
ENT_PTR  SET      16
SLICE1   SET      20
MINJPT   SET      23
DWN_PTR  SET      4

PTSTR    MOVEA.L  REC_HEAD,A4
         MOVEA.W  INDEX,A3
         MOVE.W   N_PNTS,D7
         ASL.W    #1,D7
         MOVEA.W  D7,A2
         MOVE.L   WDTHSUM,D7
         LEA      FRNT_X,A0
         LEA      PNT_Y,A1
         LEA      REAR_X,A5
         CLR.B    LOOP_FL
         CLR.B    BRK_FL
TRAPZD   CMP.W    #ENDREC,A3
         BLT.S    TR_FWD9
         TST.L    8(A4,A3.W)
         BEQ      TRNX_REC
TR_FWD9  MOVE.L   A2,D0
         ASR.L    #1,D0
         CMP.L    #MAXPNTS-1,D0
         BGE      TR_RTN
         MOVEM.W  (A4,A3.W),D0-D3
         TST.B    LOOP_FL
         BNE.S    TR_FWD8
         MOVE.W   D0,(A0,A2.W)
         MOVE.W   D1,(A1,A2.W)
         MOVE.W   D2,(A5,A2.W)
         ADDQ.W   #2,A2
TR_FWD8  SUB.W    D0,D2
         ADDQ.W   #1,D2
         TST.B    LOOP_FL
         BNE.S    TR_FWD7
         EXT.L    D2
         ADD.L    D2,D7
TR_FWD7  CMP.W    #ENDREC,A3
         BGE.S    TR_FWD5
         ADDQ.W   #8,A3
         BRA.S    TR_FWD6
TR_FWD5  MOVEA.L  8(A4,A3.W),A4
         MOVEA.L  #4,A3
TR_FWD6  MOVEM.W  (A4,A3.W),D3-D6
         MOVE.W   D3,(A0,A2.W)
         MOVE.W   D4,(A1,A2.W)
         MOVE.W   D5,(A5,A2.W)
         ADDQ.W   #2,A2
         SUB.W    D3,D5
         ADDQ.W   #1,D5
         MOVE.W   D5,LASTLEN
         EXT.L    D5
         ADD.L    D5,D7
         MOVE.W   D5,D4
         CMP.W    D2,D5
         BGE.S    D2D5
D2D5     MULU.W   #10,D2
         DIVU.W   D5,D2
```

```
               MOVE.W      D2,D1
               BRA.S       TR_FWD1
DSD2           MULU.W      #10,D5
               DIVU.W      D2,D5
               MOVE.W      D5,D1
TR_FWD1        CMP.W       #MINJPT,D1
               BGE         CHK_NXT
               TST.L       8(A4,A3.W)
               BEQ.S       TRNX_REC
               CMP.W       #ENDREC,A3
               BGE.S       TR_FWD3
               MOVEM.W     8(A4,A3.W),D0-D3
               BRA.S       TR_FWD4
TR_FWD3        MOVEM.L     A0-A1,-(A7)
               MOVEA.L     8(A4,A3.W),A0
               MOVEA.W     #4,A1
               MOVEM.W     (A0,A1),D0-D3
               MOVEM.L     (A7)+,A0-A1
TR_FWD4        SUB.W       D0,D2
               ADDQ.W      #1,D2
               CMP.W       D4,D2
               BGE.S       TR_D2D4
TR_D4D2        MULU.W      #10,D4
               DIVU.W      D2,D4
               MOVE.W      D4,D1
               BRA.S       TR_FWD2
TR_D2D4        MULU.W      #10,D2
               DIVU.W      D4,D2
               MOVE.W      D2,D1
TR_FWD2        CMP.W       #MINJPT,D1
               BGE.S       TR_RTN
               MOVE.B      #-1,LOOP_FL
               BRA         TRAPZD
SET_BRK        MOVE.B      #1,BRK_FL
TRNX_REC       MOVEA.L     TB_HEAD,A4
               TST.L       ENT_PTR(A4)
               BNE.S       TR_FWDA
               MOVE.L      #-1,ENT_PTR(A4)
TR_FWDA        MOVEA.L     DWN_PTR(A4),A4
               MOVE.L      A4,TB_HEAD
               MOVEA.W     #SLICE1,A3
               BRA.S       TR_RTN
CHK_NXT        TST.L       8(A4,A3.W)
               BEQ.S       SET_BRK
TR_RTN         MOVE.W      -2(A1,A2.W),D5
               ADDQ.W      #1,D5
               MOVE.W      D5,Y
               SUB.W       (A1),D5
               MOVE.L      A4,REC_HEAD
               MOVE.W      A3,INDEX
               MOVE.W      A2,D6
               ASR.W       #1,D6
               MOVEA.W     D6,A2
               MOVE.L      D7,WDTHSUM
               DIVU.W      D6,D7
               ANDI.L      #$FFFF,D7
               MULU.W      #10,D7
               DIVU.W      D5,D7
               MOVE.W      D7,H_SHAPE
               MOVE.W      D5,N_SLCS
               MOVE.W      A2,N_PNTS
               RTS
```

```
*****************************************************************************
*     PTSBL - FRONT AND REAR EDGES POINTS COLLECTOR                          *
*          INPUT:  REC_HEAD contains the address of the present blob record  *
*                  TB_HEAD contains the starting address of a branch         *
*                  INDEX contains the address of the slice needs to be processed *
*                  Y contains the value of y of the present slice            *
*          OUTPUT: A2 contains the number of points collected which are stored *
*                  in FRNT_X, PNT_Y, REAR_X .                                *
*                  The content of REC_HEAD, INDEX, TB_HEAD and Y have been   *
*                  updated                                                   *
*                  H_SHAPE will be greater than zero if the output section is *
*                  horizontal shape. Otherwise, it will be zero              *
*****************************************************************************

ENT_PTR   SET       16
LINK      SET       60
SLICE1    SET       20
STAREC    SET       4
MINJPB    SET       18
DWN_PTR   SET       4

PTSBL     MOVEA.L   REC_HEAD,A4
          MOVEA.W   INDEX,A3
          MOVE.W    N_PNTS,D7
          ASL.W     #1,D7
          MOVEA.W   D7,A2
          MOVE.L    WDTHSUM,D7
          MOVE.W    Y,D0
          LEA       FRNT_X,A0
          LEA       PNT_Y,A1
          LEA       REAR_X,A5
PTSLOOP   MOVE.L    A2,D1
          ASR.L     #1,D1
          CMP.L     #MAXPNTS,D1
          BEQ       RETURN
          MOVEM.W   (A4,A3.W),D1/D2
          MOVE.W    D2,LASTLEN
          MOVE.W    D1,(A0,A2.W)
          MOVE.W    D0,(A1,A2.W)
          ADD.W     D2,D1
          SUBQ.W    #1,D1
          MOVE.W    D1,(A5,A2.W)
          EXT.L     D2
          ADD.L     D2,D7
          ADDQ.W    #2,A2
          ADDQ.W    #1,D0
          ADDQ.W    #4,A3
          CMPA.W    #LINK,A3
          BMI.S     NEXT
          MOVEA.L   (A4,A3.W),A4
          CMPA.L    #0,A4
          BEQ.S     NEXT_REC
          MOVEA.L   #STAREC,A3
NEXT      TST.L     (A4,A3.W)
          BNE.S     MORE
NEXT_REC  MOVEA.L   TB_HEAD,A4
          TST.L     ENT_PTR(A4)
          BNE.S     PT_FWD1
          MOVE.L    #-1,ENT_PTR(A4)
PT_FWD1   MOVEA.L   DWN_PTR(A4),A4
          MOVE.L    A4,TB_HEAD
          MOVEA.W   #SLICE1,A3
          BRA.S     RETURN
MORE      MOVEM.W   (A4,A3.W),D3/D4
          TST.B     UP_TYPE
          BRA.S     P_CMP
          MOVE.L    A2,D6
          ASR.L     #1,D6
          MOVE.L    D7,D2
          DIVU.W    D6,D2
P_CMP     CMP.W     D2,D4
          BGE.S     D4D2
```

```
D2D4      CMP.W     MINWDTH,D2
          BLT       PTSLOOP
          MULU.W    #10,D2
          DIVU.W    D4,D2
          MOVE.W    D2,D5
          BRA.S     CONTINUE
D4D2      CMP.W     MINWDTH,D4
          BLT       PTSLOOP
          MULU.W    #10,D4
          DIVU.W    D2,D4
          MOVE.W    D4,D5
CONTINUE  CMP.W     #MINJPB,D5
          BLT       PTSLOOP
*         MOVE.L    A2,D6
*         ASR.L     #1,D6
*         CMP.W     MINWDTH,D6
*         BLT.L     PTSLOOP
RETURN    MOVE.L    A4,REC_HEAD
          MOVE.W    A3,INDEX
          MOVE.W    D0,Y
          MOVE.L    A2,D6
          ASR.L     #1,D6
          MOVEA.L   D6,A2
          MOVE.L    D7,WDTHSUM
          DIVU.W    D6,D7
          ANDI.L    #$FFFF,D7
          MULU.W    #10,D7
          SUB.W     (A1),D0
          DIVU.W    D0,D7
          MOVE.W    D7,H_SHAPE
          MOVE.W    D0,N_SLCS
          MOVE.W    A2,N_PNTS
          RTS
```

SHAPE RECOGNITION Fig. 2

```
************************************************************************
*    SHAPRCG - SHAPE RECOGNITION                                        *
*       INPUT:   N_PNTS contains the number of points in the buffer     *
*       OUTPUT:  vectors after desegmentation                           *
************************************************************************

FRAMESZ   SET       -2*VECTORS

OFFSET    FRAMESZ

SEQUENCE  SET       *
          DS.W      VECTORS

XDEF      SHAPRCG
          XREF      RELPOS,COSINX,SQDIST,PROJECT

MAXDIFF   SET       9
SQMIN     SET       1600

SECTION   0

SHAPRCG   MOVEA.W   N_PNTS,A2
          LEA       FRNT_TMP,A0
          LEA       FRNT_X,A5
          LEA       PNT_Y,A6
          BSR       VECTIZ
          LEA       REAR_TMP,A0
          LEA       REAR_X,A5
          LEA       PNT_Y,A6
          BSR       VECTIZ
          LEA       FRNT_TMP,A0
          CLR.B     COUNTER
SH_1      TST.W     (A0)
          BLT.S     SH_2
          ADDQ.B    #1,COUNTER
          ADDQ.L    #8,A0
          BRA.S     SH_1
```

```
SH_2        TST.B       COUNTER
            BEQ         SH_RTS
            MOVE.B      COUNTER,D0
            LEA         REAR_TMP,A0
            CLR.B       COUNTER
SH_3        TST.W       (A0)
            BLT.S       SH_4
            ADDQ.B      #1,COUNTER
            ADDQ.L      #8,A0
            BRA.S       SH_3
SH_4        TST.B       COUNTER
            BEQ         SH_RTS
            CMP.B       #1,COUNTER
            BEQ         SENDAT
            CMP.B       #1,D0
            BEQ         SENDAT
            CMP.B       #8,COUNTER
            BCC.S       CNT_VTZ
            CMP.B       #8,D0
            BCC.S       CNT_VTZ
            CMP.B       #2,COUNTER
            BNE.S       WDTH_CHK
            CMP.B       #2,D0
            BNE.S       WDTH_CHK
            LEA         REAR_TMP,A1
            LEA         FRNT_TMP,A2
            BSR         SINX
            CMP.W       #SIN15,D0
            BGE         SENDAT
WDTH_CHK    BSR         WDTHCHK
            TST.B       LINE_FL
            BNE.S       CNT_VTZ
            LEA         FRNT_TMP,A0
            LEA         FRNT_VEC,A1
PLYGN_1     MOVE.W      (A0)+,(A1)+
            BGE.S       PLYGN_1
            LEA         REAR_TMP,A0
            LEA         REAR_VEC,A1
PLYGN_2     MOVE.W      (A0)+,(A1)+
            BGE.S       PLYGN_2
            JSR         NOPARVEC
            JSR         DESEG
            BRA         SH_RTS

***** center points vectorization
CNT_VTZ     BSR         CENTER

LINK        A2,#FRAMESZ

LEA         SEQUENCE(A2),A0
            MOVE.W      N_PNTS,A4
            LEA         CNT_X,A5
            LEA         CNT_Y,A6
            BSR         PRTITION

LEA         FRNT_VEC,A0
            LEA         SEQUENCE(A2),A1
            BSR         GENVEC

LEA         SEQUENCE(A2),A0
            LEA         SEQUENCE(A2),A1
            LEA         FRNT_VEC,A3
            LEA         FRNT_X,A4
            LEA         REAR_X,A5
            BSR         GENWIDTH

LEA         SEQUENCE(A2),A1
            MOVEQ       #0,D0
            MOVEQ       #0,D1
            MOVEQ       #0,D2
AVE_1       ADDQ.W      #1,D0
            MOVE.W      (A1)+,D2
            ADD.L       D2,D1
```

```
              TST.W       (A1)
              BGE.S       AVE_1
              DIVS.W      D0,D1

UNLK        A2

MOVE.W      D1,A5
              CMP.W       MAXWDTH,D1
              BLE.S       SH_3VEC

***** FILLED POLYGON
              ASR.W       #1,D1
SH_PLY2       LEA         FRNT_VEC,A6
              LEA         BUFFER,A2
              MOVE.W      #$204,(A2)+
              MOVE.W      (A6),D2
              SUB.W       D1,D2
              MOVE.W      D2,(A2)+
              MOVE.W      2(A6),(A2)+
              MOVE.W      4(A6),D2
              SUB.W       D1,D2
              MOVE.W      D2,(A2)+
              MOVE.W      6(A6),(A2)+
              MOVE.W      4(A6),D2
              ADD.W       D1,D2
              MOVE.W      D2,(A2)+
              MOVE.W      6(A6),(A2)+
              MOVE.W      (A6),D2
              ADD.W       D1,D2
              MOVE.W      D2,(A2)+
              MOVE.W      2(A6),(A2)+
              MOVE.W      #-1,(A2)
              LEA         8(A6),A1
SH_PLY1       MOVE.W      (A1)+,(A6)+
              BGE.S       SH_PLY1
              MOVE.W      D1,-(A7)
              JSR         DESEG
              MOVE.W      (A7)+,D1
              TST.W       FRNT_VEC
              BGE         SH_PLY2
              BRA         SH_RTS

**** ANALYZATION
SH_3VEC       LEA         FRNT_VEC,A6
              MOVEA.W     #0,A4
              MOVEA.L     A6,A0
              ADDQ.L      #8,A0
              MOVEM.W     -8(A0),D3-D4
              MOVEM.W     (A0),D1-D2
              MOVEM.W     4(A0),D5-D6
              JSR         RELPOS
**** angle checking
SH_LOOP       MOVEA.L     D0,A1
              JSR         COSINX
              CMP.W       #COS115,D0
              BGE.S       BREAK
**** length ratio checking
              MOVEM.W     -8(A0),D4-D7
              JSR         SQDIST
              MOVE.L      D1,D0
              MOVEM.W     (A0),D4-D7
              JSR         SQDIST
              CMP.L       #SQMIN,D0
              BLT.S       SH_FWD4
              CMP.L       #SQMIN,D1
              BLT.S       SH_FWD4
              CMP.L       D1,D0
              BGE.S       SH_D0D1
              TDIVU.L     D0,D1
              MOVE.L      D1,D2
              BRA.S       SH_FWD3
SH_D0D1       TDIVU.L     D1,D0
              MOVE.L      D0,D2
```

```
SH_FWD3    CMP.L      #MAXDIFF,D2
           BGE.S      BREAK
**** convexity checking
SH_FWD4    ADDQ.L     #8,A0
           TST.W      (A0)
           BLT.S      BREAK
           MOVEM.W    -8(A0),D3-D4
           MOVEM.W    (A0),D1-D2
           MOVEM.W    4(A0),D5-D6
           JSR        RELPOS
           MOVE.L     A1,D7
           EOR.L      D0,D7
           BGE        SH_LOOP
           MOVEA.L    A6,A2
           ADD.L      #16,A2
           CMPA.L     A0,A2
           BNE.S      BREAK
           SUB.L      #8,A0
**** data transfer when break
BREAK      MOVE.B     #0,LINE_FL
           MOVEA.L    A6,A1
           LEA        8(A1),A1
           CMPA.L     A1,A0
           BEQ.S      BRK_SET
           MOVEA.L    A6,A1
           MOVE.W     (A1)+,D4
           MOVE.W     (A1)+,D5
           MOVEM.W    -4(A0),D6-D7
           JSR        DISTANCE
           MOVEM.W    D4-D7,-(A7)
           MOVEM.W    (A7)+,D3-D6
           MOVE.W     D1,D7
BREAK_CK   MOVE.W     (A1)+,D1
           MOVE.W     (A1)+,D2
           JSR        RELPOS
           JSR        ABS
           DIVU.W     D7,D0
           CMP.W      #10,D0
           BGT.S      BREAK_0
           CMPA.L     A1,A0
           BNE.S      BREAK_CK
BRK_SET    MOVE.B     #1,LINE_FL
BREAK_0    MOVEA.L    A6,A1
           MOVEA.L    BUF_PTR,A2
BREAK_1    MOVE.W     #1,(A2)+
           MOVE.W     (A1)+,(A2)+
           MOVE.W     (A1)+,(A2)+
           MOVE.W     (A1)+,(A2)+
           MOVE.W     (A1)+,(A2)+
           MOVE.W     A5,(A2)+
           CMPA.L     A1,A0
           BNE.S      BREAK_1
           MOVE.W     #-1,(A2)
BREAK_2    MOVE.W     (A1)+,(A6)+
           BGE.S      BREAK_2
           MOVE.W     A5,-(A7)
           JSR        DESEG
           MOVE.W     (A7)+,A5
           TST.W      FRNT_VEC
           BGE        SH_3VEC
           BRA.S      SH_RTS

**** complete data transfer
SENDAT     LEA        FRNT_TMP,A0
           LEA        FRNT_VEC,A1
SE_BCK1    MOVE.W     (A0)+,(A1)+
           BGE.S      SE_BCK1
           LEA        REAR_TMP,A0
           LEA        REAR_VEC,A1
SE_BCK2    MOVE.W     (A0)+,(A1)+
           BGE.S      SE_BCK2

**** data analyzer
           BSR        VECDSG
SH_RTS     RTS
```

```
************************************************************************
*    ANALYZ - ANALYZE THE SHAPE OF INPUT IMAGE                          *
*        INPUT:   FRNT_VEC, REAR_VEC contain the vectors of front edge  *
*                 and rear edge                                         *
*        OUTPUT:  shape code for jumping to the proper subroutine to    *
*                 generate correct vector(s)                            *
************************************************************************

SIN15     EQU       2
COS115    EQU       -4
MAXDIFF   SET       9

ANALYZ    CLR.L     D2
          MOVE.L    D2,-(A7)
          CLR.L     D0
          MOVEA.W   #0,A5
          LEA       FRNT_VEC,A0
**** find the longest vector in the edge
ANA_LOOP  MOVEM.W   (A0)+,D4-D7
          JSR       SQDIST
          MOVE.L    D1,-(A7)
          CMP.L     D1,D2
          BPL.S     ANA_NEXT
          MOVE.L    D1,D2
          MOVEA.W   D4,A1
          MOVEA.W   D5,A2
          MOVEA.W   D6,A3
          MOVEA.W   D7,A4
ANA_NEXT  TST.W     (A0)
          BGE.S     ANA_LOOP
          CLR.W     D4
**** are there vectors having similar length
ANA_RAT   CLR.L     D3
          MOVE.L    D2,D3
          TDIVU.L   (A7)+,D3
          CMPI.L    #MAXDIFF,D3
          BGT.S     BIG_DIF
          ADDQ.W    #1,D4
BIG_DIF   TST.L     (A7)
          BNE.S     ANA_RAT
          CMPI.W    #2,D4
          BLT.S     ANA_FWD
          ADDQ.W    #1,D0
ANA_FWD   CMPA.W    #0,A5
          BMI.S     ANA_DONE
          MOVEM.W   A1-A4,LF_VEC
          CLR.L     D2
          LEA       REAR_VEC,A0
          MOVEA.W   #-1,A5
          BRA.S     ANA_LOOP
ANA_DONE  MOVEM.W   A1-A4,LR_VEC
          ADDQ.L    #4,A7
**** possible arc
          CMP.W     #1,D0
          BGE       ANA_CUR
**** line, filled polygon

**** check if it is thin line
          MOVEM.W   LR_VEC,D3-D6
          MOVEM.W   LF_VEC,D1-D2
          JSR       RELPOS
          MOVE.L    D0,-(A7)
          MOVEM.W   LF_VEC+4,D1-D2
          JSR       RELPOS
          MOVE.L    (A7)+,D7
          TST.L     D7
          BNE.S     ANA_FWD1
          MOVEQ.L   #1,D7
ANA_FWD1  TST.L     D0
          BNE.S     ANA_ANG
          CMP.L     #1,D7
          BEQ       THINLN
```

```
**** angle checking
ANA_ANG   LEA       LR_VEC,A1
          LEA       LF_VEC,A2
          BSR       SINX
          CMP.W     #SIN15,D0
          BGE.S     NOPARALL
**** vertical and diagonal vectors
PARALL    MOVE.W    LR_VEC+4,D2
          SUB.W     LR_VEC,D2
          BGE.S     PARL_1
          NEG.W     D2
PARL_1    CMP.W     #5,D2
          BLE.S     V_VEC
          MOVE.W    LF_VEC+4,D2
          SUB.W     LF_VEC,D2
          BGE.S     PARL_2
          NEG.W     D2
PARL_2    CMP.W     #5,D2
          BLE.S     V_VEC
          MOVE.L    #2,D0
          RTS
V_VEC     MOVE.L    #1,D0
          RTS
**** horizontal line and filled polygon
NOPARALL  MOVEM.W   LF_VEC,D4/D5
          MOVEM.W   LR_VEC,D6/D7
          CMP.W     D5,D7
          BNE       NP_1
          JSR       DISTANCE
          MOVE.W    D1,D0
          MOVEM.W   LF_VEC+4,D4/D5
          MOVEM.W   LR_VEC+4,D6/D7
          CMP.W     D5,D7
          BNE.S     NP_1
          JSR       DISTANCE
          CMP.W     D1,D0
          BLE.S     NP_2
          MOVE.W    D1,D2
          BRA.S     NP_3
NP_2      MOVE.W    D0,D2
NP_3      ADD.W     D1,D0
          ASR.W     #1,D0
          MOVE.W    LF_VEC+6,D1
          SUB.W     LF_VEC+2,D1
          ADDQ.W    #1,D1
NP_4      MULU.W    #10,D0
          DIVU.W    D1,D0
          MOVE.W    D0,H_SHAPE
          CMPI.W    #25,H_SHAPE
          BLT.S     NP_1
          MOVE.W    LF_VEC,D0
          SUB.W     LF_VEC+4,D0
          BGE.S     NP_5
          NEG.W     D0
NP_5      CMP.W     #4,D0
          BLE.S     NP_1
          MOVE.W    LR_VEC,D0
          SUB.W     LR_VEC+4,D0
          BGE.S     NP_6
          NEG.W     D0
NP_6      CMP.W     #4,D0
          BLE.S     NP_1
V_HORZ    MOVE.B    #8,D0
          RTS
NP_1      MOVE.B    #3,D0
          RTS

**** curve, intersection blob, filled dot and filled polygon
ANA_CUR   CMPI.W    #10,H_SHAPE
          BLT       ANA_CUR4
          CMPI.W    #30,H_SHAPE
          BGE       V_HORZ
          CMP.W     #1,D0
```

```
             BGT        ANA_CUR1
             CMPI.W     #20,H_SHAPE
             BGE.S      NP_1
**** curve and filled polygon
CFP          MOVEM.W    FRNT_VEC,D4/D5
             MOVEM.W    REAR_VEC,D6/D7
             JSR        SQDIST
             MOVE.L     D1,D0
             LEA        FRNT_VEC,A0
CFP_1        ADDQ.L     #8,A0
             TST.W      (A0)
             BGE.S      CFP_1
             MOVEM.W    -4(A0),D4/D5
             LEA        REAR_VEC,A0
CFP_2        ADDQ.L     #8,A0
             TST.W      (A0)
             BGE.S      CFP_2
             MOVEM.W    -4(A0),D6/D7
             JSR        SQDIST
             CMP.L      D1,D0
             BLT.S      CFP_3
             TDIVU.L    D1,D0
             BRA.S      CFP_4
CFP_3        TDIVU.L    D0,D1
             MOVE.L     D1,D0
CFP_4        CMP.L      #1,D0
             BNE        NP_1
             MOVEA.W    #0,A1
             LEA        FRNT_VEC,A0
ANA_CUR3     ADDQ.L     #8,A0
             TST.W      (A0)
             BLT.S      ANA_CUR2
             MOVEM.W    (A0),D1-D2
             MOVEM.W    -8(A0),D3-D4
             MOVEM.W    4(A0),D5-D6
             JSR        COSINX
             CMP.W      #COS115,D0
             BGE        NP_1
             BRA.S      ANA_CUR3
ANA_CUR2     CMPA.W     #0,A1
             BNE        V_CUR
             MOVEA.W    #-1,A1
             LEA        REAR_VEC,A0
             BRA        ANA_CUR3

ANA_CUR4     CMP.W      #1,D0
             BGT        V_CUR

**** curve, filled polygon, and vertical or diagonal vector
             LEA        FRNT_VEC,A0
             TST.W      8(A0)
             BLT.S      FRNT_B
REAR_B       LEA        REAR_VEC,A1
             LEA        FRNT_VEC,A2
             BSR        SINX
             CMP.W      #SIN15,D0
             BGE.S      ANA_CUR5
             MOVEM.W    FRNT_VEC,D0-D3
             MOVEM.W    D0-D3,LF_VEC
             BRA        PARALL
ANA_CUR5     LEA        FRNT_VEC+8,A2
             BSR        SINX
             CMP.W      #SIN15,D0
             BGE        CFP
             MOVEM.W    FRNT_VEC+8,D0-D3
             MOVEM.W    D0-D3,LF_VEC
             BRA        PARALL
FRNT_B       LEA        REAR_VEC,A1
             LEA        FRNT_VEC,A2
             BSR        SINX
             CMP.W      #SIN15,D0
             BGE.S      ANA_CUR6
             MOVEM.W    REAR_VEC,D0-D3
```

```
            MOVEM.W     D0-D3,LR_VEC
            BRA         PARALL
ANA_CUR6    LEA         REAR_VEC+8,A1
            BSR         SINX
            CMP.W       #SIN15,D0
            BGE         CFP
            MOVEM.W     REAR_VEC+8,D0-D3
            MOVEM.W     D0-D3,LR_VEC
            BRA         PARALL

**** curve, intersection blob, filled dot, and horizontal line
ANA_CUR1    MOVEM.W     FRNT_VEC,D3-D4
            MOVEM.W     FRNT_VEC+4,D1-D2
            MOVEM.W     FRNT_VEC+12,D5-D6
            JSR         RELPOS
            MOVE.L      D0,-(A7)
            MOVEM.W     REAR_VEC,D3-D4
            MOVEM.W     REAR_VEC+4,D1-D2
            MOVEM.W     REAR_VEC+12,D5-D6
            JSR         RELPOS
            EOR.L       D0,(A7)+
            BGE.S       V_CUR
            TST.L       D0
            BGT.S       NP_BLOB
            MOVEM.W     FRNT_VEC,D4-D5
            MOVEM.W     REAR_VEC,D6-D7
            JSR         SQDIST
            MOVE.L      D1,D2
            MOVEM.W     FRNT_VEC+12,D4-D5
            MOVEM.W     REAR_VEC+12,D6-D7
            JSR         SQDIST
            CMP.L       D2,D1
            BGE.S       ANA_DP1
            TDIVU.L     D1,D2
            BRA.S       ANA_DP2
ANA_DP1     TDIVU.L     D2,D1
            MOVE.L      D1,D2
ANA_DP2     CMP.L       #1,D2
            BEQ.S       V_DOT
            BRA         V_HORZ
NP_BLOB     MOVE.B      #7,D0
            RTS
V_DOT       MOVE.B      #6,D0
            RTS
V_CUR       MOVE.B      #4,D0
            RTS
THINLN      MOVE.B      #5,D0
            RTS

***********************************************************************
*   CLEANER - NOISE CLEANER                                            *
*       INPUT:   A0 points to the vector buffer which needs to be cleaned  *
*                A1 points to the vector buffer which is the base vectors  *
*                buffer                                                *
*       OUTPUT:  noisy vector wheih is in the buffer pointed by A0 will be *
*                removed from vector buffer.  The content of base buffer   *
*                is unchanged.                                         *
*                conditions: 1.  delta_x <= 5 && delta_y <= 10         *
*                                or                                    *
*                                then                                  *
***********************************************************************

CLEANER     MOVEM.L     D0-D2/A0-A2,-(A7)
            MOVE.L      A0,-(A7)
CLN_LP1     MOVE.W      (A0),D0
            SUB.W       4(A0),D0
            BGE.S       CLEAN_1
            NEG.W       D0
CLEAN_1     MOVE.W      6(A0),D1
            SUB.W       2(A0),D1
            CMP.W       #5,D0
            BGT.S       CLEAN_2
            CMP.W       #10,D1
            BLE.S       CLEAN_3
```

```
CLEAN_2    CMP.W      #2,D1
           BLE.S      CLEAN_3
CLN_NXT    ADDQ.L     #8,A0
           TST.W      (A0)
           BGE.S      CLN_LP1
           BRA        CLN_RTN
CLEAN_3    MOVE.W     2(A0),D2
           MOVE.L     A1,-(A7)
CLN_LP2    CMP.W      2(A1),D2
           BEQ        CLEAN_4
           CMP.W      6(A1),D2
           BEQ        CLEAN_4
           ADDQ.L     #8,A1
           TST.W      (A1)
           BGE.S      CLN_LP2
           CLR.L      -4(A0)
           CLR.L      (A0)
           BRA.S      CLEAN_5
CLEAN_4    TST.W      8(A0)
           BLT.S      CLEAN_5
           CLR.L      4(A0)
           CLR.L      8(A0)
CLEAN_5    MOVEA.L    (A7)+,A1
           BRA        CLN_NXT
CLN_RTN    MOVEA.L    (A7)+,A0
           MOVEA.L    A0,A2
CLN_MV     TST.W      (A0)+
           BEQ        CLEAN_6
           MOVE.W     -2(A0),(A2)+
CLEAN_6    BGE.S      CLN_MV
           MOVEM.L    (A7)+,D0-D2/A0-A2
           RTS
```

```
****************************************************************************
*    CNTVECTZ - CENTER POINTS VECTORIZER
*    INPUT:    FRNT_X, REAR_X and PNT_Y contain the points
*    OUTPUT:   the vectors will be stored in FRNT_VEC
****************************************************************************

CNTVECTZ   MOVEM.L    D0-D7/A1-A6,-(A7)
           MOVE.L     #0,D4
           MOVE.W     #0,D5
           LEA        FRNT_X,A2
           LEA        PNT_Y,A3
           LEA        CNT_X,A4
           LEA        CNT_Y,A5
           LEA        REAR_X,A6
CNT_LP     MOVE.W     (A2,D5.W),D1
           MOVE.W     (A6,D5.W),D2
           ADD.W      D1,D2
           ASR.W      #1,D2
           MOVE.W     D2,(A4)+
           MOVE.W     (A3,D5.W),(A5)+
           ADDQ.W     #2,D5
           ADDQ.W     #1,D4
           CMP.W      N_PNTS,D4
           BNE.S      CNT_LP
           LEA        FRNT_VEC,A0
           MOVEA.L    D4,A2
           LEA        CNT_X,A5
           LEA        CNT_Y,A6
           JSR        VECTIZ
           MOVEM.L    (A7)+,D0-D7/A1-A6
           RTS
```

```
************************************************************************
*    GENWIDTH - GENERATE LINE WIDTHS                                    *
*        INPUT:    A0 points to the output location (can be same as A1) *
*                  A1 points to the input sequence  (can be same as A0) *
*                  A3 points to the vector buffer                       *
*                  A4 points to the front x buffer                      *
*                  A5 points to the rear x buffer                       *
*                  A6 points to the y buffer                            *
*        OUTPUT:   The line widths are at (A0).  Each line width occupies*
*                  a word, and the sequence is terminated by a word -1. *
*                  A4, A5, and A6 are preserved.                        *
*        FUNCTION: Generate line widths corresponding to the partition at (A1) *
*                  of the trapezoids whose coordinates are at (A4), (A5), and *
*                  (A6), and which have been vectorized at (A3).        *
*                  The line width for a vector spanning trapezoid # Top to *
*                  trapezoid # Bottom is given by:                      *
*                  W[k] = RearX[k] - FrontX[k] + 1                      *
*                  Numerator = 2 * W[Top]                               *
*                     + the sum for k from Top + 1 to Bottom of         *
*                        (W[k - 1] + W[k]) * (Y[k] - Y[k - 1] + 1) - 2 * W[k - 1] *
*                  Denominator = 2 * length of vector                   *
*                  Line width = Numerator / Denominator                 *
************************************************************************

XREF        DISTANCE

GENWIDTH:
            MOVE.W      (A1)+,D0

GENW_1      MOVE.W      D0,D1

MOVE.W      (A1)+,D0

MOVE.W      (A5,D1.W*2),D3
            SUB.W       (A4,D1.W*2),D3
            ADDQ.W      #1,D3
            ASL.W       #1,D3
            EXT.L       D3

GENW_3      ADDQ.W      #1,D1
            CMP.W       D0,D1
            BGT.S       GENW_2

MOVE.W      (-2,A5,D1.W*2),D6
            SUB.W       (-2,A4,D1.W*2),D6
            ADDQ.W      #1,D6
            MOVE.W      D6,D4
            ADD.W       (A5,D1.W*2),D6
            SUB.W       (A4,D1.W*2),D6
            ADDQ.W      #1,D6

MOVE.W      (A6,D1.W*2),D5
            SUB.W       (-2,A6,D1.W*2),D5
            ADDQ.W      #1,D5
            MULS.W      D5,D6
            ADD.L       D6,D3

ASL.W       #1,D4
            EXT.L       D4
            SUB.L       D4,D3

BRA.S       GENW_3

GENW_2      MOVEM.W     (A3)+,D4-D7
            JSR         DISTANCE
            ASL.W       #1,D1
            DIVS.W      D1,D3

MOVE.W      D3,(A0)+

TST.W       (A1)

BGE.S       GENW_1

MOVE.W      #-1,(A0)

RTS
```

```
**************************************************************************
*    GENVEC - GENERATE VECTORS                                            *
*        INPUT:   A0 points to the output location                        *
*                 A1 points to the input sequence                         *
*                 A5 points to the x buffer                               *
*                 A6 points to the y buffer                               *
*        OUTPUT:  The vectors are at (A0). Each vector occupies four words*
*                 (x1, y1, x2, y2), and the sequence is terminated by a   *
*                 word -1.                                                *
*                 A5 and A6 are preserved.                                *
*        FUNCTION: Generate vectors corresponding to the partition at (A1)*
*                  of the points whose coordinates are at (A5) and (A6).  *
**************************************************************************

GENVEC:
        MOVE.W    (A1)+,D0

GENV_1  MOVE.W    (A5,D0.W*2),(A0)+
        MOVE.W    (A6,D0.W*2),(A0)+

MOVE.W    (A1)+,D0

MOVE.W    (A5,D0.W*2),(A0)+
        MOVE.W    (A6,D0.W*2),(A0)+

TST.W     (A1)

BGE.S     GENV_1

MOVE.W    #-1,(A0)

RTS

**************************************************************************
*    CENTER - FIND CENTER POINTS                                          *
*        INPUT:   FRNT_X, REAR_X and PNT_Y contain the points             *
*        OUTPUT:  CNT_X and CNT_Y contain the center points               *
**************************************************************************
CENTER  MOVEM.L   D1-D2/D4-D5/A2-A6,-(A7)
        MOVE.W    #0,D4
        MOVE.W    #0,D5
        LEA       FRNT_X,A2
        LEA       PNT_Y,A3
        LEA       CNT_X,A4
        LEA       CNT_Y,A5
        LEA       REAR_X,A6
CNT_LP  MOVE.W    (A2,D5.W),D1
        MOVE.W    (A6,D5.W),D2
        ADD.W     D1,D2
        ASR.W     #1,D2
        MOVE.W    D2,(A4)+
        MOVE.W    (A3,D5.W),(A5)+
        ADDQ.W    #2,D5
        ADDQ.W    #1,D4
        CMP.W     N_PNTS,D4
        BNE.S     CNT_LP
        MOVEM.L   (A7)+,D1-D2/D4-D5/A2-A6
        RTS

**************************************************************************
*    VECTIZ - VECTORIZATION                                               *
*        INPUT:   A0 contains the address of output location              *
*                 A2 contains number of points in the buffer              *
*                 A5 contains the address of x buffer                     *
*                 A6 contains the address of y buffer                     *
*        OUTPUT:  vectors generated by this subroutine will be stored in  *
*                 location pointed by A0. The format of the vector will be*
*                 x1,y1,x2,y2 in consecutive word memories                *
*                 the value of A2, A5, A6 are preserved                   *
*        FUNCTION: this subroutine vectorizes the input front_edge, center,*
*                  or rear_edge points. The vectors generated will be analyzed*
*                  by subroutine ANALYZ for recognizing the shape. Sometimes,*
*                  it will vectorize the final output vector segments     *
**************************************************************************
FRAMESZ SET       -2*VECTORS

OFFSET    FRAMESZ
```

```
SEQUENCE  SET       *
          DS.W      VECTORS
NUMPNTS   SET       *
          DS.L      1

XDEF      VECTIZ

SECTION   0

VECTIZ:
          LINK      A2,#FRAMESZ

MOVE.L    A0,-(SP)

LEA       SEQUENCE(A2),A0
          MOVE.L    NUMPNTS(A2),A4
          BSR.S     PRTITION

MOVE.L    (SP)+,A0

LEA       SEQUENCE(A2),A1
          BSR       GENVEC

UNLK      A2

RTS
```

```
************************************************************************
*     VECDSG - VECTORS RECOGNITION, VECTORIZATION, AND DESEGMEMTATION
*         INPUT:   FRNT_VEC, REAR_VEC contain the vectors of front edge
*                  and rear edge.  Those vectors are convex, similar length
*                  and no sharp angle
*         OUTPUT:  vectors after desegmemtation
************************************************************************

XREF      VERTCL, PARL1VEC, NOPARVEC, CURVE, THINLINE, FILDOT, HORIZ2
          XREF      DESEG

VECDSG    BSR.S     ANALYZ
          CMPI.B    #1,D0
          BNE.S     PARL
          JSR       VERTCL
          BRA.S     DE_SEG
PARL      CMPI.B    #2,D0
          BNE.S     NO_PARL
          JSR       PARL1VEC
          BRA.S     DE_SEG
NO_PARL   CMPI.B    #3,D0
          BNE.S     VEC_CUR
          JSR       NOPARVEC
          BRA.S     DE_SEG
VEC_CUR   CMPI.B    #4,D0
          BNE.S     THIN
          JSR       CURVE
          BRA.S     DE_SEG
THIN      CMPI.B    #5,D0
          BNE.S     FIL_CRL
          JSR       THINLINE
          BRA.S     DE_SEG
FIL_CRL   CMPI.B    #6,D0
          BNE.S     VEC_HORZ
          JSR       FILDOT
          BRA.S     DE_SEG
VEC_HORZ  CMPI.B    #8,D0
          BNE.S     VD_RTN
          JSR       HORIZ2
DE_SEG    JSR       DESEG
VD_RTN    RTS
```

```
*************************************************************************
*     MAXDIST - RELATIVE MAXIMUM DISTANCE                                *
*         INPUT:    A3 contains the breakpt1                             *
*                   A4 contains the breakpt2                             *
*                   A5 contains the address of x buffer                  *
*                   A6 contains the address of y buffer                  *
*         OUTPUT:   D0 contains the value of maximum distance            *
*                   A1 contains the index of the point which has the     *
*                   maximum distance                                     *
*                   the value of A3, A4, A5, A6 are preserved            *
*         FUNCTION: this subroutine computes the relative maximum distance*
*                   from each point within two break points to the assumed*
*                   line and returns the value of the maximum distance and*
*                   the index of the point which has the maximum distance*
*************************************************************************

XREF       ABS,DISTANCE

MAXDIST     MOVEM.L    D1-D7/A2-A6,-(A7)
            CLR.L      D7
            MOVE.L     A3,D0
            ASL.L      #1,D0
            MOVE.W     (A5,D0.W),D3
            MOVE.W     (A6,D0.W),D4
            MOVE.L     A4,D0
            ASL.L      #1,D0
            MOVE.W     (A5,D0.W),D5
            MOVE.W     (A6,D0.W),D6
            MOVEA.L    A3,A2
MAX_LOOP    MOVE.L     A2,D0
            ASL.L      #1,D0
            MOVE.W     (A5,D0.W),D1
            MOVE.W     (A6,D0.W),D2
            JSR        RELPOS
            JSR        ABS
            CMP.L      D7,D0
            BLT.S      FWD_MAX
            MOVE.L     D0,D7
            MOVE.L     A2,A1
FWD_MAX     ADDQ.L     #1,A2
            CMPA.L     A2,A4
            BPL.S      MAX_LOOP
            MOVE.L     D7,-(A7)
            MOVEM.W    D3-D6,-(A7)
            MOVEM.W    (A7)+,D4-D7
            JSR        DISTANCE
            MOVE.L     (A7)+,D7
            DIVU.W     D1,D7
            MOVE.W     D7,D0
            MOVEM.L    (A7)+,D1-D7/A2-A6
            RTS

*************************************************************************
*     PRTITION - PARTITION POINTS INTO SMOOTH GROUPS                     *
*         INPUT:    A0 points to the output sequence                     *
*                   A4 contains the number of points in the buffer       *
*                   A5 points to the x buffer                            *
*                   A6 points to the y buffer                            *
*         OUTPUT:   The sequence of point indices constituting the partition*
*                   is at (A0). Each index occupies a word, and the sequence*
*                   is terminated by a word -1.                          *
*                   A5 and A6 are preserved.                             *
*         FUNCTION: Partition the points whose coordinates are at (A5) and (A6)*
*                   into groups "smooth enough" according to the line smoothing*
*                   slope tolerance. Express the partition as a sequence of*
*                   indices into the buffer.                             *
*************************************************************************

PRTITION:
            MOVE.L     A7,STK_IDX
            MOVEA.L    #0,A3
            SUBQ.L     #1,A4
```

```
VEC_LOOP  BSR.S     MAXDIST
          CMP.W     EPSILON,D0
          BGE.S     IN_STACK
          MOVE.W    A3,(A0)+
          CMPA.L    STK_IDX,A7
          BEQ.S     VECRTN
          MOVEA.L   A4,A3
          MOVEA.L   (A7)+,A4
          BRA.S     VEC_LOOP
IN_STACK  MOVE.L    A4,-(A7)
          MOVEA.L   A1,A4
          BRA.S     VEC_LOOP
VECRTN    MOVE.W    A4,(A0)+
          MOVE.W    #-1,(A0)
          RTS
```

```
****************************************************************************
*   WDTHCHK - WIDTH CHECKING FOR ARROW HEAD (FILLED POLYGON)               *
*       INPUT:    FRNT_X, REAR_X, PNT_Y contain the points                 *
*       OUTPUT:   LINE_FL = 1, if this is not a filled polygon             *
*                 Otherwise, LINE_FL = 0                                   *
****************************************************************************
```

```
WDTHCHK   MOVEM.L   D0-D3/A1-A3,-(A7)
          MOVE.W    #0,D1
          MOVE.W    #0,D2
          MOVE.W    #0,D3
          MOVE.W    N_PNTS,D4
          SUBQ.W    #1,D4
          MOVE.B    #0,LINE_FL
          LEA       FRNT_X,A1
          LEA       REAR_X,A2
          LEA       PNT_Y,A3
WCHK_LP   MOVE.W    (A2,D3.W),D0
          SUB.W     (A1,D3.W),D0
          ADD.W     #1,D0
          CMP.W     MAXWDTH,D0
          BLE.S     W_CHK1
          ADDQ.W    #2,D3
          MOVE.W    (A3,D3.W),D5
          SUBQ.W    #2,D3
          SUB.W     (A3,D3.W),D5
          ADD.W     D5,D1
W_CHK1    ADDQ.W    #2,D3
          ADDQ.W    #1,D2
          CMP.W     D4,D2
          BNE.S     WCHK_LP
          MOVE.W    (A3,D2.W*2),D2
          SUB.W     (A3),D2
          MULS.W    #10,D1
          DIVS.W    D2,D1
          CMP.W     #5,D1
          BGE.S     W_RTN
          MOVE.B    #1,LINE_FL
W_RTN     MOVEM.L   (A7)+,D0-D3/A1-A3
          RTS
```

GENERATE VECTORS

```
****************************************************************************
*   CURVE - CURVE VECTORS                                                  *
*       INPUT:    FRNT_X, PNT_Y, REAR_X contain the x, y                   *
*                 coordinates of the front and rear edges. FRNT_VEC        *
*                 contains the vectors of front edge.                      *
*       OUTPUT:   vector segments.  Data are sent to VEC_SEG area          *
****************************************************************************
```

```
          XDEF      CURVE
          XREF      VECTIZ

CURVE     LEA       FRNT_VEC,A0
CUR_BCK1  TST.W     (A0)
          BLT.S     CUR_FWD1
          ADDQ.L    #8,A0
          BRA.S     CUR_BCK1
```

```
CUR_FWD1  MOVE.W    -2(A0),D0
          LEA       REAR_VEC,A0
CUR_BCK2  TST.W     (A0)
          BLT.S     CUR_FWD2
          ADDQ.L    #8,A0
          BRA.S     CUR_BCK2
CUR_FWD2  CMP.W     -2(A0),D0
          BGE.S     CUR_FWD3
          MOVE.W    -2(A0),D0
CUR_FWD3  MOVE.W    FRNT_VEC+2,D6
          CMP.W     REAR_VEC+2,D6
          BLT.S     CUR_FWD4
          MOVE.W    REAR_VEC+2,D6
CUR_FWD4  MOVE.W    #0,D4
          MOVE.L    #0,D7
          MOVE.W    #0,D5
          LEA       PNT_Y,A0
CUR_BCK6  CMP.W     (A0)+,D6
          BEQ.S     CUR_FWD6
          ADDQ.W    #1,D5
          BRA.S     CUR_BCK6
CUR_FWD6  ASL.W     #1,D5
          LEA       FRNT_X,A2
          LEA       PNT_Y,A3
          LEA       CNT_X,A4
          LEA       CNT_Y,A5
          LEA       REAR_X,A6
CUR_LOOP  MOVE.W    (A2,D5.W),D1
          MOVE.W    (A6,D5.W),D2
          MOVE.W    D2,D3
          ADD.W     D1,D2
          ASR.W     #1,D2
          MOVE.W    D2,(A4)+
          MOVE.W    (A3,D5._),(A5)+
          SUB.W     D1,D3
          ADDQ.W    #1,D3
          ANDI.L    #$FFFF,D3
          ADD.L     D3,D7
          ADDQ.W    #1,D4
          CMP.W     (A3,D5.W),D0
          BEQ.S     CUR_FWD5
          ADDQ.W    #2,D5
          BRA       CUR_LOOP
CUR_FWD5  LEA       FRNT_VEC,A0
          MOVEA.W   D4,A2
          DIVU.W    D4,D7
          MULU.W    #10,D7
          DIVU.W    #14,D7
          MOVE.W    D7,-(A7)
          LEA       CNT_X,A5
          LEA       CNT_Y,A6
          JSR       VECTIZ
          MOVE.W    (A7)+,D7

MOVEA.L   BUF_PTR,A0
          LEA       FRNT_VEC,A2
CUR_MORE  TST.W     (A2)
          BLT.S     CURRTN
          MOVE.W    #1,(A0)+
          MOVE.W    (A2)+,(A0)+
          MOVE.W    (A2)+,(A0)+
          MOVE.W    (A2)+,(A0)+
          MOVE.W    (A2)+,(A0)+
          MOVE.W    D7,(A0)+
          BRA.S     CUR_MORE
CURRTN    MOVE.W    #-1,(A0)
          RTS
```

```
*****************************************************************************
*     FILDOT - FILLED DOT                                                    *
*         INPUT:   FRNT_VEC, REAR_VEC contains the vectors of front edge     *
*                  and rear edge                                             *
*         OUTPUT:  the center point of the filled dot and its radius.  Data  *
*                  are sent to VEC_SEG area                                  *
*         FUNCTION: this subroutine computes x, y coordinates of the center  *
*                  point of the filled dot and its radius                    *
*****************************************************************************

XDEF      FILDOT
         XREF      ARCCNT

FILDOT   LEA       FRNT_VEC,A0
F_LOOP   TST.W     (A0)
         BLT.S     F_FWD1
         ADDQ.L    #8,A0
         BRA.S     F_LOOP
F_FWD1   SUBQ.L    #4,A0
         LEA       REAR_VEC,A1
R_LOOP   TST.W     (A1)
         BLT.S     F_FWD2
         ADDQ.L    #8,A1
         BRA.S     R_LOOP
F_FWD2   SUBQ.L    #4,A1
         MOVE.W    (A0)+,D0
         MOVE.W    (A0),D1
         MOVE.W    FRNT_VEC,D2
         MOVE.W    FRNT_VEC+2,D3
         MOVE.W    (A1)+,D4
         MOVE.W    (A1),D5
         JSR       ARCCNT
         TST.W     D0
         BLT.S     F_LINE
         MOVEA.L   BUF_PTR,A0
         MOVE.W    #$300,(A0)+
         MOVE.W    D0,(A0)+
         MOVE.W    D1,(A0)+
         MOVE.W    D2,(A0)+
         MOVE.W    D2,(A0)
         BRA.S     F_RTN
F_LINE   MOVEA.L   BUF_PTR,A2
         MOVE.W    #1,(A2)+
         MOVE.W    FRNT_VEC,(A2)+
         MOVE.W    FRNT_VEC+2,(A2)+
         MOVE.W    -4(A1),(A2)+
         MOVE.W    -2(A1),(A2)+
         MOVE.W    #3,(A2)+
         MOVE.W    #-1,(A2)
F_RTN    RTS

*****************************************************************************
*     HORIZ - HORIZONTAL VECTOR                                              *
*         INPUT:   N_PNTS contains the number of points in FRNT_X, PNT_Y,    *
*                  REAR_X                                                    *
*                  FRNT_X, PNT_Y, REAR_X contain the coordinates             *
*                  of front edge and rear edge points                        *
*                  H_SHAPE contains the ratio between length of the slices   *
*                  and the number of slices  (width / high)                  *
*         OUTPUT:  horizontal vector segment. Data are sent to VEC_SEG area  *
*         FUNCTION: this subroutine outputs two different kinds of horizontal*
*                  line.  One is the oridinary horizontal line.  The other is*
*                  the top and bottom portion of an arc. The difference between*
*                  these two is distinguished by the ratio H_SHAPE.  Usually *
*                  oridinary horizontal line is longer than the top or bottom*
*                  portion of an arc                                         *
*****************************************************************************

XDEF      HORIZ

H_RATIO  EQU       256

HORIZ    LEA       PNT_Y,A3
         MOVE.W    (A3),D2
         MOVEA.W   N_PNTS,A2
```

```
              MOVE.W    A2,D4
              SUBQ.W    #1,D4
              ASL.W     #1,D4
              MOVE.W    D4,A4
              MOVE.W    (A3,A4),D6
              ADD.W     D6,D2
              ASR.W     #1,D2
              MOVE.W    (A3,A4),D5
              SUB.W     (A3),D5
              ADDQ.W    #1,D5
              LEA       FRNT_X,A3
              LEA       REAR_X,A4
              CLR.L     D3
              LEA       0,A0
              MOVE.W    #$7FFF,D0
              MOVE.W    #-1,D1
H_LOOP        CMP.W     (A3,A0),D0
              BLE.S     FND_MAX
              MOVE.W    (A3,A0),D0
FND_MAX       CMP.W     (A4,A0),D1
              BGE.S     H_NEXT
              MOVE.W    (A4,A0),D1
H_NEXT        ADDQ.W    #2,A0
              ADDQ.W    #1,D3
              CMPA.W    D3,A2
              BHI.S     H_LOOP
              CMPI.W    #H_RATIO,H_SHAPE
              BGT.S     PUT_DATA
              CMP.W     MAXWDTH,D5
              BGT.S     PUT_DATA
              MOVE.W    (A4),D3
              SUB.W     (A3),D3
              MOVE.W    -2(A4,A0),D4
              SUB.W     -2(A3,A0),D4
              CMP.W     D3,D4
              BGT.S     HORIZ_1
              MOVE.W    PNT_Y,D2
              BRA.S     PUT_DATA
HORIZ_1       MOVE.W    D6,D2
PUT_DATA MOVEA.L  BUF_PTR,A0
              MOVE.W    D1,(A0)+
              MOVE.W    D0,(A0)+
              MOVE.W    D2,(A0)+
              MOVE.W    D1,(A0)+
              MOVE.W    D2,(A0)+
              MOVE.W    D5,(A0)+
              MOVE.W    #-1,(A0)
              RTS

****************************************************************************
*     HORIZ2 - HORIZONTAL VECTOR                                            *
*         INPUT:    FRNT_VEC, REAR_VEC contain the vectors of front         *
*                   edge and rear edge                                      *
*         OUTPUT:   vector segment.  Data are sent to VEC_SEG area          *
*         FUNCTION: this subroutine computes the two end points and line    *
*                   width of a horizontal vector                            *
****************************************************************************

XDEF      HORIZ2

HORIZ2        LEA       FRNT_VEC,A0
              LEA       REAR_VEC,A1
              MOVEM.W   (A0),D4/D5
              MOVEM.W   (A1),D6/D7
              JSR       SQDIST
              MOVE.L    D1,D0
H2_1          ADDQ.L    #8,A0
              TST.W     (A0)
              BGE.S     H2_1
              MOVEM.W   -4(A0),D4/D5
H2_2          ADDQ.L    #8,A1
              TST.W     (A1)
              BGE.S     H2_2
              MOVEM.W   -4(A1),D6/D7
```

```
                JSR         SQDIST
                CMP.L       D1,D0
                BLT.S       H2_3
                MOVE.W      FRNT_VEC+2,D5
                MOVE.W      D5,D7
H2_3            MOVE.W      FRNT_VEC,D4
                ADD.W       -4(A0),D4
                ASR.W       #1,D4
                MOVE.W      REAR_VEC,D6
                ADD.W       -4(A1),D6
                ASR.W       #1,D5
                MOVE.W      -2(A0),D3
                SUB.W       FRNT_VEC+2,D3
                ADDQ.W      #1,D3
                CMP.W       MAXWDTH,D3
                BGT.S       H2_PLYGN
                MOVEA.L     BUF_PTR,A0
                MOVE.W      #1,(A0)+
                MOVEM.W     D4-D7,(A0)
                ADDQ.L      #8,A0
                MOVE.W      D3,(A0)+
                MOVE.W      #-1,(A0)
                RTS

H2_PLYGN  BSR       NOPARVEC
          RTS
```

```
****************************************************************
*   VERTCL - VERTICAL VECTOR                                    *
*       INPUT:   LF_VEC, LR_VEC contain the longest vectors of front *
*                edge and rear edge                             *
*       OUTPUT:  vector segment.  Data are sent to VEC_SEG area *
*       FUNCTION: this subroutine computes the two end points and line *
*                 width of a vertical vector                    *
****************************************************************
                XDEF        VERTCL VERTCL          MOVEM.W     LF_VEC,D0/D1
                MOVEM.W     LR_VEC,D2/D3
                ADD.W       D2,D0
                ASR.W       #1,D0
                CMP.W       D3,D1
                BLE.S       VRT_2
                MOVE.W      D3,D1
VRT_2           SUB.W       LF_VEC,D2
                ADDQ.W      #1,D2
                MOVEM.W     LF_VEC+4,D4/D5
                MOVEM.W     LR_VEC+4,D6/D7
                ADD.W       D6,D4
                ASR.W       #1,D4
                CMP.W       D7,D5
                BGE.S       VRT_3
                MOVE.W      D7,D5
VRT_3           SUB.W       LF_VEC+4,D6
                ADDQ.W      #1,D6
                ADD.W       D6,D2
                ASR.W       #1,D2
                CMP.W       MAXWDTH,D2
                BGT.S       V_PLYGN
                TST.W       D2
                BNE.S       VRT_1
                MOVE.W      #3,D2
VRT_1           MOVEA.L     BUF_PTR,A0
                MOVE.W      #1,(A0)+
                MOVE.W      D0,(A0)+
                MOVE.W      D1,(A0)+
                MOVE.W      D4,(A0)+
                MOVE.W      D5,(A0)+
                MOVE.W      D2,(A0)+
                MOVE.W      #-1,(A0)
                RTS

V_PLYGN   BSR       NOPARVEC
          RTS
```

```
***********************************************************************
*    THINLINE - THIN LINE DISREGARDING ITS DIRECTION                   *
*        INPUT:    LF_VEC, LR_VEC contain the longest vectors of front *
*                  edge and rear edge.  Actually, they are same vector.*
*        OUTPUT:   vector segment.  Data are sent to VEC_SEG area      *
*        FUNCTION: this subroutine modifies the line width of the vector*
*                  with actual line width just one pixel to the thinnest*
*                  valid line width.                                   *
***********************************************************************

XDEF      THINLINE

THINLINE  MOVEM.W   LF_VEC,D0-D3
          MOVEA.L   BUF_PTR,A0
          MOVE.W    #1,(A0)+
          MOVE.W    D0,(A0)+
          MOVE.W    D1,(A0)+
          MOVE.W    D2,(A0)+
          MOVE.W    D3,(A0)+
          MOVE.W    #3,(A0)+
          MOVE.W    #-1,(A0)
          RTS

***********************************************************************
*    PARLIVEC - VECTOR WITH AN ANGLE                                   *
*        INPUT:    LF_VEC, LR_VEC contain the longest vectors of front *
*                  edge and rear edge                                  *
*        OUTPUT:   vector segment.  Data are sent to VEC_SEG area      *
*        FUNCTION: this subroutine computes the two end points and line*
*                  width of a vector with any angle except horizontal vector*
*                  and vertical vector                                 *
***********************************************************************

XDEF      PARLIVEC
          XREF      PROJECT,SQDIST,DISTANCE

PARLIVEC  MOVEM.W   LF_VEC,D4-D5
          MOVEM.W   LR_VEC,D0-D3
          JSR       PROJECT
          JSR       DISTANCE
          MOVE.W    D1,-(A7)
          ADD.W     D4,D6
          ASR.W     #1,D6
          ADD.W     D5,D7
          ASR.W     #1,D7
          MOVEA.W   D6,A1
          MOVEA.W   D7,A2
          MOVEM.W   LF_VEC+4,D4-D5
          MOVEM.W   LR_VEC,D0-D3
          JSR       PROJECT
          JSR       DISTANCE
          MOVE.W    D1,-(A7)
          ADD.W     D4,D6
          ASR.W     #1,D6
          ADD.W     D5,D7
          ASR.W     #1,D7
          MOVEA.W   D6,A3
          MOVEA.W   D7,A4
          MOVEM.W   LR_VEC,D4-D5
          MOVEM.W   LF_VEC,D0-D3
          JSR       PROJECT
          JSR       DISTANCE
          MOVE.W    D1,-(A7)
          ADD.W     D4,D6
          ASR.W     #1,D6
          ADD.W     D5,D7
          ASR.W     #1,D7
          MOVEA.W   D6,A5
          MOVEA.W   D7,A6
          MOVEM.W   LR_VEC+4,D4-D5
          MOVEM.W   LF_VEC,D0-D3
          JSR       PROJECT
          JSR       DISTANCE
          ADD.W     D4,D6
```

```
                ASR.W       #1,D6
                ADD.W       D5,D7
                ASR.W       #1,D7
                ADD.W       (A7)+,D1
                ADD.W       (A7)+,D1
                ADD.W       (A7)+,D1
                ASR.W       #2,D1
                CMP.W       MAXWDTH,D1
                BGT         P_PLYGN
                TST.W       D1
                BNE.S       P_FWD4
                MOVE.W      #3,D1
P_FWD4          MOVE.W      D1,-(A7)
                MOVE.W      D6,D2
                MOVE.W      D7,D3
                MOVEM.W     A1-A4,-(A7)
                MOVE.W      A1,D4
                MOVE.W      A2,D5
                MOVE.W      A3,D6
                MOVE.W      A4,D7
                JSR         SQDIST
                MOVE.L      D1,D0
                MOVE.W      D2,D6
                MOVE.W      D3,D7
                JSR         SQDIST
                CMP.L       D1,D0
                BGE.S       P_FWD1
                MOVE.L      D1,D0
                ADDQ.L      #8,A7
                MOVEM.W     A1-A2/D2-D3,-(A7)
P_FWD1          MOVE.W      A5,D4
                MOVE.W      A6,D5
                MOVE.W      A3,D6
                MOVE.W      A4,D7
                JSR         SQDIST
                CMP.L       D1,D0
                BGE.S       P_FWD2
                MOVE.L      D1,D0
                ADDQ.L      #8,A7
                MOVEM.W     A3-A6,-(A7)
P_FWD2          MOVE.W      D2,D6
                MOVE.W      D3,D7
                JSR         SQDIST
                CMP.L       D1,D0
                BGE.S       P_FWD3
                ADDQ.L      #8,A7
                MOVEM.W     A5-A6/D2-D3,-(A7)
P_FWD3          MOVEA.L     BUF_PTR,A0
                MOVE.W      #1,(A0)+
                MOVE.W      (A7)+,(A0)+
                MOVE.W      (A7)+,(A0)+
                MOVE.W      (A7)+,(A0)+
                MOVE.W      (A7)+,(A0)+
                MOVE.W      (A7)+,(A0)+
                MOVE.W      #-1,(A0)
                RTS

P_PLYGN         BSR.S       NOPARVEC
                RTS

*****************************************************************************
*       NOPARVEC - NON PARALLEL VECTORS (FILLED POLYGON)                     *
*           INPUT:   FRNT_VEC, REAR_VEC contain the vectors of front edge    *
*                    and rear edge                                           *
*           OUTPUT:  filled polygon                                          *
*****************************************************************************

XDEF        NOPARVEC
                XREF        CONTRACT

NOPARVEC        MOVE.B      #0,COUNTER
                MOVE.B      #0,TRYFLG
```

```
***** Count number of verticies in the filled polygon
          LEA        FRNT_VEC,A1
          CLR.W      D0
NP_BCK3   ADDQ.L     #8,A1
          ADDQ.B     #1,COUNTER
          TST.W      (A1)
          BGE.S      NP_BCK3
          TST.W      D0
          BNE.S      NP_FWD4
          LEA        REAR_VEC,A1
          MOVE.W     #1,D0
          BRA.S      NP_BCK3
NP_FWD4   ADDQ.B     #2,COUNTER

***** generate the filled polygon
NP_AGN    MOVEA.L    BUF_PTR,A0
          LEA        FRNT_VEC,A1
          MOVE.W     #0,(A0)+
NP_BCK1   TST.W      (A1)
          BLT.S      NP_FWD1
          MOVE.W     (A1),(A0)+
          MOVE.W     2(A1),(A0)+
          ADDQ.L     #8,A1
          TST.B      TRYFLG
          BEQ.S      NP_BCK1
          ADDQ.B     #1,COUNTER
          CMP.B      #4,COUNTER
          BLT.S      NP_BCK1
NP_BCK4   TST.W      (A1)
          BLT.S      NP_FWD7
          ADDQ.L     #8,A1
          BRA.S      NP_BCK4
NP_FWD7   MOVE.W     -4(A1),-4(A0)
          MOVE.W     -2(A1),-2(A0)
          BRA.S      NP_FWD2
NP_FWD1   MOVE.W     -4(A1),(A0)+
          MOVE.W     -2(A1),(A0)+
          TST.B      TRYFLG
          BEQ.S      NP_FWD2
          ADDQ.B     #1,COUNTER
NP_FWD2   LEA        REAR_VEC,A1
NP_BCK2   TST.W      (A1)
          BLT.S      NP_FWD3
          ADDQ.L     #8,A1
          BRA.S      NP_BCK2
NP_FWD3   MOVE.W     -4(A1),(A0)+
          MOVE.W     -2(A1),(A0)+
          TST.B      TRYFLG
          BEQ.S      NP_FWD5
          ADDQ.B     #1,COUNTER
          CMP.B      #7,COUNTER
          BNE.S      NP_FWD5
          MOVE.W     REAR_VEC,-4(A0)
          MOVE.W     REAR_VEC+2,-2(A0)
          BRA.S      NP_FWD6
NP_FWD5   SUBQ.L     #8,A1
          CMPA.L     #REAR_VEC,A1
          BNE.S      NP_FWD3
          MOVE.W     (A1),(A0)+
          MOVE.W     2(A1),(A0)+
          TST.B      TRYFLG
          BEQ.S      NP_FWD6
          ADDQ.B     #1,COUNTER
NP_FWD6   MOVE.W     #-1,(A0)
          MOVEA.L    BUF_PTR,A1
          MOVE.B     #2,(A1)
          MOVE.B     COUNTER,1(A1)
          CMPI.B     #7,COUNTER
          BLE.S      NP_RTN
          JSR        CONTRACT
          MOVE.B     1(A1),COUNTER
          CMPI.B     #7,COUNTER
          BLE.S      NP_RTN
```

```
                MOVE.B      #0,COUNTER
                MOVE.B      #1,TRYFLG
                BRA         NP_AGN
NP_RTN          RTS
```

```
*************************************************************************
*       LINEWDTH - LINE LEGAL WIDTH
*           INPUT:    D7 contains the line actual width
*           OUTPUT:   D7 contains the line legal width which is set by the
*                     operator in standard line width table
*************************************************************************

XDEF        LINEWDTH
                XREF        .PARAMS,.STDWDTH,ABS

LINEWDTH        MOVEM.L     D0-D5/A4,-(A7)
                CLR.W       D0
                MOVE.W      D7,D5
                CLR.W       D7
                MOVE.W      #3,D2
                MOVE.W      #$7FFF,D3
                MOVEA.L     .PARAMS,A4
                LEA.L       .STDWDTH(A4),A4
L_WDTH          MOVE.B      (A4)+,D0
                SUB.W       D5,D0
                EXT.L       D0
                JSR         ABS
                CMP.W       D3,D0
                BGE.S       L_FWD
                MOVE.W      D0,D3
                MOVE.B      -1(A4),D7
L_FWD           DBRA        D2,L_WDTH
                MOVEM.L     (A7)+,D0-D5/A4
                RTS
```

```
*************************************************************************
*       UPOFRM - THE DATA RECORD TYPE OF THE BEGINNING OF A BRANCH
*           INPUT:    TB_PHEAD contains the starting address of the preceding
*                     data record
*           OUTPUT:   UP_OFRM contains the data type code
*                     0 - trapezoid, blob and meta object header
*                     1 - convergence
*                     -1 - divergence
*************************************************************************

XDEF        UPOFRM

UP_PTR          SET         8
DTYPE           SET         2

UPOFRM          MOVEA.L     TB_PHEAD,A0
UPO_0           TST.L       UP_PTR(A0)
                BNE.S       UO_FWD1
                CLR.B       UP_OFRM
                RTS
UO_FWD1         MOVEA.L     UP_PTR(A0),A0
                CMP.W       #3,DTYPE(A0)
                BGE.S       UPO_0
                CMP.W       #2,DTYPE(A0)
                BNE.S       UPO_FF
UPO_1           MOVE.B      #1,UP_OFRM
                RTS
UPO_FF          MOVE.B      #$FF,UP_OFRM
                RTS
```

```
***********************************************************************
*       UPTYPE - THE DATA RECORD TYPE OF PRECEDING DATA                *
*           INPUT:    TB_HEAD contains the starting address of the data type *
*                     record                                           *
*           OUTPUT:   UP_TYPE contains the data type code              *
*                     0 - trapezoid, blob and meta object header       *
*                     1 - convergence                                  *
*                    -1 - divergence                                   *
***********************************************************************

XDEF      UPTYPE

UP_PTR      EQU       8
DTYPE       SET       2
ENT_PTR     SET       16
TRPTYPE     SET       3
CONTYPE     SET       2

UPTYPE      MOVEA.L   TB_HEAD,A0
            TST.L     ENT_PTR(A0)
            BEQ.S     U_FWD1
UP_0        CLR.B     UP_TYPE
            RTS
U_FWD1      TST.L     UP_PTR(A0)
            BEQ.S     UP_0
U_BCK1      MOVEA.L   UP_PTR(A0),A0
            CMP.L     #-1,ENT_PTR(A0)
            BEQ.S     U_BCK1
            CMP.W     #TRPTYPE,DTYPE(A0)
            BGE.S     UP_0
            CMP.W     #CONTYPE,DTYPE(A0)
            BNE.S     UP_FF
UP_1        MOVE.B    #1,UP_TYPE
            RTS
UP_FF       MOVE.B    #$FF,UP_TYPE
            RTS

***********************************************************************
*       DWNTYPE - THE DATA RECORD TYPE OF FOLLOWING DATA               *
*           INPUT:    TB_HEAD contains the starting address of data type *
*                     record                                           *
*           OUTPUT:   DWN_TYPE contains the data type code             *
*                     0 - trapezoid, blob and meta object header       *
*                     1 - convergence                                  *
*                    -1 - divergence                                   *
***********************************************************************

XDEF      DWNTYPE

DTYPE       SET       2

DWNTYPE     MOVEA.L   TB_HEAD,A0
            CMPA.L    #0,A0
            BEQ.S     DWN_0
            CMP.W     #3,DTYPE(A0)
            BGE.S     DWN_0
            CMP.W     #2,DTYPE(A0)
            BNE.S     DWN_FF
DWN_1       MOVE.B    #1,DWN_TYPE
            RTS
DWN_FF      MOVE.B    #$FF,DWN_TYPE
            RTS
DWN_0       CLR.B     DWN_TYPE
            RTS
```

DESEGMENTATION Figs. 4, 5 & 14

```
*************************************************************************
*       DESEG - INCLUDE FILLLED POLYGON DESEGMENTATION                   *
*           INPUT:   BUFFER contains the vector(s) just been generated.  VECSEG *
*                    is the vectors database.                            *
*           OUTPUT:  the vectors database VECSEG, pointer buffer LINESEG and  *
*                    NONLINE have all been updated.                      *
*************************************************************************

XDEF        DESEG, RSRVBUFR, LINEGAP
            XREF        SQDIST, ACCHK, DISTANCE, RELPOS, ABS, ARANGE, INTSEC, COSINX
            XREF        ARCCNT, GETGRID, NXTGRID, LINK, NXTRECD, UNLINK, GETHORZ
            XREF        NXTHORZ, UNLNKPNT

CONOPN      EQU         $0100
OPNDIV      EQU         $00FF
CONDIV      EQU         $01FF
OPNCON      EQU         $0001
SQOPNLN     EQU         1600
SQCDLN      EQU         2500
EOBLK       EQU         $F000
LINEGAP     EQU         40
CURVGAP     EQU         30
SQLGAP      EQU         LINEGAP*LINEGAP
SQCGAP      EQU         CURVGAP*CURVGAP
MINLEN      EQU         40
ENT_PTR     EQU         16
DIVERG      EQU         $FF
SHORTVEC    EQU         2500
DTYPE       EQU         2
TRPTYPE     EQU         3

.MOVEW      MACRO
            MOVE.W      (\1)+, (\2)+
            MOVE.W      (\1)+, (\2)+
            MOVE.W      (\1)+, (\2)+
            MOVE.W      (\1)+, (\2)+
            MOVE.W      (\1)+, (\2)+
            MOVE.W      (\1)+, (\2)+
            ENDM

DESEG       MOVEA.L     BUF_PTR, A1
            CMP.W       #1, (A1)
            BNE         NON_LINE
D_LINE      MOVEA.L     TB_PHEAD, A3
            MOVE.B      #0, SHORT_FL

***** Count number of vectors in the BUFFER
            MOVE.B      #0, COUNTER
            MOVE.L      A1, -(A7)
DES_1       CMP.W       #1, (A1)
            BNE.S       DES_2
            ADDQ.B      #1, COUNTER
            ADD.L       #12, A1
            BRA.S       DES_1
DES_2       MOVEA.L     (A7)+, A1
            CMP.B       #1, COUNTER
            BGT         D_MULNS

***** LINE IN THE BUFFER

CON_DIV     CMP.W       #CONDIV, TYPE
            BNE.S       DES_CHK
            TST.B       CHAR_FLG
            BNE.S       DES_CHK
            MOVEM.W     2(A1), D4-D7
*           CMP.W       D5, D7
*           BEQ         DES_CHK
***** clean out the noise of middle intersection area
            JSR         SQDIST
            CMP.L       #SQCDLN, D1
            BPL.S       DES_CHK
            RTS
```

```
DES_CHK    MOVE.W    4(A1),D0
           CMP.W     6(A1),D0
           BNE.S     DES_3
           MOVE.W    N_INTSEC,N_OTHER
           BRA.S     DS1_PNT
DES_3      MOVE.W    #0,N_OTHER

***** First endpoint desegmentation
DS1_PNT    MOVE.L    2(A1),D0
           MOVE.B    #1,PNT1_FL
           JSR       GETGRID
           BNE.S     DS1_FWD1
DS1_BCK1   JSR       NXTGRID
           BEQ.S     DS2_PNT
           BRA.S     DS1_FWD1
D1_BCK1    JSR       NXTRECD
           BEQ.S     DS1_BCK1
DS1_FWD1   TST.L     PRI_VEC
           BEQ.S     LGET_IT1
           CMPA.L    PRI_VEC,A4
           BNE.S     D1_BCK1
LGET_IT1   MOVE.W    (A4),D0
           MOVE.W    2(A4),D1
           MOVEA.L   4(A4),A5
*          TST.L     PRI_VEC
*          BNE.S     DS1_MAH
*          CMP.W     N_INTSEC,D0
*          BEQ.S     DS1_MAH
*          CMP.W     N_INTSEC,D1
*          BNE.S     D1_BCK1
DS1_MAH    TST.L     D7
           BNE.S     MAH_1
           MOVE.W    #3,MAH_COD
           BRA.S     DS_FWD1
MAH_1      MOVE.W    #1,MAH_COD
           BRA.S     DS_FWD1

***** Second endpoint desegmemtation
DS2_PNT    MOVE.L    6(A1),D0
           MOVE.B    #0,PNT1_FL
           JSR       GETGRID
           BNE.S     DS2_FWD1
DS2_BCK1   JSR       NXTGRID
           BEQ       GET_HORZ
           BRA.S     DS2_FWD1
D2_BCK1    JSR       NXTRECD
           BEQ.S     DS2_BCK1
DS2_FWD1   TST.L     PRI_VEC
           BEQ.S     LGET_IT2
           CMPA.L    PRI_VEC,A4
           BNE.S     D2_BCK1
LGET_IT2   MOVE.W    (A4),D0
           MOVE.W    2(A4),D1
           MOVEA.L   4(A4),A5
*          TST.L     PRI_VEC
*          BNE.S     DS2_MAH
*          CMP.W     N_INTSEC,D0
*          BEQ.S     DS2_MAH
*          CMP.W     N_INTSEC,D1
*          BNE.S     D2_BCK1
DS2_MAH    TST.L     D7
           BNE.S     MAH_2
           MOVE.W    #4,MAH_COD
           BRA.S     DS_FWD1
MAH_2      MOVE.W    #2,MAH_COD

***** Adjust A5 points to VECSEG when it is convergence vector
DS_FWD1    MOVE.L    A5,D0
           BTST.L    #0,D0
           BEQ.S     DS_FWD3
           SUBQ.L    #1,D0
           MOVEA.L   D0,A5
           MOVEA.L   (A5),A5
```

```
***** Count number of vectors in the VECSEG
DS_FWD3   MOVE.B    #0,COUNTER
          MOVE.L    A5,-(A7)
DL_BCK1   CMP.W     #1,(A5)
          BNE.S     DL_FWD1
          ADDQ.B    #1,COUNTER
          ADD.L     #12,A5
          BRA.S     DL_BCK1
DL_FWD1   MOVE.L    (A7)+,A5
          CMP.B     #1,COUNTER
          BGT       DL_CURV

**** LINE TO LINE DESEGMENTATION

**** horizontal line checking
          MOVEM.W   2(A1),D0-D3
          MOVEM.W   2(A5),D4-D7
          CMP.W     D1,D3
          BNE       CLOSE_CK
          CMP.W     D5,D7
          BNE       CLOSE_CK

**** horizontal line desegmentation
          BSR       HORZDSG
          TST.B     COMB_FL
          BEQ       DES_4
H_UPDATE  MOVE.W    MAH_COD,D0
          CMP.W     #2,D0
          BGT.S     H_3_4
          MOVE.L    6(A1),D0
          CMP.L     6(A5),D0
          BEQ.S     H1_1_2
          JSR       UNLINK
          MOVE.L    6(A1),D0
          MOVE.L    #4,D7
          JSR       LINK
H1_1_2    MOVE.L    2(A1),D0
          CMP.L     2(A5),D0
          BEQ       UPDT
          MOVE.L    2(A5),D0
          MOVE.L    #0,D7
          JSR       UNLNKPNT
          MOVE.L    2(A1),D0
          MOVE.L    #0,D7
          JSR       LINK
          BRA       UPDT
H_3_4     MOVE.L    2(A1),D0
          CMP.L     2(A5),D0
          BEQ.S     H1_3_4
          JSR       UNLINK
          MOVE.L    2(A1),D0
          MOVE.L    #0,D7
          JSR       LINK
H1_3_4    MOVE.L    6(A1),D0
          CMP.L     6(A5),D0
          BEQ       UPDT
          MOVE.L    6(A5),D0
          MOVE.L    #4,D7
          JSR       UNLNKPNT
          MOVE.L    6(A1),D0
          MOVE.L    #4,D7
          JSR       LINK
          BRA       UPDT DES_4     TST.L     PRI_VEC
          BNE       DFF_CHK
D_BCK1    TST.B     PNT1_FL
          BNE       D1_BCK1
          BRA       D2_BCK1

**** general desegmentation
```

```
**** line closeness checking
CLOSE_CK  BSR      MAHDST
          CMPA.L   #SQLGAP,A6
          BHI.S    D_BCK1

**** line width difference checking
LWDTH     MOVE.W   10(A1),D0
          BNE.S    LW_1
          MOVE.W   #1,D0
LW_1      MOVE.W   10(A5),D1
          BNE.S    LW_2
          MOVE.W   #1,D1
LW_2      CMP.W    D0,D1
          BGT.S    LWDTH_1
          ANDI.L   #$FFFF,D0
          DIVU.W   D1,D0
          BRA.S    LWDTH_2
LWDTH_1   ANDI.L   #$FFFF,D1
          DIVU.W   D0,D1
          MOVE.W   D1,D0
LWDTH_2   CMP.W    #2,D0
          BGT      D_BCK1

**** line to line desegmentation
          BSR      LCOBINE
          TST.B    COMB_FL
          BNE.S    UPDATE
          MOVEM.W  2(A1),D4-D7
          JSR      SQDIST
          CMP.L    #SHORTVEC,D1
          BGT      D_BCK1
          MOVEM.W  2(A5),D4-D7
          JSR      SQDIST
          CMP.L    #SHORTVEC,D1
          BGT      D_BCK1
          MOVE.B   #1,SHORT_FL
          BRA      DL_CURV

***** LINE UPDATE
UPDATE    JSR      UNLINK
          MOVE.W   MAH_COD,D0
          CMP.W    #2,D0
          BGT.S    CODE_3_4
CODE_1_2  MOVE.L   #4,D7
          MOVE.L   6(A1),D0
          BRA.S    UPDT_LNK
CODE_3_4  MOVE.L   #0,D7
          MOVE.L   2(A1),D0
UPDT_LNK  JSR      LINK
UPDT      TST.L    PRI_VEC
          BEQ.S    UPDT_1
          MOVE.L   #0,PRI_VEC
          MOVE.W   4(A1),D0
          CMP.W    8(A1),D0
          BEQ.S    UPDT_2
          MOVE.L   A4,PRI_VEC
UPDT_2    BSR      STLNKPTR
          BRA.S    UPDT_MV
UPDT_1    BSR      STLNKPTR
          MOVE.W   4(A1),D0
          CMP.W    8(A1),D0
          BNE.S    UPDT_REG

***** Horizontal line update
          MOVE.L   #0,PRI_VEC
          MOVE.W   N_INTSEC,(A4)
          MOVE.W   N_INTSEC,2(A4)
          BRA.S    UPDT_MV

***** Non_horizontal line update
UPDT_REG  MOVE.L   A4,PRI_VEC
          MOVE.W   N_INTSEC,D0
          CMP.W    (A4),D0
          BEQ.S    UPDT_CLR
```

```
            LEA         2(A4),A4
UPDT_CLR    MOVE.W      N_OTHER,(A4)
UPDT_MV     .MOVEW      A1,A5
            MOVE.W      #-1,(A5)
            RTS
```

**** LINE TO ARC DESEGMENTATION

**** arc closeness checking
```
DL_CURV     BSR         MAHDST
            CMPA.L      #SQCGAP,A6
            BHI         D_BCK1
            BSR         CCOBINE
            TST.B       COMB_FL
            BEQ         D_BCK1
            BRA         UPDT_C GET_HORZ    MOVE.W      4(A1),D0
            CMP.W       8(A1),D0
            BNE.S       DFF_CHK
```

***** SPECIAL HANDLING FOR HORIZONTAL LINE DESEGMENTATION
```
            JSR         GETHORZ
            BNE.S       HORZ_1
HORZ_3      JSR         NXTHORZ
            BEQ.S       DFF_CHK
            BRA.S       HORZ_1
HORZ_2      JSR         NXTRECD
            BEQ.S       HORZ_3
HORZ_1      MOVE.W      (A4),D0
            MOVE.W      2(A4),D1
            MOVEA.L     4(A4),A5
            CMP.W       N_INTSEC,D0
            BEQ.S       HORZ_MAH
            CMP.W       N_INTSEC,D1
            BNE.S       HORZ_2
```

***** Set match code according to D7
```
HORZ_MAH    TST.L       D7
            BNE.S       HORZ_5
            MOVE.W      #3,MAH_COD
            BRA.S       HORZ_6
HORZ_5      MOVE.W      #1,MAH_COD
```

***** Adjust A5 points to VECSEG when it is a convergence vector
```
HORZ_6      MOVE.L      A5,D0
            BTST.L      #0,D0
            BEQ.S       HORZ_7
            SUBQ.L      #1,D0
            MOVEA.L     D0,A5
            MOVEA.L     (A5),A5
```

***** Check whether the vectors in VECSEG is a horizontal line
```
HORZ_7      TST.W       12(A5)
            BGE.S       HORZ_2
            MOVE.W      4(A5),D0
            CMP.W       8(A5),D0
            BNE.S       HORZ_2
```

***** Horizontal line desegmentation
```
            BSR         HORZDSG
            TST.B       COMB_FL
            BNE         H_UPDATE
            BRA.S       HORZ_2

DFF_CHK     CMP.B       #DIVERG,TYPE
            BEQ.S       CHK_H
            CMP.W       #OPNCON,TYPE
            BEQ.S       CHK_H
            CMP.W       #OPNDIV,TYPE
            BEQ.S       CHK_H
            CMP.W       #CONOPN,TYPE
            BNE.S       DL_PUT
```

```
CHK_H      MOVE.W     4(A1),D2
           CMP.W      8(A1),D2
           BNE.S      DL_PUT
           MOVE.W     6(A1),D2
           SUB.W      2(A1),D2
           BGE.S      CHK_H1
           NEG.W      D2
CHK_H1     ADDQ.W     #1,D2
           TST.B      CHAR_FLG
           BNE.S      DL_PUT
           CMP.W      #MINLEN,D2
           BGE.S      DL_PUT
           RTS

DL_PUT     TST.L      PRI_VEC
           BEQ.S      LPUT_REG
           MOVEA.L    PRI_VEC,A4
           MOVEM.W    (A4),D0-D1
           CMP.W      N_INTSEC,D0
           BEQ.S      LPUT_REG
           CMP.W      N_INTSEC,D1
           BEQ.S      LPUT_REG
           CMP.W      D1,D0
           BPL.S      DL_PUT1
           MOVE.W     N_INTSEC,(A4)
           BRA.S      LPUT_REG
DL_PUT1    MOVE.W     N_INTSEC,2(A4)
LPUT_REG   GETADRS    LINESEG,#16
           MOVEA.L    A0,A4
           BSR        STLNKPTR
           MOVE.L     2(A1),D0
           MOVE.L     #0,D7
           JSR        LINK
           MOVE.L     6(A1),D0
           MOVE.L     #4,D7
           JSR        LINK
           MOVE.W     4(A1),D0
           CMP.W      8(A1),D0
           BNE.S      LPUT_NH
           MOVE.L     #0,PRI_VEC
           MOVE.W     N_INTSEC,(A4)+
           MOVE.W     N_INTSEC,(A4)+
           BRA.S      LPUT_MV
LPUT_NH    MOVE.L     A4,PRI_VEC
           MOVE.W     N_INTSEC,(A4)+
           MOVE.W     #0,(A4)+
LPUT_MV    GETADRS    VECSEG,#14
           MOVE.L     A0,(A4)+
           .MOVEW     A1,A0
           BRA        D_RTN

D_MULNS    TST.B      LINE_FL
           BEQ.S      D_CURV

**** LINES IN THE BUFFER

D_LINES    GETADRS    LINESEG,#16
           MOVEA.L    A0,A4
           BSR        STLNKPTR
           MOVE.L     2(A1),D0
           MOVE.L     #0,D7
           JSR        LINK
           MOVE.L     6(A1),D0
           MOVE.L     #4,D7
           JSR        LINK
           MOVE.W     N_INTSEC,(A4)+
           MOVE.W     #0,(A4)+
           GETADRS    VECSEG,#14
           MOVE.L     A0,(A4)+
           .MOVEW     A1,A0
           MOVE.W     #-1,(A0)+
           TST.W      (A1)
           BGE.S      D_LINES
           RTS
```

**** ARC IN THE BUFFER

```
D_CURV    MOVE.W    #0,N_OTHER

**** First endpoint desegmentation
DC1_PNT   MOVE.L    2(A1),D0
          MOVE.B    #1,PNT1_FL
          JSR       GETGRID
          BNE.S     DC1_FWD1
DC1_BCK1  JSR       NXTGRID
          BEQ.S     DC2_PNT
          BRA.S     DC1_FWD1
D1_BCK2   JSR       NXTRECD
          BEQ.S     DC1_BCK1
DC1_FWD1  TST.L     PRI_VEC
          BEQ.S     CGET_IT1
          CMPA.L    PRI_VEC,A4
          BNE.S     D1_BCK2
CGET_IT1  MOVE.W    (A4),D0
          MOVE.W    2(A4),D1
          MOVEA.L   4(A4),A5
*         TST.L     PRI_VEC
*         BNE.S     DC1_MAH
*         CMP.W     N_INTSEC,D0
*         BEQ.S     DC1_MAH
*         CMP.W     N_INTSEC,D1
*         BNE.S     D1_BCK2
DC1_MAH   TST.L     D7
          BNE.S     MAH_3
          MOVE.W    #3,MAH_COD
          BRA.S     DC_FWD1
MAH_3     MOVE.W    #1,MAH_COD
          BRA.S     DC_FWD1

**** Second endpoint desegmentation
DC2_PNT   MOVE.L    A1,-(A7)
DC2_BCK2  CMP.W     #1,(A1)
          BNE.S     DC2_FWD2
          ADDA.L    #12,A1
          BRA.S     DC2_BCK2
DC2_FWD2  MOVE.L    -6(A1),D0
          MOVEA.L   (A7)+,A1
          MOVE.B    #0,PNT1_FL
          JSR       GETGRID
          BNE.S     DC2_FWD1
DC2_BCK1  JSR       NXTGRID
          BEQ       DC_PUT
          BRA.S     DC2_FWD1
D2_BCK2   JSR       NXTRECD
          BEQ.S     DC2_BCK1
DC2_FWD1  TST.L     PRI_VEC
          BEQ.S     CGET_IT2
          CMPA.L    PRI_VEC,A4
          BNE.S     D2_BCK2
CGET_IT2  MOVE.W    (A4),D0
          MOVE.W    2(A4),D1
          MOVEA.L   4(A4),A5
*         TST.L     PRI_VEC
*         BNE.S     DC2_MAH
*         CMP.W     N_INTSEC,D0
*         BEQ.S     DC2_MAH
*         CMP.W     N_INTSEC,D1
*         BNE.S     D2_BCK2
DC2_MAH   TST.L     D7
          BNE.S     MAH_4
          MOVE.W    #4,MAH_COD
          BRA.S     DC_FWD1
MAH_4     MOVE.W    #2,MAH_COD

**** Adjust A5 points to VECSEG when it is convergence vector
DC_FWD1   MOVE.L    A5,D0
          BTST.L    #0,D0
          BEQ.S     DC_FWD3
```

```
                SUBQ.L      #1,D0
                MOVEA.L     D0,A5
                MOVEA.L     (A5),A5

**** arc closeness checking
DC_FWD3         BSR         MAHDST
                CMPA.L      #SQCGAP,A6
                BHI.S       D_BCK2

**** ARC DESEGMENTATION

BSR         CCOBINE
                TST.B       COMB_FL
                BNE.S       UPDT_C
                TST.L       PRI_VEC
                BNE         DC_PUT
D_BCK2          TST.B       PNT1_FL
                BNE         D1_BCK2
                BRA         D2_BCK2

UPDT_C          JSR         UNLINK
                MOVE.W      MAH_COD,D0
                CMP.W       #2,D0
                BGT.S       UPDT_3_4
UPDT_1_2        MOVE.L      #4,D7
                MOVE.L      A1,-(A7)
UPDT_C5         CMP.W       #1,(A1)
                BNE.S       UPDT_C4
                ADDA.L      #12,A1
                BRA.S       UPDT_C5
UPDT_C4         MOVE.L      -6(A1),D0
                MOVEA.L     (A7)+,A1
                BRA.S       C_LNK
UPDT_3_4        MOVE.L      #0,D7
                MOVE.L      2(A1),D0
C_LNK           JSR         LINK
                TST.L       PRI_VEC
                BEQ.S       UPDT_C1
                MOVE.L      A4,PRI_VEC
                BSR         STLNKPTR
                BRA.S       UPDT_C3
UPDT_C1         MOVE.L      A4,PRI_VEC
                BSR         STLNKPTR
                MOVE.W      N_INTSEC,D0
                CMP.W       (A4),D0
                BEQ.S       UPDT_C2
                MOVE.W      N_OTHER,2(A4)
                BRA.S       UPDT_C3
UPDT_C2         MOVE.W      N_OTHER,(A4)
UPDT_C3         LEA         4(A4),A4
                BSR         RSRVBUFR
                MOVE.L      A0,(A4)+
DC_BCK2         MOVEW       A1,A0
                TST.W       (A1)
                BGE.S       DC_BCK2
                BRA         D_RTN

DC_PUT          GETADRS     LINESEG,#16
                MOVE.L      A0,A4
                MOVE.L      A4,PRI_VEC
                BSR         STLNKPTR
                MOVE.L      2(A1),D0
                MOVE.L      #0,D7
                JSR         LINK
                MOVE.L      A1,-(A7)
DC_PUT2         CMP.W       #1,(A1)
                BNE.S       DC_PUT1
                ADDA.L      #12,A1
                BRA.S       DC_PUT2
DC_PUT1         MOVE.L      -6(A1),D0
                MOVEA.L     (A7)+,A1
                MOVE.L      #4,D7
                JSR         LINK
                MOVE.W      N_INTSEC,(A4)+
```

```
            MOVE.W      #0,(A4)+
            BSR         RSRVBUFR
            MOVE.L      A0,(A4)+
            BRA.S       DC_BCK2

NON_LINE    CMP.W       #$300,(A1)
            BEQ.S       NL_PUT
            MOVEA.L     NONLINE,A4
NL_BCK1     MOVE.W      (A4)+,D0
            BPL.S       NL_FWD1
            CMP.W       #EOBLK,D0
            BNE.S       NL_PUT
            MOVE.L      (A4),A4
            BRA.S       NL_BCK1
NL_FWD1     MOVE.W      (A4)+,D1
            MOVEA.L     (A4)+,A5
*           CMP.W       N_INTSEC,D0
*           BEQ.S       NL_FWD2
*           CMP.W       N_INTSEC,D1
*           BNE.S       NL_BCK1
NL_FWD2     JSR         PLYMERGE
            BEQ.S       NL_BCK1
NL_UPDTE    LEA         -8(A4),A6
            MOVE.W      N_INTSEC,D0
            CMP.W       (A6),D0
            BEQ.S       NL_CLR1
            MOVE.W      #0,2(A6)
            BRA.S       NL_CLR2
NL_CLR1     MOVE.W      #0,(A6)
NL_CLR2     LEA         4(A6),A6
            BRA.S       FPLY

NL_PUT      GETADRS     NONLINE,#8
            MOVE.L      A0,A6
            MOVE.W      N_INTSEC,(A6)+
            MOVE.W      #0,(A6)+
D_DOT       CMP.W       #$300,(A1)
            BNE.S       FPLY

***** Filled dot.
            GETADRS     VECSEG,#12
            MOVE.L      A0,(A6)+
            MOVE.W      (A1)+,(A0)+
            MOVE.W      (A1)+,(A0)+
            MOVE.W      (A1)+,(A0)+
            MOVE.W      (A1)+,(A0)+
            MOVE.W      (A1)+,(A0)+
            BRA.S       D_RTN

***** filled polygon
FPLY        MOVE.L      #0,D0
            MOVEA.L     A1,A2
FPLY_LP1    TST.W       (A2)+
            BLT.S       FPLY_1
            ADDQ.L      #2,D0
            BRA.S       FPLY_LP1
FPLY_1      ADDQ.L      #2,D0
            GETADRS     VECSEG,D0
            MOVE.L      A0,(A6)+
FPLY_LP2    TST.W       (A1)
            BLT.S       D_RTN
            MOVE.W      (A1)+,(A0)+
            BRA.S       FPLY_LP2
D_RTN       MOVE.W      #-1,(A0)+
            RTS

************************************************************
* RSRVBUFR - Reserve a buffer in VECSEG for BUFFER.
*
* RTN: A0 -> VECSEG
*      A1 -> BUFFER
*      D0 = BUFFER length in bytes
*      All other registers unchanged.
************************************************************
```

```
RSRVBUFR LEA      BUFFER,A1
         CLR.L    D0
RSRV1    TST.B    (A1,D0)
         BMI.S    RSRV2
         ADDI.L   #12,D0
         BRA.S    RSRV1
RSRV2    ADDI.L   #2,D0
         GETADRS  VECSEG,D0
         RTS
```

```
***********************************************************
*
* STLNKPTR - Store the pointer of output vector
*            for trapezoid & blob record
*
* INPUT:    A3 contains the content of TB_PHEAD
*           A4 -) address of output vector
*
* OUTPUT:   A4 is put into the LINKPTR chain
*           A0 & A3 are destroyed
*
***********************************************************

STLNKPTR GETADRS  LINKPTR,#8
         MOVE.L   A4,(A0)
         MOVE.L   #0,4(A0)
         TST.L    ENT_PTR(A3)
         BEQ.S    LNKPTR_4
         CMP.L    #-1,ENT_PTR(A3)
         BNE.S    LNKPTR_1
LNKPTR_4 MOVE.L   A0,ENT_PTR(A3)
         RTS
LNKPTR_1 MOVEA.L  ENT_PTR(A3),A6
LNKPTR_2 TST.L    4(A6)
         BEQ.S    LNKPTR_3
         MOVEA.L  4(A6),A6
         BRA.S    LNKPTR_2
LNKPTR_3 MOVE.L   A0,4(A6)
         RTS
```

```
***********************************************************************
*    MATCH
*       INPUT:    D0-D7 contain the coordinates of the four end points of
*                 two vectors.  They are x1,y1,x2,y2,x3,y3,x4,and y4.
*       OUTPUT:   A2 contains the match code
*                 1: 1-4
*                 2: 2-4
*                 3: 1-3
*                 4: 2-3
*                 A6 contains the minimum distance
***********************************************************************

XDEF     MATCH

MATCH    MOVEM.L  D0-D7/A0-A1/A3-A5,-(A7)
         MOVEM.W  D1/D4-D7,-(A7)
         MOVEM.W  (A7)+,A0-A1/A3-A5
         MOVEA.L  #$7FFFFFFF,A6
M_1_4    MOVE.W   D0,D4
         MOVE.W   D1,D5
         JSR      SQDIST
         CMPA.L   D1,A6
         BLT.S    M_2_4
         MOVEA.L  D1,A6
         MOVEA.W  #1,A2
M_2_4    MOVE.W   D2,D4
         MOVE.W   D3,D5
         JSR      SQDIST
         CMPA.L   D1,A6
         BLT.S    M_1_3
         MOVEA.L  D1,A6
         MOVEA.W  #2,A2
```

```
M_1_3    MOVE.W    A0,D1
         MOVE.W    A1,D4
         MOVE.W    A3,D5
         MOVE.W    D0,D6
         MOVE.W    D1,D7
         JSR       SQDIST
         CMPA.L    D1,A6
         BLT.S     M_2_3
         MOVEA.L   D1,A6
         MOVEA.W   #3,A2
M_2_3    MOVE.W    D2,D6
         MOVE.W    D3,D7
         JSR       SQDIST
         CMPA.L    D1,A6
         BLT.S     M_RTN
         MOVEA.L   D1,A6
         MOVEA.W   #4,A2
M_RTN    MOVE.W    A2,MAH_COD
         MOVEM.L   (A7)+,D0-D7/A0-A1/A3-A5
         RTS
************************************************************************
*    HORZDSG - HORIZONTAL LINES DESEGMENTATION                          *
*       INPUT:   A1 points to the beginning of BUFFER                   *
*                A5 points to the location of the vector which is in the*
*                VEC_SEG area                                           *
*       OUTPUT:  COMB_FL will be set if the vectors can be combined     *
*                BUFFER will be updated to contain the new vector after *
*                the desegmentation if those vectors can be combined.   *
*                Otherwise, the content of BUFFER will not be changed   *
************************************************************************
         XDEF      HORZDSG

HORZGAP  EQU       13
HWDTHDIF EQU       3

HORZDSG  MOVEM.L   D0-D7/A0-A6,-(A7)
         MOVE.B    #0,COMB_FL
         MOVEM.W   2(A1),D0-D3
         MOVE.W    10(A1),A4
         MOVEM.W   2(A5),D4-D7
         MOVE.W    10(A5),A6
**** check the gap between two horizontal lines
         MOVE.W    D5,-(A7)
         SUB.W     D1,D5
         BGE.S     HD_FWD1
         NEG.W     D5
HD_FWD1  MOVEA.W   D5,A2
         MOVE.W    (A7)+,D5
         CMPA.W    #HORZGAP,A2
         BHI       HD_RTN
**** are both lines overlap somewhere
         CMP.W     D0,D2
         BGE.S     HD_FWD8
         MOVEA.W   D0,A3
         MOVE.W    D2,D0
         MOVE.W    A3,D2
HD_FWD8  CMP.W     D4,D6
         BGE.S     HD_FWD9
         MOVEA.W   D4,A3
         MOVE.W    D6,D4
         MOVE.W    A3,D6
HD_FWD9  CMP.W     D0,D6
         BLT       HD_RTN
         CMP.W     D2,D4
         BGT       HD_RTN
**** pick the longest two end points
         CMP.W     D0,D4
         BLE.S     HD_FWD2
         MOVE.W    D0,D4
HD_FWD2  CMP.W     D2,D6
         BGE.S     HD_FWD3
         MOVE.W    D2,D6
**** check the width difference between two horizontal lines
```

```
HD_FWD3    MOVEM.W    A4/A6,-(A7)
           MOVEM.W    (A7)+,D0/D2
           SUB.W      D0,D2
           BGE.S      HD_FWD4
           NEG.W      D2
HD_FWD4    CMP.W      #HWDTHDIF,D2
           BGT.S      HD_FWD5
           MOVE.W     6(A1),D2
           SUB.W      2(A1),D2
           MOVE.W     6(A5),D3
           SUB.W      2(A5),D3
           MOVEA.W    D2,A2
           MOVEA.W    D3,A3
           CMP.W      D2,D3
           BGT.S      HD_1
           ANDI.L     #$FFFF,D2
           DIVU.W     D3,D2
           MOVE.W     D2,D0
           BRA.S      HD_2
HD_1       ANDI.L     #$FFFF,D3
           DIVU.W     D2,D3
           MOVE.W     D3,D0
HD_2       CMP.W      #2,D0
           BGT.S      HD_3
**** compute average y value
           ADD.W      D1,D5
           ASR.W      #1,D5
           ADDA.W     A4,A6
           BRA.S      HD_FWD6
**** pick the y value and line width of the line which is longer
HD_3       CMPA.W     A2,A3
           BHI.S      HD_4
           MOVE.W     4(A1),D5
           MOVE.W     10(A1),A6
           BRA.S      HD_FWD6
HD_4       MOVE.W     4(A5),D5
           MOVE.W     10(A5),A6
           BRA.S      HD_FWD6
**** pick the y value of the line which has wider line width
HD_FWD5    CMPA.W     A4,A6
           BHI.S      HD_FWD6
           MOVEA.W    A4,A6
           MOVE.W     D1,D5
HD_FWD6    MOVE.W     D5,D7
           MOVE.W     A6,D3
HD_COMB    MOVE.B     #1,COMB_FL
           MOVE.W     #1,(A1)+
           MOVEM.W    D4-D7,(A1)
           ADDQ.L     #8,A1
           MOVE.W     D3,(A1)+
           MOVE.W     #-1,(A1)
HD_RTN     MOVEM.L    (A7)+,D0-D7/A0-A6
           RTS

****************************************************************************
*     MAHDST
*        INPUT:     A1 points to BUFFER
*                   A5 points to VECSEG
*                   MAH_COD contains the match code, 1: 1-4 2: 2-4 3: 1-3
*                   4: 2-3
*        OUTPUT:    A6 contains the distance of the two match points
****************************************************************************

XDEF       MAHDST

MAHDST     MOVEM.L    D0-D7/A1/A5,-(A7)
           MOVE.W     MAH_COD,D0
           CMP.W      #1,D0
           BNE.S      MAH_2_4
MAH_1_4    MOVEM.W    2(A1),D4-D5
MAH14_2    CMP.W      #1,(A5)
           BNE.S      MAH14_1
           ADDA.L     #12,A5
           BRA.S      MAH14_2
```

```
MAH14_1   MOVEM.W    -6(A5),D6-D7
          BRA.S      MAH_DST
MAH_2_4   CMP.W      #2,D0
          BNE.S      MAH_1_3
MAH24_2   CMP.W      #1,(A1)
          BNE.S      MAH24_1
          ADDA.L     #12,A1
          BRA.S      MAH24_2
MAH24_1   MOVEM.W    -6(A1),D4-D5
MAH24_4   CMP.W      #1,(A5)
          BNE.S      MAH24_3
          ADDA.L     #12,A5
          BRA.S      MAH24_4
MAH24_3   MOVEM.W    -6(A5),D6-D7
          BRA.S      MAH_DST
MAH_1_3   CMP.W      #3,D0
          BNE.S      MAH_2_3
          MOVEM.W    2(A1),D4-D5
          MOVEM.W    2(A5),D6-D7
          BRA.S      MAH_DST
MAH_2_3   CMP.W      #1,(A1)
          BNE.S      MAH23_1
          ADDA.L     #12,A1
          BRA.S      MAH_2_3
MAH23_1   MOVEM.W    -6(A1),D4-D5
          MOVEM.W    2(A5),D6-D7
MAH_DST   JSR        SQDIST
          MOVEA.L    D1,A6
          MOVEM.L    (A7)+,D0-D7/A1/A5
          RTS
```

```
***************************************************************************
*                                                                         *
*   ACCHK - ARC CLOSENESS CHECK                                           *
*                                                                         *
*       INPUT:   A1 points to the beginning of BUFFER area                *
*                A5 points to the location of the vector(s) which are in  *
*                the VEC_SEG                                              *
*                                                                         *
*       OUTPUT:  MAH_COD                                                  *
*                A6 contains the minimum distance                         *
*                                                                         *
***************************************************************************
```

```
          XDEF       ACCHK
ACCHK     MOVEM.L    D0-D7/A0-A5,-(A7)
          MOVEM.W    2(A1),D0-D1           x1,y1
AC_BCK1   CMP.W      #1,(A1)
          BNE.S      AC_FWD1
          ADD.L      #12,A1
          BRA.S      AC_BCK1
AC_FWD1   MOVEM.W    -6(A1),D2-D3          x2,y2
          MOVEM.W    2(A5),D4-D5           x3,y3
AC_BCK2   CMP.W      #1,(A5)
          BNE.S      AC_FWD2
          ADD.L      #12,A5
          BRA.S      AC_BCK2
AC_FWD2   MOVEM.W    -6(A5),D6-D7          x4,y4
          JSR        MATCH
          MOVEM.L    (A7)+,D0-D7/A0-A5
          RTS
```

```
****************************************************************************
*       PNTINLN - POINT IN LINE                                             *
*       INPUT:    D1,D2 contain the coordinate of a point                   *
*                 D3-D6 contain the two end points of a line segment        *
*       OUTPUT:   The Z bit will be set if the point is not inside the Y    *
*                 range of the line segment                                 *
*                 all registers are preserved                               *
****************************************************************************

PNTINLN   MOVEM.L   D0-D6,-(A7)
          CMP.W     D4,D6
          BGE.S     PNT_1
          MOVE.W    D4,-(A7)
          MOVE.W    D6,D4
          MOVE.W    (A7)+,D6
PNT_1     CMP.W     D4,D2
          BLT.S     NOT_IN
          CMP.W     D6,D2
          BGT.S     NOT_IN
          MOVE.W    #1,D0
          BRA.S     PNT_RTN
NOT_IN    MOVE.W    #0,D0
PNT_RTN   MOVEM.L   (A7)+,D0-D6
          RTS

****************************************************************************
*       PNTONLN - POINT INSIDE THE RANGE OF A LINE SEGMENT                  *
*       INPUT:    D0-D3 contain the coordinates of a line segment           *
*                 D4-D5 contain the coordinate of a point                   *
*       OUTPUT:   If the point is inside the window of the line segment     *
*                 D7 = 1, otherwise, D7 = 0.                                *
****************************************************************************

PNTONLN   MOVEM.L   D0-D3,-(A7)
          CMP.W     D0,D2
          BGE.S     PNTONLN1
          MOVE.W    D0,-(A7)
          MOVE.W    D2,D0
          MOVE.W    (A7)+,D2
PNTONLN1  CMP.W     D1,D3
          BGE.S     PNTONLN2
          MOVE.W    D1,-(A7)
          MOVE.W    D3,D1
          MOVE.W    (A7)+,D3
PNTONLN2  CMP.W     D0,D4
          BLT.S     NOTON
          CMP.W     D2,D4
          BGT.S     NOTON
          CMP.W     D1,D5
          BLT.S     NOTON
          CMP.W     D3,D5
          BGT.S     NOTON
ON        MOVE.L    #1,D7
          BRA.S     PNT_RTN
NOTON     MOVE.L    #0,D7
PNT_RTN   MOVEM.L   (A7)+,D0-D3
          RTS

****************************************************************************
*    LCOBINE - LINE COMBINATION                                             *
*       INPUT:    A1 points to the beginning of BUFFER area                 *
*                 A5 points to the location of the vector(s) which is in    *
*                 the VEC_SEG                                               *
*       OUTPUT:   COMB_FL will be set if the vectors can be combined        *
*                 BUFFER will be updated to contain the new vector(s) after *
*                 the desegmentation if those vectors can be combined.      *
*                 Otherwise, the content of BUFFER will not be changed      *
****************************************************************************

XDEF      LCOBINE

LCOBINE   MOVEM.L   D0-D7/A0-A5,-(A7)
          MOVE.B    #0,COMB_FL
          MOVE.W    4(A1),D0
          CMP.W     8(A1),D0
          BNE.S     LC_FWD1
          CMP.W     #1,10(A1)
          BEQ       L_RTN
```

```
LC_FWD1   MOVE.W     MAH_COD,A2
          MOVEM.W    2(A1),D0-D3
          MOVEM.W    2(A5),D4-D7
LC_1_4    CMPA.W     #1,A2
          BNE.S      LC_2_4
          MOVEM.W    D0-D1/D6-D7,-(A7)
          MOVEM.W    D2-D3,-(A7)
          MOVEM.W    D4-D5,-(A7)
          BRA.S      LC_FWD2
LC_2_4    CMPA.W     #2,A2
          BNE.S      LC_1_3
          MOVEM.W    D2-D3/D6-D7,-(A7)
          MOVEM.W    D0-D1,-(A7)
          MOVEM.W    D4-D5,-(A7)
          BRA.S      LC_FWD2
LC_1_3    CMPA.W     #3,A2
          BNE.S      LC_2_3
          MOVEM.W    D0-D1/D4-D5,-(A7)
          MOVEM.W    D2-D3/D6-D7,-(A7)
          BRA.S      LC_FWD2
LC_2_3    MOVEM.W    D2-D5,-(A7)
          MOVEM.W    D0-D1/D6-D7,-(A7)
LC_FWD2   MOVEM.W    (A7)+,D3-D6
          MOVEM.W    (A7)+,A0/A2-A4
          MOVE.W     A0,D1
          MOVE.W     A2,D2
          BSR        PNTINLN
          BEQ        L_RTN
          JSR        RELPOS
          JSR        ABS
          MOVE.W     A3,D1
          MOVE.W     A4,D2
          BSR        PNTINLN
          BEQ        L_RTN
          MOVE.L     D0,-(A7)
          JSR        RELPOS
          JSR        ABS
          MOVEM.W    D3-D6,-(A7)
          MOVEM.W    (A7)+,D4-D7
          JSR        DISTANCE
          MOVE.L     (A7)+,D2
          DIVU.W     D1,D0
          MOVE.W     EPSILON,D3
          ADDQ.W     #2,D3
          CMP.W      D3,D0
          BGT.S      L_RTN
          DIVU.W     D1,D2
          CMP.W      D3,D2
          BGT.S      L_RTN
          MOVE.W     10(A1),D3
          ADD.W      10(A5),D3
          ASR.W      #1,D3
          MOVE.W     D3,-(A7)
          MOVE.W     4(A1),D0
          MOVE.W     8(A1),D1
          MOVE.W     4(A5),D2
          MOVE.W     8(A5),D3
          CMP.W      D0,D1
          BGE.S      LC_FWD3
          MOVE.W     D0,-(A7)
          MOVE.W     D1,D0
          MOVE.W     (A7)+,D1
LC_FWD3   CMP.W      D2,D3
          BGE.S      LC_FWD4
          MOVE.W     D2,-(A7)
          MOVE.W     D3,D2
          MOVE.W     (A7)+,D3
LC_FWD4   CMP.W      D2,D0
          BLT.S      LC_COMB
          CMP.W      D3,D0
          BGT.S      LC_COMB
          CMP.W      D2,D1
          BLT.S      LC_COMB
```

```
                CMP.W       D3,D1
                BGT.S       LC_COMB
                MOVEM.W     2(A5),D4-D7
LC_COMB         MOVE.B      #1,COMB_FL
                MOVEA.L     BUF_PTR,A1
                MOVE.W      #1,(A1)+
                MOVEM.W     D4-D7,(A1)
                ADDQ.L      #8,A1
                MOVE.W      (A7)+,(A1)+
                MOVE.W      #-1,(A1)
L_RTN           MOVEM.L     (A7)+,D0-D7/A0-A5
                RTS
*************************************************************************
*       CCOBINE - CURVE COMBINATION                                      *
*       INPUT:      A1 points to the beginning of BUFFER                 *
*                   A5 points to the location of the vector(s) which is in *
*                   the VEC_SEG                                          *
*       OUTPUT:     COMB_FL will be set if the vectors can be combined   *
*                   BUFFER will be updated to contain the new vectors after *
*                   the desegmentation if those vectors can be combined. *
*                   Otherwise, the content of BUFFER will not be changed *
*************************************************************************
                XDEF        CCOBINE

COS100          EQU         -1
MAXDIFF         SET         9

CCOBINE         MOVEM.L     D0-D7/A0-A6,-(A7)
                MOVE.B      #0,COMB_FL
                MOVE.W      4(A1),D0
                CMP.W       8(A1),D0
                BNE.S       CC_FWD1
                CMP.W       #1,10(A1)
                BEQ         C_RTN
CC_FWD1         MOVE.L      A1,-(A7)
CC_BCK1         CMP.W       #1,(A1)
                BNE.S       CC_FWD2
                ADDA.L      #12,A1
                BRA.S       CC_BCK1
CC_FWD2         ADDQ.L      #2,A1
                MOVE.L      A1,BUF_PTR
                MOVEA.L     (A7)+,A1

***** Compute the length ratio between these two entities
*****      A1 -> BUFFER     A5 -> VECSEG
CC_RAT          CLR.L       D2
                MOVE.L      A1,-(A7)
RAT_1_LP        CMP.W       #1,(A1)
                BNE.S       RAT_ANO
                MOVEM.W     2(A1),D4-D7
                JSR         SQDIST
                CMP.L       D2,D1
                BMI.S       RAT_1
                MOVE.L      D1,D2
RAT_1           ADD.L       #12,A1
                BRA.S       RAT_1_LP
RAT_ANO         CLR.L       D3
                MOVE.L      (A7)+,A1
                MOVE.L      A5,-(A7)
RAT_2_LP        CMP.W       #1,(A5)
                BNE.S       RAT_CMP
                MOVEM.W     2(A5),D4-D7
                JSR         SQDIST
                CMP.L       D3,D1
                BMI.S       RAT_2
                MOVE.L      D1,D3
RAT_2           ADD.L       #12,A5
                BRA.S       RAT_2_LP
RAT_CMP         MOVE.L      (A7)+,A5
                CMP.L       D2,D3
                BGE.S       C_D3D2
C_D2D3          TDIVU.L     D3,D2
                MOVE.L      D2,D4
                BRA.S       CC_FWD3
```

```
C_D3D2    IDIVU.L    D2,D3
          MOVE.L     D3,D4
CC_FWD3   CMP.L      #MAXDIFF,D4                              84
          BGE.S      C_RTN

***** ANGLE CHECKING. DEPENDING ON THEIR DIFFERENT COMBINATION OF ENDPOINTS
***** GO TO DIFFERENT ROUTINE.  IF ANGLE FALLS INTO THE CRITERIA, THE CORRECT
***** ORDER OF VECTORS WILL BE ARRANGED IN THE BUFFER.
          MOVE.W     MAH_COD,A2
CC_1_4    CMPA.W     #1,A2
          BNE.S      CC_2_4
          BSR.S      CDSG14
          BRA.S      ANG_TST
CC_2_4    CMPA.W     #2,A2
          BNE.S      CC_1_3
          BSR        CDSG24
          BRA.S      ANG_TST
CC_1_3    CMPA.W     #3,A2
          BNE.S      CC_2_3
          BSR        CDSG13
          BRA.S      ANG_TST
CC_2_3    BSR        CDSG23
ANG_TST   BEQ.S      C_RTN

***** CONVEXITY TESTING
***** BUF_PTR -> the beginning of vectors which are in sequential order
CHK_CVX   MOVEA.L    BUF_PTR,A0
          BSR        CONVEX
          TST.B      CVX_FLG
          BEQ.S      C_RTN

***** CIRCULAR ARC CHECKING
***** A0 -> the beginning of vectors which are in sequential order
CHK_CARC  BSR        CARCCHK
          TST.B      CARC_FLG
          BEQ.S      C_RTN
          MOVE.B     #1,COMB_FL
          MOVEA.L    #BUFFER,A1
CC_LOOP   MOVE.W     A0,A1
          TST.W      (A0)
          BGE.S      CC_LOOP
          MOVE.W     #-1,(A1)
C_RTN     MOVE.L     #BUFFER,BUF_PTR
          MOVEM.L    (A7)+,D0-D7/A0-A6
          RTS

************************************************************************
*   CARCCHK - CIRCULAR ARC CHECKING                                     *
*      INPUT:    A0 points to the beginning of vectors.  The format of  *
*                vectors is as follows:                                 *
*                  type x y x y w type x y x y w type x y x y w ...     *
*                  type x y x y w type x y x y w -1                     *
*      OUTPUT:   flag CARC_FLG will be set if it is a circular arc.     *
*                Otherwise, CARC_FLG will be cleared. All registers are *
*                unchanged.                                             *
************************************************************************

XDEF       CARCCHK

MAXRDIFF  EQU        30

CARCCHK   MOVEM.L    D0-D7/A0-A4,-(A7)
          MOVE.B     #0,CARC_FLG
          MOVE.B     #0,COUNTER
          MOVEA.L    A0,A1
CARC_LP   CMP.W      #1,(A1)
          BNE.S      CARC_1
          ADDQ.B     #1,COUNTER
          ADD.L      #12,A1
          BRA.S      CARC_LP
CARC_1    MOVEM.W    2(A0),D4-D5
          MOVEM.W    -6(A1),D6-D7
          JSR        SQDIST
```

```
            CMP.L       #900,D1
            BLE         CARC_Y
            MOVE.W      D4,D0
            MOVE.W      D5,D1
            MOVE.W      D6,D4
            MOVE.W      D7,D5
            MOVE.L      A0,-(A7)
            MOVE.B      COUNTER,D7
            ASR.B       #1,D7
CARC_2      ADD.L       #12,A0
            SUBQ.B      #1,D7
            BNE.S       CARC_2
            MOVEM.W     2(A0),D2-D3
            JSR         ARCCNT
            MOVEA.L     (A7)+,A0
            TST.W       D0
            BLT.S       CARC_RTN
            MOVE.L      #$FFFF8000,D3
            MOVE.L      D3,D4
            AND.L       D0,D3
            BNE.S       CARC_Y
            AND.L       D1,D4
            BNE.S       CARC_Y
            MOVEM.W     D0-D2,-(A7)
            MOVEM.W     (A7)+,A2-A4
CARC_3      MOVE.W      A2,D1
            MOVE.W      A3,D2
            MOVEM.W     2(A0),D3-D6
            JSR         RELPOS
            JSR         ABS
            MOVEM.W     D3-D6,-(A7)
            MOVEM.W     (A7)+,D4-D7
            JSR         DISTANCE
            DIVU.W      D1,D0
            MOVE.W      A4,D1
            CMP.W       D0,D1
            BLT.S       CARC_4
            SUB.W       D0,D1
            MOVE.W      D1,D2
            BRA.S       CARC_5
CARC_4      SUB.W       D1,D0
            MOVE.W      D0,D2
CARC_5      CMP.W       #MAXRDIFF,D2
            BGE.S       CARC_RTN
            ADDA.L      #12,A0
            CMPA.L      A0,A1
            BNE         CARC_3
CARC_Y      MOVE.B      #1,CARC_FLG
CARC_RTN    MOVEM.L     (A7)+,D0-D7/A0-A4
            RTS

*********************************************************************
*   CONVEX - CONVEX TEST                                             *
*       INPUT:   A0 points to the beginning of vectors. The format of *
*                vectors is as follows:                              *
*                  type x y x y w type x y x y w type x y x y w type...*
*                  type x y x y w type x y x y w -1                  *
*       OUTPUT:  flag CVX_FLG will be set if it is convex, and A0 will be*
*                unchanged. Otherwise, CVX_FLG will be clear and A0 will*
*                points to the location of breakpoint.               *
*********************************************************************

CONVEX      MOVEM.L     D1-D7/A1-A2,-(A7)
            CLR.B       CVX_FLG
            CLR.B       COUNTER
            MOVE.L      A0,-(A7)
            ADD.L       #12,A0
            MOVE.W      -10(A0),D3
            MOVE.W      -8(A0),D4
            MOVE.W      -6(A0),D1
            MOVE.W      -4(A0),D2
            MOVE.W      6(A0),D5
            MOVE.W      8(A0),D6
```

```
                JSR         RELPOS
                MOVEM.W     D3-D6,-(A7)
                MOVEM.W     (A7)+,D4-D7
                JSR         DISTANCE
                DIVS.W      D1,D0
COVX_1          CLR.B       TRYFLG
COVX            MOVE.W      D0,-(A7)
                ADD.L       #12,A0
                TST.W       (A0)
                BLT.S       CVX_FWD1
                MOVE.W      -10(A0),D3
                MOVE.W      -8(A0),D4
                MOVE.W      -6(A0),D1
                MOVE.W      -4(A0),D2
                MOVE.W      6(A0),D5
                MOVE.W      8(A0),D6
                JSR         RELPOS
                MOVEM.W     D3-D6,-(A7)
                MOVEM.W     (A7)+,D4-D7
                JSR         DISTANCE
                DIVS.W      D1,D0
                MOVE.W      (A7),D2
                EOR.W       D0,(A7)+
                BGE.S       COVX_1
                TST.W       D0
                BGE.S       CVX_FWD2
                NEG.W       D0
CVX_FWD2        CMP.W       #0,D0
                BGT.S       NO_CVX
                TST.B       TRYFLG
                BNE.S       NO_CVX
                MOVE.B      #1,TRYFLG
                MOVE.W      D2,D0
                BRA.S       COVX
NO_CVX          MOVEA.L     (A7)+,A1
                ADD.L       #24,A1
                CMPA.L      A0,A1
                BNE.S       CVX_RTN
                SUB.L       #12,A0
                BRA.S       CVX_RTN
CVX_FWD1        MOVE.B      #1,CVX_FLG
                TST.W       (A7)+
                MOVEA.L     (A7)+,A0
CVX_RTN         MOVEM.L     (A7)+,D1-D7/A1-A2
                RTS

*********************************************************************
*   ARANGE - VECTOR DATABASE REARRANGEMENT                           *
*       INPUT:   BUF_PTR points to the beginning of free space in BUFFER *
*                A0 points to the location where vectors sequence need to *
*                be rearranged.                                      *
*                type x y x y w type x y x y w type x y x y w -1     *
*       OUTPUT:  vectors pointed by A0 have been rearranged          *
*********************************************************************

XDEF        ARANGE

ARANGE          MOVEM.L     D0/A0-A1,-(A7)
                CLR.W       D0
ARG_BCK1        TST.W       (A0)
                BLT.S       ARG_FWD1
                ADDQ.W      #1,D0
                ADD.L       #12,A0
                BRA.S       ARG_BCK1
ARG_FWD1        SUBQ.W      #1,D0
                MOVEA.L     BUF_PTR,A1
ARG_BCK2        SUBA.L      #12,A0
                MOVE.W      (A0),(A1)+
                MOVE.W      6(A0),(A1)+
                MOVE.W      8(A0),(A1)+
                MOVE.W      2(A0),(A1)+
                MOVE.W      4(A0),(A1)+
                MOVE.W      10(A0),(A1)+
```

```
            DBRA        D0,ARG_BCK2
            MOVE.W      #-1,(A1)
            MOVEA.L     BUF_PTR,A1
ARG_BCK3    MOVE.W      (A1)+,(A0)+
            BGE.S       ARG_BCK3
            MOVEM.L     (A7)+,D0/A0-A1
            RTS

*********************************************************************************
*       CDSG13 - ANGLE CHECKING IN THE ORDER OF 1 - 3                            *
*           INPUT:     A1 points to the beginning of BUFFER                      *
*                      A5 points to the location of the vector(s) which is in    *
*                      the VECSEG                                                *
*                      BUF_PTR points to next available space in BUFFER          *
*           OUTPUT:    D0 = 1 if angle falls into the criteria and the combined  *
*                      vectors will be in sequential order                       *
*                      D0 = 0 if angle is too sharp                              *
*********************************************************************************

COS100      SET         -1

CDSG13      MOVEM.W     2(A1),D0-D3
            MOVE.B      #0,COUNTER
            MOVE.L      A1,A2
D13_B1      CMP.W       #1,(A1)
            BNE.S       D13_F1
            ADDA.L      #12,A1
            ADDQ.B      #1,COUNTER
            BRA.S       D13_B1
D13_F1      MOVEM.W     2(A5),D4-D7
            JSR         INTSEC
            TST.W       D0
            BLT         D13_FAIL
            CMP.W       6(A2),D0
            BNE.S       D13_F2
            CMP.W       8(A2),D1
            BEQ         D13_FAIL
D13_F2      CMP.W       6(A5),D0
            BNE.S       D13_F3
            CMP.W       8(A5),D1
            BEQ         D13_FAIL

***** Find the correct endpoint in vector #1 for angle computation
D13_F3      MOVEM.W     D0-D1,-(A7)
            MOVEM.W     (A7)+,D4-D5
            TST.W       12(A2)
            BGE.S       D13_F4
            MOVEM.W     2(A2),D6-D7
            JSR         SQDIST
            MOVE.L      D1,D0
            MOVEM.W     6(A2),D6-D7
            JSR         SQDIST
            CMP.L       D1,D0
            BGT.S       D13_F5
D13_F4      MOVE.W      8(A2),-(A7)
            MOVE.W      6(A2),-(A7)
            BRA.S       D13_F6
D13_F5      MOVE.W      4(A2),-(A7)
            MOVE.W      2(A2),-(A7)

***** Find the correct endpoint in vector #2 for angle computation
D13_F6      TST.W       12(A5)
            BGE.S       D13_F7
            MOVEM.W     2(A5),D6-D7
            JSR         SQDIST
            MOVE.L      D1,D0
            MOVEM.W     6(A5),D6-D7
            JSR         SQDIST
            CMP.L       D1,D0
            BGT.S       D13_F8
D13_F7      MOVE.W      8(A5),-(A7)
            MOVE.W      6(A5),-(A7)
            BRA.S       D13_F9
```

```
D13_F8      MOVE.W      4(A5),-(A7)
            MOVE.W      2(A5),-(A7)
D13_F9      MOVEM.W     D4-D5,-(A7)
            MOVEM.W     (A7)+,D1-D2
            MOVEM.W     (A7)+,D3-D6
            JSR         COSINX
            CMP.W       #COS100,D0
            SGE.S       D13_FAIL
            MOVEA.L     BUF_PTR,A3
            MOVE.W      10(A2),D0
            ADD.W       10(A5),D0
            ASR.W       #1,D0
            MOVE.W      #0,D4
            MOVE.B      COUNTER,D4
            SUBQ.W      #1,D4
D13_B2      SUB.L       #12,A1
            MOVE.W      (A1),(A3)+
            MOVE.W      6(A1),(A3)+
            MOVE.W      8(A1),(A3)+
            MOVE.W      2(A1),(A3)+
            MOVE.W      4(A1),(A3)+
            MOVE.W      D0,(A3)+
            DBRA        D4,D13_B2
            MOVE.W      D1,-6(A3)
            MOVE.W      D2,-4(A3)
            MOVE.L      A3,-(A7)
D13_B3      TST.W       (A5)
            BLT.S       D13_FB
            MOVEM.W     (A5),D3-D7
            MOVEM.W     D3-D7,(A3)
            ADDA.L      #12,A5
            ADDA.L      #10,A3
            MOVE.W      D0,(A3)+
            BRA.S       D13_B3
D13_FB      MOVE.W      #-1,(A3)
            MOVEA.L     (A7)+,A3
            MOVE.W      D1,2(A3)
            MOVE.W      D2,4(A3)
            MOVE.W      #1,D0
            RTS
D13_FAIL    MOVE.W      #0,D0
            RTS

*******************************************************************
*   CDS814 - ANGLE CHECKING IN THE ORDER OF 1 - 4                  *
*       INPUT:   A1 points to the beginning of BUFFER              *
*                A5 points to the location of the vector(s) which is in *
*                the VCODES                                        *
*                BUF_PTR points to next available space in BUFFER  *
*       OUTPUT:  D0 = 1 if angle falls into the criteria and the combined *
*                vectors will be in sequential order               *
*                D0 = 0 if angle is too sharp                      *
*******************************************************************

COS100      SET         -1

CDS814      MOVEM.W     2(A1),D0-D3
            MOVE.L      A5,A6
D14_B1      CMP.W       #-1,(A5)
            BNE.S       D14_F1
            ADDA.L      #12,A5
            BRA.S       D14_B1
D14_F1      MOVEM.W     -10(A5),D4-D7
            JSR         INTSEC
            TST.W       D0
            BLT         D14_FAIL
            CMP.W       6(A1),D0
            BNE.S       D14_F2
            CMP.W       8(A1),D1
            BEQ         D14_FAIL
D14_F2      CMP.W       -10(A5),D0
            BNE.S       D14_F3
            CMP.W       -8(A5),D1
            BEQ         D14_FAIL
```

***** Find the correct endpoint in vector #1 for angle computation
```
D14_F3    MOVEM.W    D0-D1,-(A7)
          MOVEM.W    (A7)+,D4-D5
          TST.W      12(A1)
          BGE.S      D14_F4
          MOVEM.W    2(A1),D6-D7
          JSR        SQDIST
          MOVE.L     D1,D0
          MOVEM.W    6(A1),D6-D7
          JSR        SQDIST
          CMP.L      D1,D0
          BGT.S      D14_F5
D14_F4    MOVE.W     8(A1),-(A7)
          MOVE.W     6(A1),-(A7)
          BRA.S      D14_F6
D14_F5    MOVE.W     4(A1),-(A7)
          MOVE.W     2(A1),-(A7)
```

***** Find the correct endpoint in vector #2 for angle computation
```
D14_F6    TST.W      12(A6)
          BGE.S      D14_F7
          MOVEM.W    -6(A5),D6-D7
          JSR        SQDIST
          MOVE.L     D1,D0
          MOVEM.W    -10(A5),D6-D7
          JSR        SQDIST
          CMP.L      D1,D0
          BGT.S      D14_F8
D14_F7    MOVE.W     -8(A5),-(A7)
          MOVE.W     -10(A5),-(A7)
          BRA.S      D14_F9
D14_F8    MOVE.W     -4(A5),-(A7)
          MOVE.W     -6(A5),-(A7)
D14_F9    MOVEM.W    D4-D5,-(A7)
          MOVEM.W    (A7)+,D1-D2
          MOVEM.W    (A7)+,D3-D6
          JSR        COSINX
          CMP.W      #COS100,D0
          BGE.S      D14_FAIL
          MOVEA.L    BUF_PTR,A3
          MOVE.W     10(A1),D0
          ADD.W      -2(A5),D0
          ASR.W      #1,D0
D14_B2    TST.W      (A6)
          BLT.S      D14_FA
          MOVEM.W    (A6),D3-D7
          MOVEM.W    D3-D7,(A3)
          ADDA.L     #12,A6
          ADDA.L     #10,A3
          MOVE.W     D0,(A3)+
          BRA.S      D14_B2
D14_FA    MOVE.W     D1,-6(A3)
          MOVE.W     D2,-4(A3)
          MOVE.L     A3,-(A7)
D14_B3    TST.W      (A1)
          BLT.S      D14_FB
          MOVEM.W    (A1),D3-D7
          MOVEM.W    D3-D7,(A3)
          ADDA.L     #12,A1
          ADDA.L     #10,A3
          MOVE.W     D0,(A3)+
          BRA.S      D14_B3
D14_FB    MOVE.W     #-1,(A3)
          MOVEA.L    (A7)+,A3
          MOVE.W     D1,2(A3)
          MOVE.W     D2,4(A3)
          MOVE.W     #1,D0
          RTS
D14_FAIL  MOVE.W     #0,D0
          RTS
```

```
*********************************************************************
*       CDSG23 - ANGLE CHECKING IN THE ORDER OF 2 - 3                *
*          INPUT:    A1 points to the beginning of BUFFER            *
*                    A5 points to the location of the vector(s) which is in *
*                    the VECSEG                                      *
*                    BUF_PTR points to next available space in BUFFER *
*          OUTPUT:   D0 = 1 if angle falls into the criteria and the combined *
*                    vectors will be in sequential order             *
*                    D0 = 0 if angle is too sharp                    *
*********************************************************************

COS100    SET       -1

CDSG23    MOVEA.L   A1,A2
D23_B4    CMP.W     #1,(A1)
          BNE.S     D23_FC
          ADDA.L    #12,A1
          BRA.S     D23_B4
D23_FC    MOVEM.W   -10(A1),D0-D3
          MOVEM.W   2(A5),D4-D7
          JSR       INTSEC
          TST.W     D0
          BLT       D23_FAIL
          CMP.W     -10(A1),D0
          BNE.S     D23_F2
          CMP.W     -8(A1),D1
          BEQ       D23_FAIL
D23_F2    CMP.W     6(A5),D0
          BNE.S     D23_F3
          CMP.W     8(A5),D1
          BEQ       D23_FAIL

***** Find the correct endpoint in vector #1 for angle computation
D23_F3    MOVEM.W   D0-D1,-(A7)
          MOVEM.W   (A7)+,D4-D5
          TST.W     12(A2)
          BGE.S     D23_F4
          MOVEM.W   -6(A1),D6-D7
          JSR       SQDIST
          MOVE.L    D1,D0
          MOVEM.W   -10(A1),D6-D7
          JSR       SQDIST
          CMP.L     D1,D0
          BGT.S     D23_F5
D23_F4    MOVE.W    -8(A1),-(A7)
          MOVE.W    -10(A1),-(A7)
          BRA.S     D23_F6
D23_F5    MOVE.W    -4(A1),-(A7)
          MOVE.W    -6(A1),-(A7)

***** Find the correct endpoint in vector #2 for angle computation
D23_F6    TST.W     12(A5)
          BGE.S     D23_F7
          MOVEM.W   2(A5),D6-D7
          JSR       SQDIST
          MOVE.L    D1,D0
          MOVEM.W   6(A5),D6-D7
          JSR       SQDIST
          CMP.L     D1,D0
          BGT.S     D23_F8
D23_F7    MOVE.W    8(A5),-(A7)
          MOVE.W    6(A5),-(A7)
          BRA.S     D23_F9
D23_F8    MOVE.W    4(A5),-(A7)
          MOVE.W    2(A5),-(A7)
D23_F9    MOVEM.W   D4-D5,-(A7)
          MOVEM.W   (A7)+,D1-D2
          MOVEM.W   (A7)+,D2-D5
          JSR       COSINX
          CMP.W     #COS100,D0
          BGE       D24_FAIL
          MOVEQ.L   BUF_PTR,A3
          MOVE.W    -2(A1),D0
```

```
                ADD.W       -10(A5),D0
                ASR.W       #1,D0
D23_B2          TST.W       (A3)
                BLT.S       D23_FA
                MOVEM.W     (A3),D3-D7
                MOVEM.W     D3-D7,(A3)
                ADDA.L      #12,A2
                ADDA.L      #10,A3
                MOVE.W      D0,(A3)+
                BRA.S       D23_B2
D23_FA          MOVE.W      D1,-6(A3)
                MOVE.W      D2,-4(A3)
                MOVE.L      A3,-(A7)
D23_B3          TST.W       (A5)
                BLT.S       D23_FB
                MOVEM.W     (A5),D3-D7
                MOVEM.W     D3-D7,(A3)
                ADDA.L      #12,A5
                ADDA.L      #10,A3
                MOVE.W      D0,(A3)+
                BRA.S       D23_B3
D23_FB          MOVE.W      #-1,(A3)
                MOVEA.L     (A7)+,A3
                MOVE.W      D1,2(A3)
                MOVE.W      D2,4(A3)
                MOVE.W      #1,D0
                RTS
D23_FAIL        MOVE.W      #0,D0
                RTS

****************************************************************************
*       CDSG24 - ANGLE CHECKING IN THE ORDER OF 2 - 4                       *
*       INPUT:     A1 points to the beginning of BUFFER                     *
*                  A5 points to the location of the vector(s) which is in   *
*                  the VECSEG                                               *
*                  BUF_PTR points to next available space in BUFFER         *
*       OUTPUT:    D0 = 1 if angle falls into the criteria and the combined *
*                  vectors will be in sequential order                      *
*                  D0 = 0 if angle is too sharp                             *
****************************************************************************

COS100          SET         -1

CDSG24          MOVEA.L     A1,A2
                MOVE.B      #0,COUNTER
D24_B4          CMP.W       #1,(A1)
                BNE.S       D24_FC
                ADDA.L      #12,A1
                ADDQ.B      #1,COUNTER
                BRA.S       D24_B4
D24_FC          MOVEM.W     -10(A1),D0-D3
                MOVEA.L     A5,A6
D24_B1          CMP.W       #1,(A5)
                BNE.S       D24_F1
                ADDA.L      #12,A5
                BRA.S       D24_B1
D24_F1          MOVEM.W     -10(A5),D4-D7
                JSR         INTSEC
                TST.W       D0
                BLT         D24_FAIL
                CMP.W       -10(A1),D0
                BNE.S       D24_F2
                CMP.W       -8(A1),D1
                BEQ         D24_FAIL
D24_F2          CMP.W       -10(A5),D0
                BNE.S       D24_F3
                CMP.W       -8(A5),D1
                BEQ         D24_FAIL
```

***** Find the correct endpoint in vector #1 for angle computation

```
D24_F3    MOVEM.W    D0-D1,-(A7)
          MOVEM.W    (A7)+,D4-D5
          TST.W      12(A2)
          BGE.S      D24_F4
          MOVEM.W    -6(A1),D6-D7
          JSR        SQDIST
          MOVE.L     D1,D0
          MOVEM.W    -10(A1),D6-D7
          JSR        SQDIST
          CMP.L      D1,D0
          BGT.S      D24_F5
D24_F4    MOVE.W     -8(A1),-(A7)
          MOVE.W     -10(A1),-(A7)
          BRA.S      D24_F6
D24_F5    MOVE.W     -4(A1),-(A7)
          MOVE.W     -6(A1),-(A7)
```

***** Find the correct endpoint in vector #2 for angle computation

```
D24_F6    TST.W      12(A6)
          BGE.S      D24_F7
          MOVEM.W    -6(A5),D6-D7
          JSR        SQDIST
          MOVE.L     D1,D0
          MOVEM.W    -10(A5),D6-D7
          JSR        SQDIST
          CMP.L      D1,D0
          BGT.S      D24_F8
D24_F7    MOVE.W     -8(A5),-(A7)
          MOVE.W     -10(A5),-(A7)
          BRA.S      D24_F9
D24_F8    MOVE.W     -4(A5),-(A7)
          MOVE.W     -6(A5),-(A7)
D24_F9    MOVEM.W    D4-D5,-(A7)
          MOVEM.W    (A7)+,D1-D2
          MOVEM.W    (A7)+,D3-D6
          JSR        COSINX
          CMP.W      #COS100,D0
          BGE.S      D24_FAIL
          MOVEA.L    BUF_PTR,A3
          MOVE.W     -2(A1),D0
          ADD.W      -2(A5),D0
          ASR.W      #1,D0
D24_B2    TST.W      (A6)
          BLT.S      D24_FA
          MOVEM.W    (A6),D3-D7
          MOVEM.W    D3-D7,(A3)
          ADDA.L     #12,A6
          ADDA.L     #10,A3
          MOVE.W     D0,(A3)+
          BRA.S      D24_B2
D24_FA    MOVE.W     D1,-6(A3)
          MOVE.W     D2,-4(A3)
          MOVE.L     A3,-(A7)
          MOVE.W     #0,D4
          MOVE.B     COUNTER,D4
          SUBQ.W     #1,D4
D24_B3    SUB.L      #12,A1
          MOVE.W     (A1),(A3)+
          MOVE.W     6(A1),(A3)+
          MOVE.W     8(A1),(A3)+
          MOVE.W     2(A1),(A3)+
          MOVE.W     4(A1),(A3)+
          MOVE.W     D0,(A3)+
          DBRA       D4,D24_B3
D24_FB    MOVE.W     #-1,(A3)
          MOVEA.L    (A7)+,A3
          MOVE.W     D1,2(A3)
          MOVE.W     D2,4(A3)
          MOVE.W     #1,D0
          RTS
D24_FAIL  MOVE.W     #0,D0
          RTS
```

```
************************************************************************
*
*       MODULE NAME:    PLYMERGE.SA              (C) COPYRIGHT 1986 GTX CORP
*
*       REVISION HISTORY        V
*                               E R
*                               R E
*       AUTHOR      DATE        S V - ADD CHANGES TO THE TOP
*       ------      --------    ---------------------------------
*       A. LAI      11/05/86    0.3 - Avoid # of vertices < 4
*       A. LAI      10/29/86    0.2 - Enhance CONTRACT by adding DELETE
*       A. LAI      08/08/86    0.1 - Original Design
*
*       MODULE DESCRIPTION:     Two routines are included in this file and
*                               module description is given at the beginning
*                               of individual one.  These routines are
*                               PLYMERGE and CONTRACT .
*
*       ENTRY CONDITIONS:       Refer to individual routine
*
*       EXIT CONDITIONS:        Refer to individual routine
*
*             REGISTERS USED
*         0  1  2  3  4  5  6  7
*       -----------------------------
*       A !P  P  P  P  P  P  P  P!
*       -----------------------------
*       D !P  P  P  P  P  P  P  P!
*       -----------------------------
*         * = DESTROYED
*         P = REGISTER USED BUT PRESERVED
*         E = ENTRY PARAMETER - PRESERVED
*         B = ENTRY PARAMETER & RETURN VALUE
*         R = RETURN VALUE
***** NOTES:   Use ASM020 to assemble this module since    **************
*              TMULS.L and TDIVU.L are used.
*
************************************************************************
         XREF    RELPOS
         XDEF    PLYMERGE,CONTRACT
         PAGE
************************************************************************
*
* PGM:   PLYMERGE - Filled Polygon Merging
* ENT:   A1 -> Filled polygon record in local buffer
*        A5 -> Filled polygon record in VECSEG area
* RTN:   Two Conditions :
*          1. Z-bit = 0 :- 2 polygons are merged into one which is
*                          defined in local buffer pointed by A1.
*          2. Z-bit = 1 :- No merging has been done.
*        All registers are not changed.
* NOTE:  PLYMERGE merges the two filled polygons if they are
*        closed enough and pass all criteria for merging polygons.
* DESCRIPTION:
*        Higher filled                    / HI  \
*             polygon                    /      !
*             pointed                    \ (A1) .!
*             by  A1.            (xR,yR) _____! (xRc,yRc)
*        LOwer filled            (xS1,yS1) \   LO  \ (xSn,ySn)
*             polygon                       \      !
*             pointed                        \ (A5) !
*             by  A5                          \_____!
*
*          Structure of 64-byte record used to combine the two given
*          filled polygons :
*
*        ----------------------------------------------------------
*        !T/V#! x1 ! y1 ! ....... ! xR ! yR !FF00! xS1! yS1! ............ !
*
*        ! ....... ! xSn! ySn!FF00! xRc! yRc! ....... ! xRn! yRn!FFFF!xxxx!
*        ----------------------------------------------------------
*
************************************************************************
```

```
*****     VARIABLE   DEFINITIONS     *****

MAX_DIST  EQU       200
MAX_SPC   EQU       10
MAX_CLOS  EQU       5*5
BENDFCTR  EQU       3*3

MAX_VTX   EQU       7
MIN_VTX   EQU       4
FILLPLYG  EQU       2
ABORT     EQU       20

OFFSET    0
          DS.B      1
N_O_VTX   DS.B      1
RECD_X1   DS.W      1
RECD_Y1   DS.W      1
          PAGE
          SECTION   0

PLYMERGE  MOVEM.L   D0-D7/A0-A6,-(A7)
          MOVE.L    A1,A4
          ADDQ.L    #N_O_VTX,A1
          ADDQ.L    #N_O_VTX,A5
          MOVE.B    (A1)+,D7
          ADD.B     (A5)+,D7

*****     Check if the 2 given filled polygons are too far separated:
          MOVEM.W   (A5),D0-D1
          SUB.W     RECD_X1-RECD_X1(A1),D0
          BPL.S     *+4
          NEG.W     D0
          CMP.W     #MAX_DIST,D0
          BGT       NOMERGEX
          SUB.W     RECD_Y1-RECD_X1(A1),D1
          BPL.S     *+6
          NEG.W     D1
          EXG.L     D1,D5
          CMP.W     #MAX_DIST,D1
          BGT       NOMERGEX

*****     Find the (xR, yR) of the Higher polygon:
          MOVE.L    A1,A3
          MOVE.L    (A1)+,D0
          MOVE.L    A1,A0
NXT_PTR   MOVE.L    (A1)+,D1
          BMI.S     CHK_HORZ
          CMP.W     D0,D1
          BLE.S     NXT_PTR
          MOVE.L    A1,A0
          MOVE.L    D1,D0
          BRA.S     NXT_PTR

*****     Check if horizontal lines exist at (xR, yR) and (xS1, yS1):
CHK_HORZ  CMP.W     2(A0),D0
          BNE       NOMERGEX
          MOVE.L    (A5),D1
          MOVE.B    N_O_VTX-RECD_X1(A5),D2
          SUBQ.B    #1,D2
          ASL.B     #2,D2
          EXT.W     D2
          CMP.W     2(A5,D2),D1
          BNE       NOMERGEX

*****     Check if the horizontal lines are closed vertically
*         and overlapping horizontally:
CHK_SPC   SUB.W     D0,D1
          CMP.W     #MAX_SPC,D1
          BHI       NOMERGEX
          SWAP.W    D0
          SWAP.W    D1
          CMP.W     (A0),D1
          BGE       NOMERGEX
          CMP.W     (A5,D2),D0
```

```
            BGE         NOMERGEX
            PAGE
*****       Obtain 64-byte free memory for a combined filled polygon:
GET_REC     BSR         GET_MEM
            MOVE.L      A6,A2
            MOVE.B      #FILLPLYG,(A2)+
            MOVE.B      D7,(A2)+

*****       Move HI and LO polygons points in record in sequence:
            MOVE.L      A3,A1
            MOVEQ.L     #-1,D7
            CLR.B       D7
NXT_HI      MOVE.W      (A1)+,(A2)+
            BMI.S       CHK_BEND
            CMP.L       A0,A1
            BNE.S       NXT_HI
            MOVE.W      D7,(A2)+
NXT_LO      MOVE.L      (A5)+,(A2)+
            BPL.S       NXT_LO
            SUBQ.L      #4,A2
            MOVE.W      D7,(A2)+
            BRA.S       NXT_HI

*****       Check junctions if there are straight lines:
CHK_BEND    LEA.L       RECD_X1(A6),A2
NXT_RPTR    MOVE.W      (A2)+,D0
            BPL.S       NXT_RPTR
            NOT.W       D0
            BEQ         E_O_REC
            LEA.L       -18(A2),A3
            MOVEM.W     (A2)-,D5-D6
            MOVEM.W     (A3)+,D3-D4
            MOVEM.W     (A3),D1-D2
            JSR         RELPOS
            TMULS.L     D0,D0
            BVS.S       NOMERGEX
            BSR         ABS_POS
            CMP.L       #BENDFCTR,D0
            BGT.S       CONT_CHK
            CMP.B       #MIN_VTX,N_O_VTX(A6)
            BLS.S       CONT_CHK
            MOVE.W      D7,(A3)
            MOVE.W      D7,2(A3)
            SUBQ.B      #1,N_O_VTX(A6)
            MOVEM.W     -4(A3),D1-D2

CONT_CHK    ADDQ.L      #6,A3
            EXG.L       D1,D5
            EXG.L       D2,D6
            TST.W       (A2)
            BGE.S       CON_CHK1
            MOVEM.W     RECD_X1(A6),D3-D4
            BRA.S       CON_CHK2
CON_CHK1    MOVEM.W     (A2)+,D3-D4
CON_CHK2    JSR         RELPOS
            TMULS.L     D0,D0
            BVS.S       NOMERGEX
            BSR.S       ABS_POS
            CMP.L       #BENDFCTR,D0
            BGT.S       NXT_RPTR
            CMP.B       #MIN_VTX,N_O_VTX(A6)
            BLS.S       NXT_RPTR
            MOVE.W      D7,(A3)+
            MOVE.W      D7,(A3)
            SUBQ.B      #1,N_O_VTX(A6)
            BRA         NXT_RPTR

*****       Contract points in the combined filled polygon
*           and merge if number of vertices is acceptable:
E_O_REC     MOVE.L      A6,A1
            BSR.S       CONTRACT
            CMP.B       #MAX_VTX,N_O_VTX(A6)
            BGT.S       NOMERGEX
```

```
NXT_BPTR  MOVE.W    (A1)+,(A4)+
          BPL.S     NXT_BPTR
          MOVEQ.L   #1,D0
          BRA.S     PLYMERGX

NOMERGEX  MOVEQ.L   #0,D0
PLYMERGX  MOVEM.L   (A7)+,D0-D7/A0-A6
          RTS

*************************************************************************
*         END  OF  PLYMERGE
*************************************************************************

*****     Obtain A6 pointed to the end of BUFFER in VECGEN:
GET_MEM   MOVE.L    A4,A6
NEXT.W    TST.W     (A6)+
          BPL.S     NEXT.W
          TST.W     (A6)+
          RTS

*****     Calculate absolute square distance between mid-point and the line:
ABS_PCS   SUB.W     D5,D3
          SUB.W     D6,D4
          MULS.W    D3,D3
          MULS.W    D4,D4
          ADD.L     D3,D4
          TDIVU.L   D4,D0
          RTS PAGE
*************************************************************************
*
* PGM:     CONTRACT - Contraction of filled polygon record
*
* ENT:     A1 -> Filled polygon record to be contracted
*
* RTN:     Contracted filled polygon record pointed by A1
*          All registers are not changed.
*
* NOTE:    CONTRACT searches through the record and deletes one
*          extra point if 2 points are closed and within the tolerance.
*
*************************************************************************
CONTRACT  MOVEM.L   D0-D4/D7/A0-A2,-(A7)

MOVEQ.L   #2,D7
          LEA.L     RECD_X1(A1),A0

*****     Obtain two consecutive points from the given polygon:
GET_X0    MOVE.W    (A0)+,D1
          BPL.S     GET_Y0
          BSR.S     REPLACE
          BMI.S     CONTRT_X
          MOVE.W    D0,D1

GET_Y0    MOVE.W    (A0)+,D2
          BPL.S     GET_X1
          BSR.S     REPLACE
          BMI.S     CONTRT_X
          MOVE.W    D0,D2

GET_X1    MOVE.W    (A0)+,D3
          BPL.S     GET_Y1
          BSR.S     REPLACE
          BMI.S     CONTRT_X
          MOVE.W    D0,D3

GET_Y1    MOVE.W    (A0)+,D4
          BPL.S     CLOSE
          BSR.S     REPLACE
          BMI.S     CONTRT_X
          MOVE.W    D0,D4
```

```
*****     Check closeness of the two points and obsolete if close enough:
CLOSE     SUB.W     D1,D3
          SUB.W     D2,D4
          MULS.W    D3,D3
          MULS.W    D4,D4
          ADD.L     D3,D4
          MOVEQ.L   #MAX_CLOS,D3
          SUBQ.L    #4,A0
          CMP.L     D3,D4
          BGT.S     GET_X0
          BSR.S     MARKER
          BRA.S     GET_X0
          PAGE CONTRT_X  CMP.B     #MAX_VTX,N_O_VTX(A1)
          BLE.S     CONTRCTX
          BSR.S     DELETE

CONTRCTX  MOVEM.L   (A7)+,D0-D4/D7/A0-A2
          RTS

*************************************************************************
*         END   OF   CONTRACT
*************************************************************************

*****     Replace the current negative data by next positive data:
REPLACE   MOVE.L    A0,A2
          MOVE.W    -(A0),D0
          NOT.W     D0
          BEQ.S     GETLAST

NEXT      MOVE.W    (A2)+,D0
          BMI.S     CONNECT

*****     If positive data is found, return to CONTRACT:
          MOVE.W    #$FF00,-(A2)
          MOVE.W    D0,(A0)+
          RTS

CONNECT   NOT.W     D0
          BNE.S     NEXT

GETLAST   SUBQ.L    #1,D7
          BMI.S     REPLACEX
          BEQ.S     PUT_Y
          MOVE.W    RECD_X1(A1),D0
          RTS
PUT_Y     MOVE.W    RECD_Y1(A1),D0
          RTS

REPLACEX  MOVE.W    #$FFFF,(A0)+
          RTS
          PAGE

*****     Mark out the extra point in filled polygon record
MARKER    CMP.B     #MIN_VTX,N_O_VTX(A1)
          BLS.S     MARKERX MOVE.L    4(A0),D0
          BPL.S     CHKHORZ
          SWAP.W    D0
          NOT.W     D0
          BEQ.S     CHKEND LEA.L     6(A0),A2
NEXT.PT   MOVE.L    (A2),D0
          BPL.S     CHKHORZ
          MOVE.W    (A2)+,D0
          NOT.W     D0
          BNE.S     NEXT.PT
```

```
CHKEND    TST.L     D7
          BEQ.S     MARKOUT
          SUBQ.L    #4,A0
          BRA.S     MARKOUT

CHKHORZ   CMP.W     2(A0),D0
          BNE.S     MARKOUT

SUBQ.L    #8,A0
          CMP.L     A1,A0
          LEA.L     8(A0),A0
          BLS.S     MARKERX
          SUBQ.L    #4,A0

MARKOUT   MOVE.L    #$FF00FF00,(A0)
          SUBQ.B    #1,N_O_VTX(A1)
MARKERX   RTS
          PAGE
```

************************************************************************
*
* PGM:   DELETE - Further contraction of filled polygon record
*
* ENT:   A1 -) Filled polygon record to be contracted
*
* RTN:   Contracted filled polygon record pointed by A1
*        All registers are not changed.
*
* NOTE:       DELETE searches through the record and deletes middle
*        point if 3 consecutive points form a straight line.
*
************************************************************************

```
DELETE    MOVEM.L   D0-D7/A0-A2,-(A7)

MOVEQ.L   #0,D7
          LEA.L     RECD_X1(A1),A0

*****     Obtain two consecutive points from the given polygon:
FIND_X0   MOVE.W    (A0)+,D3
          BPL.S     FIND_Y0
          BSR       REPLACE
          BMI.S     DELETE_X
          MOVE.W    D0,D3

FIND_Y0   MOVE.W    (A0)+,D4
          BPL.S     FIND_X1
          BSR       REPLACE
          BMI.S     DELETE_X
          MOVE.W    D0,D4

FIND_X1   MOVE.W    (A0)+,D1
          BPL.S     FIND_Y1
          BSR       REPLACE
          BMI.S     DELETE_X
          MOVE.W    D0,D1

FIND_Y1   MOVE.W    (A0)+,D2
          BPL.S     FIND_X2
          BSR       REPLACE
          BMI.S     DELETE_X
          MOVE.W    D0,D2

FIND_X2   MOVE.W    (A0)+,D5
          BPL.S     FIND_Y2
          BSR       REPLACE
          BMI.S     DELETE_X
          MOVE.W    D0,D5

FIND_Y2   MOVE.W    (A0)+,D6
          BPL.S     CHANGE1
          BSR       REPLACE
          BMI.S     DELETE_X
          MOVE.W    D0,D6
          PAGE
```

```
*****     Check if the 3 points form a straight line:
CHKBEND   JSR       RELPOS
          TMULS.L   D0,D0
          BVS.S     DELETE_X
          BSR       ABS_POS
          CMP.L     #BENDFCTR,D0
          LEA.L     -8(A0),A0
          BGT.S     FIND_X0

MOVE.L    #$FF00FF00,(A0)
          SUBQ.B    #1,N_O_VTX(A1)
          BRA.S     FIND_X0

DELETE_X  MOVEM.L   (A7)+,D0-D7/A0-A2
          RTS

***********************************************************************
*         END  OF  DELETE                                              *
***********************************************************************

***********************************************************************
*    DESEG2 - SECOND DESEGMENTATION                                    *
*         INPUT:    LINESEG contains all pointers of vectors which are in VECSEG*
*         OUTPUT:   line, arc, circle desegmentation                   *
***********************************************************************

XDEF      DESEG2
          XREF      HORZDSG,MAHDST,LCOBINE,ACCHK,CCOBINE,RSRVBUFR
          XREF      GETGRID,NXTGRID,LINK,NXTRECD,UNLINK,UNLNKPNT
          XREF      GETHORZ,NXTHORZ

EOBLK     EQU       $F000
SQLGAP    EQU       1600
SQCGAP    EQU       900

DESEG2    MOVEA.L   LINESEG,A3
DS2_LOOP  MOVE.W    (A3)+,INTSEC1
          BPL.S     DS2_FWD1
          MOVE.W    INTSEC1,D0
          CMP.W     #EOBLK,D0
          BNE       DS2_RTN
          MOVEA.L   (A3),A3
          BRA.S     DS2_LOOP
DS2_FWD1  MOVE.W    (A3)+,INTSEC2
          MOVEA.L   (A3)+,A2
          LEA       8(A3),A3
          TST.L     INTSEC1
          BEQ.S     DS2_LOOP
          LEA       BUFFER,A1

***** Adjust A2 points to VECSEG when it is a convergence vector
          MOVE.L    A2,D0
          BTST.L    #0,D0
          BEQ.S     DS2_BCK1
          SUBQ.L    #1,D0
          MOVEA.L   D0,A2
          MOVEA.L   (A2),A2

***** Move data from VECSEG to BUFFER
DS2_BCK1  MOVE.W    (A2)+,(A1)+
          BGE.S     DS2_BCK1

***** Count number of vectors in the BUFFER
          LEA       BUFFER,A1
          MOVE.B    #0,COUNTER
          MOVE.L    A1,-(A7)
DS2_1     CMP.W     #1,(A1)
          BNE.S     DS2_2
          ADDQ.B    #1,COUNTER
          ADD.L     #12,A1
          BRA.S     DS2_1
```

```
DS2_2     MOVEA.L    (A7)+,A1
          CMP.B      #1,COUNTER
          BGT        DS_PNT1

***** LINE IN THE BUFFER

***** First endpoint desegmentation
DS2_PNT1  MOVE.L     2(A1),D0
          MOVE.B     #1,PNT1_FL
          JSR        GETGRID
          BNE.S      PT1_FWD1
PT1_BCK1  JSR        NXTGRID
          BEQ.S      DS2_PNT2
          BRA.S      PT1_FWD1
PT1_BCK   JSR        NXTRECD
          BEQ.S      PT1_BCK1
PT1_FWD1  MOVE.W     (A4),D0
          MOVE.W     2(A4),D1
          MOVEA.L    4(A4),A5
*         CMP.W      INTSEC1,D0
*         BEQ.S      PT1_MAH
*         CMP.W      INTSEC1,D1
*         BEQ.S      PT1_MAH
*         CMP.W      INTSEC2,D0
*         BEQ.S      PT1_MAH
*         CMP.W      INTSEC2,D1
*         BNE.S      PT1_BCK
PT1_MAH   TST.L      D7
          BNE.S      MAH_1
          MOVE.W     #3,MAH_COD
          BRA.S      DS2_FWD6
MAH_1     MOVE.W     #1,MAH_COD
          BRA.S      DS2_FWD6

***** Second-endpoint desegmentation
DS2_PNT2  MOVE.L     6(A1),D0
          MOVE.B     #0,PNT1_FL
          JSR        GETGRID
          BNE.S      PT2_FWD1
PT2_BCK1  JSR        NXTGRID
          BEQ        GET_HORZ
          BRA.S      PT2_FWD1
PT2_BCK   JSR        NXTRECD
          BEQ.S      PT2_BCK1
PT2_FWD1  MOVE.W     (A4),D0
          MOVE.W     2(A4),D1
          MOVEA.L    4(A4),A5
*         CMP.W      INTSEC1,D0
*         BEQ.S      PT2_MAH
*         CMP.W      INTSEC1,D1
*         BEQ.S      PT2_MAH
*         CMP.W      INTSEC2,D0
*         BEQ.S      PT2_MAH
*         CMP.W      INTSEC2,D1
*         BNE.S      PT2_BCK
PT2_MAH   TST.L      D7
          BNE.S      MAH_2
          MOVE.W     #4,MAH_COD
          BRA.S      DS2_FWD6
MAH_2     MOVE.W     #2,MAH_COD

***** prevent desegment with itself
DS2_FWD6  LEA        -16(A3),A2
          CMPA.L     A2,A4
          BEQ        DS2_BCK2

***** prevent desegment with an obsoleted vector
          TST.W      2(A4)
          PL         DS2_BCK2

***** Adjust A5 points to VECSES when it is a convergence vector
          MOVE.L     A5,D0
          BTST.L     #0,D0
          BEQ.S      DS2_FWD5
```

```
                SUBQ.L      #1,D0
                MOVEA.L     D0,A5
                MOVEA.L     (A5),A5

***** Count number of vectors in the VECSEG
DS2_FWD5        MOVE.B      #0,COUNTER
                MOVE.L      A5,-(A7)
DS2_BCK3        CMP.W       #1,(A5)
                BNE.S       DS2_FWD3
                ADDQ.B      #1,COUNTER
                ADDA.L      #12,A5
                BRA.S       DS2_BCK3
DS2_FWD3        MOVEA.L     (A7)+,A5
                CMP.B       #1,COUNTER
                BGT         DS2L_CRV

*****   LINE TO LINE DESEGMENTATION

***** horizontal line checking
                MOVEM.W     2(A1),D0-D3
                MOVEM.W     2(A5),D4-D7
                CMP.W       D1,D3
                BNE         CLOSE_CK
                CMP.W       D5,D7
                BNE         CLOSE_CK

*****   horizontal line desegmentation

JSR         HORZDSG
                TST.B       COMB_FL
                BNE.S       HUPDATE
                JSR         HORZDSG2
                TST.B       COMB_FL
                BEQ         DS2_BCK2
HUPDATE         MOVE.W      MAH_COD,D0
                CMP.W       #2,D0
                BGT.S       H_3_4
                MOVE.L      6(A1),D0
                CMP.L       6(A5),D0
                BEQ.S       H1_1_2
                JSR         UNLINK
                MOVE.L      6(A1),D0
                MOVE.L      #4,D7
                JSR         LINK
H1_1_2          MOVE.L      2(A1),D0
                CMP.L       2(A5),D0
                BEQ         UPDT
                MOVE.L      2(A5),D0
                MOVE.L      #0,D7
                JSR         UNLNKPNT
                MOVE.L      2(A1),D0
                MOVE.L      #0,D7
                JSR         LINK
                BRA         UPDT
H_3_4           MOVE.L      2(A1),D0
                CMP.L       2(A5),D0
                BEQ.S       H1_3_4
                JSR         UNLINK
                MOVE.L      2(A1),D0
                MOVE.L      #0,D7
                JSR         LINK
H1_3_4          MOVE.L      6(A1),D0
                CMP.L       6(A5),D0
                BEQ         UPDT
                MOVE.L      6(A5),D0
                MOVE.L      #4,D7
                JSR         UNLNKPNT
                MOVE.L      6(A1),D0
                MOVE.L      #4,D7
                JSR         LINK
                BRA         UP_4
```

```
DS2_BCK2  TST.B    PNT1_FL
          BNE      PT1_BCK
          BRA      PT2_BCK

*****  general desegmentation

*****  line closeness checking

CLOSE_CK  JSR      MAHDST
          CMPA.L   #SQLGAP,A6
          BHI      DS2_BCK2

*****  line width difference checking

MOVE.W   10(A1),D0
          BNE.S    LW_1
          MOVE.W   #1,D0
LW_1      MOVE.W   10(A5),D1
          BNE.S    LW_2
          MOVE.W   #1,D1
LW_2      CMP.W    D0,D1
          BGT.S    LWDTH_1
          ANDI.L   #$FFFF,D0
          DIVU.W   D1,D0
          BRA.S    LWDTH_2
LWDTH_1   ANDI.L   #$FFFF,D1
          DIVU.W   D0,D1
          MOVE.W   D1,D0
LWDTH_2   CMP.W    #2,D0
          BGT      DS2_BCK2

*****  line to line desegmentation

JSR      LCOBINE
          TST.B    COMB_FL
          BEQ      DS2_BCK2

***** LINE UPDATE
LUPDATE   JSR      UNLINK
          MOVE.W   MAH_COD,D0
          CMP.W    #2,D0
          BGT.S    CODE_3_4
CODE_1_2  MOVE.L   #4,D7
          MOVE.L   6(A1),D0
          BRA.S    UPDT_LNK
CODE_3_4  MOVE.L   #0,D7
          MOVE.L   2(A1),D0
UPDT_LNK  JSR      LINK
UPDT      MOVEM.W  (A4),D2-D3
          CMP.W    INTSEC1,D2
          BNE.S    UP_1
          MOVE.W   INTSEC2,(A4)
          BRA.S    UP_4
UP_1      CMP.W    INTSEC2,D2
          BNE.S    UP_2
          MOVE.W   INTSEC1,(A4)
          BRA.S    UP_4
UP_2      CMP.W    INTSEC1,D3
          BNE.S    UP_3
          MOVE.W   INTSEC2,2(A4)
          BRA.S    UP_4
UP_3      MOVE.W   INTSEC1,2(A4)
UP_4      MOVE.W   #-1,-14(A3)
UP_5      MOVE.W   (A1)+,(A5)+
          BGE.S    UP_5
          BRA      DS2_LOOP

*****  LINE TO ARC DESEGMENTATION
```

```
*****  arc closeness checking
DS2L_CRV JSR       MAHDST
         CMPA.L    #SQCGAP,A6
         BHI       DS2_BCK2
         JSR       CCOBINE
         TST.B     COMB_FL
         BEQ       DS2_BCK2
         BRA       CUPDATE GET_HORZ MOVE.W    4(A1),D0
         CMP.W     8(A1),D0
         BNE       DS2_LOOP

***** SPECIAL HANDLING FOR HORIZONTAL LINE DESEGMENTATION
         JSR       GETHORZ
         BNE.S     HORZ_1
HORZ_3   JSR       NXTHORZ
         BEQ       DS2_LOOP
         BRA.S     HORZ_1
HORZ_2   JSR       NXTRECD
         BEQ.S     HORZ_3
HORZ_1   MOVE.W    (A4),D0
         MOVE.W    2(A4),D1
         MOVEA.L   4(A4),A5
*        CMP.W     INTSEC1,D0
*        BNE.S     HORZ_2

***** Set match code according to D7
HORZ_MAH TST.L     D7
         BNE.S     HORZ_5
         MOVE.W    #3,MAH_COD
         BRA.S     HORZ_6
HORZ_5   MOVE.W    #1,MAH_COD

***** Prevent desegmenting with itself
HORZ_6   LEA       -16(A3),A2
         CMPA.L    A2,A4
         BEQ.S     HORZ_2

***** Prevent desegmenting with an obsoleted vector
         TST.W     2(A4)
         BLT       HORZ_2

***** Adjust A5 points to VECSEG when it is a convergence vector
         MOVE.L    A5,D0
         BTST.L    #0,D0
         BEQ.S     HORZ_7
         SUBQ.L    #1,D0
         MOVEA.L   D0,A5
         MOVEA.L   (A5),A5

***** Check whether the vector in VECSEG is a horizontal line
HORZ_7   TST.W     12(A5)
         BGE.S     HORZ_2
         MOVE.W    4(A5),D0
         CMP.W     8(A5),D0
         BNE.S     HORZ_2

**** Horizontal line desegmentation
         JSR       HORZDSG
         TST.B     COMB_FL
         BNE       HUPDATE
         BSR       HORZDSG2
         TST.B     COMB_FL
         BNE       HUPDATE
         BRA       HORZ_2

*****  ARC IN THE BUFFER

DC_PNT1  MOVE.L    2(A1),D0
         MOVE.B    #1,PNT1_FL
         JSR       GETGRID
         BNE.S     DC1_FWD1
```

```
DC1_BCK1   JSR       NXTGRID
           BEQ.S     DC_PNT2
           BRA.S     DC1_FWD1
D1_BCK2    JSR       NXTRECD
           BEQ.S     DC1_BCK1
DC1_FWD1   MOVE.W    (A4),D0
           MOVE.W    2(A4),D1
           MOVEA.L   4(A4),A5
*          CMP.W     INTSEC1,D0
*          BEQ.S     DC1_MAH
*          CMP.W     INTSEC1,D1
*          BEQ.S     DC1_MAH
*          CMP.W     INTSEC2,D0
*          BEQ.S     DC1_MAH
*          CMP.W     INTSEC2,D1
*          BNE.S     D1_BCK2
DC1_MAH    TST.L     D7
           BNE.S     MAH_3
           MOVE.W    #3,MAH_COD
           BRA.S     DS2_FWD7
MAH_3      MOVE.W    #1,MAH_COD
           BRA.S     DS2_FWD7

***** Second endpoint desegmentation
DC_PNT2    MOVE.L    A1,-(A7)
DC2_BCK2   CMP.W     #1,(A1)
           BNE.S     DC2_FWD2
           ADDA.L    #12,A1
           BRA.S     DC2_BCK2
DC2_FWD2   MOVE.L    -6(A1),D0
           MOVEA.L   (A7)+,A1
           MOVE.B    #0,PNT1_FL
           JSR       GETGRID
           BNE.S     DC2_FWD1
DC2_BCK1   JSR       NXTGRID
           BEQ       DS2_LOOP
           BRA.S     DC2_FWD1
D2_BCK2    JSR       NXTRECD
           BEQ.S     DC2_BCK1
DC2_FWD1   MOVE.W    (A4),D0
           MOVE.W    2(A4),D1
           MOVEA.L   4(A4),A5
*          CMP.W     INTSEC1,D0
*          BEQ.S     DC2_MAH
*          CMP.W     INTSEC1,D1
*          BEQ.S     DC2_MAH
*          CMP.W     INTSEC2,D0
*          BEQ.S     DC2_MAH
*          CMP.W     INTSEC2,D1
*          BNE.S     D2_BCK2
DC2_MAH    TST.L     D7
           BNE.S     MAH_4
           MOVE.W    #4,MAH_COD
           BRA.S     DS2_FWD7
MAH_4      MOVE.W    #2,MAH_COD

***** prevent desegment itself
DS2_FWD7   LEA       -16(A3),A2
           CMPA.L    A2,A4
           BEQ.S     DS2_BCK4

***** prevent desegment with an obsoleted vector
           TST.W     2(A4)
           BLT.S     DS2_BCK4

***** Adjust A5 points to VECSEG when it is a convergence vector
           MOVE.L    A5,D0
           BTST.L    #0,D0
           BEQ.S     DS2_FWDA
           SUBQ.L    #1,D0
           MOVEA.L   D0,A5
           MOVEA.L   (A5),A5
```

```
***** arc closeness checking
DS2_FWDA JSR       MAHDST
         CMPA.L    #SQCGAP,A6
         BHI.S     DS2_BCK4

*****    ARC DESEGMENTATION

JSR.      CCOBINE
         TST.B     COMB_FL
         BNE.S     CUPDATE
DS2_BCK4 TST.B     PNT1_FL
         BNE       D1_BCK2
         BRA       D2_BCK2

CUPDATE  JSR       UNLINK
         MOVE.W    MAH_COD,D0
         CMP.W     #2,D0
         BGT.S     UPDT_3_4
UPDT_1_2 MOVE.L    #4,D7
         MOVE.L    A1,-(A7)
UPDT_C5  CMP.W     #1,(A1)
         BNE.S     UPDT_C4
         ADDA.L    #12,A1
         BRA.S     UPDT_C5
UPDT_C4  MOVE.L    -6(A1),D0
         MOVEA.L   (A7)+,A1
         BRA.S     C_LNK
UPDT_3_4 MOVE.L    #0,D7
         MOVE.L    2(A1),D0
C_LNK    JSR       LINK
         MOVEM.W   (A4),D2-D3
         CMP.W     INTSEC1,D2
         BNE.S     CUP_1
         MOVE.W    INTSEC2,(A4)
         BRA.S     CUP_4
CUP_1    CMP.W     INTSEC2,D2
         BNE.S     CUP_2
         MOVE.W    INTSEC1,(A4)
         BRA.S     CUP_4
CUP_2    CMP.W     INTSEC1,D3
         BNE.S     CUP_3
         MOVE.W    INTSEC2,2(A4)
         BRA.S     CUP_4
CUP_3    MOVE.W    INTSEC1,2(A4)
CUP_4    MOVE.W    #-1,-14(A3)
         JSR       RSRVBUFR
         MOVE.L    A0,4(A4)
DS2_BCK5 MOVE.W    (A1)+,(A0)+
         BGE.S     DS2_BCK5
         BRA       DS2_LOOP

DS2_RTN  RTS

*****************************************************************************
*    HORZDSG2 - SECOND HORIZONTAL LINES DESEGMENTATION                       *
*    INPUT:    A1 points to the beginning of BUFFER                          *
*              A5 points to the location of the vector which is in the       *
*              VEC_SEG area                                                  *
*    OUTPUT:   COMB_FL will be set if the vectors can be combined            *
*              BUFFER will be updated to contain the new vector after        *
*              the desegmentation if those vectors can be combined.          *
*              Otherwise, the content of BUFFER will not be changed          *
*****************************************************************************

HORZGAP  EQU       25
OFFSET   EQU       400

HORZDSG2 MOVEM.L   D2-D7/A0-A6,-(A7)
         MOVE.B    #0,COMB_FL
         MOVEM.W   2(A1),D0-D3
         MOVE.W    10(A1),A4
         MOVEM.W   2(A5),D4-D7
         MOVE.W    10(A5),A6
```

```
**** check the gap between two horizontal lines
          MOVE.W    D5,-(A7)
          SUB.W     D1,D5
          BGE.S     HD_FWD1
          NEG.W     D5
HD_FWD1   MOVEA.W   D5,A2
          MOVE.W    (A7)+,D5
          CMPA.W    #HORZGAP,A2
          BHI.S     HD_RTN
**** are both lines overlap somewhere
          CMP.W     D0,D2
          BGE.S     HD_FWD2
          MOVE.W    D0,-(A7)
          MOVE.W    D2,D0
          MOVE.W    (A7)+,D2
HD_FWD2   CMP.W     D4,D6
          BGE.S     HD_FWD3
          MOVE.W    D4,-(A7)
          MOVE.W    D6,D4
          MOVE.W    (A7)+,D6
HD_FWD3   CMP.W     D0,D6
          BLT.S     HD_RTN
          CMP.W     D2,D4
          BGT.S     HD_RTN
**** are they overlap in the right way
          CMP.W     D0,D4
          BGE.S     HD_FWD4
          CMP.W     D2,D5
          BGT.S     HD_RTN
          SUB.W     D4,D0
          CMP.W     #OFFSET,D0
          BGE.S     HD_FWD5
          MOVE.W    D2,A2
          SUBA.W    D5,A2
          CMPA.W    #OFFSET,A2
          BLT.S     HD_RTN
HD_FWD5   MOVEM.W   D0-D1,-(A7)
          MOVEM.W   (A7)+,D4-D5
          BRA.S     HD_COMB
HD_FWD4   CMP.W     D2,D5
          BLT.S     HD_RTN
          SUB.W     D0,D4
          CMP.W     #OFFSET,D4
          BGE.S     HD_FWD6
          MOVEA.W   D5,A2
          SUBA.W    D2,A2
          CMPA.W    #OFFSET,A2
          BLT.S     HD_RTN
HD_FWD6   MOVEM.W   D0-D1,-(A7)
          MOVEM.W   (A7)+,D4-D5
HD_COMB   ADDA.W    A4,A6
          MOVE.W    A6,D3
          ASR.W     #1,D3
          MOVE.B    #1,COMB_FL
          MOVE.W    #1,(A1)+
          MOVEM.W   D4-D7,(A1)
          ADDQ.L    #8,A1
          MOVE.W    D3,(A1)+
          MOVE.W    #-1,(A1)
HD_RTN    MOVEM.L   (A7)+,D0-D7/A0-A6
          RTS                              END POINT EXTENSION Fig. 15
```

```
*                OBJEXT:   ENDPOINT EXTENSION                             *
*                INPUT:    LINKHED contains all pointers of vectors which are in VECGRD *
*                OUTPUT:   endpoint extension of whole object             *

XDEF      OBJEXT
          XREF      MATCH,SQDIST,GETGRID,NXTGRID,NXTREDD

EOBLK     EQU       $F000
SQLGAP    EQU       1000
SQDGAP    EQU       1600
SQMXDST   EQU       2500
```

```
OBJEPEXT MOVEA.L    LINESEG,A3
OEP_LOOP MOVE.W     (A3)+,INTSEG1
         BPL.S      OEP_FWD1
         MOVE.W     INTSEG1,D0
         CMP.W      #EOBLK,D0
         BNE        OEP_RTN
         MOVEA.L    (A3),A3
         BRA.S      OEP_LOOP
OEP_FWD1 MOVE.W     (A3)+,INTSEG2
         MOVEA.L    (A3)+,A1
         LEA        6(A3),A3
         TST.L      INTSEG1
         BEQ.S      OEP_LOOP
         TST.W      INTSEG2
         BLT.S      OEP_LOOP

***** Adjust A1 points to VECSEG when it is a convergence vector
         MOVE.L     A1,D0
         BTST.L     #0,D0
         BEQ.S      OEP_FWD2
         SUBQ.L     #1,D0
         MOVEA.L    D0,A1
         MOVEA.L    (A1),A1

***** Count number of vectors in the BUFFER
OEP_FWD2 MOVE.B     #0,COUNTER
         MOVE.B     #1,LINE_FL
         MOVE.L     A1,-(A7)
CNT_BCK2 CMP.W      #1,(A1)
         BNE.S      OEP_FWD3
         ADDQ.B     #1,COUNTER
         ADD.L      #12,A1
         BRA.S      CNT_BCK2
OEP_FWD3 MOVEA.L    A1,A2
         MOVEA.L    (A7)+,A1
         CMP.B      #1,COUNTER
         BEQ.S      OEP_PNT1

***** prevent endpoint extension on circle
         MOVE.B     #0,LINE_FL
         MOVEA.W    2(A1),D4-D5
         MOVEM.W    -6(A2),D6-D7
         JSR        DUDIST
         CMP.L      ROMAXDST,D1
         BLE        OUT_LOOP

***** First endpoint extension
OEP_PNT1 MOVE.L     2(A1),D0
         MOVE.L     -6(A2),-(A7)
         MOVE.B     #1,PNT1_FL
         JSR        GETGRID
         BNE.S      PT1_FWD1
PT1_BCK1 JSR        NXTGRID
         BEQ.S      OEP_PNT2
         BRA.S      PT1_FWD1
PT1_BCK  JSR        NXTRECD
         BEQ.S      PT1_BCK1
PT1_FWD1 MOVE.W     (A4),D0
         MOVE.W     2(A4),D1
         MOVEA.L    4(A4),A5
         BRA.S      OEP_FWD6

OEP_BCK1 TST.B      PNT1_FL
         BNE.S      PT1_BCK
         BRA.S      PT2_BCK

OEP_PNT2 MOVE.L     (A7)+,D0
         MOVE.B     #0,PNT1_FL
         JSR        GETGRID
         BNE.S      PT2_FWD1
PT2_BCK1 JSR        NXTGRID
         BEQ        OEP_LOOP
         BRA.S      PT2_FWD1
```

```
PT2_BCK    JSR       NXTRECD
           BEQ.S     PT2_BCK1
PT2_FWD1   MOVE.W    (A4),D0
           MOVE.W    2(A4),D1
           MOVEA.L   4(A4),A5

***** prevent endpoint extension with itself
OEP_FWD6   LEA       -16(A3),A6
           CMPA.L    A6,A4
           BEQ       OEP_BCK1

***** prevent endpoint extension with an obsoleted vector
           TST.W     2(A4)
           BLT       OEP_BCK1

***** Adjust A5 points to VECSEG when it is a convergence vector
           MOVE.L    A5,D2
           BTST.L    #0,D2
           BEQ.S     OEP_FWD5
           SUBQ.L    #1,D2
           MOVEA.L   D2,A5
           MOVEA.L   (A5),A5

***** Count number of vectors in the VECSEG
OEP_FWD5   MOVE.B    #0,COUNTER
           MOVE.L    A5,-(A7)
OEP_BCK3   CMP.W     #1,(A5)
           BNE.S     OEP_FWD4
           ADDQ.B    #1,COUNTER
           ADDA.L    #12,A5
           BRA.S     OEP_BCK3
OEP_FWD4   MOVEA.L   A5,A6
           MOVEA.L   (A7)+,A5
           CMP.B     #1,COUNTER
           BEQ       OEP_DRV1
           TST.B     LINE_FL
           BEQ       OEP_DRV2

***** LINE TO LINE ENDPOINT EXTENSION
           TST.W     INTSEC1
           BEQ.S     PTL_INT
           CMP.W     INTSEC1,D0
           BEQ.S     L_EXT
           CMP.W     INTSEC1,D1
           BEQ.S     L_EXT
PTL_INT    TST.W     INTSEC2
           BEQ.S     CHK_REL
           CMP.W     INTSEC2,D0
           BEQ.S     L_EXT
           CMP.W     INTSEC2,D1
           BNE.S     CHK_REL
L_EXT      MOVEM.W   2(A1),D0-D3
           MOVEM.W   2(A5),D4-D7
           JSR       MATCH
EP_1_4     CMPA.W    #1,A2
           BNE.S     EP_2_4
           MOVEM.W   D6-D7,2(A5)
           MOVEM.W   D4-D5,6(A5)
           BRA.S     OEP_GAP
EP_2_4     CMPA.W    #2,A2
           BNE.S     EP_1_3
           MOVEM.W   D2-D3,2(A1)
           MOVEM.W   D0-D1,6(A1)
           MOVEM.W   D6-D7,2(A5)
           MOVEM.W   D4-D5,6(A5)
           BRA.S     OEP_GAP
EP_1_3     CMPA.W    #3,A2
           BNE.S     EP_2_3
           BRA.S     OEP_GAP
EP_2_3     MOVEM.W   D2-D3,2(A1)
           MOVEM.W   D0-D1,6(A1)
```

```
OEP_GAP   CMPA.L    #1,A6
          BLS.S     OEP_BCK4
          CMPA.L    #SQLGAP,A6
          BLS.S     LEP_EXT
CHK_REL   BSR       RELCHK
          TST.B     REL_FL
          BEQ       OEP_BCK1
LEP_EXT   BSR       EPTEXT
          TST.B     SPEXT_FL
          BEQ       OEP_BCK1
OEP_BCK4  TST.B     PNT1_FL
          BNE       OEP_PNT2
          BRA       OEP_LOOP

OEP_CRV1  MOVEA.W   D1,A2
          MOVEM.W   2(A5),D4-D5
          MOVEM.W   -6(A6),D6-D7
          JSR       SQDIST
          CMP.L     #SQMAXDST,D1
          BLE       OEP_BCK1
          MOVE.W    A2,D1
OEP_CRV2  TST.W     INTSEC1
          BEQ.S     PTC_INT
          CMP.W     INTSEC1,D0
          BEQ.S     OEP_CRV
          CMP.W     INTSEC1,D1
          BEQ.S     OEP_CRV
PTC_INT   TST.W     INTSEC2
          BEQ       OEP_BCK1
          CMP.W     INTSEC2,D0
          BEQ.S     OEP_CRV
          CMP.W     INTSEC2,D1
          BNE       OEP_BCK1
OEP_CRV   BSR       ACCHK
          CMPA.L    #SQCGAP,A6
          BHI       OEP_BCK1
          MOVE.L    #BUFFER,BUF_PTR
          MOVE.W    MAH_COD,D0
OEP_1_4   CMP.W     #1,D0
          BNE.S     OEP_2_4
          MOVEA.L   A5,A0
          BSR       ARANGE
          BRA       LEP_EXT
OEP_2_4   CMP.W     #2,D0
          BNE.S     OEP_1_3
          MOVEA.L   A1,A0
          BSR       ARANGE
          MOVEA.L   A5,A0
          BSR       ARANGE
          BRA       LEP_EXT
OEP_1_3   CMP.W     #3,D0
          BNE.S     OEP_2_3
          BRA       LEP_EXT
OEP_2_3   MOVEA.L   A1,A0
          BSR       ARANGE
          BRA       LEP_EXT

OEP_RTN   RTS
```

```
****************************************************************************
*   RELCHK - RELATIVE POSITION CHECK                                        *
*       INPUT:    A1 points to the beginning of BUFFER                      *
*                 A5 points to the location of the vector which is in the   *
*                 VEC_SEG                                                   *
*       OUTPUT:   D0 contains the minimum distance between these two line   *
*                 segments                                                  *
*                 the x1,y1 of BUFFER is the point which is closer to the   *
*                 line in the VEC_SEG.  And the x1,y1 of the line in VEC_SEG*
*                 is the point which is closer to the line in the BUFFER    *
****************************************************************************

XREF      RELPOS,ABS,DISTANCE,PROJECT
RELGAP    EQU       15
```

```
RELCHK      MOVEM.L     D1-D7/A1-A3/A5,-(A7)
            MOVE.B      #0,REL_FL
            MOVEM.W     6(A1),D1-D2
            MOVEM.W     2(A5),D3-D6
            JSR         RELPOS
            JSR         ABS
            MOVE.L      D0,-(A7)
            MOVEM.W     2(A1),D1-D2
            JSR         RELPOS
            JSR         ABS
            MOVE.L      (A7)+,D7
            CMP.L       D7,D0
            BLE.S       REL_FWD1
            MOVE.W      6(A1),2(A1)
            MOVE.W      8(A1),4(A1)
            MOVEM.W     D1-D2,6(A1)
            MOVE.L      D7,D0
REL_FWD1    MOVEM.W     D3-D6,-(A7)
            MOVEM.W     (A7)+,D4-D7
            JSR         DISTANCE
            DIVU.W      D1,D0
            MOVE.W      D0,A3
            MOVEM.W     6(A5),D1-D2
            MOVEM.W     2(A1),D3-D6
            JSR         RELPOS
            JSR         ABS
            MOVE.L      D0,-(A7)
            MOVEM.W     2(A5),D1-D2
            JSR         RELPOS
            JSR         ABS
            MOVE.L      (A7)+,D7
            CMP.L       D7,D0
            BLE.S       REL_FWD2
            MOVE.W      6(A5),2(A5)
            MOVE.W      8(A5),4(A5)
            MOVEM.W     D1-D2,6(A5)
            MOVE.L      D7,D0
REL_FWD2    MOVEM.W     D3-D6,-(A7)
            MOVEM.W     (A7)+,D4-D7
            JSR         DISTANCE
            DIVU.W      D1,D0
            MOVE.W      A3,D1
            CMP.W       D1,D0
            BLE.S       REL_2
REL_1       TST.W       D1
            BEQ.S       REL_RTN
            CMP.W       #RELGAP,D1
            BGT.S       REL_RTN
            MOVEM.W     2(A1),D4-D5
            MOVEM.W     2(A5),D0-D3
            JSR         PROJECT
            BRA.S       REL_CHK
REL_2       TST.W       D0
            BEQ.S       REL_RTN
            CMP.W       #RELGAP,D0
            BGT.S       REL_RTN
            MOVEM.W     2(A5),D4-D5
            MOVEM.W     2(A1),D0-D3
            JSR         PROJECT
REL_CHK     MOVE.W      D6,D4
            MOVE.W      D7,D5
            BSR         PNTONLN
            BEQ.S       REL_RTN
            MOVE.B      #1,REL_FL
REL_RTN     MOVEM.L     (A7)+,D1-D7/A1-A3/A5
            RTS
```

```
************************************************************************
*     EPTEXT - ENDPOINT EXTENSION                                       *
*         INPUT:   A1 points to the beginning of BUFFER                 *
*                  A5 points to the location of the vector which is in the *
*                  VEC_SEG                                              *
*         OUTPUT:  the content of BUFFER and VEC_SEG will be updated if these *
*                  two line segments can have endpoint extension. Otherwise, *
*                  both area will be unchanged.                         *
************************************************************************

EPTEXT     MOVEM.L    D0-D7/A1-A5,-(A7)
           MOVEM.W    2(A1),D0-D3
           MOVEM.W    2(A5),D4-D7
           MOVE.B     #0,EPEXT_FL
           SUB.W      XMIN,D0
           SUB.W      YMIN,D1
           SUB.W      XMIN,D2
           SUB.W      YMIN,D3
           SUB.W      XMIN,D4
           SUB.W      YMIN,D5
           SUB.W      XMIN,D6
           SUB.W      YMIN,D7
           BSR        INTSEC
           TST.W      D0
           BLT.S      EP_RTN
           ADD.W      XMIN,D0
           ADD.W      YMIN,D1
           CMP.W      6(A1),D0
           BNE.S      EP_1
           CMP.W      8(A1),D1
           BEQ.S      EP_RTN
EP_1       CMP.W      6(A5),D0
           BNE.S      CHK_VAD
           CMP.W      8(A5),D1
           BEQ.S      EP_RTN
CHK_VAD    BSR.S      EPVALID
           BEQ.S      EP_RTN
           BSR        EXTCUT
           MOVE.B     #1,EPEXT_FL
EP_RTN     MOVE.B     #0,REL_FL
           MOVEM.L    (A7)+,D0-D7/A1-A5
           RTS

************************************************************************
*     EXTCUT - EXTEND & CUT                                             *
*         INPUT:   A1 points to the beginning of BUFFER                 *
*                  A5 points to the location of the vector which is in the *
*                  VECSEG. D0,D1 contain the x, y coordinates of the   *
*                  intersection point. The coordinate structure in BUFFER *
*                  & VECSEG is 1-3                                      *
*         OUTPUT:  the content of BUFFER & VECSEG are updated           *
************************************************************************

EXTCUT     MOVEM.L    D0-D7,-(A7)
           MOVE.W     OVERTOL,D2
           MULS.W     D2,D2
           MOVE.W     D0,D4
           MOVE.W     D1,D5
           MOVEM.W    2(A1),D0-D3
           BSR        PNTONLN
           BEQ.S      UPDATE1
***** CUT
           TST.B      REL_FL
           BNE.S      EXTCUT_1
           MOVEM.W    2(A1),D6-D7
           JSR        SQDIST
           CMP.L      D2,D1
           BGT.S      EXTCUT_1
UPDATE1    MOVEM.W    D4-D5,2(A1)
EXTCUT_1   MOVEM.W    2(A5),D0-D3
           BSR        PNTONLN
           BEQ.S      UPDATE2
***** CUT
```

```
             TST.B      REL_FL
             BNE.S      EC_RTN
             MOVEM.W    2(A5),D6-D7
             JSR        SQDIST
             CMP.L      D2,D1
             BGT.S      EC_RTN
UPDATE2      MOVEM.W    D4-D5,2(A5)
EC_RTN       MOVEM.L    (A7)+,D0-D7
             RTS
```

```
************************************************************************
*     EPVALID - VALIDITY CHECKING                                       *
*         INPUT:   A1 points to the beginning of BUFFER                 *
*                  A5 points to the location of the vector which is in the *
*                  VECSEG.) D0,D1 contain the x, y coordinates of the   *
*                  intersection point.  The coordinate structure in BUFFER *
*                  & VECSEG is 1-3                                      *
*         OUTPUT:  D7 = 0, not a valid extension point                  *
*                  D7 = 1, a valid extension point                      *
************************************************************************

EPVALID      MOVEM.L    D0-D6,-(A7)
             MOVE.W     D0,D4
             MOVE.W     D1,D5
             MOVE.W     OVERTOL,D2
             MULS.W     D2,D2
             MOVEM.W    2(A1),D6-D7
             JSR        SQDIST
             CMP.L      D2,D1
             BLS.S      EPV_3
             MOVEM.W    2(A1),D0-D3
             BSR.S      PNTONLN
             BEQ.S      NOVALID
EPV_3        MOVEM.W    2(A5),D6-D7
             JSR        SQDIST
             CMP.L      D2,D1
             BLS.S      VALID
             MOVEM.W    2(A5),D0-D3
             BSR.S      PNTONLN
             BNE.S      VALID
NOVALID      MOVE.L     #0,D7
             BRA.S      EPV_RTN
VALID        MOVE.L     #1,D7
EPV_RTN      MOVEM.L    (A7)+,D0-D6
             RTS
```

```
************************************************************************
*     INTSEC - LINE TO LINE INTERSECTION                                *
*         INPUT:   D0 - D7 contain the coordinates of the four points which *
*                  represent the two lines.  Coordinates of first line are *
*                  in D0 - D3 and coordinates of second line are in D4 - D7 *
*                  D0 D1 D2 D3 D4 D5 D6 D7                              *
*                  x1 y1 x2 y2 x3 y3 x4 y4                              *
*         OUTPUT:  D0, D1 contain the coordinate of the intersection point if *
*                  there is a intersection point.  Otherwise, D0 = -1. It *
*                  means both lines are parallel                        *
************************************************************************

XDEF       INTSEC
             XREF       LMUL,LDIV

CHIPTYPE EQU            68020

INTSEC       MOVEM.L    D2-D7/A0-A6,-(A7)
             MOVE.W     D1,-(A7)
             SUB.W      D3,D1
             EXT.L      D1
             SUB.W      D0,D2
             EXT.L      D2
             MULS.W     D1,D0
             MOVE.W     (A7)+,D3
             MULS.W     D2,D3
             ADD.L      D0,D3
             MOVE.W     D5,-(A7)
```

```
        SUB.W       D7,D5
        EXT.L       D5
        SUB.W       D4,D6
        EXT.L       D6
        MULS.W      D5,D4
        MOVE.W      (A7)+,D7
        MULS.W      D6,D7
        ADD.L       D4,D7
        MOVEM.L     D2/D6,-(A7)
        IFEQ        CHIPTYPE-68020
        TMULS.L     D1,D6
        TMULS.L     D5,D2
        ENDC
        IFNE        CHIPTYPE-68020
        MOVE.L      D6,-(A7)
        MOVE.L      D1,-(A7)
        JSR         LMUL
        ADDQ.L      #8,A7
        MOVE.L      D0,D6
        MOVE.L      D2,-(A7)
        MOVE.L      D5,-(A7)
        JSR         LMUL
        ADDQ.L      #8,A7
        MOVE.L      D0,D2
        ENDC
        SUB.L       D2,D6
        BEQ.S       INT_PARL
        MOVEM.L     (A7)+,D2/D4
        IFEQ        CHIPTYPE-68020
        TMULS.L     D3,D4
        BVS.S       INT_BAD
        TMULS.L     D7,D2
        BVS.S       INT_BAD
        ENDC
        IFNE        CHIPTYPE-68020
        MOVE.L      D4,-(A7)
        MOVE.L      D3,-(A7)
        JSR         LMUL
        ADDQ.L      #8,A7
        MOVE.L      D0,D4
        MOVE.L      D2,-(A7)
        MOVE.L      D7,-(A7)
        JSR         LMUL
        ADDQ.L      #8,A7
        MOVE.L      D0,D2
        ENDC
        SUB.L       D2,D4
        IFEQ        CHIPTYPE-68020
        TDIVS.L     D6,D4
        ENDC
        IFNE        CHIPTYPE-68020
        MOVE.L      D4,-(A7)
        MOVE.L      D6,-(A7)
        JSR         LDIV
        ADDQ.L      #8,A7
        MOVE.L      D0,D4
        ENDC
        MOVE.L      D4,D0
        BLT.S       INT_BAD
        IFEQ        CHIPTYPE-68020
        TMULS.L     D1,D7
        BVS.S       INT_BAD
        TMULS.L     D5,D3
        BVS.S       INT_BAD
        ENDC
        IFNE        CHIPTYPE-68020
        MOVE.L      D7,-(A7)
        MOVE.L      D1,-(A7)
        JSR         LMUL
        ADDQ.L      #8,A7
        MOVE.L      D0,D7
        MOVE.L      D3,-(A7)
        MOVE.L      D5,-(A7)
```

```
            JSR       LMUL
            ADDQ.L    #8,A7
            MOVE.L    D0,D3
            ENDC
            SUB.L     D3,D7
            IFEQ      CHIPTYPE-68020
            TDIVS.L   D6,D7
            ENDC
            IFNE      CHIPTYPE-68020
            MOVE.L    D7,-(A7)
            MOVE.L    D6,-(A7)
            JSR       LDIV
            ADDQ.L    #8,A7
            MOVE.L    D0,D7
            ENDC
            MOVE.L    D7,D1
            BLT.S     INT_BAD
            BRA.S     INT_RTN

INT_PARL    MOVEM.L   (A7)+,D2/D6
INT_BAD     MOVE.L    #-1,D0
INT_RTN     MOVEM.L   (A7)+,D2-D7/A0-A6
            RTS
```

GENERAL SUBROUTINES

```
****************************************************************************
*    ABS - ABSOLUTE VALUE                                                   *
*         INPUT:   D0.L contains the data                                   *
*         OUTPUT:  D0.L contains the absolute value of the input data       *
*         FUNCTION: this subroutine generates the absolute value of the     *
*                   input data                                              *
****************************************************************************

XDEF      ABS

ABS         TST.L     D0
            BGE.S     ABSRTN
            NEG.L     D0
ABSRTN      RTS

****************************************************************************
*    ARCCNT - ARC_CENTER                                                    *
*         INPUT:   the coordinates of three sequential points in the D0-D5  *
*         OUTPUT:  D0, D1 contains the x, y coordinates of the center point *
*                  and D2 contains the radius of the arc                    *
*         FUNCTION: this subroutine accepts three points and computes the   *
*                   center point and the radius of the arc. The mathematical*
*                   concept of this subroutine is as follows:               *
*                     delta = 2*(x3*y2+x1*y3+x2*y1-x1*y2-x2*y3-x3*y1);      *
*                     r1 = x1*x1+y1*y1;                                     *
*                     r2 = x2*x2+y2*y2;                                     *
*                     r3 = x3*x3+y3*y3;                                     *
*                     x_center = (y1*r2+y2*r3+y3*r1-y3*r2-y2*r1-y1*r3)/delta;*
*                     y_center = (x2*r1+x3*r2+x1*r3-x2*r3-x1*r2-x3*r1)/delta;*
*                     radius = distance(x_center,y_center,x1,y1);           *
****************************************************************************

XDEF      ARCCNT

ARCCNT      MOVEM.L   D3-D7/A0-A5,-(A7)
            MOVEM.W   D0-D5,-(A7)
            MOVEM.W   (A7)+,A0-A5
            MULU.W    D4,D3
            MULU.W    D0,D5
            MULU.W    D2,D1
            MOVE.W    A3,D6
            MULU.W    D6,D0
            MOVE.W    A5,D6
            MULU.W    D6,D2
            MOVE.W    A1,D6
            MULU.W    D6,D4
            ADD.L     D5,D3
            ADD.L     D1,D3
            SUB.L     D0,D3
```

```
        SUB.L       D2,D3
        SUB.L       D4,D3
        ASL.L       #1,D3
        BEQ         NO_CNT
        MOVE.L      D3,-(A7)
        MOVEM.W     A0-A5,-(A7)
        MOVEM.W     (A7)+,D0-D5
        MULU.W      D0,D0
        MULU.W      D1,D1
        ADD.L       D0,D1
        MULU.W      D2,D2
        MULU.W      D3,D3
        ADD.L       D2,D3
        MULU.W      D4,D4
        MULU.W      D5,D5
        ADD.L       D4,D5
        CLR.L       D4
        CLR.L       D6
        CLR.L       D7
        MOVEM.W     A1/A3/A5,-(A7)
        MOVEM.W     (A7)+,D4/D6/D7
        TMULS.L     D3,D4
        TMULS.L     D5,D6
        TMULS.L     D1,D7
        ADD.L       D6,D4
        ADD.L       D7,D4
        CLR.L       D2
        CLR.L       D6
        CLR.L       D7
        MOVEM.W     A1/A3/A5,-(A7)
        MOVEM.W     (A7)+,D2/D6/D7
        TMULS.L     D3,D7
        TMULS.L     D1,D6
        TMULS.L     D5,D2
        SUB.L       D7,D4
        SUB.L       D6,D4
        SUB.L       D2,D4
        MOVE.L      (A7)+,D0
        TDIVS.L     D0,D4
        MOVE.L      D4,-(A7)
        MOVE.L      D0,-(A7)
        CLR.L       D2
        CLR.L       D6
        CLR.L       D7
        MOVEM.W     A0/A2/A4,-(A7)
        MOVEM.W     (A7)+,D2/D6/D7
        TMULS.L     D1,D6
        TMULS.L     D3,D7
        TMULS.L     D5,D2
        ADD.L       D7,D6
        ADD.L       D2,D6
        CLR.L       D2
        CLR.L       D4
        CLR.L       D7
        MOVEM.W     A0/A2/A4,-(A7)
        MOVEM.W     (A7)+,D2/D4/D7
        TMULS.L     D5,D4
        TMULS.L     D3,D2
        TMULS.L     D1,D7
        SUB.L       D4,D6
        SUB.L       D2,D6
        SUB.L       D7,D6
        MOVE.L      (A7)+,D0
        TDIVS.L     D0,D6
        MOVE.L      D6,D5
        MOVE.L      (A7)+,D4
        MOVE.W      A0,D6
        MOVE.W      A1,D7
        JSR         DISTANCE
        MOVE.W      D1,D2
        MOVE.L      D4,D0
        MOVE.L      D5,D1
        BRA.S       ACNT_RTN
```

```
NO_CNT   MOVE.L     #-1,D0
ACNT_RTN MOVEM.L    (A7)+,D3-D7/A0-A5
         RTS
*********************************************************************
*   COSINX - THE COSIN VALUE OF THE ANGLE FORMED BY THREE POINTS    *
*      INPUT:   D1, D2 contain x0, y0 which are the coordinates of the *
*               intermidiate point.  D3, D4, D5, D6 contain the coordinates *
*               of other two points                                 *
*      OUTPUT:  D0.L contains the consin value of the angle.        *
*      FUNCTION: the mathematic equation of this subroutine is as follows: *
*                       (x1-x0)(x2-x0)+(y1-y0)(y2-y0)               *
*      COSINX = ----------------------------------------------------*
*               sqrt((x1-x0)**2+(y1-y0)**2)*sqrt((x2-x0)**2+(y2-y0)**2) *
*********************************************************************

XDEF       COSINX
         XREF       SQRT32,LDIV,LMUL

CHIPTYPE EQU        68020

COSINX   MOVEM.L    D1-D6/A0-A1,-(A7)
         SUB.W      D1,D3
         SUB.W      D1,D5
         SUB.W      D2,D4
         SUB.W      D2,D6
         MOVEM.W    D5-D6,-(A7)
         MOVEM.W    (A7)+,A0-A1
         MULS.W     D3,D5
         MULS.W     D4,D6
         ADD.L      D5,D6
         BNE.S      COS_1
         MOVE.L     #-10,D0
         BRA.S      COS_RTN
COS_1    NOP
         IFEQ       CHIPTYPE-68020
         TMULS.L    #10,D6
         ENDC
         IFNE       CHIPTYPE-68020
         MOVE.L     D6,-(A7)
         MOVE.L     #10,-(A7)
         JSR        LMUL
         ADDQ.L     #8,A7
         MOVE.L     D0,D6
         ENDC
         MULS.W     D3,D3
         MULS.W     D4,D4
         ADD.L      D3,D4
         MOVE.L     D4,D1
         JSR.L      SQRT32
         MOVE.W     D0,-(A7)
         MOVE.W     A0,D1
         MOVE.W     A1,D2
         MULS.W     D1,D1
         MULS.W     D2,D2
         ADD.L      D1,D2
         MOVE.L     D2,D1
         JSR.L      SQRT32
         MULU.W     (A7)+,D0

IFEQ       CHIPTYPE-68020
         TDIVS.L    D0,D6
         ENDC
         IFNE       CHIPTYPE-68020
         MOVE.L     D6,-(A7)
         MOVE.L     D0,-(A7)
         JSR        LDIV
         ADDQ.L     #8,A7
         MOVE.L     D0,D6
         ENDC
         MOVE.L     D6,D0
COS_RTN  MOVEM.L    (A7)+,D1-D6/A0-A1
         RTS
```

```
***************************************************************************
*      DISTANCE - DISTANCE BETWEEN TWO POINTS                              *
*          INPUT:   D4.W contains x coordinate of point1                   *
*                   D5.W contains y coordinate of point1                   *
*                   D6.W contains x coordinate of point2                   *
*                   D7.W contains y coordinate of point2                   *
*          OUTPUT:  D1.W contains the value of the distance between the    *
*                   two input points                                       *
*                   rest of the registers are preserved                    *
*          FUNCTION: this subroutine computes the value of the distance    *
*                   between the two input points                           *
***************************************************************************

XDEF      DISTANCE
              XREF      SQRT32

DISTANCE      MOVEM.L   D0/D4-D7,-(A7)
              SUB.W     D4,D6
              BLT.S     D_FWD1
              ADDQ.W    #1,D6
              BRA.S     D_FWD2
D_FWD1        ADD.W     #-1,D6
D_FWD2        SUB.W     D5,D7
              BLT.S     D_FWD3
              ADDQ.W    #1,D7
              BRA.S     D_FWD4
D_FWD3        ADD.W     #-1,D7
D_FWD4        MULS.W    D6,D6
              MULS.W    D7,D7
              ADD.L     D6,D7
              MOVE.L    D7,D1
              JSR       SQRT32
              MOVE.W    D0,D1
              MOVEM.L   (A7)+,D0/D4-D7
              RTS

***************************************************************************
*      SQDIST - SQUARE DISTANCE BETWEEN TWO POINTS                         *
*          INPUT:   D4.W contains x coordinate of point1                   *
*                   D5.W contains y coordinate of point1                   *
*                   D6.W contains x coordinate of point2                   *
*                   D7.W contains y coordinate of point2                   *
*          OUTPUT:  D1.L contains the square value of the distance between the *
*                   two input points                                       *
*                   rest of the registers are preserved                    *
*          FUNCTION: this subroutine computes the square value of the distance *
*                   between the two input points                           *
***************************************************************************

XDEF      SQDIST

SQDIST        MOVEM.L   D0/D4-D7,-(A7)
              SUB.W     D4,D6
              BLT.S     S_FWD1
              ADDQ.W    #1,D6
              BRA.S     S_FWD2
S_FWD1        ADD.W     #-1,D6
S_FWD2        SUB.W     D5,D7
              BLT.S     S_FWD3
              ADDQ.W    #1,D7
              BRA.S     S_FWD4
S_FWD3        ADD.W     #-1,D7
S_FWD4        MULS.W    D6,D6
              MULS.W    D7,D7
              ADD.L     D6,D7
              MOVE.L    D7,D1
              MOVEM.L   (A7)+,D0/D4-D7
              RTS
```

```
*********************************************************************
*    SINX - THE SIN VALUE OF THE ANGLE FORMED BY TWO VECTORS        *
*        INPUT:   A1 points to the first vector which is the base vector *
*                 A2 points to the second vector.  The format of the vector *
*                 is x1,y1,x2,y2                                     *
*        OUTPUT:  D0.W contains the sin value of the angle           *
*********************************************************************

SINX     MOVEM.L    D1-D7,-(A7)
         MOVEM.W    (A1),D3-D6
         MOVEM.W    (A2),D1-D2
         JSR        RELPOS
         MOVE.L     D0,D7
         MOVEM.W    4(A2),D1-D2
         JSR        RELPOS
         MOVEM.L    D0/D7,-(A7)
         MOVEM.W    (A2),D4-D7
         JSR        DISTANCE
         MOVE.W     D1,D3
         MOVEM.W    (A1),D4-D7
         JSR        DISTANCE
         MOVEM.L    (A7)+,D0/D7
         CMP.L      D0,D7
         BGE.S      D7D0
D0D7     SUB.L      D7,D0
         DIVU.W     D1,D0
         MOVE.W     D0,D2
         BRA.S      SIN_1
D7D0     SUB.L      D0,D7
         DIVU.W     D1,D7
         MOVE.W     D7,D2
SIN_1    MULU.W     #10,D2
         DIVU.W     D3,D2
         MOVE.W     D2,D0
         MOVEM.L    (A7)+,D1-D7
         RTS

*********************************************************************
*    RELPOS - RELATIVE POSITION                                      *
*        INPUT:   D1, D2 contain the x, y coordinates of a point. D3, *
*                 D4, D5, D6 contain the two end points of a line    *
*        OUTPUT:  D0 contain the value of relative position between the *
*                 point and the line                                 *
*        FUNCTION: this subroutine computes the value of the relative *
*                  position.  D1, D2, D3, D4, D5, D6 contain x0, y0, x1, *
*                  y1, x2, y2, respectively.  The mathematical concept of *
*                  this subroutine is as follows:                    *
*                      a = y2 - y1;    b = x2 - x1;                  *
*                      c = y0 - y1;    d = x0 - x1;                  *
*                      s = c * b - d * a;                            *
*********************************************************************

XDEF       RELPOS

RELPOS   MOVEM.L    D1/D2/D5/D6,-(A7)
         SUB.W      D4,D2
         SUB.W      D3,D5
         MULS.W     D5,D2
         SUB.W      D3,D1
         SUB.W      D4,D6
         MULS.W     D6,D1
         SUB.L      D1,D2
         MOVE.L     D2,D0
         MOVEM.L    -(A7)+,D1/D2/D5/D6
         RTS
```

```
***********************************************************************
*    PROJECT - PROJECTION                                              *
*       INPUT:   D4, D5 contain the x, y coordinates of the point going to *
*                be projected.  D0, D1, D2, D3 contain the two end points *
*                of a line                                              *
*       OUTPUT:  D6, D7 contain the x, y coordinates of the point which is *
*                the projection point on the input line                 *
*                the value of rest of the registers are all preserved   *
*       FUNCTION: this subroutine compute the projection point on line D0,D1 - *
*                -- D2,D3 which contain x1, y1, x2, y2, respectively.  D4, D5 *
*                contain x0, y0.  The mathematical concept is as follows: *
*                    relpos = (x1 - x0) * delta_y - (y1 - y0) * delta_x *
*                    sqdist = delta_x * delta_x + delta_y * delta_y     *
*                    x = x0 + delta_y * relpos / sqdist                 *
*                    y = y0 - delta_x * relpos / sqdist                 *
***********************************************************************

XDEF        PROJECT

PROJECT     MOVEM.L     D0-D5,-(A7)
            SUB.W       D2,D2
            BEQ.S       PRJ_VER
            SUB.W       D1,D3
            BEQ.S       PRJ_HOR
            MOVEM.W     D2-D3,-(A7)
            SUB.W       D4,D0
            SUB.W       D5,D1
            MULS.W      D3,D0
            MULS.W      D2,D1
            SUB.L       D1,D0
            MULS.W      D2,D2
            MULS.W      D3,D3
            MOVE.L      D2,D1
            ADD.L       D3,D1
            MOVEM.W     (A7)+,D2-D3
            EXT.L       D3
            MULS.L      D0,D6:D3
            DIVS.L      D1,D6:D3
            ADD.W       D3,D4
            MOVE.W      D4,D6
            EXT.L       D2
            MULS.L      D0,D7:D2
            DIVS.L      D1,D7:D2
            SUB.W       D2,D5
            MOVE.W      D5,D7
            BRA.S       PRJRTN
PRJ_VER     MOVE.W      D0,D6
            MOVE.W      D5,D7
            BRA.S       PRJRTN
PRJ_HOR     MOVE.W      D4,D6
            MOVE.W      D1,D7
PRJRTN      TST.W       D6
            BGE.S       PRJRTN_1
            MOVE.W      #0,D6
PRJRTN_1    TST.W       D7
            BGE.S       PRJRTN_2
            MOVE.W      #0,D7
PRJRTN_2    MOVEM.L     (A7)+,D0-D5
            RTS
```

```
GRIDLINK                IDNT    0,2

****************************************************************************
*
*       MODULE NAME:  GRIDLINK.SA                     (C) COPYRIGHT 1986 GTX CORP
*
*       REVISION HISTORY        V
*                               E R
*                               R E
*       AUTHOR      DATE        S V  - ADD CHANGES TO THE TOP
*       ------      ----        --------------------------------
*       PBF         09/04/86    0.1 - ORIGINAL WRITING
*       PBF         09/24/86    0.2 - Added UNLINK0
*
*       MODULE DESCRIPTION:
*       GRIDLINK contains routines to divide a picture into small squares
*       for quick location of segment endpoints, and to link segment
*       endpoints into those grids.
*
*         ENTRY CONDITIONS:
*
*          EXIT CONDITIONS:
*
*              REGISTERS USED
*              0  1  2  3  4  5  6  7
*             +------------------------+
*       A !                            !
*             -------------------------
*       D !                            !
*             -------------------------
*             * = DESTROYED
*             P = REGISTER USED BUT PRESERVED
*             E = ENTRY PARAMETER - PRESERVED
*             B = ENTRY PARAMETER & RETURN VALUE
*             R = RETURN VALUE
*
*       NOTES:
*
****************************************************************************
        XDEF    INITGRID,GETGRID,NXTGRID,NXTRECD,LINK,UNLINK
        XDEF    GETHORZ,NXTHORZ,UNLNKPNT

XREF    LINEGAP

GRAPH    EQU    1
XENTRIES EQU    22
YENTRIES EQU    34
GRIDSLEN EQU    XENTRIES*YENTRIES

****************************************************************************
* INITGRID - Initialize the grid links.
*
* ENT: D5 = Object X size.
*      D7 = Object Y size.
*
* RTN: D0,D1,A6 used
****************************************************************************
INITGRID MOVE.W  #LINEGAP+1,MAXGAP
         MOVE.W  #LINEGAP,D1
         ASL.W   #2,D1
         CLR.L   D0
         MOVE.W  D5,D0
         DIVU.W  #XENTRIES-1,D0
         CMP.W   D1,D0
         BCC.S   INITG1
         MOVE.W  D1,D0
INITG1   MOVE.W  D0,XGSIZE
         CLR.L   D0
         MOVE.W  D7,D0
         DIVU.W  #YENTRIES-1,D0
         CMP.W   D1,D0
```

```
                BCC.S       INITG2
                MOVE.W      D1,D0
INITG2          MOVE.W      D0,YGSIZE
                CLR.L       D0
                MOVE.W      #GRIDSLEN-1,D1
                LEA         GRIDS,A6
GRDZRO          MOVE.L      D0,(A6)+
                DBRA        D1,GRDZRO
                RTS

*******************************************************************
* GETGRID - Get the first pointer from GRIDS.
*
* ENT: D0 = XXYY of line endpoint in pixels.
*
* RTN: A4=D0= Pntr to lineseg entry, or 0 (zero flag set) if none.
*      D7 = 0 if first endpoint, 4 if second.
*      All other regs unchanged.
*******************************************************************
GETGRID         MOVE.L      D1,-(A7)
                CLR.L       D1
                MOVE.W      D0,D1
                CLR.W       D0
                SWAP        D0
                CMP.W       XMIN,D0
                BGE.S       GETGRID1
                MOVE.W      XMIN,D0
GETGRID1        SUB.W       XMIN,D0
                DIVU.W      XGSIZE,D0
                MOVE.W      D0,XGRID
                SWAP        D0
                MOVE.W      D0,XREM
                CMP.W       YMIN,D1
                BGE.S       GETGRID2
                MOVE.W      YMIN,D1
GETGRID2        SUB.W       YMIN,D1
                DIVU.W      YGSIZE,D1
                MOVE.W      D1,YGRID
                SWAP        D1
                MOVE.W      D1,YREM
                EOR.W       D0,D0
                SWAP        D0
                MULU.W      #YENTRIES,D0
                ADD.W       YGRID,D0
                MOVE.W      D0,GRID
                MOVE.L      (A7)+,D1
                MOVE.L      #NXTG,NXTSTATE

*******************************************************************
* GOTGRID - Got a grid number. Point D0 to grid pointer.
*
* ENT: D0 = grid #.
*******************************************************************
GOTGRID         ASL.L       #2,D0
                ADD.L       #GRIDS,D0

*******************************************************************
* GETPNTR - Get a pntr and strip out the 1st/2nd endpoint flag.
*
* ENT: D0 -) pntr.
*
* RTN: D0 = A4 = Pntr.  (Zero flag set if 0)
*      D7 = 0 for 1st endpoint, 4 for 2nd.
*******************************************************************
GETPNTR         MOVE.L      D0,LASTLINK
                BEQ.S       GETPNTX
                CLR.L       D7
                MOVE.L      D0,A4
                MOVE.L      (A4),D0
                BEQ.S       GETPNTX
                BCLR.L      #30,D0
                BEQ.S       GETPNT1
                MOVEQ       #4,D7
```

```
GETPNT1   MOVE.W    D7,SIDE
          MOVE.L    D0,A4
GETPNTX   TST.L     D0
          RTS

*************************************************************
* NXTGRID - Get the next grid to check, if any.
*
* ENT: Grid parameters set up by GETGRID.
*
* RTN: Same as GETGRID.
*************************************************************
NXTGRID   CLR.L     D0
          MOVE.W    GRID,D0
          MOVE.L    NXTSTATE,A4
          JMP       (A4)

*************************************************************
**** State 0. Check for any grids needed left of endpoint.
*************************************************************
NXT0      MOVE.W    XREM,D7
          CMP.W     MAXGAP,D7
          BCC.S     NXT3
          MOVE.W    XGRID,D7
          BEQ.S     NXT6
          LEA       NXT1,A4
          BRA.S     NXTLEFT

**** State 1. Check for grid at upper left.
NXT1      BSR       CHKUPPER
          BCC.S     NXT2
          SUBQ.L    #1,D0
          LEA       NXT7,A4
          BRA.S     NXTLEFT

**** State 2. Check for grid at lower left.
NXT2      BSR       CHKLOWER
          BCC       NXTDONE
          ADDQ.L    #1,D0
          LEA       NXT6,A4

**** Return a grid number left of main grid.
NXTLEFT   SUB.W     #YENTRIES,D0
          BRA.S     NXTRIT1

*************************************************************
**** State 3. Check for grids right of endpoint.
*************************************************************
NXT3      MOVE.W    XGSIZE,D7
          SUB.W     XREM,D7
          CMP.W     MAXGAP,D7
          BCC.S     NXT6
          MOVE.W    XGRID,D7
          CMP.W     #XENTRIES-1,D7
          BCC.S     NXT6
          LEA       NXT4,A4
          BRA.S     NXTRITE

**** State 4. Check for grid at upper right.
NXT4      BSR.S     CHKUPPER
          BCC.S     NXT5
          SUBQ.L    #1,D0
          LEA       NXT7,A4
          BRA.S     NXTRITE

**** State 5. Check for grid at lower right.
NXT5      BSR.S     CHKLOWER
          BCC.S     NXTDONE
          ADDQ.L    #1,D0
          LEA       NXT6,A4

**** Return a grid at right of main grid.
NXTRITE   ADD.W     #YENTRIES,D0
NXTRIT1   MOVE.L    A4,NXTSTATE
          BRA.W     GOTGRID
```

```
**** State 6. Check for grids above and below main grid.
NXT6    BSR.S    CHKLOWER
        BCC.S    NXT7
        ADDQ.L   #1,D0
        BRA.S    NXTVERT

**** State 7. Check for grid above main grid.
NXT7    BSR.S    CHKUPPER
        BCC.S    NXTDONE
        SUBQ.L   #1,D0

**** Check a grid above or below main grid.
NXTVERT MOVE.L   #NXTDONE,NXTSTATE
        BRA.W    GOTGRID

*********************************************************************
* CHKUPPER - Check for a grid above this grid.
*
* RTN: Carry set if grid needs checking, else carry clear.
*      Exits if close to upper edge but no upper grid.
*********************************************************************
CHKUPPER MOVE.W  YREM,D7
         CMP.W   MAXGAP,D7
         BCC.S   CHKUPPX
         TST.W   YGRID
         BEQ.S   CHKDONE
         ORI     #1,CCR
CHKUPPX  RTS

*********************************************************************
* CHKLOWER - Check for a grid below this grid.
*
* RTN: Carry set if grid needs checking.
*      Exits if close to bottom edge but no lower grid.
*********************************************************************
CHKLOWER MOVE.W  YGSIZE,D7
         SUB.W   YREM,D7
         CMP.W   MAXGAP,D7
         BCC.S   CHKLOWX
         MOVE.W  YGRID,D7
         CMP.W   #YENTRIES-1,D7
         BCC.S   CHKDONE
CHKLOWX  RTS

**** Remove the return adrs and return "no grids".
CHKDONE  ADDQ.L  #4,A7

*********************************************************************
* NXTDONE - Return "no grids".
*********************************************************************
NXTDONE  EOR.L   D0,D0
         RTS

*********************************************************************
* GETHORZ - Get 1st grid for horizontal desegmentation.
*
* ENT: GETGRID previously run.
*
* RTN: Same as GETGRID.
*********************************************************************
GETHORZ  MOVE.W  YGRID,D0
         BRA.S   NXTHORZ3

*********************************************************************
* NXTHORZ - Get next grid for horizontal desegmentation.
*
* ENT: GETHORZ previously run.
*
* RTN: Same as GETGRID.
*********************************************************************
NXTHORZ  CLR.L   D0
```

```
                MOVE.W      HGRID,D0
                CMP.W       XGRID,D0
                BCC.S       NXTHORZ1
                ADDQ.W      #1,D0
                BRA.S       NXTHORZ4

**** Finished all X grids. Need another row above or below?
NXTHORZ1        MOVE.W      VGRID,D0
                CMP.W       YGRID,D0
                BNE         NXTDONE
                BSR         CHKUPPER
                BCC.S       NXTHORZ2
                SUBQ.L      #1,D0
                BRA.S       NXTHORZ3
NXTHORZ2        BSR         CHKLOWER
                BCC         NXTDONE
                ADDQ.L      #1,D0
NXTHORZ3        MOVE.W      D0,VGRID
                CLR.L       D0
NXTHORZ4        MOVE.W      D0,HGRID
                MULU        #YENTRIES,D0
                ADD.W       VGRID,D0
                BSR         GETGRID
                BEQ.S       NXTHORZ
                RTS

****************************************************************
* NXTRECD - Get next record in current string.
*
* ENT: A4 -) Lineseg entry.
*
* RTN: Same as GETGRID.
****************************************************************
NXTRECD         CLR.L       D0
                MOVE.W      SIDE,D0
                ADD.L       A4,D0
                ADDQ.L      #8,D0
                BRA.W       GETPNTR

****************************************************************
* LINK - Link endpoint at x,y to grid.
*
* ENT: D0 = XXYY of endpoint in pixels.
*      A4 -) Lineseg entry to link.
*      D7 = 0 for 1st side, 4 for 2nd.
*
* RTN: D0,D7 used. All other regs unchanged.
****************************************************************
LINK            MOVEM.L     D6/A4-A5,-(A7)
                MOVE.L      A4,A5
                MOVE.L      D7,D6
                BSR.W       GETGRID
                MOVE.L      LASTLINK,A4
                MOVE.L      (A4),D0
                MOVE.L      D0,8(A5,D6)
                MOVE.L      A5,D0
                TST.B       D6
                BEQ.S       LINK1
                BSET.L      #30,D0
LINK1           MOVE.L      D0,(A4)
                MOVEM.L     (A7)+,D6/A4-A5
                RTS

****************************************************************
* UNLINK - Unlink an endpoint from the grid.
*
* ENT: A4 -) Lineseg entry
*
* RTN: All regs unchanged.
****************************************************************
UNLINK          MOVEM.L     A0/A4,-(A7)
                MOVE.L      LASTLINK,A0
```

```
            ADDA.W    SIDE,A4
            MOVE.L    8(A4),(A0)
            MOVEM.L   (A7)+,A0/A4
            RTS

*********************************************************************
* UNLNKPNT - Unlink a specific point.
*
* ENT: A4 -) Lineseg entry to unlink.
*      D0 = XXYY of endpoint in pixels.
*      D7 = 0 for 1st side, 4 for 2nd
*
* RTN:.D0,D7 used. All other regs unchanged.
*********************************************************************
UNLNKPNT  MOVEM.L   D4/D6/A4,-(A7)
          MOVE.L    A4,D4
          MOVE.L    D7,D6
          BSR.W     GETGRID
          BNE.S     UNLNKP3
UNLNKP1   BSR.W     NXTGRID
UNLNKP2   BEQ.S     UNLNKP5
UNLNKP3   CMP.L     A4,D4
          BNE.S     UNLNKP3A
          CMP.B     D7,D6
          BEQ.S     UNLNKP4
UNLNKP3A  BSR.S     NXTRECD
          BNE.S     UNLNKP3
          BRA.S     UNLNKP1
UNLNKP4   BSR.S     UNLINK
UNLNKP5   MOVEM.L   (A7)+,D4/D6/A4
          RTS

INCLUDE   DATA.SA

END

MAXPNTS   SET       500
VECTORS   SET       200

LOCAL     SECTION   14
FRNT_X    DS.W      MAXPNTS
CNT_X     DS.W      MAXPNTS
PNT_Y     DS.W      MAXPNTS
CNT_Y     DS.W      MAXPNTS
REAR_X    DS.W      MAXPNTS
FRNT_TMP  DS.L      2*VECTORS
REAR_TMP  DS.L      2*VECTORS
FRNT_VEC  DS.L      2*VECTORS
REAR_VEC  DS.L      2*VECTORS
BUF_PTR   DS.L      1
BUFFER    DS.W      7*VECTORS
BRH_HEAD  DS.L      1
BRH_IDX   DS.L      1
OBJ_HEAD  DS.L      1
REC_HEAD  DS.L      1
TB_PHEAD  DS.L      1
TB_HEAD   DS.L      1
CD_HEAD   DS.L      1
CD_REC    DS.L      1
CD_IDX    DS.L      1
STK_IDX   DS.L      1
LF_VEC    DS.L      2
LR_VEC    DS.L      2
DIV_PTR   DS.L      1
DIV_BUF   DS.L      500
ENDIVBUF  EQU       *
DIV_USE   DS.L      1
PRI_VEC   DS.L      1
WDTHSUM   DS.L      1
TBH_CON   DS.L      1
RH_CON    DS.L      1
NXTSTATE  DS.L      1
LASTLINK  DS.L      1
```

```
         GRIDS    DS.L    $2EC
         IDX_CON  DS.W    1
         Y_CON    DS.W    1
         N_INTSEC DS.W    1
         N_OTHER  DS.W    1
         INTSEC1  DS.W    1
         INTSEC2  DS.W    1
         MINWDTH  DS.W    1
         MAXWDTH  DS.W    1
         EPSILON  DS.W    1
         OVERTOL  DS.W    1
         INDEX    DS.W    1
         N_SLCS   DS.W    1
         N_PNTS   DS.W    1
         H_SHAPE  DS.W    1
         CD_CNT   DS.W    1
         INT_CNTR DS.W    1
         Y        DS.W    1
         XMIN     DS.W    1
         YMIN     DS.W    1
         LASTLEN  DS.W    1
         GAP      DS.W    1
         MAH_COD  DS.W    1
         MAXGAP   DS.W    1
         XGSIZE   DS.W    1
         YGSIZE   DS.W    1
         XGRID    DS.W    1
         XREM     DS.W    1
         YGRID    DS.W    1
         YREM     DS.W    1
         GRID     DS.W    1
         SIDE     DS.W    1
         HGRID    DS.W    1
         VGRID    DS.W    1
                  DS.W    1
         UP_OFRM  DS.B    1
         TYPE     EQU     *
         UP_TYPE  DS.B    1
         DWN_TYPE DS.B    1
         LOOP_FL  DS.B    1
         COUNTER  DS.B    1
         COMB_FL  DS.B    1
         CVX_FLG  DS.B    1
         CARC_FLG DS.B    1
         CHAR_FLG DS.B    1
         UD_FL    DS.B    1
         REL_FL   DS.B    1
         TRYFLG   DS.B    1
         PRCFLG   DS.B    1
         EPEXT_FL DS.B    1
         SHORT_FL DS.B    1
         ARCRCG_F DS.B    1
         LINE_FL  DS.B    1
         INC_FLG  DS.B    1
         GOOD_BRH DS.B    1
         PNT1_FL  DS.B    1
         BRK_FL.  DS.B    1
                  DS.B    3
********** Memory file pointers. THESE MUST REMAIN IN THIS ORDER.
********** Memory files
         NONLINE  DS.L    1
         LINKPTR  DS.L    1
         BRHPTR   DS.L    1
         LINESEG  DS.L    1
         VECSEG   DS.L    1

********** NONLINE, LINESEG, & VECSEG files use rest of local ram.
                  IFEQ    GRAPH
                  DS.B    $2000
.ENDLOCL
                  ENDC

IFNE    GRAPH
.ENDLOCL EQU      $8001FC00
                  ENDC
```

I claim:

1. A method for vectorizing data obtained by electronically scanning an object of a document, the data being assembled into records definitive of connected basic shapes of which the object is composed, the method comprising the steps of:
   (a) obtaining the record of a first basic shape of the object;
   (b) vectorizing a front edge of the first basic shape and vectorizing a rear edge of the first basic shape;
   (c) determining if the first basic shape is accurately representable as an arc vector, a line vector, or a filled shape consisting of a plurality of stored runlength slices by operating on the front and rear edge vectors obtained in step (b);
   (d) generating an input vector that is a line vector or an arc vector if the first basic shape is to be represented by a line vector or an arc vector, respectively, and generating data defining a filled shape it if the first basic shape is to be represented as a filled shape;
   (e) if the first basic shape is represented as a filled shape, entering the filled shape data as a new entry into a filled shape table;
   (f) if the first basic shape is represented by an input vector, determining whether the input vector touches an intermediate vector and can be combined with a vector that is spaced from the input vector, touches the intermediate vector, and is already stored in a vector table, and if this determination is affirmative, combining the input vector with the stored vector and storing the combined vector in the vector table, and it this determination is negative, entering the input vector as a new entry into the vector table; and
   (g) repeating steps (a) through (f) for any additional basic shapes of the object until the entire object has been vectorized.

2. The method of claim 1 wherein the records include blob records that include runlength slices of blobs which are non-trapezoidal irregular basic shapes of the object.

3. The method of claim 2 wherein the records include trapezoid records that include four corner points of trapezoids that are basic shapes of the object.

4. The method of claim 3 wherein the records include convergence records and divergence records that each include pointers to basic shapes connected to convergences and divergences, respectively, of the object.

5. The method of claim 4 wherein step (g) includes repeating steps (a) through (f) for all of the basic shapes connected to a first intersection before repeating steps (a) through (f) for any basic shapes connected to a second intersection but not connected to the first intersection.

6. The method of claim 5 including incrementing an intersection counter after all of the basic shapes connected to the first intersection have been vectorized.

7. The method of claim 6 including repeating steps (a) through (f) for a basic shape connected to the second intersection but not to the first intersection after the incrementing of the intersection counter.

8. The method of claim 5 including determining if the first basic shape is horizontal before performing step (b).

9. The method of claim 8 wherein if the first basic shape is not horizontal, step (c) includes determining if the front and rear edges of the first basic shape each include a plurality of line vectors of similar length, and if so, determining if the first basic shape is nearly horizontal, and if the first basic shape is not nearly horizontal, generating an arc code indicating that the first basic shape is to be represented by an arc vector, and if the first basic shape is nearly horizontal, determining if the first basic shape is convex.

10. The method of claim 9 including generating an intersection blob code indicating that the first basic shape is to be representedas an intersection blob if the first basic shape is not convex, and generating a filled circle code indicating that the first basic shape is to be represented as a filled circle if the first basic shape is convex.

11. The method of claim 9 including, if the front and rear edges of the first basic shape do not each include a plurality of line vectors of similar length, determining if the longest front edge vector of the first basic shape is parallel to the longest rear edge vector thereof, and if this determination is affirmative, generating a vertical vector code indicating that the first basic shape is to be represented by a vertical vector if the front and rear edge vectors of the first basic shape are vertical, and generating a diagonal vector indicating that the first basic shape is to be represented by a diagonal vector if the front and rear edges of the first basic shape are parallel diagonal vectors.

12. The method of claim 11 including generating a filled polygon code indicating that the first basic shape is to be represented as a filled polygon if the longest vectors of the front and rear edges of the first basic shape are not parallel.

13. The method of claim 12 wherein step (d) includes utilizing one of the filled polygon, diagonal vector, vertical vector, horizontal vector, filled circle, or arc codes to cal up and execute a vector generating subroutine or a filled shape data generating subroutine in order to generate a vector representing the first basic shape or to generate filled shape data accurately representing the first basic shape.

14. The method of claim 13 wherein step (e) includes determining if the information generated in step (d) is an input vector or filled shape data, and if the information is filled shape data, entering the filled shape data as a new entry into the filled shape table, and if the information if a vector, determining if that vector is an arc vector.

15. The method of claim 14 including executing a line desegmentation subroutine if the input vector is not an arc vector and executing an arc desegmentation subroutine if the input vector is an arc vector.

16. The method of claim 15 wherein executing the line desegmentation subroutine includes resetting a combine flag, determining if any vector in the table has the same intersection number as the present input vector, and if this determination is affirmative, determining if the stored vector is an arc vector, and if this determination is affirmative, executing the arc desegmentation subroutine, and if that determination is negative, determining if the input vector and the stored vector are sufficiently close together and sufficiently colinear that the input vector can be combined with the stored vector, and if that determination is affirmative, setting the combine flag.

17. The method of claim 16 including entering the input vector as a new entry in the vector table if it is determined that no vector stored in that table has the same intersection number as the input vector.

18. The method of claim 17 wherein executing of the line desegmentaion subroutine includes determining if the input vector begins at an open point and ends at a divergence, and if so, entering the input vector into the vector table, and if not, determining if the input vector is in an intersection that includes an upper convergence and a lower divergence, and if this determination is affirmative, determining if the vector is too short to be entered into the vector table, and if not, entering it as a new entry into the vector table, and if the input vector is not in the intersection, then determining if the input vector begins at a convergence and ends at an open point, and if not, determining if any vector stored in the vector table has the same intersection number as the input vector, and if the input vector begins at a convergence and ends at an open point, determining if the input vector is too short to be combined with a stored vector.

19. The method of claim 17 wherein executing the arc desegmentation subroutine includes resetting a combine flag, determining if the two closest end points of the input vector and a vector stored in the vector table having the present intersection number are close enough to allow the two to be combined, and if not, entering the input arc vector as a new entry in the vetor tablet, and if so, determining if the lengths of the input arc vector and the stored vector are similar, and if they are not, entering the input vector into the vector table, but if they are, computing the intersection between the input vector and the stored vector, and determining if the computed angle is less than about 90 degrees, and if it is, entering the input vector into the vector table, but if it is not, determining if the input arc vector and the stored vector, if combined, form a convex shape, and if they do not, entering the input vector as a new entry in the vector table, and if they do, setting the combine flag and then combining the input vector with the stored vector in the vector table.

20. The method of claim 15 including executing a polygon merging subroutine if the information generated in step (d) represents a filled polygon, including the steps of determining if the present filled polygon is close to a filled polygon already stored in the filled shape table, and if it is, determining if there is a horizontal edge at the lowest point of one of those two filled polygons and a horizontal edge at the highest point of the other of those two filled polygons, and if so, determining if the two horizontal edges are substantially coextensive, and if they are, generating a filled polygon record including all vertices of both of the filled polygon, and deleting one vertex of each pair of vertices which are closer than a first predetermined distance apart from the filled polygon record.

21. The method of claim 20 including determining if the middle vertex of a groupof three consecutive vertices lies less than a second predetermined distance from a straight line through the outer two vertices of that group and if it is deleting the middle vertex, and repeating the two foregoing steps for a separate group of three consecutive vertices in the filed polygon record.

22. The method of claim 15 including generating a polygon merging subroutine if the information generated in step (d) represents a filled polygon, including the steps of determining if the present filled polygon is close to a filled polygon already stored in the filled shape table, and if it is, determining if there is a horizontal edge at the lowest point of one of those two filled polygons and a horizontal edge at the highest pont of the other of those two filled polygons, and if so, determining if the two horizontal edges are substantially coextensive, and if they are, generating a filled polygon record including all vertices of both of the filled polygons, and determining if the middle vertex of a group of three consecutive vertices in the filled polygon record lies less than a predetermined distance from a straight line through the outer two vertices of that group, and if it is, deleting the middle vertex from the filled polygon record, and repeating the two foregoing stepsfor a different group of three consecutive vertices in the filled polygon record.

23. A method for vectorizing data obtained by electronically scanning an object of a document, the data being assembled into records definitive of connected basic shapes of which the object is composed, the method comprising the steps of:
   (a) obtaining the record of a first basic shape of the object;
   (b) vectorizing a front edge and vectorizing a rear edge of the first basic shape;
   (c) determining if the first basic shape is accurately representable as a line vector, by operating on the front and rear edge vectors obtained in step (b);
   (d) generating an input vector that is a line vector;
   (e) if the first basic shape is represented by an input vector, determining whether the input vector touches an intermediate vector and can be combined with a vector that is spaced from the input vector, touches the intermediate vector, and is already stored in a vector table, and if this determination is affirmative, combining the input vector with the stored vector and storing the combined vector in the vector table, and if this determination is negative, entering the input vector as a new entry into the vector table; and
   (f) repeating steps (a) through (e) for any additional basic shapes of the object until the entire object has been vectorized.

24. A method for vectorizing data obtained by electronically scanning an object of a document, the data being assembled into records definitive of connected basic shapes of which the object is composed, the method comprising the steps of:
   (a) obtaining the record of a first basic shape of the object;
   (b) vectorizing a front edge of the first basic shape and vectorizing a rear edge of the first basic shape;
   (c) determining if the first basic shape is accurately representable as an arc vector, a line vector, or a filled shape consisting of a plurality of stored runlength slices by operating on the front and rear edge vectors obtained in step (b);
   (d) generating an input vector that is a line vector or an arc vector if the first basic shape is to be represented by a line vector or an arc vector, respectively, and generating data defining a filled shape if the first basic shape is to be represented as a filled shape;
   (e) if the first basic shape is represented as a filled shape, entering the filled shape data as a new entry into a filled shape table;
   (f) if the first basic shape is represented by an input vector, entering the input vector as a new entry into the vector table; and
   (g) repeating steps (a) through (f) for any additional basic shapes of the object until the entire object has been vectorized.

25. A system for vectorizing data obtained by electronically scanning an object of a document, the data being assembled into records definitive of connected basic shapes of which the object is composed, the system comprising in combination:

(a) means for obtaining the record of a first basic shape of the object;

(b) means for vectorizing a front edge and vectorizing a rear edge of the first basic shape;

(c) means for determining if the first basic shape is accurately representable as an arc vector, a line vector, or a filled shape consisting of a plurality of stored runlength slices by operating on front and rear edge vectors of the first basic shape;

(d) means for generating an input vector that is a line vector or an arc vector if the first basic shape is to be represented by a line vector or an arc vector, respectively, and means for generating data defining a filled shape if the first basic shape is to be represented as a filled shape;

(e) means for entering the filled shape data as a new entry into a filled shape table; and (f) means for determining whether the input vector touches an intermediate vector and can be combined with a vector already stored in the vector table, and if this determination is affirmative, combining the input vector with the stored vector and storing the combined vector in the vector table, and if this determination is negative, entering the input vector as a new entry into the vector table.

26. The system of claim 25 wherein the records include blob records that include runlength slices of blobs which are non-trapezoidal irregular basic shapes of the object, and the records include trapezoid records that include four corner points of trapezoids that are basic shapes of the object.

27. The system of claim 26 wherein the records include convergence records and divergence records that each include pointers to basic shapes connected to convergences and divergences, respectively, of the object.

28. The system of claim 27 including an intersection counter and means for incrementing the intersection counter after all of the basic shapes connected to a first intersection have been vectorized.

29. The system of claim 28 including means for determining if the first basic shape is hoizontal before the vectorizing of the front and rear edges.

30. The system of claim 29 including means for determining if the front and rear edges of the first basic shape each include a plurality of line vectors of similar length, and if so, determining if the first basic shape is nearly horizontal, and if the first basic shape is not nearly horizontal, generating an arc code indicating that the first basic shape is to be represented by an arc vector, and if the first basic shape is nearly horizontal, determining if the first basic shape is convex.

31. The system of claim 30 including means for generating an intersection blob code indicating that the first basic shape is to be represented as an intersection blob if the first basic shape is not convex, and generating a filled circle code indicating that the first basic shape is to be represented as a filled circle if the first shape is convex.

32. The system of claim 30 including means for determining if the longest front edge vector of the first basic shape is parallel to the longest rear edge vector thereof, and if this determination is affirmative, generating a vertical vector code indicating that the first basic shape is to be represented by a vertical vector if the front and rear edge vectors of the first basic shape are vertical, and generating a diagonal vector indicating that the first basic shape is to be represented by a diagonal vector if the front and rear edges of the first basic shape are parallel diagonal vectors.

33. The system of claim 32 including means for generating a filled polygon code indicating that the first basic shape is to be represented as a filled polygon if the longest vectors of the front and rear edges of the first basic shape are not parallel.

34. The system of claim 33 including means for utilizing one of the filled polygon, diagonal vector, vertical vector, horizontal vector, filled circle, or arc codes to call up and execute a vector generating subroutine or a filled shape data generating subroutine in order to generate a vector representing the first basic shape or to generate filled shape data accurately representing the first basic shape.

35. The system of claim 34 including means for entering the filled shape data as a new entry into the filled shape table, and if the information is a vector, determining if the vector is an arc vector.

36. The system of claim 35 including means for executing a line desgmentation subroutine if the input vector is not an arc vector and executing an arc desegmentation subroutine if the input vector is an arc vector.

37. The system of claim 36 wherein the line desegmentation subroutine executing means includes means for resetting a combine flag, determining if any vector in the table has the same intersection number as the present input vector, and if this determination is affirmative, determining if the stored vector is an arc vector, and if this determination is affirmative, executing the arc desegmentation subroutine, and if that determination is negative, determining if the input vector and the stored vector are sufficiently close together and sufficiently colinear that the input vector can be combined with the stored vector, and if that determination if affirmative, setting the combine flag.

38. The system of claim 37 including means for entering the input vector as a new entry in the vector table if it is determined that no vector stored in that table has the same intersection number as the input vector.

39. The system of claim 38 wherein the line desegmentation subroutine executing means includes means for determining if the input vector begins at an open point and ends at a divergence, and if so, entering the input vector into the vector table, and if not, determining if the input vector is in an intersection that includes an upper convergence and a lower divergence, and if this determination is affirmative, determining if the input vector is too short to be entered into the vector table, and if not, entering it as a new entry into the vector table, and if the input vector is not in the intersection, then determining if the input vector begins at a convergence and ends at an open point, and if not, determining if any vector stored in the vector table has the same intersection number as the input vector, and if the input vector begins at a convergence and ends at an open point, determining if the input vector is too short to be combined with a stored vector.

40. The system of claim 38 wherein the arc desegmentation subroutine executing means includes means for resetting a combine flag, determining if the two closest end points of the input vector and a vector stored in the vector table having the present intersection number are close enough to allow the two to be combined, and if not, entering the input arc vector as a new entry in the vector tablet, and if so, determining if the lengths of the input arc vector and the stored vector are similar, and if they are not, entering the input vector into the vector table, but if they are, computing the intersection between the input vector and the stored vector, and determining if the computed angle is less than about 90 degrees, and if it is, entering the input vector into the vector table, but if it is not, determining if the input arc vector and the stored vector, if combined, form a convex shape, and if they do not, entering the input vector as a new entry in the vector table, and if they do, setting the combine flag and then combining the input vector with the stored vector in the vector table.

41. The system of claim 36 including means for executing a polygon merging subroutine including means for determining if a present filled polygon is close to a filled polygon already stored in the filled shape table, and if it is, for determining if there is a horizontal edge at the lowest point of one of those two filled polygons and a horizontal edge at the highest point of the other of those two filled polygons, and if so, for determining if the two horizontal edges are substantially coextensive, and if they are, for generating a filed polygon record including all vertices of both of the filled polygon, and for deleting one vertex of each pair of vertices which are closer than a first predetermined distance apart from the filled polygon record.

42. The system of claim 41 including means for determining if the middle vertex of a group of three consecutive vertices lies less than a second predetermined distance from a straight line through the outer two vertices of that group and if it is deleting the middle vertex, and repeating the two foregoing steps for a separate group of three consecutive vertices in the filed polygon record.

43. The system of claim 36 including means for generating a polygon merging subroutine including means for determining if the present filled polygon is close to a filled polygon already stored in the filled shape table, and if it is , for determining if there is a horizontal edge at the loest point of one or those two filled polygons and a horizontal edge at the highest point of the other of those two filled polygons, and if so, for determining if the two horizontal edges are substantially coextensive, and if they are, for generating a filled polygon record including all vertices of both of the filled polygons, and for determining if the middle vertex of a group of three consecutive vertices in the filled polygon record lies less than a predetermined distance from a straight line through the outer two vertices of that group, and if it is, for deleting the middle vertex from the filled polygon record, and repeating the two foregoing steps for a different group of three consecutive vertices in the filled polygon record.

44. A system for vectorizing dta obtained by electronically scanning an object of a document, the data being assembled into records definitive of connected basic shapes of which the object is composed, the system comprising in combination:
   (a) means for obtaining the record of a first basic shape of the object;
   (b) means for vectorizing a front edge and vectorizing a rear edge of the first basic shape;
   (c) means for determining it the first basic shape is accurately representable as a line vector, by operating on the front and rear edge vectors;
   (d) means for generating an input vector that is a line vector; and
   (e) means for determining whether the input vector touches an intermediate vector and can be combined with a vector that is spaced from the input vector, touches the intermediate vector, and is already stored in a vector table, means for combining the input vector with the stored vector if this determination is affirmative, and means for storing the combined vector in the vector table, and means for entering the input vector as a new entry into the vector table if this determination if negative.

45. A system for vectorizing data obtained by electronically scanning an object of a document, the data being assembled into records definitive of connected basic shapes of which the object is composed, the system comprising in combination:
   (a) means for obtaining the record of a first basic shape of the object;
   (b) means for vectorizing a front edge and vectorizing a rear edge of the first basic shape;
   (c) means for determining it the first basic shape is accurately representable as an arc vector, a line vector, or a filled shape consisting of a plurality of stored runlength slices by operating on the front and rear edge vectors;
   (d) means for generating an input vector that is a line vector or an arc vector if the first basic shape is to be represented by a line vector or an arc vector, respectively, and generating data defining a filled shape if the first basic shape is to be represented as a filled shape;
   (e) means for entering the filling shape data as a new entry into a filled shape table if the first basic shape is represented as a filled shape; and
   (f) means for entering the input vector as a new entry into the vector table if the first basic shape is represented by an input vector.

* * * * *